United States Patent
Kaplan

(10) Patent No.: US 9,117,175 B2
(45) Date of Patent: Aug. 25, 2015

(54) NEURITE SYSTEMS

(71) Applicant: Jeremy M. Kaplan, McLean, VA (US)

(72) Inventor: Jeremy M. Kaplan, McLean, VA (US)

(*) Notice: Subject to any disclaimer, the term of this patent is extended or adjusted under 35 U.S.C. 154(b) by 130 days.

(21) Appl. No.: 14/134,876

(22) Filed: Dec. 19, 2013

(65) Prior Publication Data

US 2014/0372354 A1    Dec. 18, 2014

Related U.S. Application Data

(60) Provisional application No. 61/835,833, filed on Jun. 17, 2013.

(51) Int. Cl.
*G06N 3/00* (2006.01)
*G06N 3/063* (2006.01)
*G06N 3/06* (2006.01)

(52) U.S. Cl.
CPC ............ *G06N 3/0635* (2013.01); *G06N 3/06* (2013.01)

(58) Field of Classification Search
None
See application file for complete search history.

(56) References Cited

PUBLICATIONS

Hagras, et al., Evolving Spiking Neural Network Controllers for Autonomous Robots, Proceedings of the 2004 IEEE international Conference on Robotics 8 Automation, New Orleans, LA Apr. 2004, pp. 4620-4626.*
Ponulak, Supervised Learning in Spiking Neural Networks with ReSuMe Method, Doctoral Dissertation, Poznan University of Technology, 2006, pp. 1-151.*

* cited by examiner

*Primary Examiner* — Wilbert L Starks
(74) *Attorney, Agent, or Firm* — Venable LLP; Jeffri A. Kaminski; Trent B. Ostler

(57) ABSTRACT

Neurite systems, methods, and media are disclosed. An input section may be configured to receive an input voltage and amplify the input voltage by a weight into a weighted voltage rate-of change. A firing center comprising an existing instantaneous voltage and a trigger firing voltage may be configured to, in a period of time, receive the weighted voltage rate-of-change, determine a new instantaneous voltage based on the existing instantaneous voltage, the weighted voltage rate-of-change, and the period of time, transmit a pulse trigger to an output section when the new instantaneous voltage rises to or above the trigger firing voltage, and reset the new instantaneous voltage to zero or some other predefined value. The output section may be configured to receive the pulse trigger and to transmit an output voltage pulse having a finite duration to one or more branches.

74 Claims, 74 Drawing Sheets

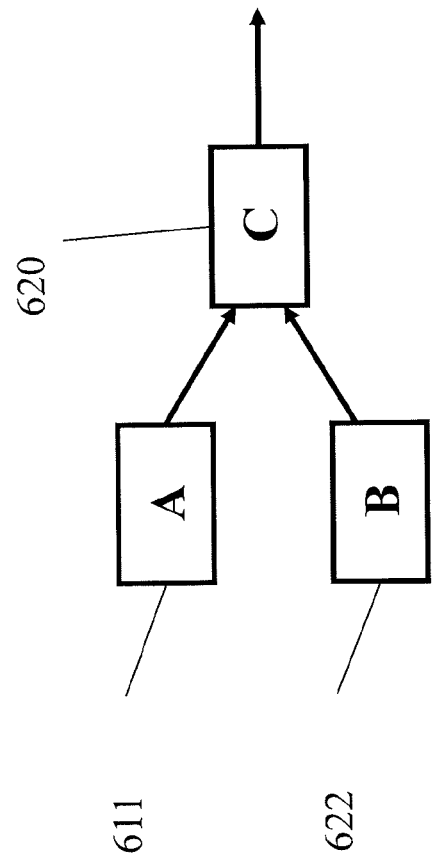
Figure 6a
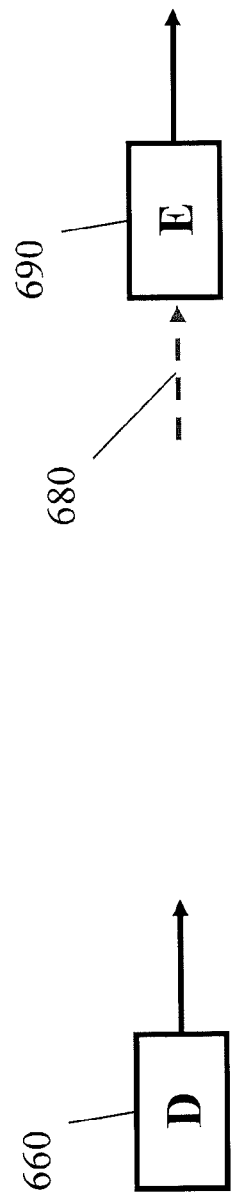
Figure 6c
Figure 6b

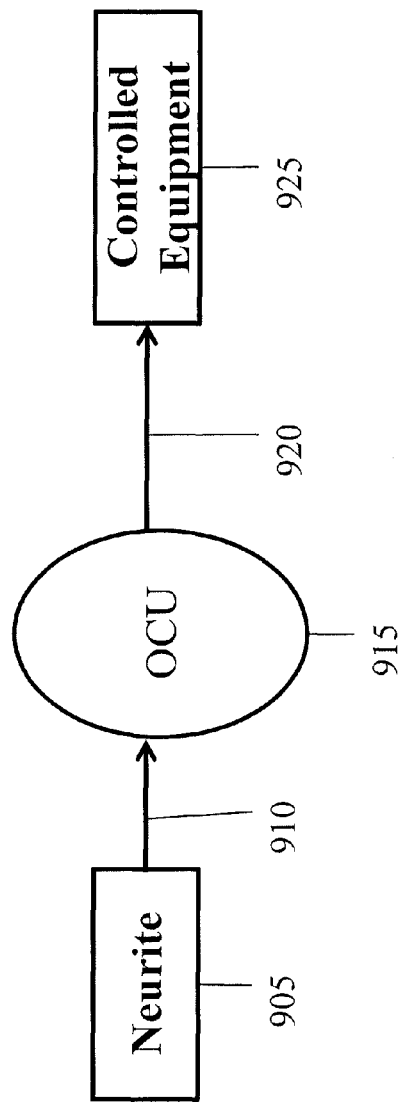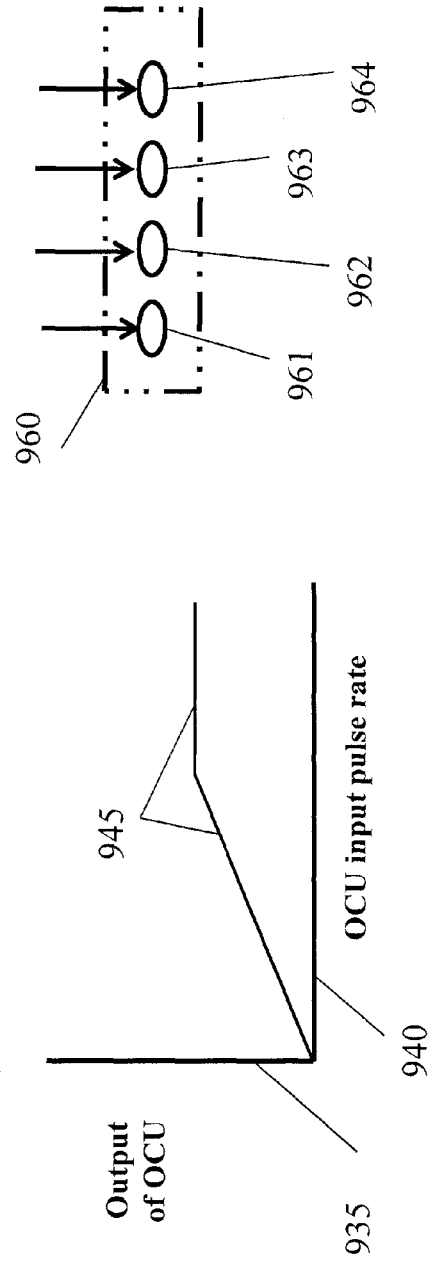

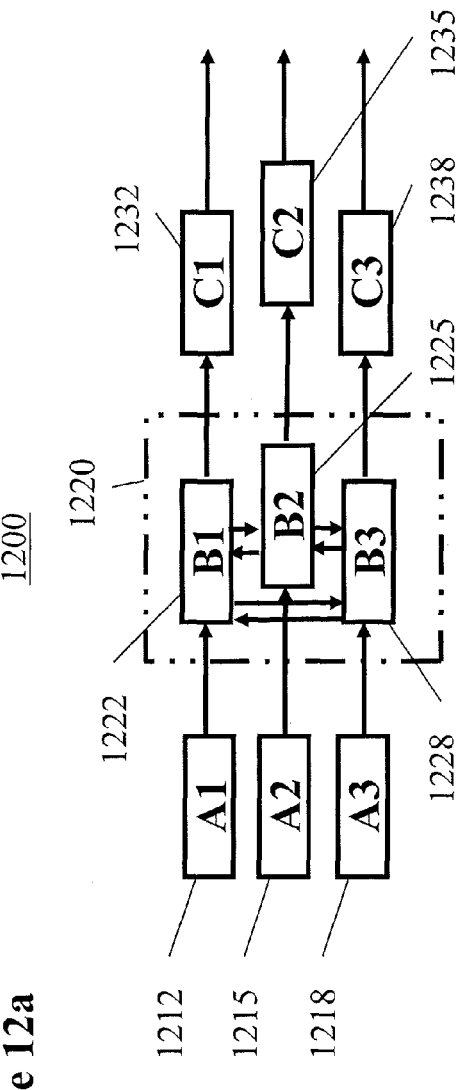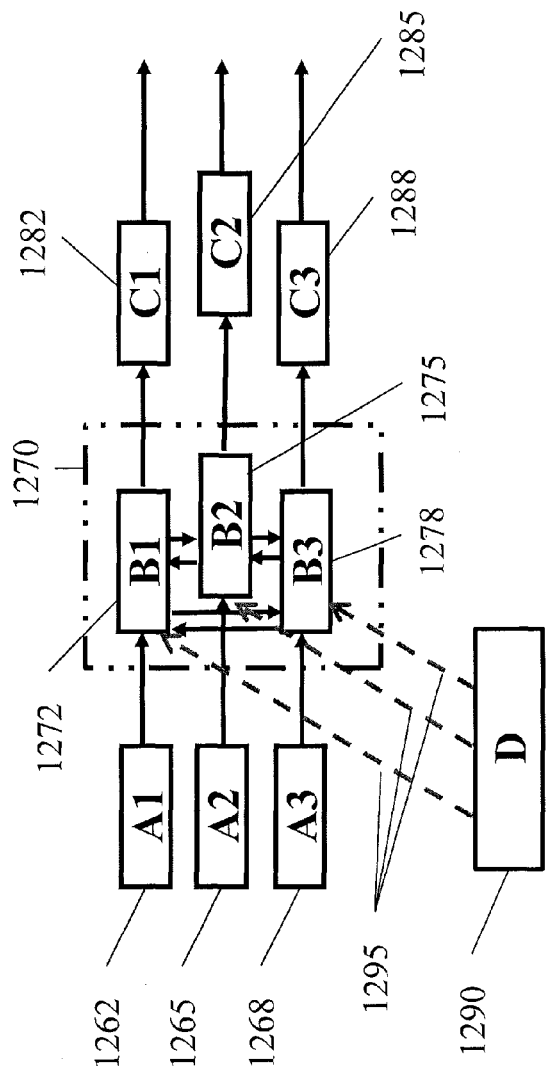
Figure 12a
Figure 12b

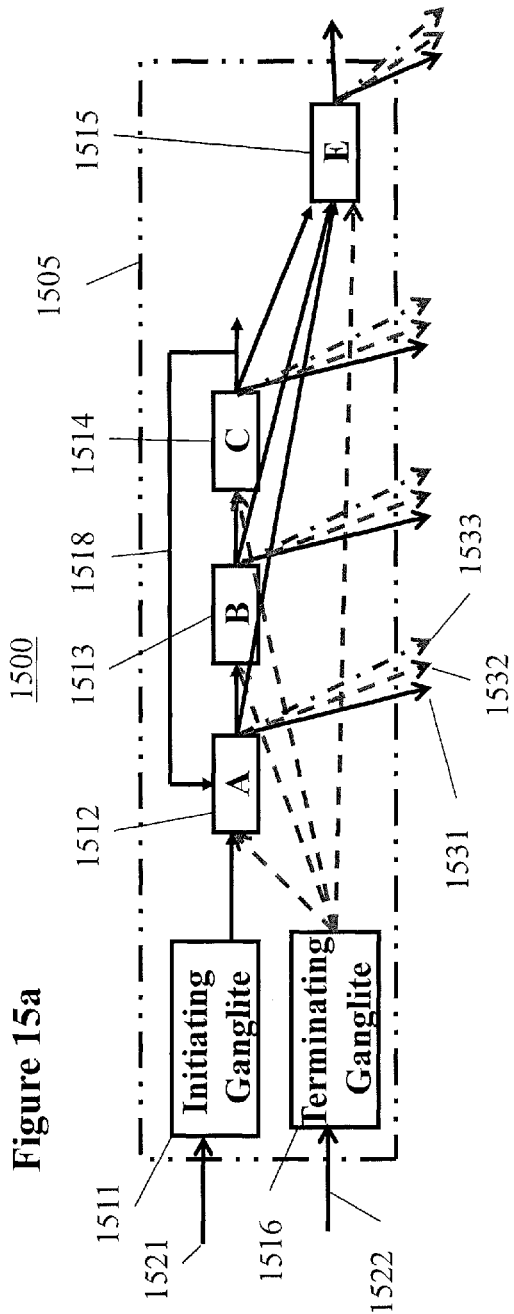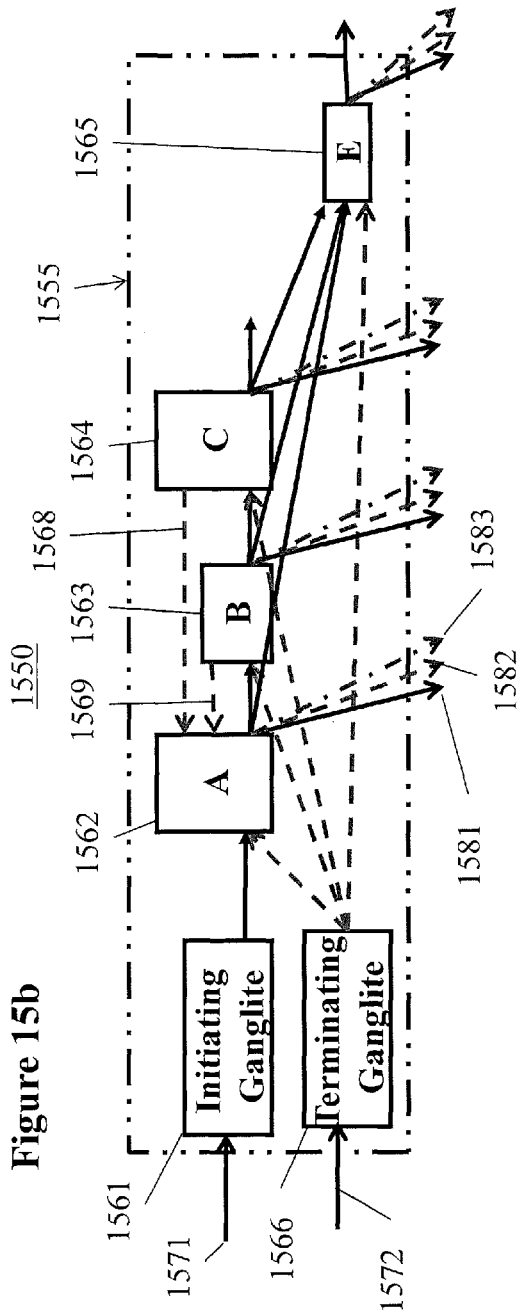

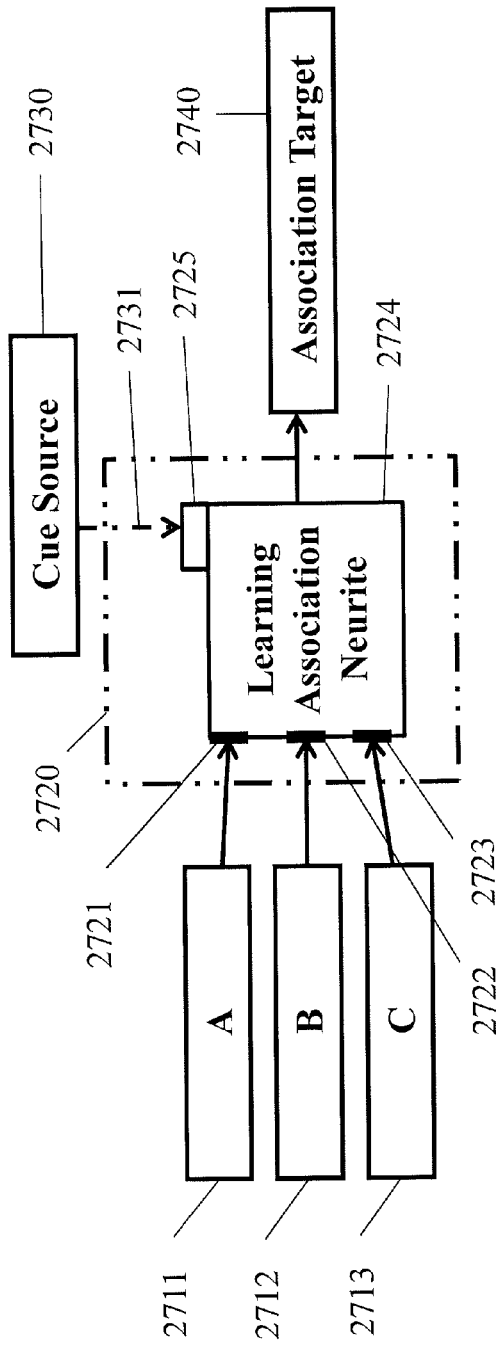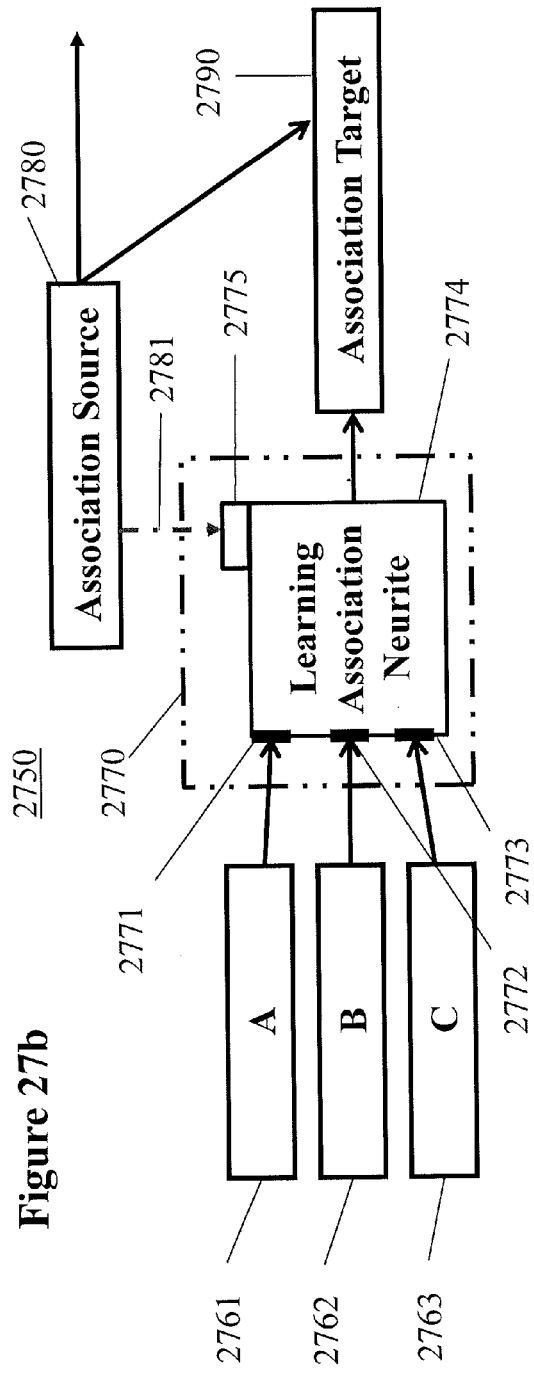
Figure 27a
Figure 27b

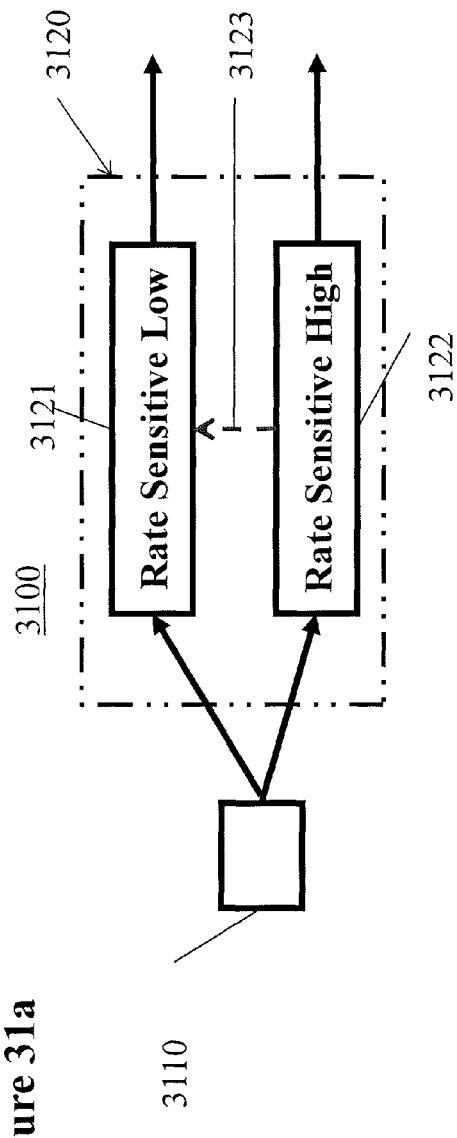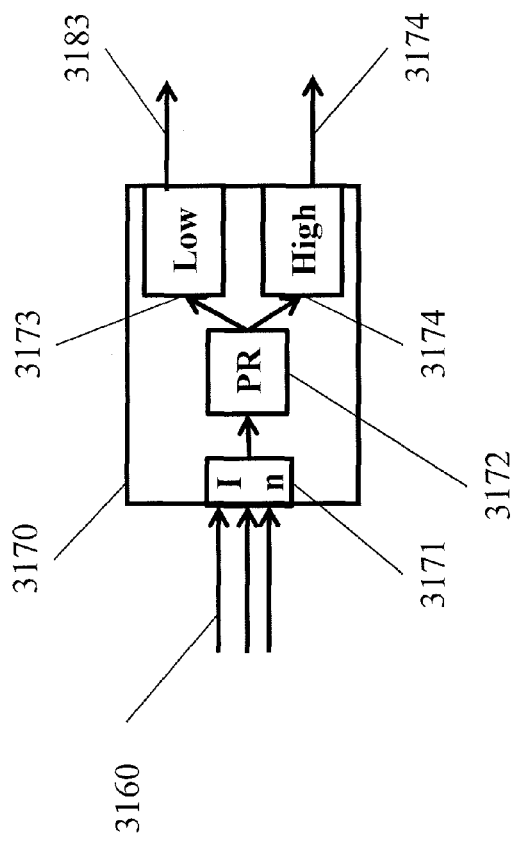
Figure 31a
Figure 31b

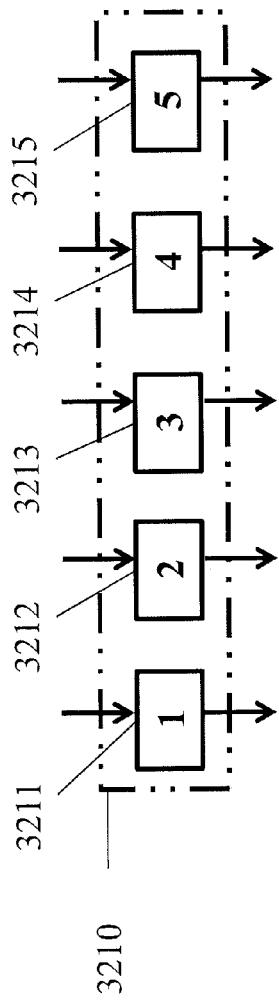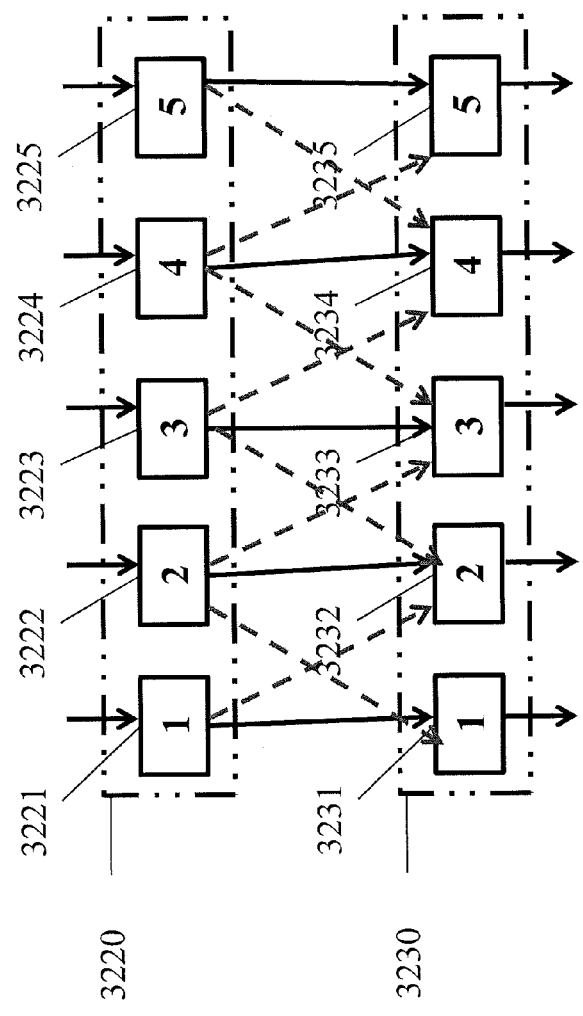
Figure 32a
Figure 32b

Figure 50

| Number of Stages | Number of Neurites | Number of Inputs | Number of Recognizable Input States | Efficiency = Input States / Neurites |
|---|---|---|---|---|
| N | $4 * (2^N - 1)$ | $2^N$ | $2^{(2^N)} - 1$ | $\rightarrow 2^{(2^N - N - 2)}$ |
| 2 | 12 | 4 | 15 | 1.25 |
| 3 | 28 | 8 | 255 | 9.1 |
| 4 | 60 | 16 | 65535 | 1092 |
| 5 | 124 | 32 | $\rightarrow 4{,}000{,}000{,}000$ | $\rightarrow 32{,}000{,}000$ |

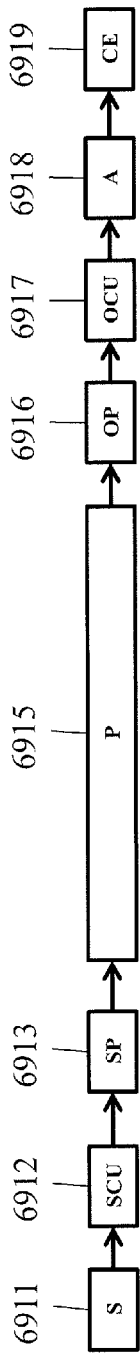
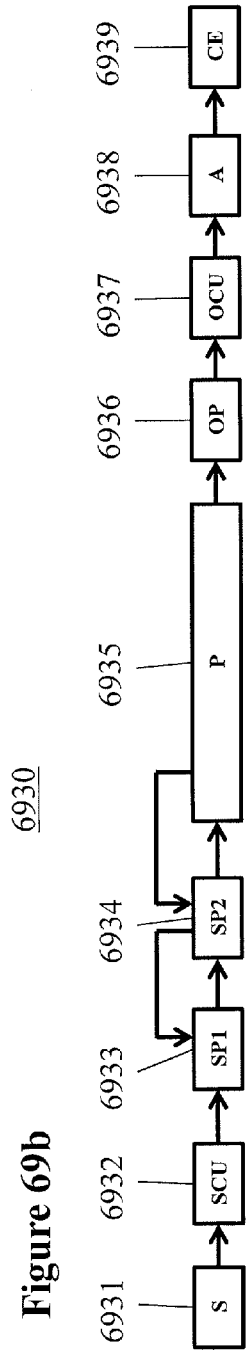
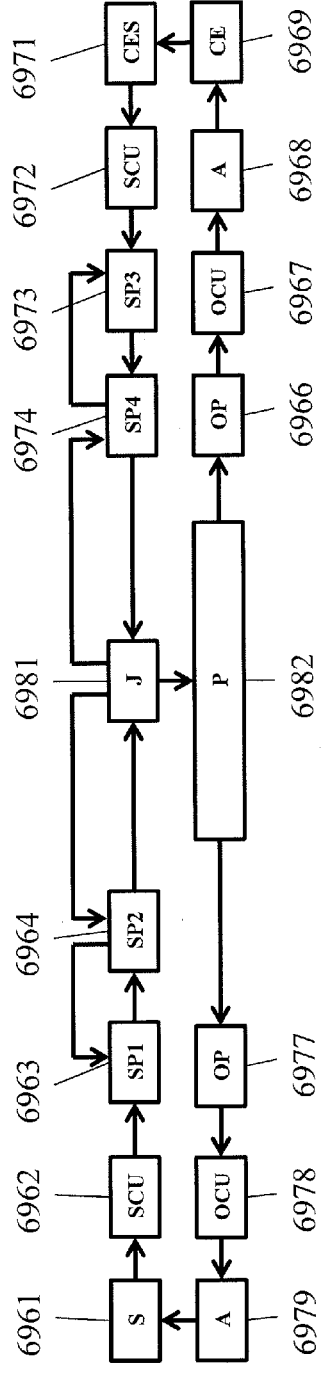
Figure 69a
Figure 69b
Figure 69c

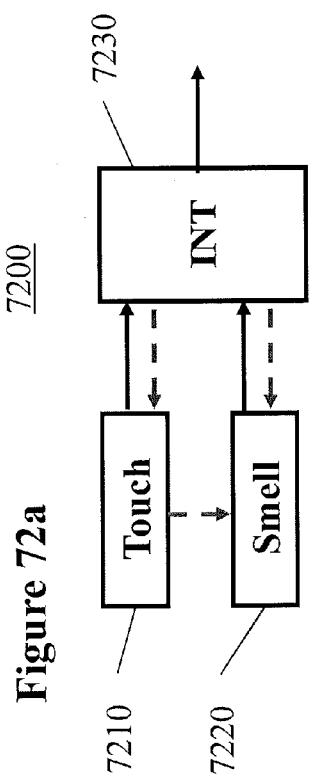
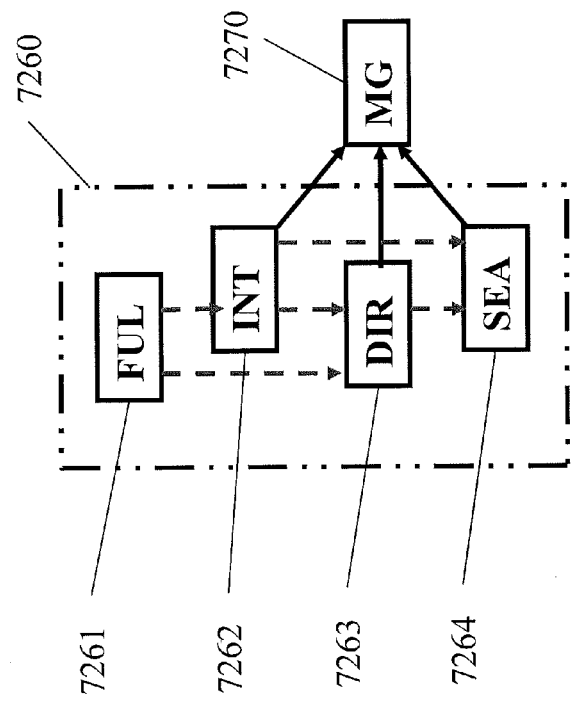
Figure 72a
Figure 72b

NEURITE SYSTEMS

CROSS REFERENCE TO RELATED APPLICATIONS

This application claims priority to U.S. Provisional Patent Application Ser. No. 61/835,833 entitled "MASSIVELY-PARALLEL, ASYNCHRONOUS, MULTIPLY-INTER-CONNECTED NEURITE SYSTEMS," filed Jun. 17, 2013, which is hereby incorporated herein by reference in its entirety.

BACKGROUND

An artificial neuron characteristically receives inputs, calculates a weighted sum of these inputs, applies a non-linear operator (almost always a sigmoid or signum) to this weighted sum, and provides an output that is the result of the non-linear operator. In artificial neural networks, weights are externally calculated by various algorithms, usually as a result of training runs in which calculated outputs are compared to desired outputs, and weights are modified to improve the calculated outputs to better match the desired outputs. This is often done by trial and error, with statistical methods employed to improve the speed of convergence. Further, artificial neurons fire in synchronous cycles.

However, artificial neural networks suffer from several deficiencies. For example, the weights in artificial neural networks may only be set externally, but not by the neurons themselves. Further, other than a potential change of weights, the artificial neuron retains no state information and has no time dependence. Specifically, it treats the next round of inputs exactly as it did the previous one. Artificial neural networks are also not richly connected, and they do not have significant feedback at multiple levels. These characteristics severely limit the ability of artificial neural networks to learn, particularly as self-organizing and self-regulating systems. They also severely limit the ability of artificial neural networks to create spontaneous behavior and to coordinate and control complex systems in dynamic and changing environments.

What is needed are processing systems, methods, and media that overcome these shortcomings.

SUMMARY

Various embodiments are generally directed to neurites to overcome the aforementioned problems.

One or more embodiments may include a neurite comprising: an input section configured to: receive an input voltage, and amplify the input voltage by a weight into a weighted voltage rate-of change; a firing center comprising an existing instantaneous voltage and a trigger firing voltage, wherein the firing center is configured to, in a period of time: receive the weighted voltage rate-of-change, determine a new instantaneous voltage based on the existing instantaneous voltage, the weighted voltage rate-of-change, and the period of time, transmit a pulse trigger to an output section when the new instantaneous voltage rises to or above the trigger firing voltage, and reset the new instantaneous voltage to zero or some other predefined value; and the output section configured to receive the pulse trigger and transmit an output voltage pulse having a finite duration to one or more branches. One or more embodiments may include a plurality of neurites.

One or more embodiments may include a neurite system comprising: one or more sensor conversion units, wherein each of the sensor conversion units are configured to: receive inputs from an external environment and controlled equipment, create pulses based on the received inputs, and provide the pulses to a neurite core; the neurite core comprising a plurality of neurites, wherein the neurite core is configured to: receive the pulses from the one or more sensor conversion units, transmit the pulses to one or more other neurites in the neurite core, create second pulses based on pulses received from sensor conversion units and other neurites in the neurite core, and transmit the second pulses to one or more output conversion units; and the one or more output conversion units configured to: receive the second pulses from neurites in the neurite core, and provide output signals to one or more output devices.

One or more embodiments may include a sensor conversion unit comprising: an input section configured to: receive one or more inputs from a sensor that senses a physical phenomenon, and transmit the one or more inputs to a processing section; a processing section configured to produce one or more pulses that are a function of the input; and an output section configured to transmit the one or more pulses to a neurite.

One or more embodiments may include an output conversion unit comprising: an input section configured to receive one or more pulses from one or more neurites; a processing section configured to convert the received one or more pulses into electrical or physical signals; and an output section that provides electrical or physical signals to one or more output devices.

One or more embodiments may include a method of processing input voltages, the method comprising: receiving, by an input section, an input voltage; amplifying, by the input section, the input voltage by a weight into a weighted voltage rate of change; receiving a weighted voltage rate-of-change by a firing center, the firing center comprising an existing instantaneous voltage and a trigger firing voltage; determining, by the firing center in any period of time, a new instantaneous voltage based on the existing instantaneous voltage, the weighted voltage rate-of-change, and the period of time; transmitting, by the firing center, a pulse trigger to an output section when the new instantaneous potential rises to or above the trigger firing voltage; resetting, by the firing center, the new instantaneous voltage to zero or a preset value; and receiving, by an output section, the pulse trigger, and transmitting, by the output section, an output voltage pulse for a finite duration to one or more branches.

One or more embodiments may include a method of local weight modification in elements that amplify input voltages by weights, through the use of a learning module associated with an element, the method comprising: receiving, by the learning module associated with the element, a stimulation from another source; remaining stimulated for a time duration during which the learning module causes or enables weights to be modified; and modifying the weight assigned to input voltages by the element that amplifies the input voltages by weights.

One or more embodiments may include a method of sequenced, coordinated, and timed action using a sequence of action-initiating elements interspersed with variable timing elements that are fed by time delay and enhancement source, the method comprising: loading the variable timing elements with time delays or enhancements from a variable time delay and enhancement source; initiating an action-initiating sequence element; initiating a variable timing element by the action-initiating sequence element; and initiating the next action-initiating sequence element by the variable timing element.

One or more embodiments may include a method of associating a source with an association target, the method comprising: receiving, by a learning neurite that fires an output to an association target, a learning cue; receiving, by the learning neurite, an input from the source; and increasing, by the learning neurite, the weight applied to the input received from the source; wherein later output from the source causes the learning neurite to stimulate the association target.

One or more embodiments may include a method of associating a new source with an association target so that the new source evokes the same response as the original association source, the method comprising: receiving, by a learning module of a learning neurite that fires an output to the association target, a pulse from the original association source that also fires a pulse to the association target; receiving by the learning neurite a voltage input from the new source; and increasing a weight applied to the voltage input from the new source; wherein later output from the new source causes the learning neurite to stimulate the association target.

One or more embodiments may include a method for change or motion detection in a field, the method comprising: initiating, by a first field element, a first time sequence of events; stimulating, by an element of the first time sequence of events, a comparison element; inhibiting the comparison element by a same amount by a subsequent element in the first time sequence of events; initiating, by a second field element, a second time sequence of events; stimulating the comparison element, by an element of the second time sequence of events, more strongly than the element of the first time sequence of events; firing, by the comparison element; and inhibiting the comparison element by the same amount as the stimulation by the element of the second time sequence of events, by a subsequent element in the second time sequence of events.

One or more embodiments may include a method for pattern matching from incomplete patterns, the method comprising: receiving, by a pattern matching unit, inputs from sufficient elements of a pattern to make the pattern matching unit fire at a low level; firing, by a low level output of the pattern matching unit, stimulating inputs to the elements of the pattern, sufficient to enhance first firing rates of the elements of the pattern; and firing, at a high rate output of the pattern matching unit, in response to high rate outputs of the elements of the pattern firing at higher rates than the first firing rates.

One or more embodiments may include a method of reciprocal memory wherein activation of a composite memory stimulates the individual memory elements that originally produced the composite memory, the method comprising: forming the composite memory, wherein forming the composite memory further comprises: stimulating a first element by the individual memory elements, reinforcing the pathways from the individual memory elements to the first element, stimulating a second element by the first element, reinforcing a second pathway from the first element to the second element, stimulating a target composite memory by the second element, stimulating the second element by the target composite memory, reinforcing a third pathway from the target composite memory to the second element, stimulating the first element by the second element, reinforcing a fourth pathway from the second element to the first element, stimulating the individual memory elements by the first element, reinforcing the pathways from the first element to the individual memory elements; and activating the individual memory elements from the composite memory, wherein the activating further comprises: activating the composite memory, activating the second element by the composite memory, activating the first element by the second element, and activating the individual memory elements by the first element.

One or more embodiments may include a computer readable storage medium comprising instructions that if executed enables a computing system to: receive an input voltage; amplify the input voltage by a weight into a weighted voltage rate-of change; determine a new instantaneous voltage based on the existing instantaneous voltage, the weighted voltage rate-of-change, and the period of time; transmit to one or more branches an output voltage pulse having a finite duration.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

Embodiments will now be described in connection with the associated drawings, in which:

FIG. 6a depicts a block diagram of an exemplary neurite used as a pseudo logical device that can execute neurite logic 600 in accordance with one or more embodiments.

FIG. 6b depicts an exemplary spontaneous pulse generating neurite used to generate spontaneous pulses 650 in accordance with one or more embodiments.

FIG. 6c depicts another exemplary spontaneous pulse generating neurite used to generate spontaneous pulses 670 in accordance with one or more embodiments.

FIG. 9a depicts a block diagram of an exemplary output conversion unit in situ 900, in accordance with one or more embodiments.

FIG. 9b depicts an exemplary output of an output conversion unit 930 in accordance with one or more embodiments.

FIG. 9c depicts an exemplary output conversion unit module of 950 in accordance with one or more embodiments.

FIG. 12a depicts an exemplary simple relay ganglite 1200 in accordance with one or more embodiments.

FIG. 12b depicts an exemplary simple inhibiting junction relay ganglite 1250 in accordance with one or more embodiments.

FIG. 15a depicts a block diagram of an exemplary persistent state ganglite with initiating and terminating ganglites 1500 in accordance with one or more embodiments.

FIG. 15b depicts a block diagram of an exemplary time-limited state ganglite with initiating and terminating ganglites 1550 in accordance with one or more embodiments.

FIG. 27a depicts a block diagram of an exemplary learning association ganglite in context 2700 in accordance with one or more embodiments.

FIG. 27b depicts a block diagram of an exemplary learning association method in which an association source causes an input ganglite to have an effect comparable to the effect of the source 2750 in accordance with one or more embodiments.

FIG. 31a depicts a simple rate selective channel separation ganglite 3100 in accordance with one or more embodiments.

FIG. 31b depicts a general ganglite with rate selective channel separation 3150 in accordance with one or more embodiments.

FIG. 32a depicts an exemplary linear ganglite field 3200 in accordance with one or more embodiments.

FIG. 32b depicts an exemplary concatenation of ganglite fields to form a pathway segment 3250 in accordance with one or more embodiments.

FIG. 50 depicts an exemplary table in accordance with one or more embodiments.

FIG. 69a depicts a simple pathway from sensor to controlled equipment 6900 in accordance with one or more embodiments.

FIG. 69b depicts a simple pathway from sensor to controlled equipment with multi-stage sensor processing 6930 in accordance with one or more embodiments.

FIG. 69c shows a simple creature with multiple pathways to provide more integrated control for controlled equipment 6950 in accordance with one or more embodiments.

FIG. 72a depicts a simple sensory decision hierarchy 7200 in accordance with one or more embodiments.

FIG. 72b displays a decision hierarchy involving four ganglites 7250 in accordance with one or more embodiments.

DETAILED DESCRIPTION OF THE DRAWINGS

Exemplary embodiments are discussed in detail below. While specific exemplary embodiments are discussed, it should be understood that this is done for illustration purposes only. In describing and illustrating the exemplary embodiments, specific terminology is employed for the sake of clarity. However, the embodiments are not intended to be limited to the specific terminology so selected. A person skilled in the relevant art will recognize that other components and configurations may be used without parting from the spirit and scope of the embodiments. It is to be understood that each specific element includes all technical equivalents that operate in a similar manner to accomplish a similar purpose. The examples and embodiments described herein are non-limiting examples.

Disclosed is a class of computational devices, along with constituent components, interconnections, pathways, and processes that may receive sensory inputs, make decisions, and control equipment. A computation device may include one or more neurites, one or more groups of potentially interconnected neurites (called ganglites), and one or more groups of potentially interconnected ganglites (called ganglite structures) that may perform complex calculations needed to control complex systems. Many specific neurite types and variations are disclosed, along with many specific ganglite types and variations, ganglite structure types and variations, and many specific types and variations of interconnections and pathways. All of which may receive and process information, make decisions, initiate actions, and perform and coordinate multiple simultaneous actions and activities of equipment. The result may comprise an autonomous creature that is capable of thought.

Massively Parallel, Asynchronous, Multiply Connected, and Autonomous

Each neurite may fire, asynchronously or synchronously, when it is ready to fire. Thus, the neurites in ganglites and ganglite structures may also fire, asynchronously or synchronously, when they are ready to fire. A neurite system may be massively multiply interconnected in that any neurite, by itself or in any ganglite and ganglite structure may connect to any other neurite that is by itself or in any ganglite, ganglite structure, or output conversion unit. The system may be massively parallel in that any number or set of neurites and the elements composed of neurites may fire in any finite time period, however brief. Firing may occur in complex chains and pathways, which may include open pathways and closed loops that are richly interconnected, and which may include feedback at all levels. These pathways may result in processes that may feed into other processes, and feed back into themselves. Thus, multiple processes may be potentially active and potentially interacting and continuing in parallel at any one time.

Figure 1:
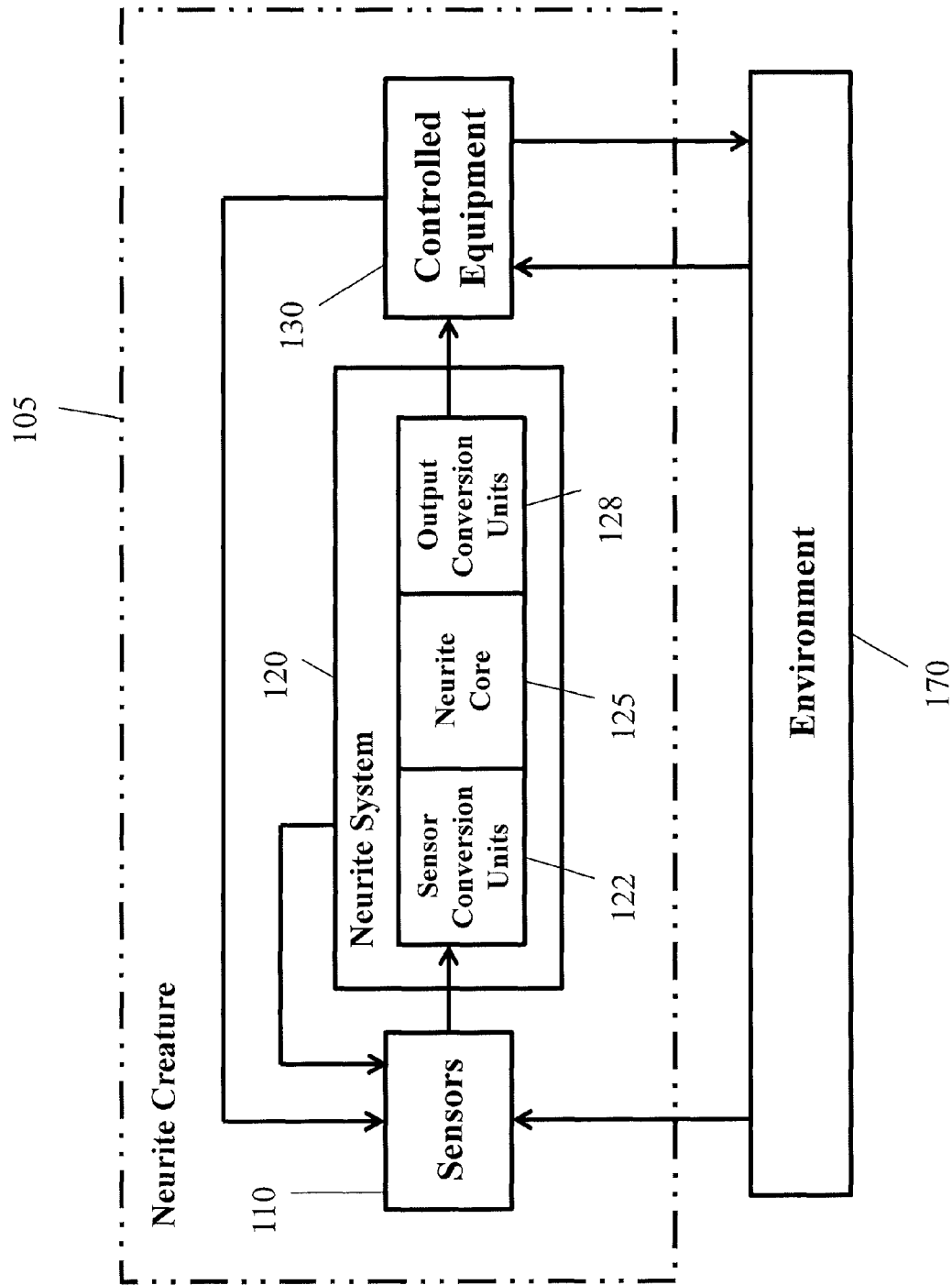
FIG. 1 depicts a block diagram of an exemplary neurite creature in the context of an environment 100 in accordance with one or more embodiments.

FIG. 1 depicts a block diagram of an exemplary neurite creature in the context of an environment 100 in accordance with one or more embodiments. Neurite creature 105 may include one or more sensors 110, one or more neurite systems 120, and one or more controlled equipments 130. The one or more sensors 110 may be any devices that sense physical phenomena and produce electrical voltages and currents. Specific examples of sensors include acoustic sensors that sense sounds and produce voltages and currents, optical sensors and sensor arrays that sense light and produce voltages and currents, and pressure sensitive devices that sense pressure and produce corresponding voltages and currents. Sensors may also detect specific aspects of the state of the neurite system and controlled equipments. Specific examples might include temperature, fuel levels, degree of wear and tear, and the need for replenishment and repair. The one or more neurite systems 120 may be the brains and nervous system of the neurite creature. They may be the controllers of entire autonomous vehicles, the controllers of assemblies of individual factory equipment, or creative engines that produce new art and science. The controlled equipment 130 may be devices that produce motion or provide signals to external entities. They may be vehicles or vehicle components, artificial limbs, factory assembly equipment, or radio frequency or other communications equipment. Environment 170 may be any physical or logical environment with which the neurite creature interacts. It may be physical terrain on this or another planet, an undersea environment, or a logical computer-driven simulation.

The neurite system 120 may comprise one or many sensor conversion units 122, one or many neurite cores 125, and one or many output conversion units 128. A neurite pulse may be a pulse that is acceptable to a neurite as an input. The sensor conversion units may be devices that convert the electrical outputs of sensors into neurite pulses that can stimulate or inhibit neurites in the neurite core. They may be, for example, devices that convert microphone output voltages into neurite pulses, voltages from optical sensor arrays into neurite pulses, or voltage outputs of radio-frequency communications systems into neurite pulses. In the case that a sensor produces neurite pulses directly, the input conversion unit may be discussed in what follows as if it is logically present and physically located in the sensor. The neurite core 125 may comprise one or many neurites. Any neurite in the neurite core may receive and be stimulated by neurite pulses from any sensor conversion unit or any other neurite in the neurite core. Any neurite in the neurite core may stimulate or inhibit any neurite in the neurite core. Any neurite in the neurite core may stimulate or inhibit one or more output conversion units 128. The neurite core may execute internal processes that may result in and represent memories, concepts, and internal states. The neurite core may execute multiple simultaneous processes, including processes that control the behavior of the neurite creature based on sensor inputs from the external environment, the state of sensors and controlled equipment, and the internal processes that may represent memories, concepts, and internal states. An output conversion unit 128 may be any device that receives pulses from one or many neurites, and produces electrical or other signals that can initiate and control controlled equipment. Examples may include devices that convert neurite pulses into voltages that control actuators for mechanical limbs, and devices that convert neurite pulses into signals that control and provide signals to radio frequency communications equipment. In the event that controlled equipment can be directly controlled by neurite pulses, the output conversion may be discussed in what follows as being logically present and physically located in the controlled equipment.

Elements of the class of neurite creatures, such as one or more sensors 110, one or more neurite systems 120, and one or more controlled equipment 130, may be autonomous in that they can potentially be aware of their internal states, controlled-equipment states, sensor states and external environment. They may potentially control themselves and their sensors and equipment, and may have persistent behaviors and goals that can change with time, internal state, sensor and equipment state, and external surroundings. Through their controlled equipment and sensors they may communicate externally.

Neurites

Figure 2A:
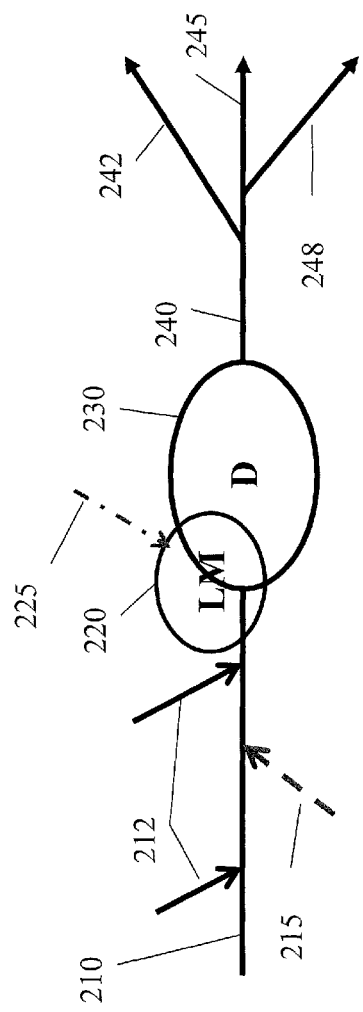
FIG. 2a depicts a block flow diagram of an exemplary method 200 of an exemplary neurite in accordance with one or more embodiments.

FIG. 2a depicts a block flow diagram of an exemplary method 200 of an exemplary neurite in accordance with one or more embodiments. It also may represent a physical layout of a neurite. A neurite may be comprised of an input section 210, a learning module 220, firing center 230, and an output section 240.

The input section may receive pulse inputs from one or more neurites or sensor processing units. Excitory inputs (inputs with weights that are positive or zero) 212 may be shown by solid arrows and inhibitory inputs (negative weights) 215 may be shown by dashed arrows. The input section 210 may provide a weighted sum of the inputs to the firing center 230 as a weighted voltage rate-of-change. Each individual input may be provided its own individual weight by the input section. The input section may have spatial extent, and may have physical branches and sub-branches (not shown).

The learning module 220 may be activated by an activation cue 225. The activation cue may be one or many neurite pulses, may be a general system input, or may be an input that is present at various periods of time. Once activated by the activation cue, the learning module may remain active for a period of time called a learning activation time. When active, the learning module may modify the weights of individual inputs to the input section that fire while the learning module is active. These modifications may remain until they are subsequently modified.

The firing center may be characterized by a voltage, internal voltage noise, a voltage decay rate, a trigger firing voltage, and a dead time. After any period of time the firing center may determine its new voltage from its previous voltage, the weighted voltage rate-of-change supplied by the input section, the voltage noise, and its voltage by the decay rate over that period of time. If the voltage at any instantaneous time is equal to or greater than the trigger firing voltage, and the time since last firing exceeds the dead time (if any), the firing center may initiate a pulse to the output section 240. If the firing center initiates a pulse, its voltage may be diminished to a preset value, which may be zero or some other value. The firing center may then continue to accumulate voltage, but may not fire again until it reaches or exceeds the trigger firing voltage and the elapsed time again exceeds the dead time (if any). The firing center voltage may be limited by a minimum voltage, which may be less than zero, and also by a maximum voltage.

While the neurite's firing center is accumulating voltage, its firing center voltage may be characterized in any brief period of time by the difference equation:

$$\Delta V = (\Sigma_i W_i * X_i + \text{noise}(t, \Delta t) - \lambda * V) * \Delta t \quad (1)$$

Where V is the instantaneous firing center voltage, $\Delta V$ is the change in firing center voltage in period of time $\Delta t$, $X_i$ is the input from source i, $W_i$ is the weight assigned to source i, $\text{noise}(t, \Delta t)*\Delta t$ is the average noise voltage at time t for period $\Delta t$, and $\lambda$ is the firing center voltage decay rate. Inputs may be voltages, and weights may be positive, zero, or negative.

The output section 240 may transmit pulses initiated by the firing center.

The output section may branch into one or multiple branches 242, 245, and 248, and these may branch into sub-branches (not shown). These branches and sub-branches may transmit pulses initiated by the firing center to the input sections of other neurites, and to output processing units. The output section may be characterized by pulse duration, which may be different from the pulse durations of the individual inputs to the input section. The output section may also be characterized by spatial extent and a transmission speed.

Depending on the features desired in a specific application, many variations of a neurite are possible. The neurite may or may not have a learning module, and for ones that do, different neurites may have different learning activation times. Individual neurites may or may not have an internal decay rate, may or may not have a dead time, and may or may not have firing center maximum and/or minimum voltages. If present, internal decay rate, dead time, and maximum and minimum voltages may take on different values in different neurites. Individual neurites may also have varying geometries, trigger firing voltages, and output pulse durations.

Figure 2B:
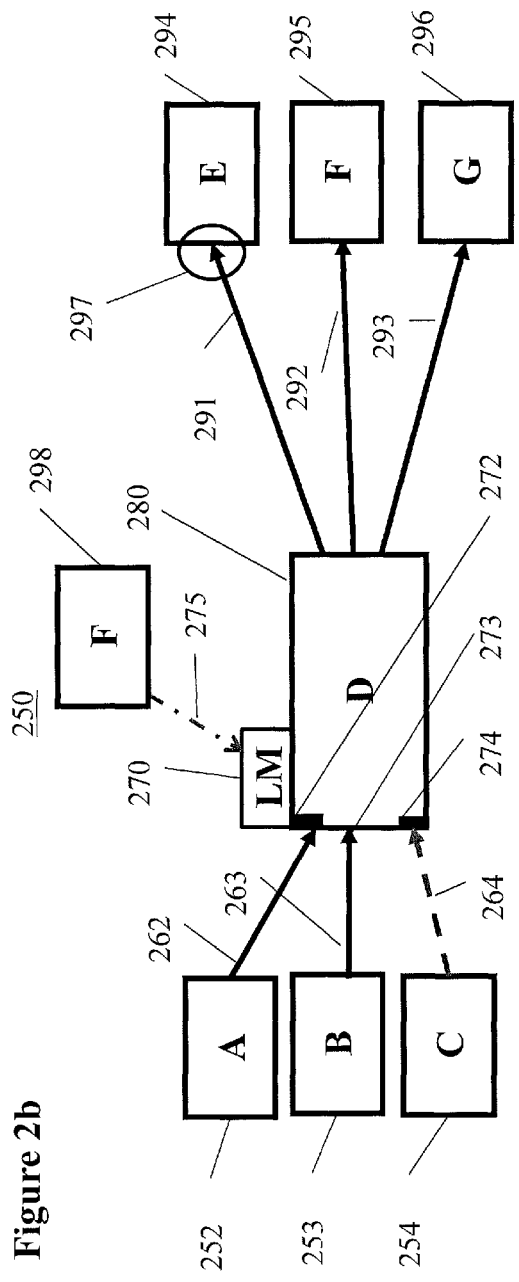
FIG. 2b depicts an exemplary schematic of a neurite 250 in accordance with one or more embodiments.

FIG. 2b depicts an exemplary schematic of a neurite 250 in accordance with one or more embodiments. It may be comprised of a firing center 280, a learning module 270, an output section 291, 292, and 293 comprised of all arrows leading outward from the firing center, and an input section that may be depicted as the entire perimeter of the firing center 280. The firing center may be depicted as a rectangle. An individual neurite with all its components may be identified by its firing center. The learning module may be depicted as a smaller rectangle adjoining the firing center. When space does not permit, the learning module may be omitted from the diagram, but may still be referred to in the text. Input neurites and input conversion units 252, 253, and 254 may be depicted as rectangles with outward arrows 262, 263, and 264 that represent their output sections. These may touch the input section represented by the perimeter of the firing center of the neurite 280 to indicate that they can supply pulse inputs to neurite 280. Inputs with positive or zero weights may be represented by solid arrows 262 or 263. Inputs with negative weights may be indicated by dashed arrows 264. If a learning module is present, some inputs may be capable of being strengthened (weight increased in absolute magnitude) by stimulation of the learning module. The locations where these inputs impinge upon the firing center 280 may be indicated by thickened line segments (272 and 274). If no learning module is present, or if the input is not capable of being strengthened, the input section may be represented as the perimeter of the firing center without any thickened line segments (273 in FIG. 2). The activation cue 275 that activates the learning module may be indicated by a dot dash arrow. The output section may be indicated by one or many outward-pointing arrows 291, 292, and 293. The neurites or output conversion units they connect to may be indicated by rectangles 294, 295, and 296. The connections from neurite output section to neurite input section or output conversion unit input section may be referred to as a synapse 297. Thus 272, 273, and 274 also indicate synapses. The combination of two synapse-connected neurites (e.g., 280 and 294) may be referred to as a signaling pathway segment. A chain of such signaling pathways segments may be referred to as a signaling pathway, so that a signaling pathway comprises one or many chained signaling pathway segments (e.g., 252 to 280 to 294). Another neurite 298 may have an output section 275 that stimulates a learning module 270. An output section that stimulates a learning module may be depicted by a dot dash line. A connection from neurite output section to a learning module may be referred to as a learning pathway segment. Signaling pathways that lead to learning modules may be referred to as learning pathways.

A neurite may be viewed as a single processing unit in a neurite system. In some instances, a neurite may also be viewed as representing the pattern of inputs that causes it to fire. In the case of FIG. 2b, that pattern comprises 252 and 253. If the pattern that causes a neurite to fire is a learned pattern, the neurite may be viewed as a memory of that pattern. In some instances, a neurite may also be viewed as forming and representing a concept stimulated by the neurite pattern that feeds it.

Signaling and Learning Pathways

The signaling pathways among neurites in the neurite core 125 may determine behavior. Behavioral decisions in the neurite core may be made by the relative strengths and frequency of firing of multiple simultaneous signaling pathways, internal noise, and the states of neurites connecting these pathways. Sensors 110, through their sensor conversion units 122, provide inputs to the signaling pathways of the neurite core 125, and neurites in the neurite core, through their signaling pathways, provide outputs to the output conversion units 128 that control the equipment 130. The equipment 130 may, in turn, control and steer the sensors 110, and may manipulate and modify the external environment 170.

Many neurites may have a second pathway, called a learning pathway, which terminates on the learning module of the neurite. When the learning pathway stimulates the learning module, the learning module may cause modification of the strength of signaling pathways by modifying some neurite connections to the input section of the neurite. Signal pathway connection strength may be increased (in the presence of a learning cue to the learning pathway) incrementally by the presence of each signal input pulse. There may be a maximum connection strength. In other kinds of neurites, connection strength may be increased (in the presence of a learning cue to the learning pathway) by frequent signal inputs at or above a critical threshold frequency. Neurites with some input connection strengths that can be modified are termed learning neurites. Learning cues may be specific to specific input neurite types. Neurites whose input connection strengths cannot be modified are termed simple neurites.

Other Features: Mood, Noise, Association, Memory, and Concept Formation

Signaling pathways in the neurite core may form persistent and semi-persistent states (neurite states, moods, drives and desires) that may interact with and influence other signaling pathways and creature behavior.

The neurite core may use noise at the neurite level to create randomness in its processing and non-determinism in its outputs. Neurite operation at or near the noise floor may increase desired randomness, may improve certain behaviors and capabilities, and may also decrease the total amount of power consumed.

Signaling pathway modification by learning cue may create associations that form the basis of learning, memory, and concept formation. Memory in the neurite system may be accomplished by use of neurite techniques only or may be assisted by the use of conventional memory storage devices. The neurite system may recall memories based on associative processes, and may use memories in its decision processes.

General Behavior

The neurite creature may sense its external environment and the state of its controlled equipment by converting inputs from the multiple sensors that it is provided into neurite signals. These sensors may include communications devices, so that the creature may receive external instructions.

The neurite creature may process and combines converted sensory inputs to make sense of its internal state and external environment.

The neurite creature may make decisions based on its external environment and controlled-equipment state in the context of its neurite memories, moods, and drives.

The neurite creature may initiate and take actions to control the equipment to which it is connected and to coordinate and control the components of that equipment. The equipment may have internal sensors to report on internal status and to enable better and finer control of portions of the equipment. The equipment may include actuators that control sensors (e.g., direction, magnification, sensitivity) that sense the external environment, so that the neurite creature may not only act autonomously, it may autonomously direct its attention to various aspects of its environment.

The neurite creature may sense, make sense of make decisions, and initiate and take actions simultaneously rather than serially.

Thus the entire neurite creature system (neurite system, sensors, and controlled equipment) is capable of both externally controlled and autonomous maneuver and action in its environment. The neurite creature can also be configured to provide information to external components and systems.

Range of Disclosure

This disclosure is for all implementations of these computational devices, constituent components, interconnections, pathways and processes, in any form, including in hardware and computer simulation. For example, these computational devices may comprise software (e.g. software executing on a computing device such as a digital computer or processor), hardware implementations, or any combination thereof.

Figure 3:
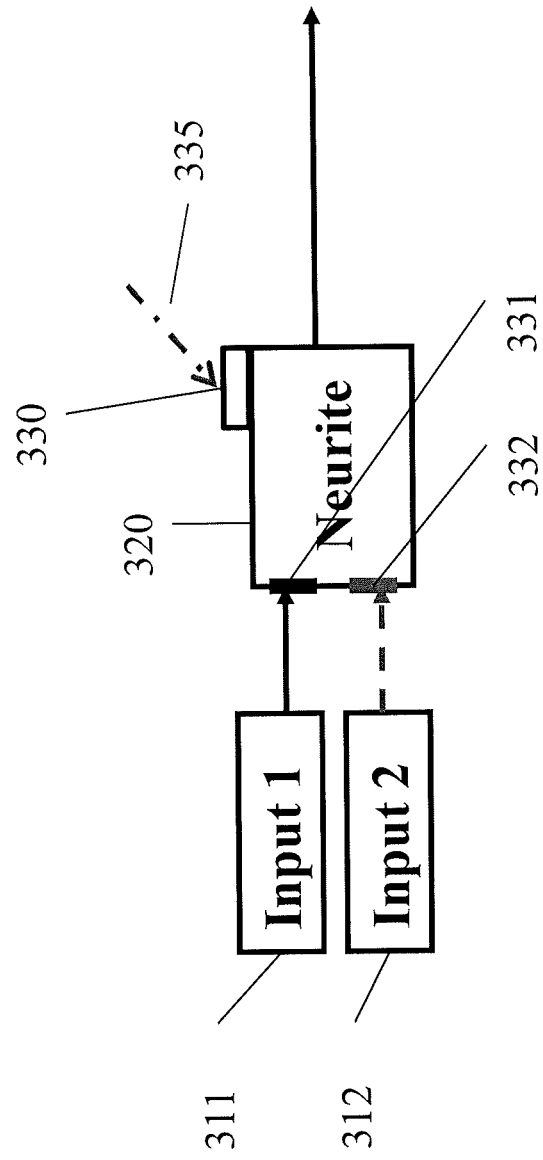
FIG. 3 depicts a block diagram of an exemplary method of synapse modification in the presence of a learning cue 300 in accordance with one or more embodiments.

FIG. 3 depicts a block diagram of an exemplary method of synapse modification in the presence of a learning cue 300 in accordance with one or more embodiments. The figure depicts two input neurites 311 and 312, and a receiving neurite 320. The figure also depicts the synapses 331 and 332 at which inputs from the input neurites impinge respectively upon the input section of the receiving neurite, and the learning cue 335 impinging on the learning area 330 of the receiving neurite. Input neurite 311, through its synapse 331, provides pulses that may stimulate the neurite 320. Input neurite 312, through its synapse 332, provides pulses that may inhibit the neurite 320. The receiving neurite 320 has a learning module 330 that may be stimulated by learning cue 335. A synapse strength may be characterized by the weight that the input section of the receiving neurite applies to an input pulse. In FIG. 3, the strength of the synapse 331 of input neurite 311 with the neurite 320 may increase (positive weight may become more positive) with one or many firings of input 1 in the presence of the learning cue 335. Similarly, the strength of the inhibiting synapse 332 of neurite 312 with the neurite 320 may increase (e.g. negative weight may become more negative) with one or many firings of neurite 312 in the presence of a learning cue 335. Situations of synapse strengthening may be limited to situations of high rates of input firing (firing above a critical threshold frequency). Situations of synapse strengthening may also be limited to instances in which the receiving neurite also fires. There may be multiple synapse types from inputs to a receiving neurite, and these multiple synapse types may react differently to a learning cue. In addition, the receiving neurite may contain multiple learning modules that react to different learning cues and affect different synapse types differently. In addition, under various circumstances, various synapses may be allowed to weaken. This may be done to gradually weaken the synapse strengths of unused synapses in learning neurites to enhance pattern recognition.

Types of Neurites

In addition to the presence or absence of a learning module, various combinations of input section geometry, input weights, trigger firing voltage, voltage decay rate, firing center voltage minimum, internal firing center voltage noise, dead time, output pulse duration, and output section geometry enable the development of many different kinds of neurites with different functionality and utility. Some of the major types are presented in this section. The first two kinds, simple neurites (neurites without learning modules) and learning neurites (neurites with learning modules), have already been discussed. Other functionally distinct neurite types, many of which can be implemented as simple (non-learning) or learning neurites, include rate-sensitive neurites, variable time delay neurites, various location sensitive neurites, pseudo-logic capable neurites, spontaneously firing neurites, synapse inhibiting neurites, and transmission inhibiting neurites. They are presented and discussed in their non-learning variants.

Figure 4A:
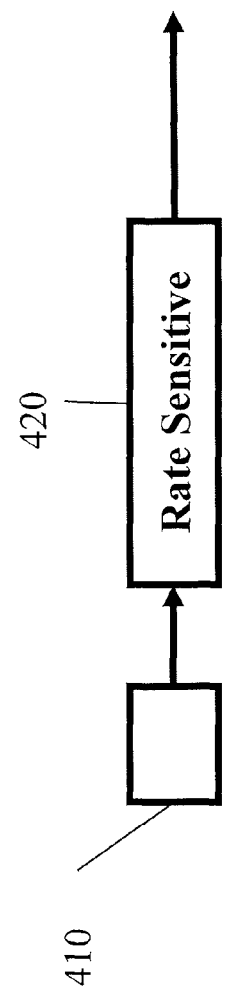
FIG. 4a depicts an exemplary simple rate-sensitive neurite 400 in accordance with one or more embodiments.

FIG. 4a depicts an exemplary simple rate-sensitive neurite 400 in accordance with one or more embodiments. The figure contains an input neurite 410 and a rate sensitive neurite 420. The rate sensitive neurite may fire if and only if its input neurite fires rapidly enough. This same feature may be implemented in all other types and variations of neurites, including learning neurites. Rate sensitivity may be accomplished by adjusting the voltage decay rate of the rate sensitive neurite. A higher decay rates may produce a rate sensitive neurite that may require a higher frequency of pulse stimulation by its input in order to reach its trigger firing voltage and fire. A rate-sensitive neurite may have multiple inputs.

Figure 4B:
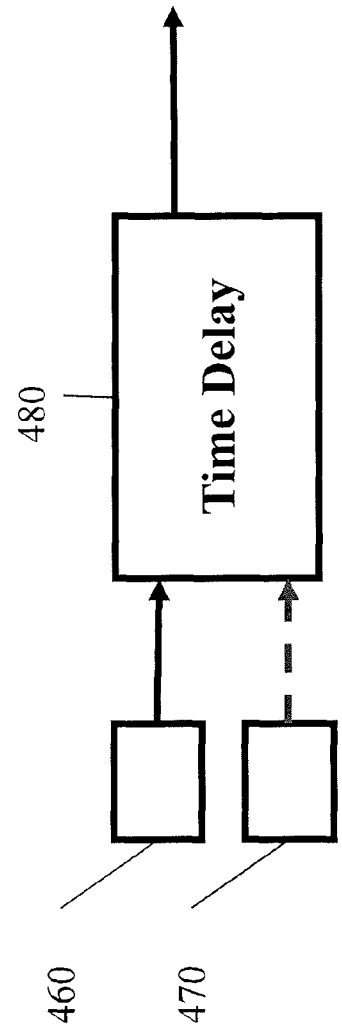
FIG. 4b depicts an exemplary variable time delay neurite 450 in accordance with one or more embodiments.

FIG. 4b depicts an exemplary variable time delay neurite 450 in accordance with one or more embodiments. The figure contains one or many excitory input neurites 460, and one or many inhibitory input neurites 470, and a variable time delay neurite 480. The time delay neurite has a firing center potential that may be decreased below zero by inhibitory pulses from 270. It may have some minimum value. Thus, inputs from 270 either before or during excitation from 460 may cause a time delay in the firing of Q80 relative to when it would have fired due to inputs from 460 in the absence of the inputs from 270, and the amount of time delay may be varied in accordance with the number or frequency of inputs 270, but may be limited by the magnitude of the minimum firing center potential allowed.

Figure 5A:
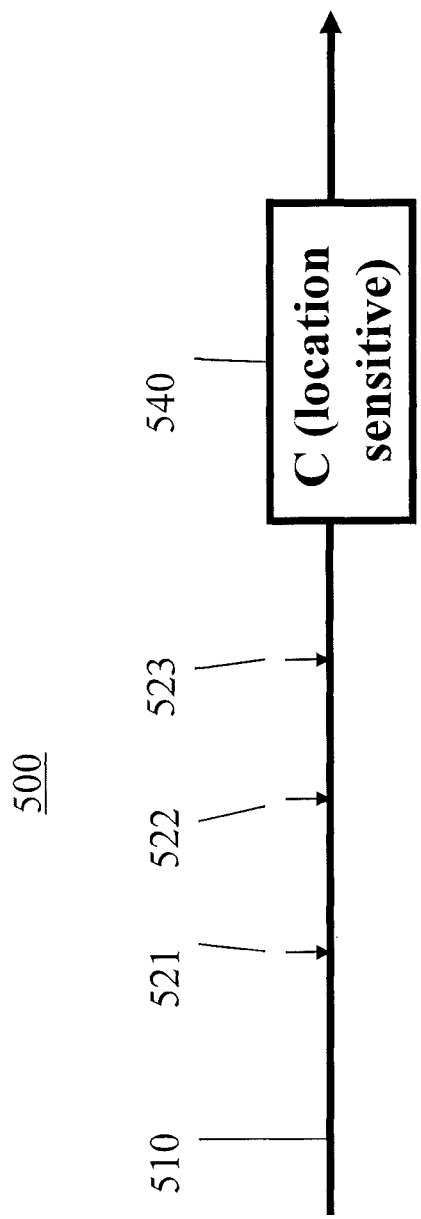
FIG. 5a depicts an exemplary location-sensitive neurite 500, in accordance with one or more embodiments.

FIG. 5a depicts an exemplary location-sensitive neurite 500, in accordance with one or more embodiments. The input section 510 of the neurite 540 is explicitly depicted with locations 521, 522, and 523 along it. 521 is further from the firing center than 522, and 522 is further from the firing center than 523. A location-sensitive neurite may have input weights that vary with position along its input section. One embodiment may have increasing input sensitivity (increasing positive weighting function) along its input section towards the firing center 540. In this embodiment a neurite input at 523, closer to the firing center, may create greater firing center voltage changes than a neurite input 521 further from the firing center. Other embodiments may have both excitory and inhibitory inputs with sensitivities that vary with position along the input section. Other embodiments may have input sensitivity that decreases towards the firing center.

Figure 5B:
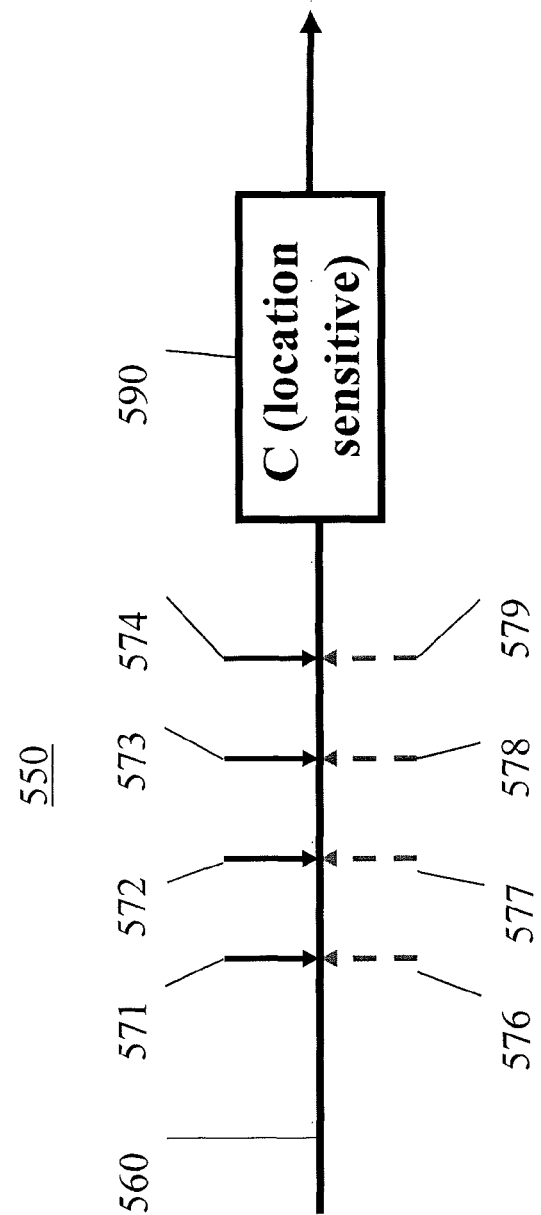
FIG. 5b depicts an exemplary variant of a location-sensitive neurite 550 that can compare inputs, in accordance with one or more embodiments.

FIG. 5b depicts an exemplary variant of a location-sensitive neurite 550 that can compare inputs, in accordance with one or more embodiments. The location sensitive neurite 590 is shown with its input section 560 depicted as a line. Its excitory inputs 571, 572, 573, and 574 form a field of neurites in which position indicates current location, and its inhibitory inputs 576, 577, 578, and 579 form a field of neurites for which position indicates desired location. In the exemplar, input sensitivity may increase towards the firing center 590 for both excitory and inhibitory inputs. Such an exemplary neurite might be stimulated to fire pulses if the current position lies further to the right than the desired location, so that an excitory input neurite stimulates the input section closer to the firing center 590 than the inhibitory input neurite. In this exemplary configuration, the location-sensitive neurite requires that the same number (e.g. ideally one) of current location and desired location neurites fire on average in a given time period. This may be accomplished in many ways, for example by the nature of the inputs themselves, or by requiring the inputs to fire in one of the single output modes discussed later.

FIG. 6a depicts a block diagram of an exemplary neurite used as a pseudo logical device that can execute neurite logic 600 in accordance with one or more embodiments. The figure contains input neurites 611 and 622, and the pseudo-logical neurite 620. If 620 has a low decay rate and will fire with only a few input pulses from either input 611 or 612, then it is functioning in an "or-like" capacity. When so constructed, 620 may have any number of inputs capable of firing it, and will fire if any of these or any combination of these is sufficiently active. Neurite 620 may also occasionally fire spontaneously, based on internal noise. If preventing this is desirable, its voltage decay rate may be set just high enough to prevent or minimize spontaneous firing. If instead, neurite 620 has a decay rate so high that 611, firing at its maximum rate (determined by 611's dead time), cannot cause 620 to fire, and 612, firing at its maximum rate (determined by 612's dead time), cannot cause 620 to fire, but both 611 and 612, firing at high rates can cause 620 to fire, then 620 is functioning in pseudo-logical "and-like" capacity. Providing more inputs to such a neurite is possible, but then it functions more in a role of firing if the weighted sum of its inputs is great enough, and less in a logical role.

FIG. 6b depicts an exemplary spontaneous pulse generating neurite used to generate spontaneous pulses 650 in accordance with one or more embodiments. The figure contains a spontaneous pulse generating neurite 660 with high noise, very low decay rate, and a relatively low trigger voltage relative to its voltage minimum. Noise will cause it to pulse at random times.

FIG. 6c depicts another exemplary spontaneous pulse generating neurite used to generate spontaneous pulses 670 in accordance with one or more embodiments. The figure contains a neurite 690 with high noise, very low decay rate, a relatively low trigger voltage relative to its voltage minimum, and a depotentiating input 680 that may be strong enough to reset its voltage to zero. Like the neurite 660, noise may cause it to pulse at random times. In addition, an input from 680 will reset it, perhaps so that it can compete with other spontaneous pulse generating neurites.

Figure 7A:
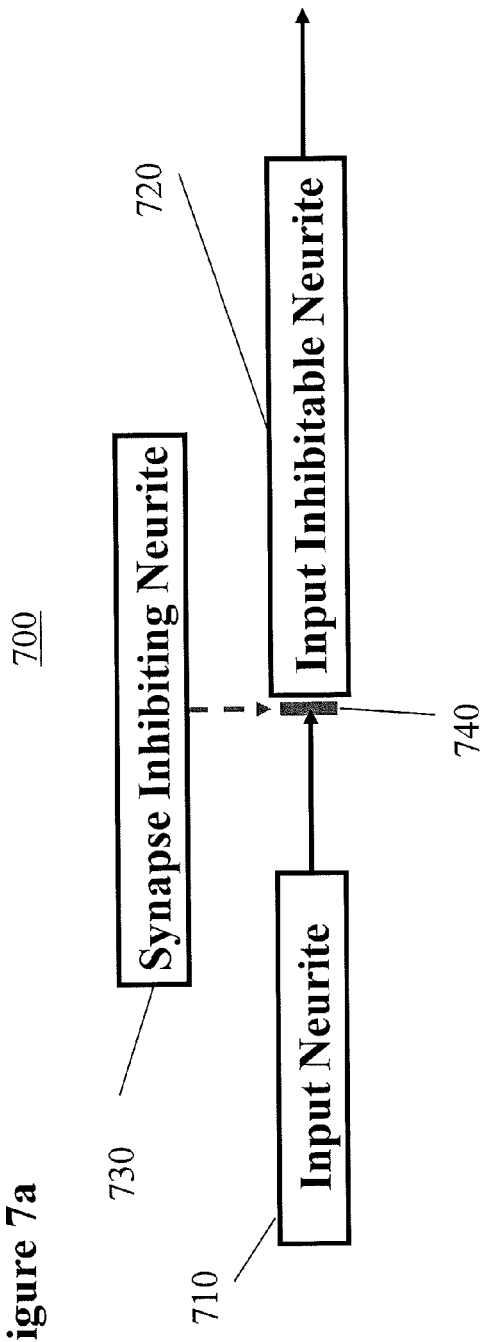
FIG. 7a depicts exemplary synapse inhibition among neurites 700 in accordance with one or more embodiments.

FIG. 7a depicts exemplary synapse inhibition among neurites 700 in accordance with one or more embodiments. The figure contains an input neurite 710, an input inhibitable neurite 720, a synapse inhibiting neurite 730, and a synapse 740 at the junction of the input neurite and the input inhibitable neurite. When the synapse inhibiting neurite does not fire, pulses from the input neurite may stimulate or inhibit the input inhibitable neurite. When the synapse inhibiting neurite fires, pulses from the input neurite do not stimulate or inhibit the input inhibitable neurite. The synapse may be constructed so that a portion of the output section of the synapse inhibiting neurite may be interposed between the output of the input neurite and the input section of the input inhibitable neurite, and may act as a barrier when it pulses.

Figure 7B:
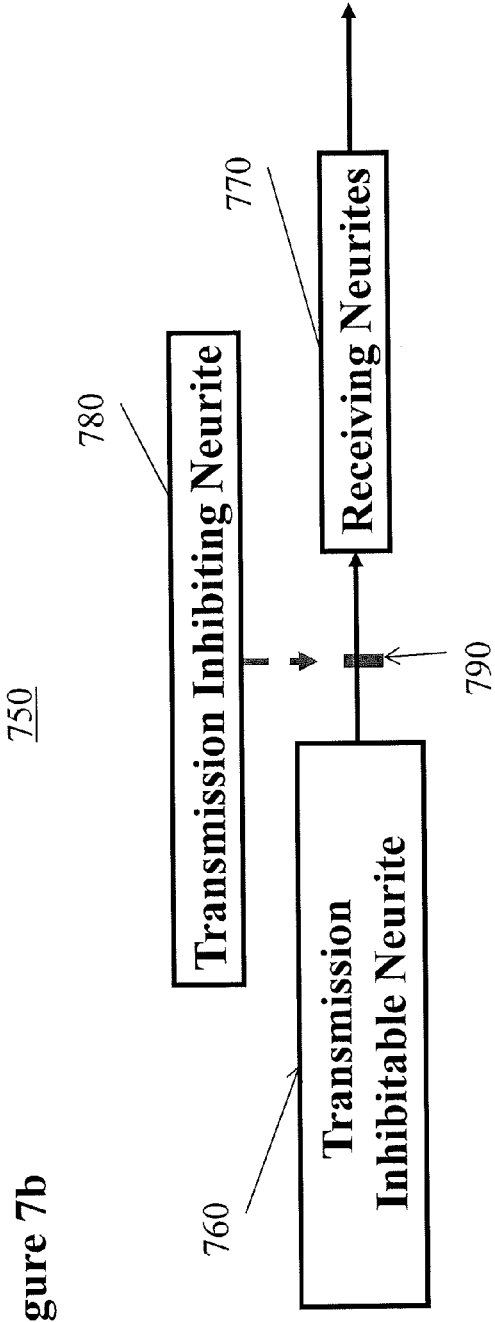
FIG. 7b depicts exemplary neurite transmission inhibition 750 in accordance with one or more embodiments.

FIG. 7b depicts exemplary neurite transmission inhibition 750 in accordance with one or more embodiments. The figure contains a transmission inhibitable neurite 760, a receiving neurites 770, and a transmission inhibiting neurite 780. When the transmission inhibiting neurite does not fire, pulses from the transmission inhibitable neurite may stimulate or inhibit the receiving neurite. When the transmission inhibiting neurite fires, pulses from the transmission inhibitable neurite do not reach the input sections of any receiving neurite beyond the point of transmission interference. The transmission inhibitable neurite contains one or more sections on its output section 790 that are so constructed that a portion of the output section of the transmission inhibiting neurite may interfere with and terminate the output pulses of the transmission inhibitable neurite. The transmission inhibiting neurite may be a neurite whose output pulses can interfere with pulses on the output section of a transmission inhibitable neurite. The receiving neurite maybe any neurite. Synapse inhibiting and transmission inhibiting neurite types are generally needed only when very rapid nullification of a signal is needed.

Sensor and Output Conversion Units

Receipt of information and control of physical devices may include conversion to and from neurite pulses.

Figure 8A:
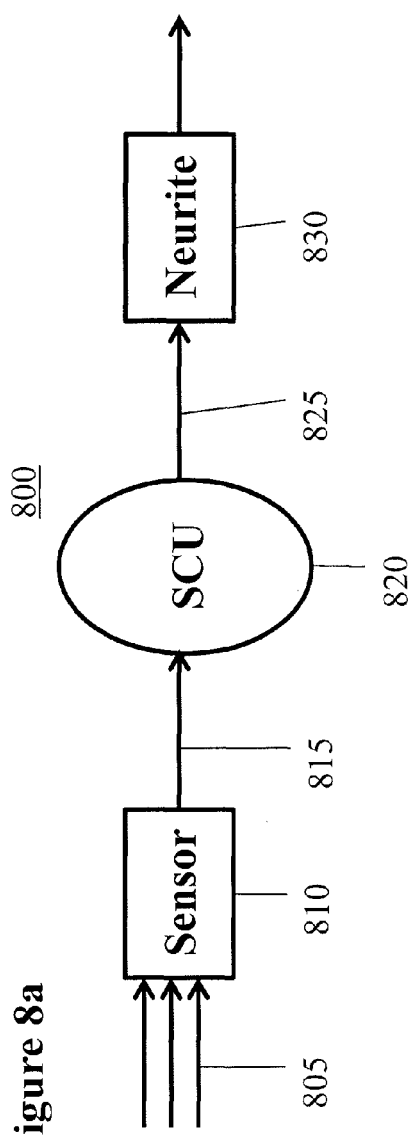
FIG. 8a depicts a block diagram of an exemplary sensor conversion unit in situ 800 in accordance with one or more embodiments.

FIG. 8a depicts a block diagram of an exemplary sensor conversion unit in situ 800 in accordance with one or more embodiments. The figure contains: a physical phenomenon or field 805, which may be pressure, light, or any electromagnetic signal; a sensor 810, which may be a microphone or field of pressure detectors, an optical detector or field of optical detectors, or any electromagnetic or radio frequency detector; a sensor output 815, which may be an electrical voltage or a field of electrical or electro-optical signals; a sensor conversion unit 820, which may be any device that may receive, as inputs, the outputs 815 of one or more sensors or other input devices 810, and may produce pulse outputs along its output section 825 that may serve as inputs to one or many neurites 830. The combination of sensor and sensor conversion unit may convert any discernible aspect of the external environment (e.g., tactile pressure, sound amplitude, light amplitude at a specific color, total light amplitude, and radio frequency communications) into pulses that may be used by neurites. A sensor conversion unit may convert any output (e.g., a voltage output) of any conventional sensor (e.g., a microphone, an element of an optical sensor array, or the electrical signals from a radio frequency communications signal) into neurite pulses. These pulses may then be sent to any number of neurites.

Figure 8C:
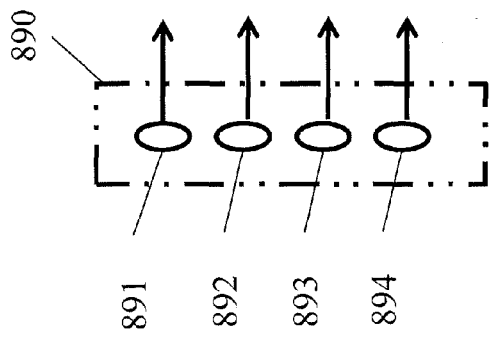
FIG. 8c depicts an exemplary module of sensor conversion units 880 in accordance with one or more embodiments.
Figure 8B:
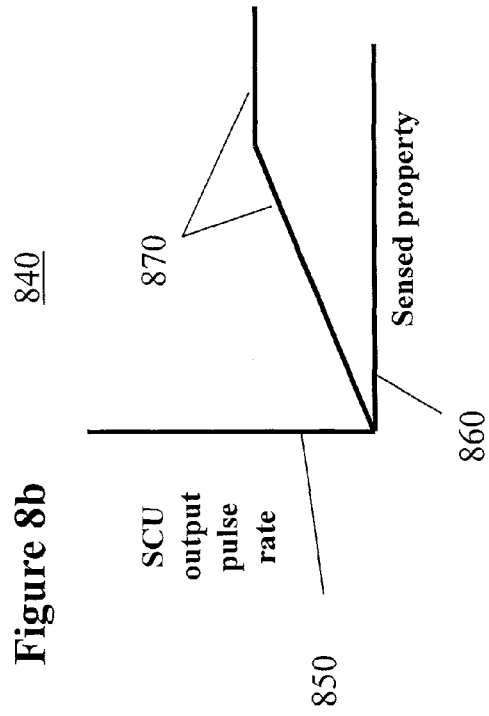
FIG. 8b depicts an exemplary output of a sensor conversion unit 840 in accordance with one or more embodiments.

FIG. 8b depicts an exemplary output of a sensor conversion unit 840 in accordance with one or more embodiments. The figure comprises a horizontal axis 860 on which the value of the sensed property may 805 may be displayed, a vertical axis 850 on which the corresponding output pulse rate of the sensor conversion unit 820 may be displayed, and a curve 870 that may be representative of the relationship between output pulse rate and the physical property. The curve may vary with the sensor, the sensor conversion unit, and the physical property sensed.

FIG. 8c depicts an exemplary module of sensor conversion units 880 in accordance with one or more embodiments. The figure contains the sensor conversion unit module 890, which may contain one or more sensor conversion units 891, 892, 893, and 894. A module of sensor conversion units may convert multiple outputs of a field or array of sensors, such as an acoustic sensor array or a visual or infra-red sensor array into an array of pulse sources, each source of which may be sent to one or multiple neurites.

FIG. 9a depicts a block diagram of an exemplary output conversion unit in situ 900, in accordance with one or more embodiments. The figure contains one or more neurites 905, which may send pulses along its output section 910 to an output conversion unit 915. The output conversion unit may receive neurite pulses from one or many neurites, and may send signals along its output 920 to one or many pieces of controlled equipment 925. These signals may be electrical, electromagnetic, or of any nature and form used by the equipment controller portion (not explicitly shown) of the controlled equipment. The equipment controllers of the controlled equipment may be solenoids that drive mechanical movement, engines and transmissions that drive wheels, speakers that create sound, devices that stimulate muscle cells, or radio frequency or other communications devices that control and provide signals for communications. Output conversion units are needed to convert neurite pulses into control signals of whatever formats are needed to control the controlled equipment. Output conversion units may convert neurite pulses directly into movement (e.g., muscles or muscle-like units that respond to electrical pulses with movement, or into analog or digital radio frequency communications). Output conversion units may also convert neurite pulses into the electrical inputs needed by commercial actuators and receivers (e.g., into voltages used by solenoids or voltages used by radio frequency analog and digital communications devices).

FIG. 9b depicts an exemplary output of an output conversion unit 930 in accordance with one or more embodiments. The figure comprises a horizontal axis 940 on which the value of the input pulse rate to the output conversion unit 915 may be displayed, a vertical axis 935 on which the corresponding output signal (e.g., a voltage) of the output conversion unit 915 may be displayed, and a curve 945 that may be representative of the relationship between input pulse rate and the output signal of the output conversion unit. The curve may vary with the type of output conversion unit and the needs and properties of the controlled equipment.

FIG. 9c depicts an exemplary output conversion unit module of 950 in accordance with one or more embodiments. The figure contains an output conversion unit module 960, which may contain one or more output conversion units 961, 962, 963, and 964. Each output conversion unit may control one or many pieces of controlled equipment. The outputs of the output conversion units are not explicitly shown.

Ganglites

Figure 10A:
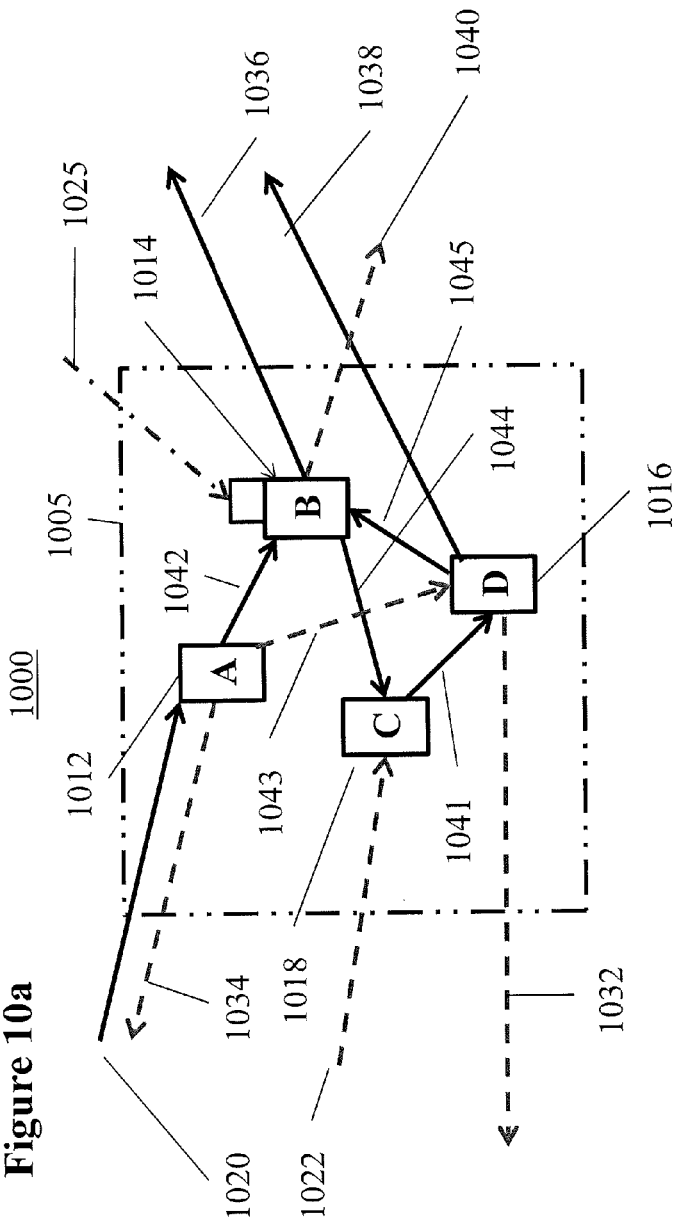
FIG. 10a depicts a block diagram of an exemplary ganglite 1000 in accordance with one or more embodiments.

A ganglite may be an ensemble of neurites with a defined function and structure. A ganglite may be comprised of one or more neurites. FIG. 10a depicts a block diagram of an exemplary ganglite 1000 in accordance with one or more embodiments. The exemplary ganglite 1005 is comprised of one or more neurites 1012, 1014, 1016, and 1018. Any of these neurites may be any kind of neurite, including but not limited to simple neurites, learning neurites, rate-sensitive neurites, and location-sensitive neurites. Any of these neurites may receive excitory 1020 or inhibitory 1022 neurite pulse inputs from external sources that include neurites and sensor conversion units. Any neurites in the ganglite may receive excitory pulses 1041, 1042, 1044, 1045 or inhibitory pulses 1043 from any other neurite within the ganglite. Any learning neurite in the ganglite may receive learning cues 1025 from sources that are external to or internal to the ganglite. Any neurites in the ganglite may send excitory 1041, 1042, 1044, 1045 pulses or inhibitory pulses 1043 to any other neurite within the ganglite. Any neurite in the ganglite may send excitory 1036 and 1038 or inhibitory pulses 1032 and 1034 to any external neurite (not shown) or output conversion unit (not shown). Neurites in the ganglite may send inhibitory or excitory pulses to external neurites that excite or inhibit individual neurites of the ganglite. A ganglite may have any number and kind of neurites with any number and kind of internal connections. It may have inputs originating from any number and kind of sources (neurites and input conversion units), and may transmit to any number and kind of neurites and output conversion units. However, neurites in a ganglite may often have a common set of neurite or input conversion unit inputs, a common set of outputs (to neurites in one or several other ganglites), some easily understandable internal processing activity performed on one another, and potentially some neurite-processed feedback to their inputs.

Neurites in ganglites may feed back to the neurites in their input ganglites, directly or indirectly. This may be done for many reasons, e.g., in order to control inputs (e.g., to enhance or suppress input firing, which may maintain the pathway at an effective firing level or extend an effective input sensor range), to control attention (e.g., which input will dominate), to stimulate constituent memories that form part of a larger memory, and to enable complex behavioral control processes.

A ganglite may be viewed as a collection of neurite processors in a neurite system. In some instances, a ganglites may also be viewed as representing the pattern of ganglites that cause it to fire. If that pattern has been formed by learning neurites in the ganglite, the ganglite may also represent a memory. In some instances, a ganglite may also be viewed as forming and representing a concept stimulated by the ganglite pattern that feeds it.

Figure 10B:
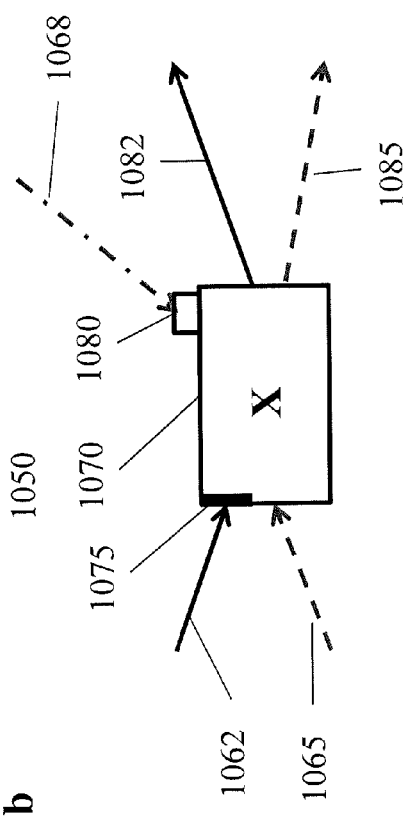
FIG. 10b depicts an exemplary abstraction of a ganglite 1050 in accordance with one or more embodiments.

FIG. 10b depicts an exemplary abstraction of a ganglite 1050 in accordance with one or more embodiments. It depicts a ganglite 1070 as a rectangle, external neurite inputs to some individual internal neurites 1062 and 1065 as arrows pointing to the rectangle, synapses for these external inputs to internal neurites as the perimeter of the rectangle 1070, synapses that can be strengthened as darkened line segments 1075 on the perimeter, the presence of at least one learning neurite by the presence of a learning modules 1080, a learning cue 1068, and neurite outputs 1082 and 1085 of individual internal neurites as arrows pointing outward from the rectangle. In ganglites, the firing of one output path does not imply the firing of another output path or all output paths, and a ganglite may control its outputs individually. In complex diagrams the ganglite learning module portion of the symbol and the darkening of learning synapses may be omitted, but their presence will still be noted in the text.

The value of the ganglite as a descriptor is that it may facilitate the development and description of neurite systems. This disclosure shows the internal details of ganglites where appropriate. When internal ganglite details are needed, they may be provided within the box or may be provided in a separate diagram. Where internal details are not needed, it may abstract ganglites with the same notation it uses for individual neurites. Since an individual neurite may be a ganglite, this common abstract notation is really ganglite notation, with an individual neurite a special case in which no internal connections are present and all outputs fire together.

For simplicity of discussion, sensor and output conversion units may be represented as ganglites in the context of neurite and ganglite inputs and outputs, without explicit separate mention.

Mathematical Description of a Ganglite for Modeling and Calculation

Below is a mathematical model of a ganglite in the context of other ganglites (including sensor conversion units and output conversion units). Although a particular mathematical model may be described below, various other models or approaches may be used to model a ganglite in the context of other ganglites. In the model that follows, output pulse voltages are normalized to unity.

The ganglite model may be characterized by matrices that include the physical descriptions of the neurites that compose it, its interactions with its input neurites, the internal interactions of its neurites, and the pulses that its neurites send out.

The ganglite model may have a neurite data matrix with a row for each neurite. Its columns may include: the current firing center voltage, the trigger firing voltage, the last time the neurite fired, the firing center dead time, the synapse excitation (e.g., output pulse) duration, and last time the neurite information was updated. It might also include decay rate and noise level, or these might be controlled at the ganglite level within the code.

Figure 11:
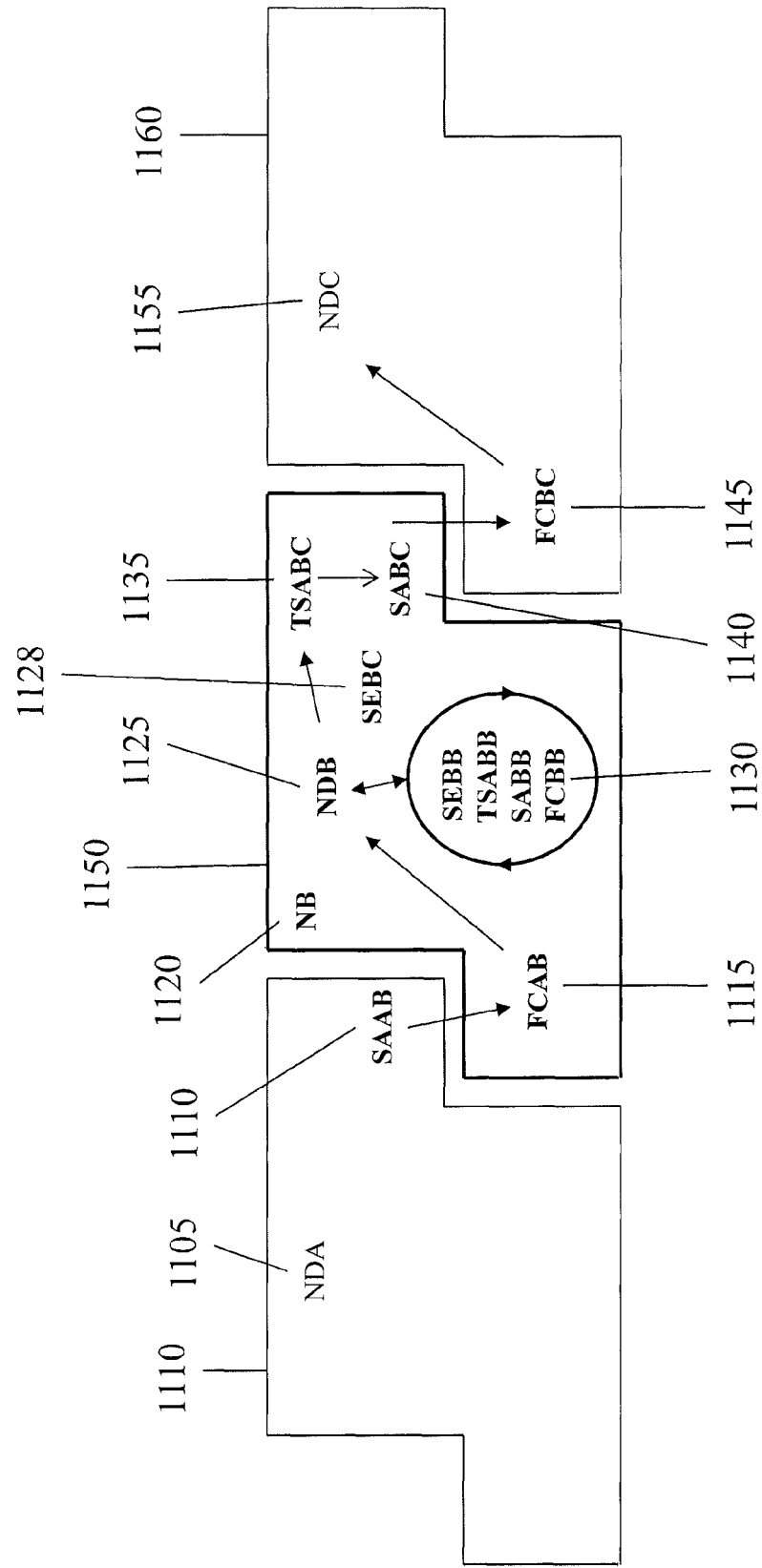
FIG. 11 depicts exemplary ganglite nomenclature 1100 in accordance with one or many embodiments.

FIG. 11 depicts exemplary ganglite nomenclature 1100 in accordance with one or many embodiments. The figure depicts ganglite A 1110 with outputs that synapse on ganglite B 1150, whose outputs synapse on ganglite C 1160. The neurite data (ND) matrices for these ganglites are NDA 1105, NDB 1125, and NDC 1155 respectively. The number of neurites in ganglite B may be indicated by the integer NB 1120.

For matrices that describe the interactions of a first ganglite on a second ganglite, the matrix element in the $i^{th}$ row and $j^{th}$ column indicates the value that the $i^{th}$ neurite of the first ganglite provides to act upon the $j^{th}$ neurite of the second ganglite.

The existence of a synapse from a neurite of one ganglite to a neurite of another ganglite may be indicated by a synapse existence matrix (SE), so that SEBC 1128 may indicate the existing synapses from neurites in ganglite B to neurites in ganglite C. Specific synapses that exist (or do not exist) may be indicated by ones (or zeros) in the synapse existence matrices.

The occurrence of a synapse that is firing from the $i^{th}$ neurite in a first ganglite to the $j^{th}$ neurite in a second ganglite (i.e., the $i^{th}$ neurite of the first ganglite is firing, and the synapse to the $j^{th}$ neurite in the second ganglite exists) may be indicated by a one in the synapse active matrix. These matrices are indicated by SAAB 1110 for neurites in ganglite A that fire on neurites in ganglite B, SABB 1130 for neurites in ganglite B that fire on other neurites in ganglite B, and SABC 1140 for neurites in ganglite B that fire on neurites in ganglite C. The weights that neurites apply to their inputs (their sensitivities to inputs) may be contained in firing coefficient matrices (FC), whose elements may be positive, zero, or negative. Thus the firing center voltage rate-of-change of the $j^{th}$ neurite in ganglite B to the firing of the $i^{th}$ neurite in ganglite A may be indicated by a real number in the $i^{th}$ row and $j^{th}$ column in the firing coefficient matrix FCAB 1115, the sensitivity of $i^{th}$ neurite in ganglite B to the $i^{th}$ neurite in ganglite B may be indicated by a real number in the $i^{th}$ row and $j^{th}$ column of FCBB 1130. Similarly, the sensitivities of neurites in ganglite C to the firing of neurites in ganglite B may be given by the matrix FCBC 1145. Modeling an ensemble in a sequence independent way may require temporary holding matrices. The temporary synapse active matrix for SABC may be TSABC 1135, and the temporary synapse active matrix for SABB may be TSABB 1135.

In general the neurites in a ganglite may receive inputs from neurites in many other ganglites, and may send outputs to neurites in many other ganglites. One may use the conventions that NDY refers to the neuron data matrix for ganglite Y, SEXY to the synapse existence matrix that connects ganglite X to ganglite Y, SAXY for the synapse activity matrix for the synapse that connects neurites in ganglite X to neurites in ganglite Y, FCXY for the Firing Coefficient matrix that provides the voltage rise per unit time from a pulse from a neurite in ganglite X to a neurite in ganglite Y when the synapse is active. For simulation in a computer, TSAXY may be a temporary storage matrix for SAXY results in one time interval in order to enable all computations to be done with simulated simultaneity. Within the ganglite Z, neurite interactions may thus characterized with matrices labeled with Z in place of both X and Y. Thus the synapse existence matrix may be referred to as SEZZ. For all matrices SEXY, SAXY, TSAXY, and FCXY, the i,j element may represent the impact of the $i^{th}$ neurite of ganglite X on the $j^{th}$ neurite of ganglite Y, so that, if the X neurite has NX elements and the Y neurite has NY elements, the matrix has NX rows and NY columns.

Within a simulation, one wants to select a time step that is appropriate to the behavior to be modeled or achieved, and generally much less than the time in which a neurite builds up potential and fires, so that the model captures the important dynamics inside the neurite. This time step can be quite small. For example, when the interest is in neurite processing in interior ganglites and complex decision phenomena, the time step may be as small as one twentieth to one sixth of a the time a typical neurite typically takes to build to its trigger firing potential. Desired results may occur when the time step is a divisor of both the pulse duration and dead time for the neurites of interest. Of course, too small a time step may slow the simulation down. For some neurites, internal dynamics may not be of interest, so that the time step used to simulate them may be somewhat larger. For example, for slowly varying inputs (e.g., from some sensor conversion units and neurites that directly receive sensor conversion pulse inputs from slow sensors), one may even choose a time step equal to the time a neurite takes to reach its trigger voltage.

Using $V_j$ to represent the firing center potential of the $j^{th}$ neurite in ganglite Y, $\Delta V_j$ to represent its change in time interval $\Delta t$, $noise_j*\Delta t$ to represent the accumulation of noise voltage in time $\Delta t$, $\lambda$ to indicate the firing center voltage decay rate, and i to index the neurites of each ganglite X that synapses with neurites in ganglite Y, then the change in firing center voltage $V_j$ is:

$$V_j = [-\lambda V_j + noise_j + \Sigma_x \Sigma_i (SAXY)_{i,j} * (FCXY)_{i,j}] * \Delta t$$

Where the double summation is across all ganglites X that synapse upon ganglite Y (which may include ganglite Y), and across all neurites i in each ganglite X.

Normal commercial modeling languages can then be used to simulate the processes associated with neurite firing (e.g., the neurite fires when its firing center voltage reaches or exceeds the trigger firing voltage and the dead time is exceeded; the firing center voltage is reset to zero or a preset value; and the neurite pulse continues until time>firing time+ pulse duration; and a new neurite pulse cannot be initiated by that neurite until time>firing time+dead time for the neurite.

Some Basic Ganglites

Relay, Junction, Sequence, Persistent State, Timing, and Coordination

Ganglites are extremely flexible structures that have many uses. These include, but are not limited to: input processing; input comparison; learning pathway input logic and conditioning; internal timing and time delays; internal and external persistence; pulse timing and coordination in neurites that form a part of a pathway; controlled equipment coordination and timing; attention direction (determining which input will dominate); action selection and initiation; reflexes and reflex override of selected actions; continuous signal generation (e.g., for goal maintenance and maintenance of persistent state and "mood"); memory development, association, and retrieval; pattern identification; and concept development and association. They can be used to perform simple and complex logic-like functions (e.g., and, or, and not). They can be used generate spontaneous activity. They can create decision hierarchies, generate and control complex behaviors, and generate and control complex outputs. Ganglites have many additional uses beyond those listed above.

FIG. 12a depicts an exemplary simple relay ganglite 1200 in accordance with one or more embodiments. The relay ganglite 1220 comprises neurites 1222, 1225, and 1228 that receive neurite inputs from neurites 1212, 1215, and 1218, and have output sections that fire upon neurites 1232, 1235, and 1238. The neurites of the ganglite may stimulate or inhibit one another, so that they synchronize and regularize randomly firing inputs, or perform other pulse shaping or coordination. Any of the neurites in the ganglite may receive input pulses from any of the input neurites, and any of the neurites may fire pulses to any of the output neurites. As shown in the figure, the relay ganglite may take pulse inputs from randomly firing input neurites and form them into a less random and more simultaneous group of pulses, which it may send on to neurites C1, C2, and C3.

FIG. 12b depicts an exemplary simple inhibiting junction relay ganglite 1250 in accordance with one or more embodiments. The figure shows a junction ganglite 1270, comprised of one or more neurites 1272, 1275, and 1278 that relay and transform information from input neurites 1262, 1265, and 1268, and send the transformed information on to neurites 1282, 1285, and 1288. It also contains a neurite or ganglite 1290 that can inhibit some or all of the neurites in the junction ganglite. Neurite or ganglite 1290 may interfere with or modify the relay process by inhibiting all or some of the neurites in the relay ganglite. Relay ganglites may be useful in control or override of ganglite pathways.

Many ganglites contain other ganglites as elements. Unless otherwise noted, the elements within the ganglites in this disclosure may be regarded as ganglites.

Figure 13A:
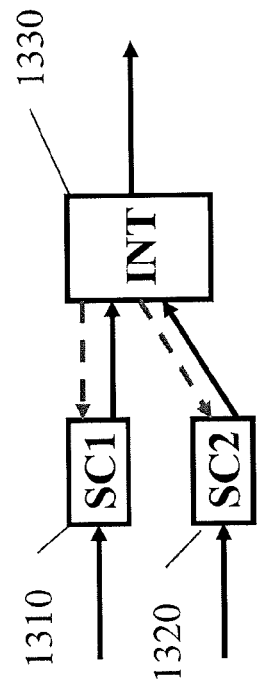
FIG. 13a depicts an exemplary input inhibiting junction ganglite 1300 in accordance with one or many embodiments.

FIG. 13a depicts an exemplary input inhibiting junction ganglite 1300 in accordance with one or many embodiments. The figure contains: feedback junction ganglite 1330, input ganglite 1310, and input ganglite 1320. Some neurites in the junction ganglite 1330 receives stimulation from neurites in the input ganglites 1310 and 1320. Other neurites in the junction ganglite inhibit the input ganglites via inhibitory pathways to neurites in 1310 and 1320. Ganglites 1310 and 1320 may represent relays and processing from sensors, and junction ganglite 1330 may represent a ganglite at which these inputs meet and are integrated. Feedback from 1330 to 1320 and 1310 is optional. This junction, with the feedback shown, may be used to extend the dynamic range of the sensor processing in the individual input ganglites, and may also be used to allow the outputs of one input pathway to indirectly suppress the outputs of the other. Optional direct inhibition among the inputs (e.g., from 1310 to 1320) may be used to allow different inputs to be dominant at different firing rates.

Figure 13B:
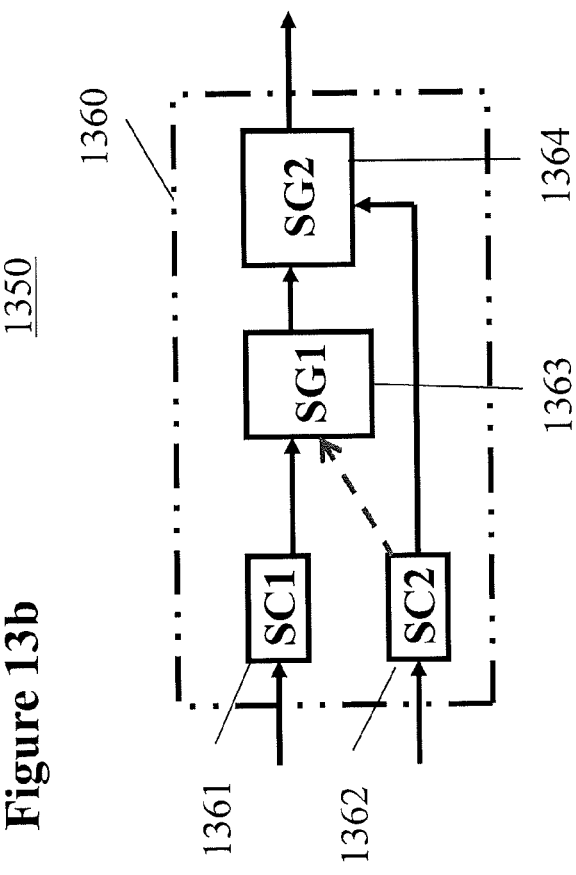
FIG. 13b depicts an exemplary replacement junction ganglite in which one input replaces another 1350 in accordance with one or more embodiments.

FIG. 13b depicts an exemplary replacement junction ganglite in which one input replaces another 1350 in accordance with one or more embodiments. The ganglite 1360 comprises ganglites 1361, 1362, 1363, and 1364. Ganglite 1361 may stimulate ganglite 1363, which in turn may stimulate ganglite 1364. Ganglite 1362 may inhibit ganglite 1363 so that it does not fire, and may stimulate ganglite 1364. Thus the net effect of junction ganglite 1360 may be to allow 1362, when it fires, to take control of whatever action 1361 was controlling. Many variations are possible; including one in which ganglite 1362 may also directly suppresses 1361. A junction ganglite in which one input replaces another may be useful in permitting reflexes to take control of the motion of limbs to regain balance.

Figure 14A:
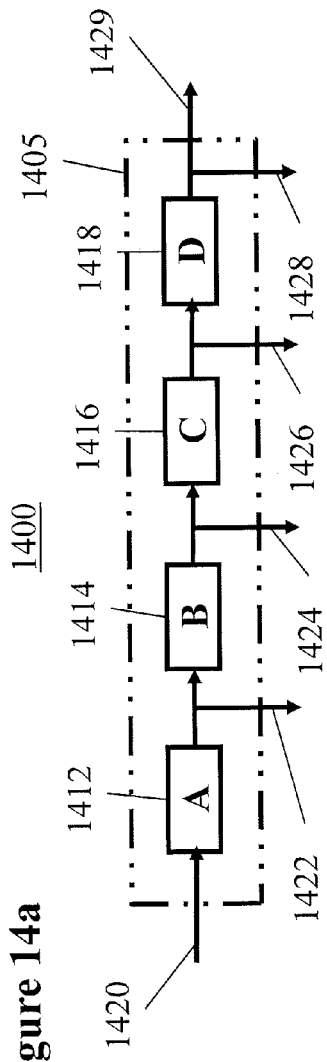
FIG. 14a depicts an exemplary simple time sequence ganglite 1400 in accordance with one or more embodiments.

Time sequence ganglites have many uses. FIG. 14a depicts an exemplary simple time sequence ganglite 1400 in accordance with one or more embodiments. The time sequence ganglite 1405 comprises one or more ganglites 1412, 1414, 1416, and 1418 (which may be simple neurites), each connected to the next in a chain, and each one of which may cause the next to fire in sequence, so that they may provide a sequence of output pulses along their output branches 1422, 1424, 1426, and 1428. The time sequence may comprise of any number of chained ganglites, each of which may initiate or inhibit subsequent ganglites and actions.

Example uses of time sequence ganglites include almost any activity that must be performed in a sequence, such as a peristaltic movement or muscle contraction, or a single movement of multiple legs or the application of forces in sequence. Simple time sequence ganglites have many other uses, including limited persistence and limited maintenance of pattern, concept, mood or state, all of which will be discussed later. Time sequence ganglites may also play a role in time sequence pattern recognition (see FIG. 46).

Figure 14B:
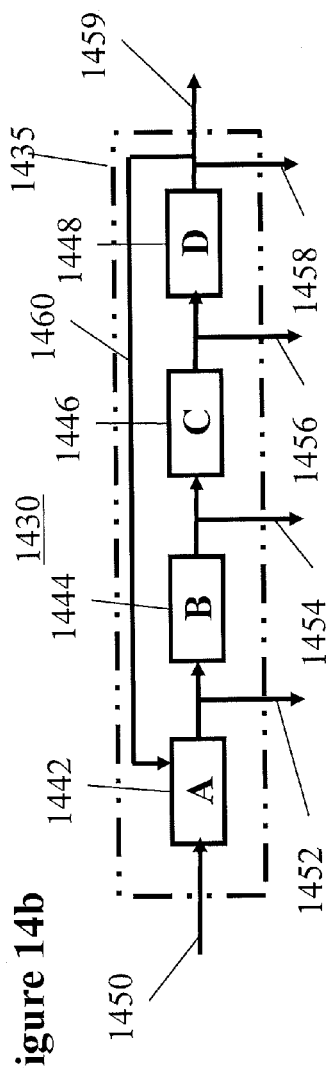
FIG. 14b depicts an exemplary time sequence ganglite with feedback 1430 in accordance with one or more embodiments.

FIG. 14b depicts an exemplary time sequence ganglite with feedback 1430 in accordance with one or more embodiments. The time sequence ganglite with feedback 1435 comprises two or more ganglites 1442, 1444, 1446, and 1448 that fire in sequence, with the output section of one of the ganglites 1448 feeding back to fire a previous ganglite 1442 in the sequence. The feedback may be of the same strength as the other connections, so that the loop continues until interrupted, or it may be weaker, so that it merely sensitizes the earlier ganglite so that weaker inputs can cause it to fire. Examples of applications for this ganglite are in persistence, mood and state maintenance, and in continuous activity generators (CAGs), all of which will be covered later. Time sequence ganglites and ganglite chains may also be in use across a neurite system to enable the interactions of ganglites whose initial firing may not be quite simultaneous, but whose interactions may be essential.

Figure 14C:
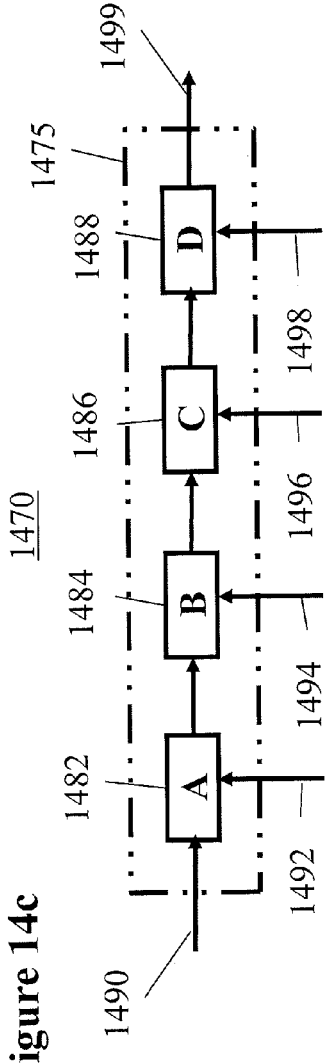
FIG. 14c depicts an exemplary time sequence ganglite in which an input may be added at any point in the sequence 1470 in accordance with one or more embodiments.

FIG. 14c depicts an exemplary time sequence ganglite in which an input may be added at any point in the sequence 1470 in accordance with one or more embodiments. The ganglite comprises one or more neurites 1482, 1484, 1486, and 1488, each (but the last) of which fires the next ganglite, and each of which may receive additional inputs 1492, 1494, 1496, and 1498 respectively, so that it may initiate the sequence from that point forward. Such ganglites may have utility in the formation of certain sequences of activity, such as speech formation. The individual ganglites in these time sequences do not need to be identical, and do not need to send pulses to ganglites outside the sequence.

FIG. 15a depicts a block diagram of an exemplary persistent state ganglite with initiating and terminating ganglites 1500 in accordance with one or more embodiments. The ganglite 1505 may comprise initiating ganglite 1511, any number of persistent sequence ganglites 1512, 1513, 1514, persistent state representative 1515, and terminating ganglite 1516. External neurite input 1521 may stimulate the initiating ganglite to fire, and external input 1522 may cause the terminating ganglite to fire. Feedback may be provided from the last persistent sequence ganglite 1514 to the first persistent sequence ganglite 1512 to make the sequence persistent. Negative feedback in the sequence may be used to limit the number of neurites that may be firing at once. Each ganglite in the persistent sequence may provide outputs that stimulate (e.g., 1531), inhibit (e.g., 1532), or provide a learning cue (e.g., 1533) to external neurites. When the initiating ganglite fires, it may cause the first persistent sequence neurite to fire, which may cause the second persistent sequence neurite to fire, which may cause the third persistent sequence neurite to fire, which may provide feedback that causes the first neurite to fire again, so that the sequence may continue. The ganglite 1515, which lies beyond the feedback loop and is stimulated by each of the neurites in the chain, may fire continuously and may represent the persistent state. The persistent sequence may continue until external stimulation may cause the terminating ganglite to fire. The terminating ganglite may depotentiate all persistent sequence neurite firing centers and the persistent state representative, preventing further firing. This persistent state ganglite may be used to provide persistent sequential outputs, to form short-term memory, or to create a state that affects neurite processing and system behavior in the manner of a neurite mood.

FIG. 15b depicts a block diagram of an exemplary time-limited state ganglite with initiating and terminating ganglites 1550 in accordance with one or more embodiments. The ganglite 1555 may comprise initiating ganglites 1561, any number of sequence ganglites 1562, 1563, 1564, state representative 1565, and terminating ganglite 1566. External neurite input 1571 may stimulate the initiating ganglite to fire, and external neurite input 1572 may cause the terminating ganglite to fire. Negative feedback may be provided from sequence ganglites beyond the first to the first persistent sequence ganglite 1562 to prevent premature re-initiation of the sequence, to limit the number of neurites that may be firing, and to limit the duration of the state. Each ganglite in the persistent sequence may provide outputs that stimulate (e.g., 1581), inhibit (e.g., 1582), or provide a learning cue (e.g., 1583) to external neurites. When the initiating ganglites fires, they may cause the first sequence neurite to fire, which may cause the second sequence neurite to fire, which may cause the third sequence neurite to fire, so that the sequence has a predetermined duration unless it is otherwise terminated. The ganglite 1515, which may be stimulated by each of the neurites in the chain, fires continuously and may represent the time-limited persistent representation of a state, pattern, or concept. The sequence and the state may continue until external stimulation may cause the terminating ganglite to fire. The terminating ganglite may depotentiate all sequence neurites and the persistent state representative, preventing further firing.

Figure 16:
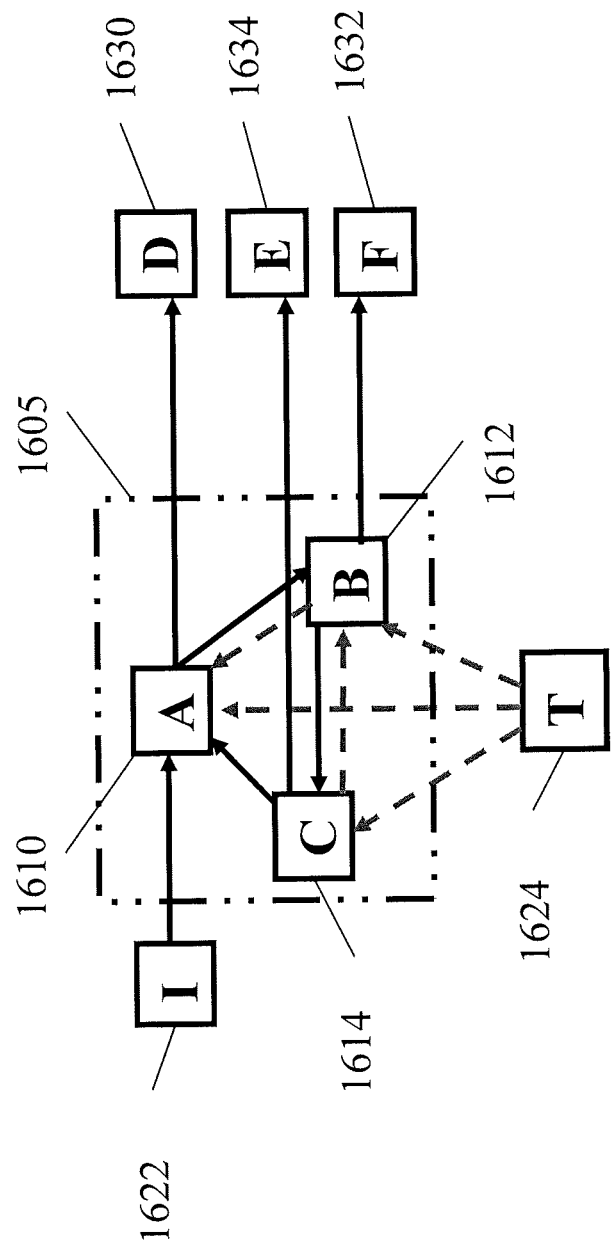
FIG. 16 depicts an exemplary simple continuous activity generator (CAG) ganglite 1600 in accordance with one or more embodiments.

FIG. 16 depicts an exemplary simple continuous activity generator (CAG) ganglite 1600 in accordance with one or more embodiments. The figure includes a CAG 1605, an initiating ganglite 1622, a quenching ganglite 1624, and receiving ganglites 1630, 1632, and 1634. The CAG comprises ganglites 1610, 1612, and 1614, each of which may be implemented as a single neurite or as a simple ganglite in which a few neurites are combined. The ganglite 1622 (which may be a single neurite) may initiate the CAG. It fires ganglite 1610, which fires 1612, which fires 1614, which fires 1610 again. The receiving ganglites, which may be a single ganglite for all CAG outputs, or which may be any number of ganglites, may receive a steady stream of pulses over time. The negative feedback running in the reverse direction (1614 to 1612, 1612 to 1610) in the CAG may be needed to prevent multiple groups of pulses from entering and interfering with the CAG if 1610 is overstimulated by too many pulses over too long a period of time. Pulses from ganglite 1624 (which may be a single neurite) may quench the CAG by depotentiating each of its ganglites. Spontaneous noise may initiate a CAG without the need for a separate initiator. If this is not desired, it may be prevented by sufficient internal voltage decay in the individual neurites. To make a CAG work properly, neurite firing potentials or input sensitivities may need to be properly adjusted, and negative feedback in the reverse direction may be needed. Initiating and terminating ganglites 1622 and 1624 may be included as part of the CAG. Of course any number of ganglites may constitute the CAG, and any number of ganglites may receive the stream of pulses. Continuous movement represents just one application of this continuous sequence activity generator. Many ganglites and other structures may rely on continuous activity generators.

Figure 17:
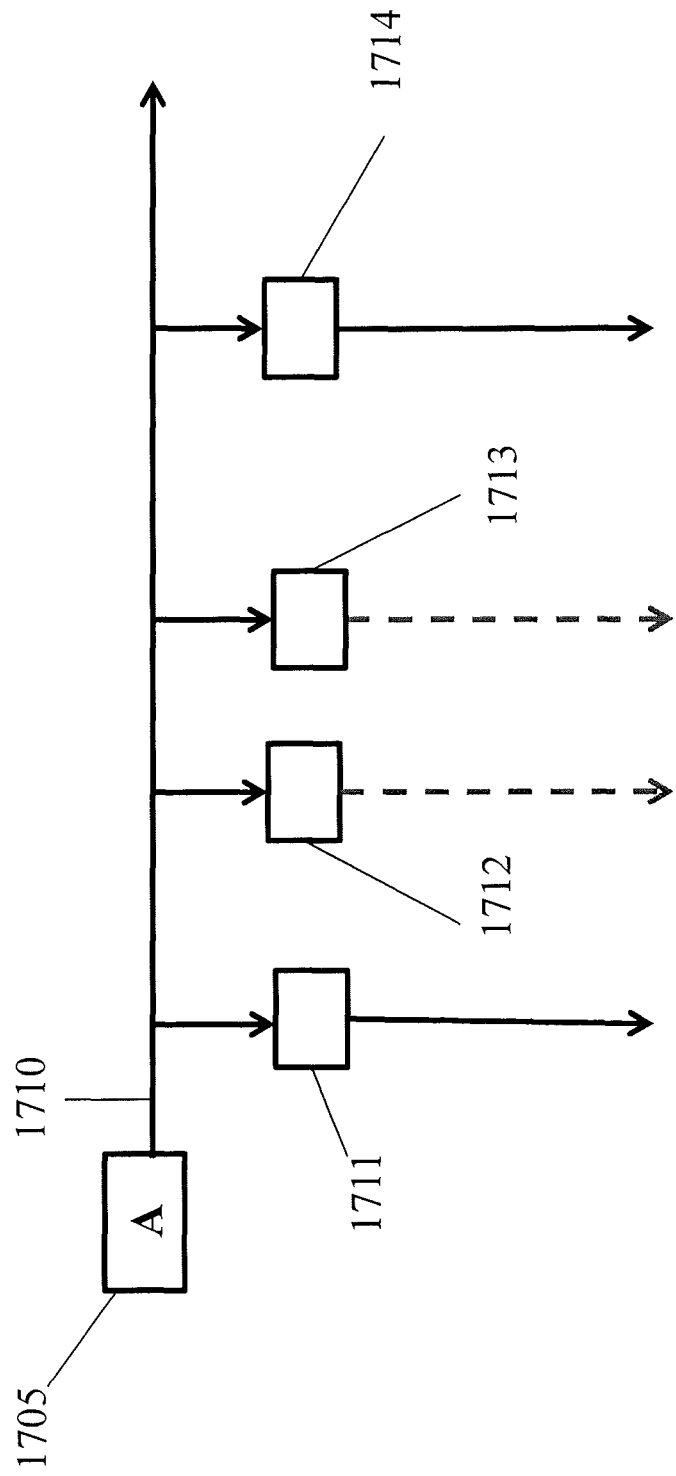
FIG. 17 depicts a timing set ganglite 1700 in accordance with one or more embodiments.

FIG. 17 depicts a timing set ganglite 1700 in accordance with one or more embodiments. The figure comprises: a stimulating neurite 1705 and one or more stimulated neurites 1711, 1712, 1713, and 1714 that are stimulated by the output section 1710 of the stimulating neurite. The output section of the stimulating neurite may have a finite propagation rate along it. The output section may have branches to the stimulated neurites. These branches may diverge from the output section of the stimulating neurite at different points along the output section. The stimulated neurites may have different input sensitivities, so that different numbers of stimulating neurite pulses are needed to fire each. The stimulated neurites may have outputs that are excitory or inhibitory. The timing set ganglite is a flexible structure that may, in combination with controlled timing sequence ganglites, allow enormous flexibility in timing and coordinating complex sequences of movement. One use of a timing set ganglite may be to provide inhibition to a variable time-delay ganglite.

Figure 18:
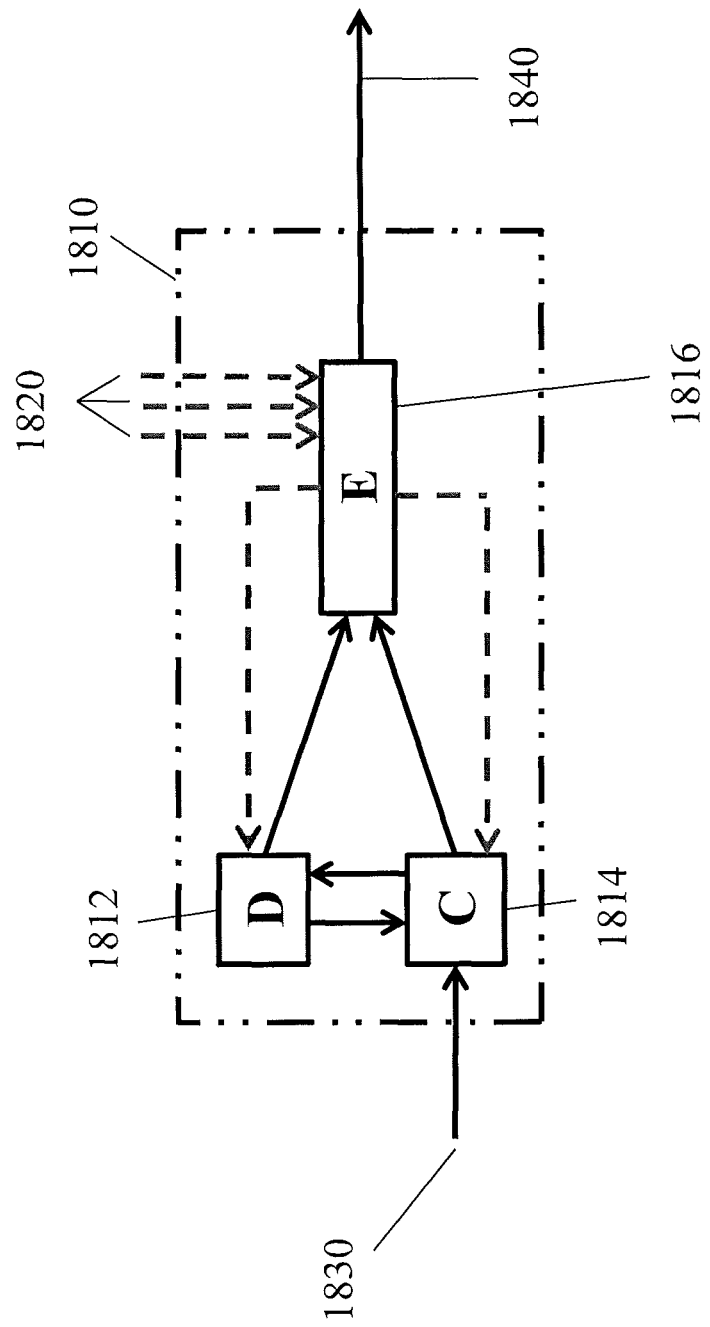
FIG. 18 depicts a block diagram of an exemplary variable time-delay ganglite 1800 in accordance with one or more embodiments.

FIG. 18 depicts a block diagram of an exemplary variable time-delay ganglite 1800 in accordance with one or more embodiments. The figure comprises: a variable time-delay ganglite 1810; a neurite pulse initiator 1830; and one or many time-delay inputs 1820. The variable time-delay ganglite comprises: a continuous activity generator comprises ganglites 1812 and 1814 (each of which may be a single neurite); and a time-delay neurite 1816 with output section 1840. Neurite 1816 may have a negative minimum potential, and may be depotentiated to a negative potential by its time-delay inputs. When ganglite 1814 is initiated, it may stimulate both the time-delay neurite and the other CAG ganglite 1812. When the other CAG ganglite 1812 fires, it may stimulate both the next CAG ganglite (1814) and the time-delay neurite. Ultimately the CAG may cause the firing center voltage of the time-delay neurite 1816 to rise to or above its firing value. When the time-delay neurite fires, it may quench all ganglites in the CAG and provide a neurite output from the ganglite via its output section. The key idea here is that the time-delay neurite may be initially depotentiated to varying degrees by the time-delay inputs, so that flexibility in timing can be achieved via these inputs. Potentiating time-delay inputs 1820 may also be used to shorten the time delay of the time-delay ganglite. The CAG used here is for illustrative purposes, and other CAGs may be used.

Figure 19:
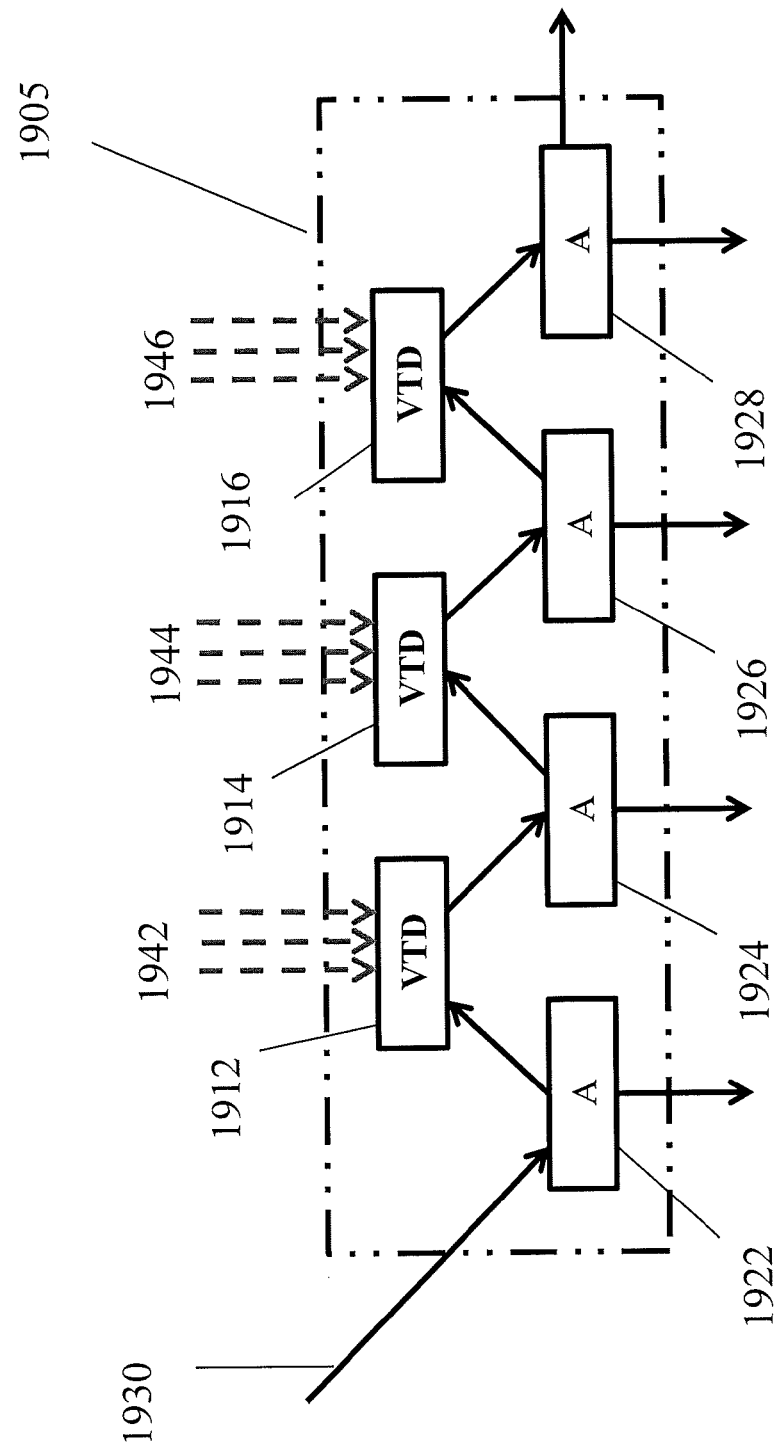
FIG. 19 depicts a block diagram of an exemplary controlled timing sequence ganglite 1900 in accordance with one or more embodiments.

FIG. 19 depicts a block diagram of an exemplary controlled timing sequence ganglite 1900 in accordance with one or more embodiments. The figure contains the controlled timing sequence ganglite 1905, its initiating neurite pulse source 1930, and its variable timing neurite inputs 1942, 1944, and 1946. The controlled timing sequence ganglite comprises a sequence of two or more activity ganglites (1922, 1924, 1926, and 1928) that may initiate or control other activities not shown, separated by variable time delay ganglites 1912, 1914, and 1916 so that there may be one or more variable time-delay ganglites between activity ganglites. (If the initiating pulse goes to a variable time delay ganglite, only one activity ganglite is required.) When initiated by the initiating neurite pulse source, the activity ganglites may cause and control a sequence of actions external to the ganglite 1905 that is regulated by the variable timing neurite inputs. These inputs may come from timing set ganglites. Thus variable timing set ganglite inputs to the variable time-delay ganglites may control the pace and rhythm of a sequence of actions. Quenching of the sequence may be added to depotentiate activity.

Logic-like Ganglites

Ganglites can exhibit both logic-like and logical functionality. FIG. 6a depicts a ganglite comprises a single neurite that, depending on its decay rate, may exhibit "and-like" and "or-like" functionality. In cases where a single neurite might provide the same logical or logic-like functionality, other ganglites comprises multiple neurites may be used if they have desirable properties. For example, they may be used to smooth performance in a ganglite pathway has multiple neurite pathways operating in parallel.

Figure 20:
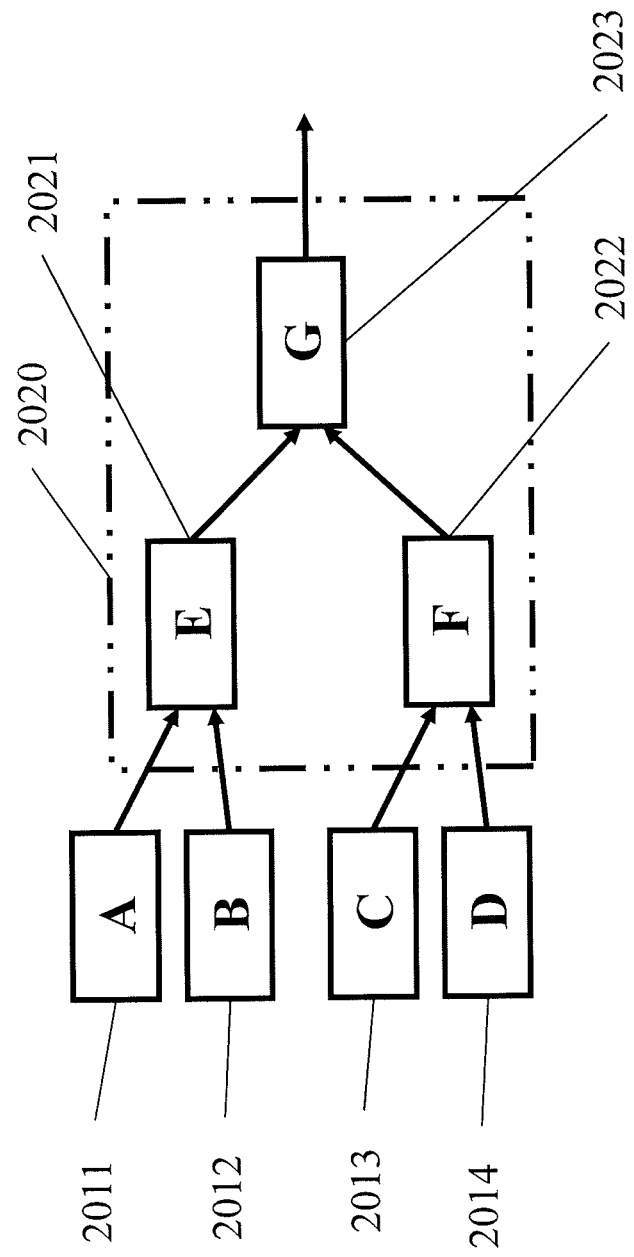
FIG. 20 depicts an exemplary "and-like" ganglite for many inputs 2000 in accordance with one or more embodiments.

FIG. 20 depicts an exemplary "and-like" ganglite for many inputs 2000 in accordance with one or more embodiments. The figure contains four inputs 2011, 2012, 2013, and 2014 and the "and-like" ganglite 2020. 2020 comprises three "and-like" neurites (see FIG. 6a). Neurite 2021 will fire if both 2011 and 2012, fire; neurite 2022 will fire if both 2013 and 2014 fire, and thus neurite 2023 will fire if all four inputs fire. "Or-like" functionality may also be achieved by ganglite structure 2020 using multiple simple "or-like" neurites (see FIG. 6a) for 2021, 2022, and 2023 in the manner.

Figure 21:
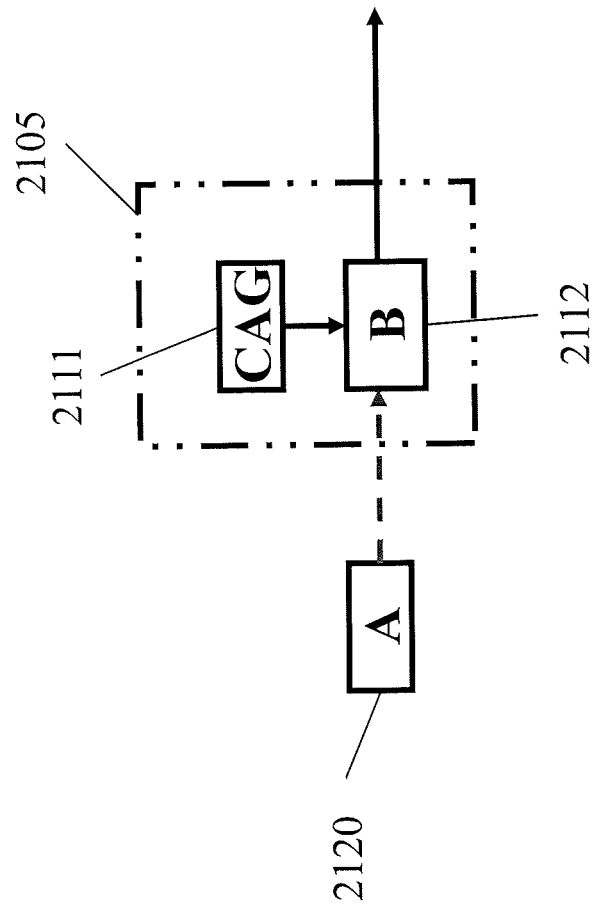
FIG. 21 depicts an exemplary simple "not-like" ganglite in accordance with one or more embodiments 2100.

FIG. 21 depicts an exemplary simple "not-like" ganglite in accordance with one or more embodiments 2100. The figure contains an input ganglite 2120, and a not-like ganglite 2105, which is comprised of a continuous activity generator (CAG) 2111 and a ganglite 2112 that may be implemented as a single neurite. The CAG potentiates 2112 sufficiently to make it fire, and the input ganglite deactivates it sufficiently to overcome the CAG and prevent it from firing. Thus 2112 may fire when ganglite 2120 does not fire and 2112 may not fire when the input ganglite 2120 does fire. In that sense, the output of the ganglite 2105 represents the negation of its input ganglite 2120. The CAG must be active for this ganglite to function. Not-like ganglites are especially useful in control and feedback pathways, in learning pre-logic, and when some activity must be initiated quickly under specific circumstances. These circumstances might inhibit the input 2120, permitting 2112 to become initiated rapidly by the CAG. Suppression and suppression of suppressors are important control techniques in neurite systems.

Figure 22A:
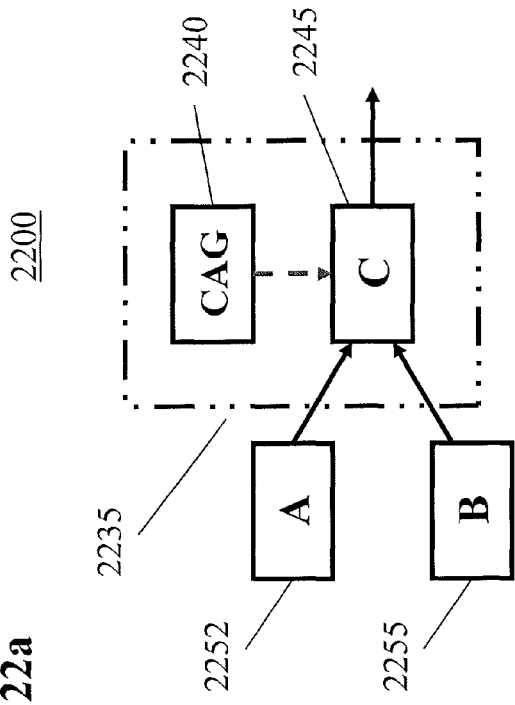
FIG. 22a depicts another exemplary "and-like" ganglite 2200 in accordance with one or more embodiments.

FIG. 22a depicts another exemplary "and-like" ganglite 2230 in accordance with one or more embodiments. The figure contains two input ganglites 2252 and 2255, and an and-like ganglite 2235 comprising a continuous activity generator (CAG) 2240 and a ganglite 2245 (which may be implemented as a single neurite). The CAG provides continuous depotentiation of 2245. Neither of the input ganglites, firing alone at its maximum rate may be sufficient to overcome the suppression of the CAG, but both, firing at fairly high rates may be sufficient to overcome the CAG and cause 2245 to fire. More than two inputs may be provided, and the depotentiation by the CAG may be set so that any number of inputs firing as sufficient rate may be sufficient to cause 2245 to fire.

Figure 22B:
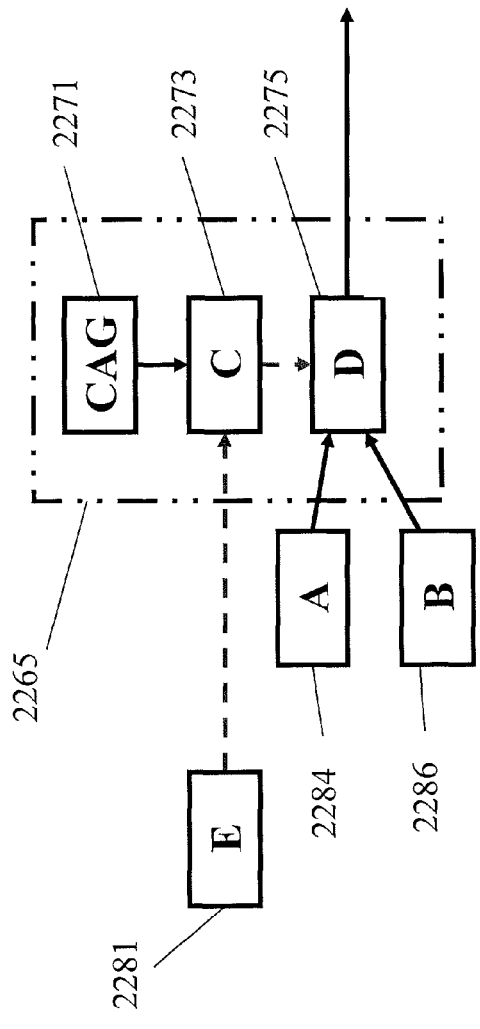
FIG. 22b depicts an exemplary flexible switch ganglite that may switch between and-like and or-like behavior 2260, in accordance with one or more embodiments.
Figure 23:
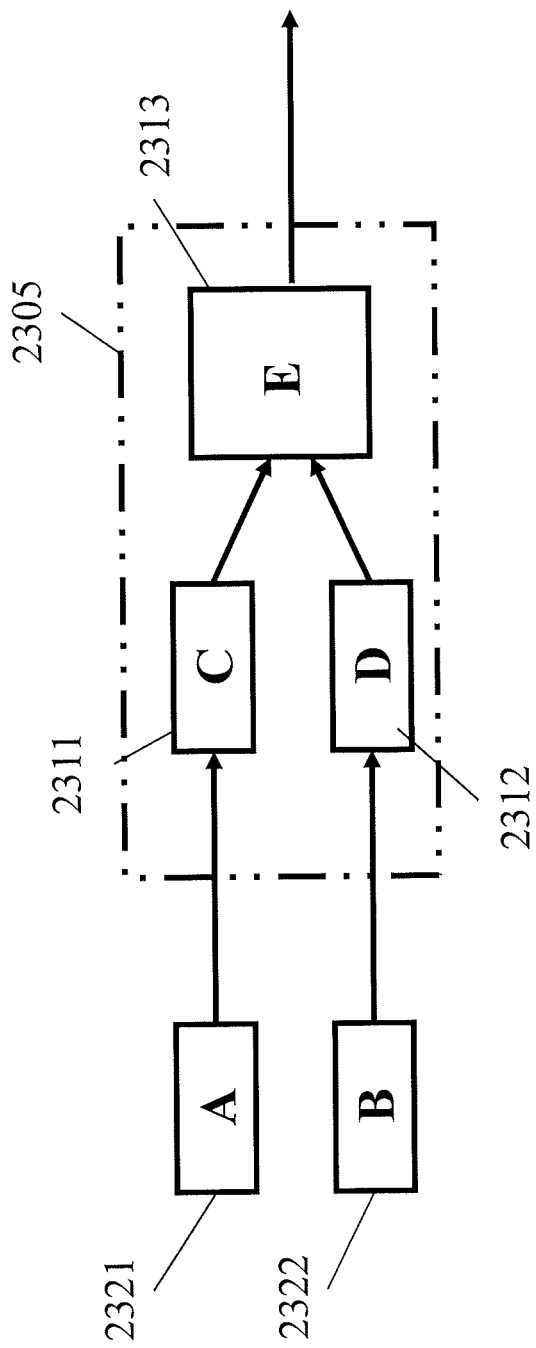
FIG. 23 displays an exemplary "and-like" ganglite for dissimilar inputs 2300 in accordance with one or more embodiments.

FIG. 22b depicts an exemplary flexible switch ganglite that may switch between and-like and or-like behavior 2260, in accordance with one or more embodiments. The figure contains a control ganglite 2281, two input ganglites 2284 and 2286, and the exemplary flexible switch ganglite that can switch behavior 2265. The flexible switch ganglite comprises a continuous activity generator 2271, a summing ganglite 2273 (which may be implemented as a single simple neurite), and a summing ganglite 2275 (which may be implemented as a single simple neurite. When the control ganglite is not firing, the CAG may cause 2273 to fire. 2273 may suppress 2275 sufficiently that both input ganglites must fire to cause 2275 to fire. This provides "and-like" functionality. When control ganglite 2281 fires, it may suppress 2273 so that 2273 does not fire. Then 2275 may not be suppressed, so that either input is sufficient to cause it to fire. This provides or-like functionality FIG. 23 displays an exemplary "and-like" ganglite for dissimilar inputs 2300 in accordance with one or more embodiments. The figure contains two input ganglites 2321 and 2322, and an and-like ganglite for dissimilar inputs 2305. 2305 is comprised of ganglites 2311, 2312, and 2313 (all of which may be implemented as single neurites). 2311 and 2312 have matched pulse durations and dead times, so that they may take unequal pulse durations and dead times from the inputs and may precondition them to produce similar inputs for the "and-like" ganglite 2313. The output of 2313 thus may provide an "and-like" function for dissimilar inputs. A dissimilar input "and-like" ganglite may be used to provide a learning cue to a learning neurite that is a part of an associative process.

Figure 24:
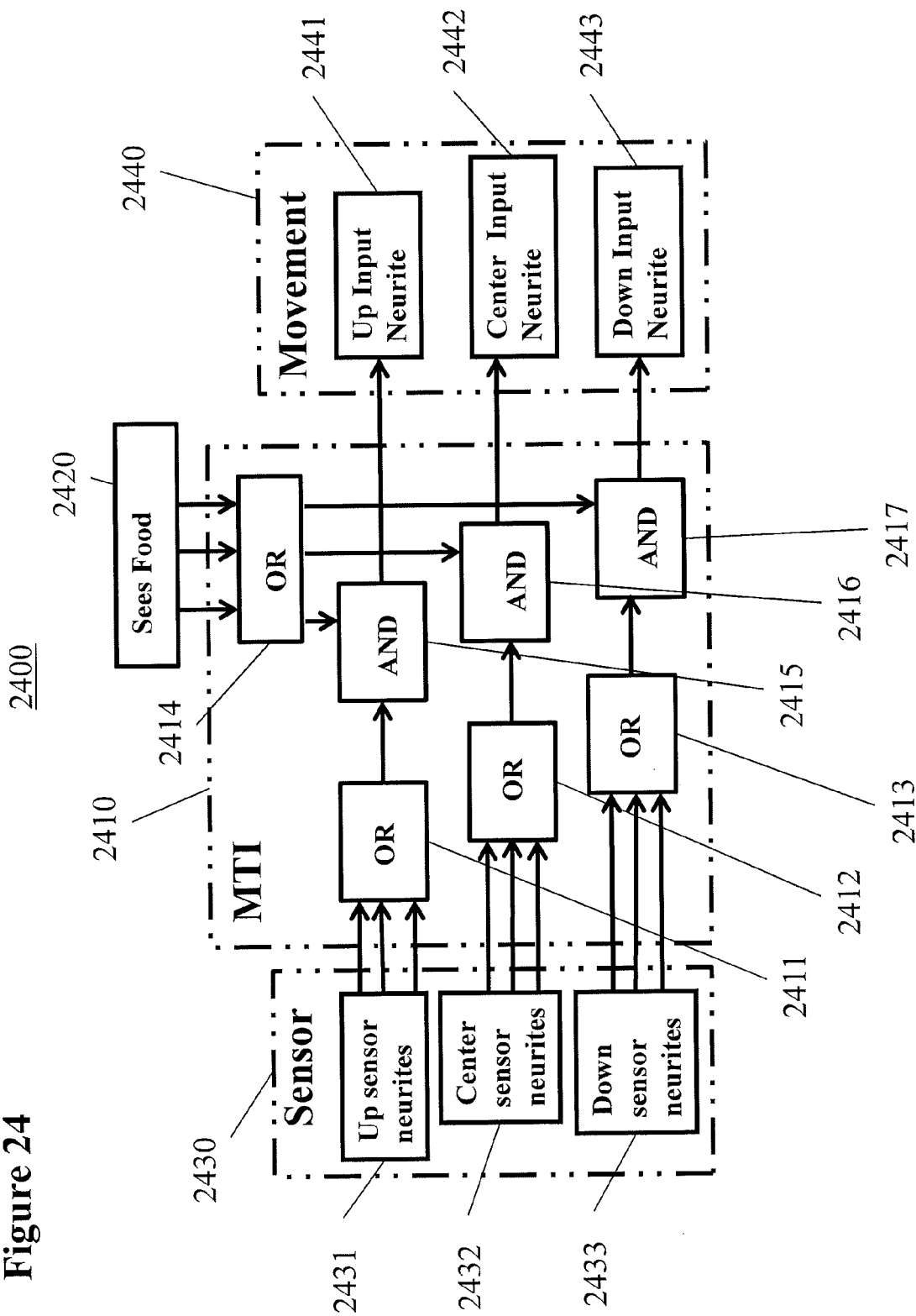
FIG. 24 depicts a block diagram of an exemplary compound logical decision ganglite in context 2400 in accordance with one or more embodiments.

FIG. 24 depicts a block diagram of an exemplary compound logical decision ganglite in context 2400 in accordance with one or more embodiments. The figure comprises a "sees food" ganglite 2420, a ganglite of eye position sensor neurites 2430, an exemplary compound logical decision ganglite (MTI) 2410, and a movement initiation ganglite 2440. The ganglite of sensor neurites comprises eye position "up" sensor neurites 2431, eye position "center" sensor neurites 2412, and eye position "down" sensor neurites 2433. The compound logical decision ganglite comprises "or-like" neurites 2411, 2412, 2413, and 2414 and "and-like" neurites 2415, 2416, and 2417. Each of the ganglites in the compound decision ganglite may be implemented as a single neurite. The movement ganglite comprises an "up input" neurite 2441, a "center input" neurite 2442, and a "down input" neurite 2443. Neurites in the "sees food" ganglite may fire when the creature recognizes a visual pattern as food. Any neurite in the "sees food" ganglite may fire the "or-like" ganglite 2414, which provides inputs to the three "and-like" neurites 2415, 2416, and 2417. Any of the "up" sensor neurites may fire the "or-like" ganglite 2411, which may fire the "and-like" ganglite 2415, so that any combination of a firing "sees food" neurite and a firing "up" sensor neurite may fire 2415, which may in turn may fire the "up input" neurite 2441 of the movement ganglite, so that the creature may move up towards the seen food. Similarly the firing of any "down" sensor neurite and "sees food" neurite may fire the "and-like" ganglite 2417, which may fire a "down input" neurite in the movement ganglite, so that the creature may move down towards the seen food. Similarly the firing of a "center" sensor neurite and a "sees food" neurite may cause the firing of a "center input" movement neurite. In the absence of a "sees food" input the compound decision ganglite may have no output. In the absence of an eye position sensor input, the compound decision ganglite may have no output.

Additional Ganglites

Figure 25:
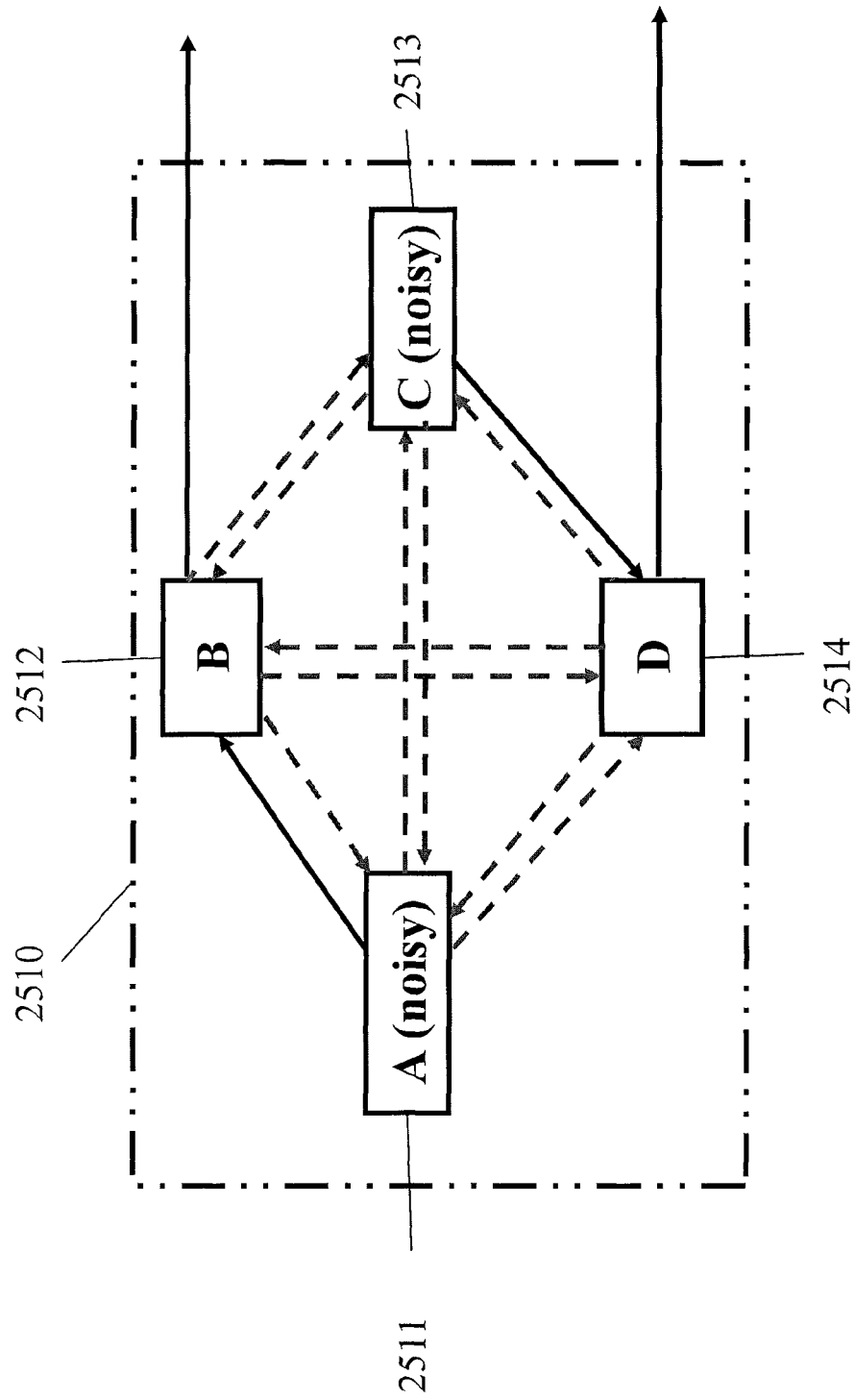
FIG. 25 depicts a block diagram of an exemplary ganglite with random outputs at random times 2500 in accordance with one or more embodiments.

Voltage noise in neurites can be the source of random firing. Ganglites can be constructed to take advantage of this to produce explicitly random behavior. FIG. 25 depicts a block diagram of an exemplary ganglite with random outputs at random times 2500 in accordance with one or more embodiments. The ganglite 2510 comprises four neurites 2511, 2512, 2513, and 2514. Neurites 2511 and 2513 are identical spontaneous pulse generating neurites (see FIG. 6c). They are relatively noisy, and have very low voltage decay rates so that noise voltage accumulates. They thus compete to fire. If 2511 fires first, it may stimulate neurite 2512 and zero the voltages of neurites 2513 and 2514. Neurite 2512 may then fire, and zero the voltages of neurites 2511, 2513, and 2514, so that the voltage noise competition may begin anew with an even start. Similarly, if neurite 2513 fires first, its net effect may be to fire neurite 2514 and begin a new voltage noise competition with an even start. The net effect may be that neurites 2512 and 2514 fire at random, and at somewhat random times.

A single output ganglite or ganglite grouping is a grouping of member ganglites in which only one member ganglite at a time can provide outputs. This can be achieved in many ways, including by having each member ganglite provide negative inputs to all of the others (direct single output mode), or by having each member ganglite feed a single master ganglite that provides negative inputs to all member ganglites (indirect single output mode). Single output ganglite groupings may commonly be used in cases where the member ganglites are members of a ganglite field, and only one output is desired. Of course, there may be instances in which some or all of the member ganglites may be single neurites, and instances in which the master ganglite may be a single neurite.

Figure 26A:
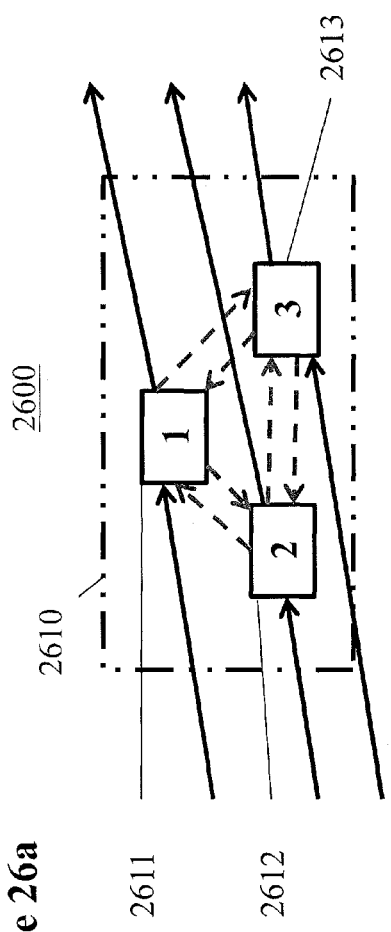
FIG. 26a depicts an exemplary single output ganglite grouping by direct suppression 2600 in accordance with one or more embodiments.

FIG. 26a depicts an exemplary single output ganglite grouping by direct suppression 2600 in accordance with one or more embodiments. The exemplary single output ganglite 2610 comprises two or more member ganglites 2611, 2612, and 2613. Each member ganglite in 2610 has an external input and an external output. Each member ganglite may suppress all other member ganglites directly, so that when one fires, all firing potentials may be reset to zero, and only the firing member ganglite may provide an external output at that time. A single output ganglite by direct suppression may have any number of member ganglites. However, it may not scale well to large numbers of member ganglites due to the large number of output branches needed for direct suppression. Single output ganglites may select the strongest input, and are useful in many instances where selection of one of many inputs is desirable. Thus they may play a role in sensor processing, memory selection, and decision-making. Faster output inhibition may be achieved if synapse or transmission inhibition is also used among the member ganglites on the output sections of other member ganglites, so that their output paths are suppressed in addition to their firing centers.

Figure 26B:
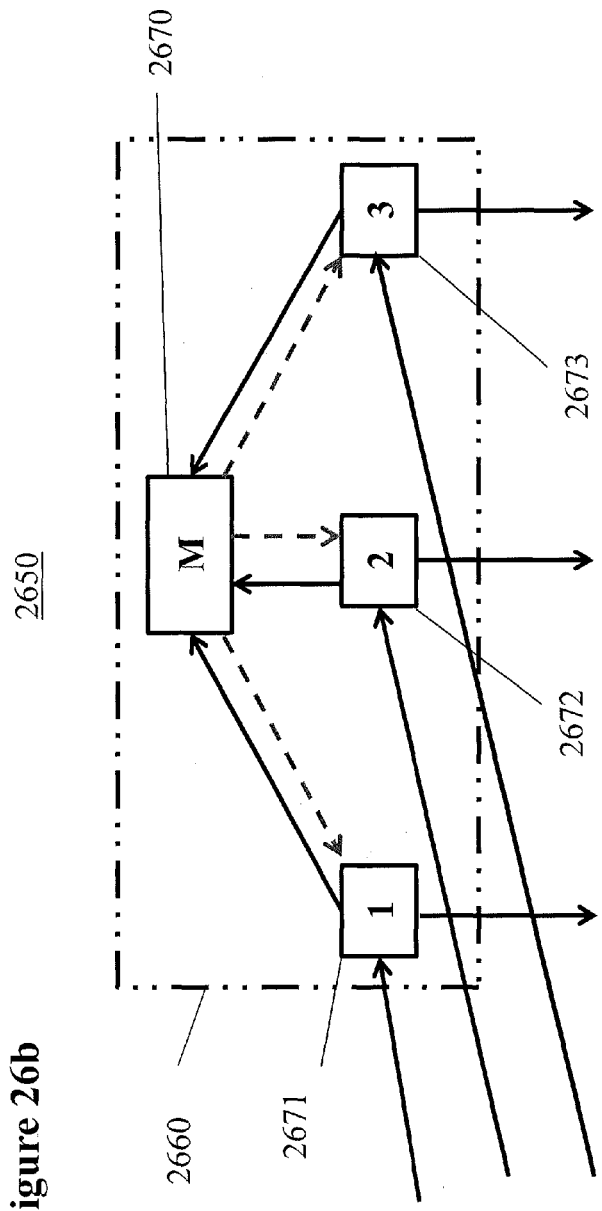
FIG. 26b displays an exemplary single output ganglite by indirect suppression 2650 in accordance with one or more embodiments.

FIG. 26b displays an exemplary single output ganglite by indirect suppression 2650 in accordance with one or more embodiments. The exemplary ganglite 2660 comprises a master ganglite 2670 and two or more member ganglites 2671, 2672, and 2673. Each member ganglite in 2660 has an external input and an external output. Each member ganglite, when it fires, may stimulate the master ganglite to fire, which may then suppress all members ganglites directly, so that when one member ganglite fires, all firing potentials may be reset to zero, and only the firing member may provide an external output at that time. A single output ganglite by indirect suppression may have any number of members. It may scale well to large numbers of members. However, the delay time involved in firing the master may lead to longer time delays in suppression, so that it is more likely that multiple members may fire at a time. Faster output inhibition may be achieved if, in addition to suppressing the member ganglites, the master ganglite also uses synapse or transmission inhibition on the output sections of the member ganglites, so that their output paths are suppressed in addition to their firing centers. Single output ganglites and ganglite groupings by indirect suppression may select the strongest input, and may be useful in many instances where selection of one of many inputs is desirable. Thus they may play a role in sensor processing, memory selection, and decision-making, and may be especially useful in processing large ganglite fields. Control of the indirect suppression ganglite may be achieved by inhibiting the master suppressor ganglite.

Collections of ganglites that are arranged so that, either by direct or indirect suppression only one may be likely to fire, may be said to be in single output mode.

FIG. 27a depicts a block diagram of an exemplary learning association ganglite in context 2700 in accordance with one or more embodiments. The figure contains: one or more ganglites to be associated 2711, 2712 and 273; the learning association ganglite 2720, which is comprised of one or many learning association neurites 2724; a cue source 2730 that stimulates the learning modules of the learning association neurites 2724; and an association target 2740.

The cue source may be any ganglite that may stimulate the learning association modules of the learning association neurites so that active strengthenable synapses may be strengthened in the presence of the learning cue. The association target is any ganglite that may be stimulated by a learning association neurite. Prior to learning, all synapses from ganglites to be associated may be weak, so that even repeated firing may be unlikely to stimulate the learning association neurite. If, in the presence of a learning cue (which may, for example be from a source ganglite that fires in a fearful situation), one of the ganglites to be associated (e.g., 2711) is firing, its synapse (e.g., 2721) may be strengthened, so that subsequently the firing of this ganglite may stimulate the learning association ganglite to fire, which may in turn stimulate the association target to fire. Thus, even after the learning cue is withdrawn, the firing of the ganglite to be associated may result in the firing of the association target. However, ganglites to be associated that were not firing in the presence of the learning cue may not cause the association target to fire. Learning association ganglites and individual learning association neurites may form the basis of long-term memory and learning.

FIG. 27b depicts a block diagram of an exemplary learning association method in which an association source causes an input ganglite to have an effect comparable to the effect of the source 2750 in accordance with one or more embodiments. The figure contains: one or many potential ganglites to be associated 2761, 2762 and 2763; the learning association ganglite 2770, comprises one or many learning association neurites 2774; an association source 2780 that may be a ganglite; and an association target 2790 that is stimulated by the association source. Each learning association neurite possesses a learning association module 2775 and synapses that can be strengthened 2771, 2772, and 2773 from their corresponding potential ganglites to be associated. The association source may be any ganglite that may stimulate the learning association areas of the learning association neurites so that active strengthenable synapses are strengthened in the presence of the learning cue. The association target may be any ganglite that may be stimulated by the association source and a learning association neurite. Prior to learning, all synapses from ganglites to be associated are weak, so that even repeated firing of a potential ganglite to be associated may be unlikely to stimulate the learning association neurite. If, during activation of the association source (which might, for example be ganglite that fires in a fearful situation), one of the potential ganglites to be associated (e.g., 2761) is firing, its synapse (e.g., 2771) may be strengthened. Subsequently the firing of this ganglite may stimulate the learning association neurite to fire, which may in turn stimulate the association target to fire. Thus, even after the learning cue is withdrawn, the firing of this potential ganglite to be associated may result in the firing of the association target. However, potential ganglites to be associated that were not firing in the presence of the learning cue may not cause the association target to fire. A typical use of this method is to enable a learning association ganglite to be able to associate some previously unrelated aspect of a fearful situation (a specific potential ganglite to be associated) with the association target (e.g., a fear response) so the neurite creature learns to react to that aspect of the fearful situation.

Figure 28:
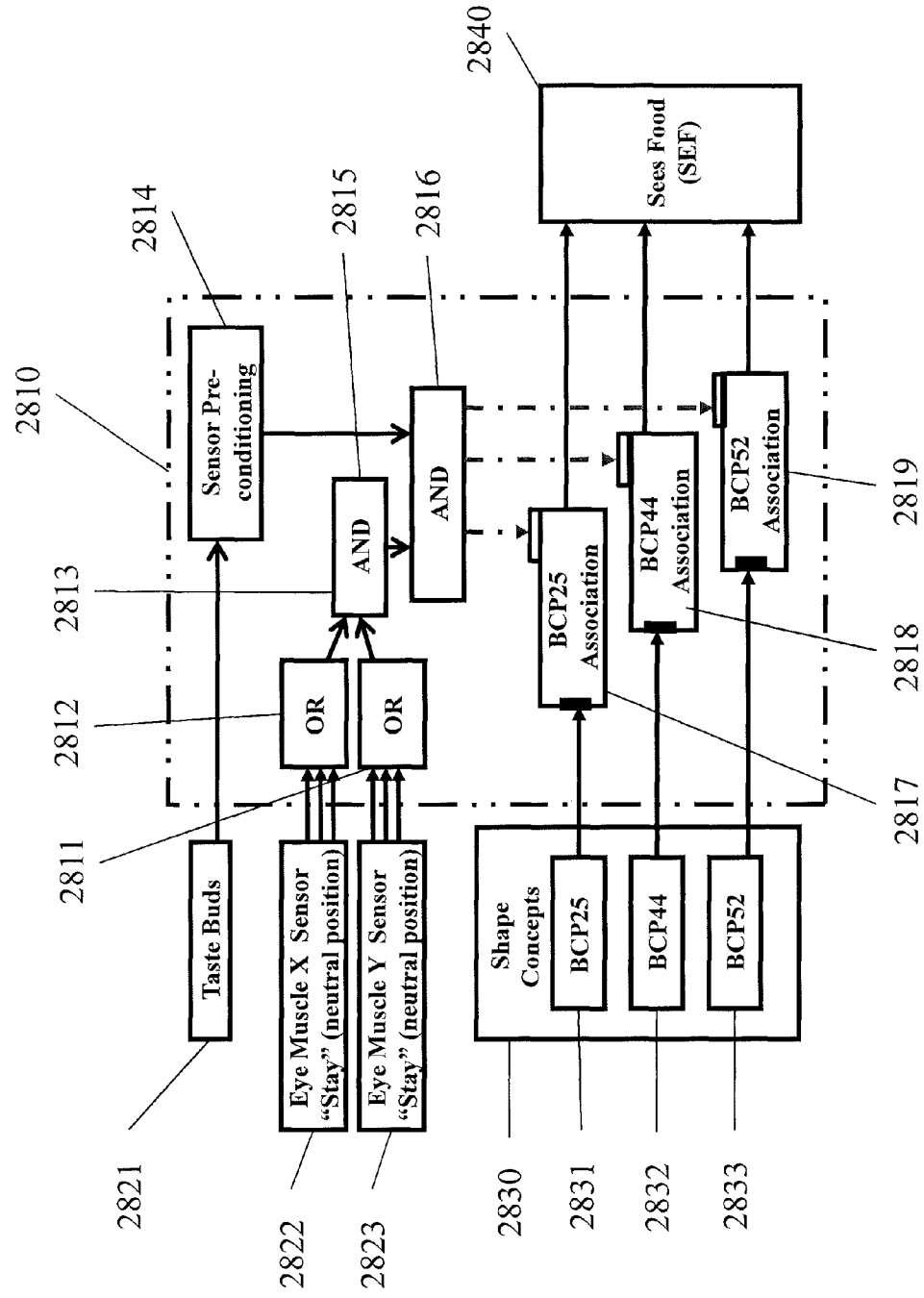
FIG. 28 depicts an exemplary learning association ganglite for concept association 2800 in accordance with one or more embodiments.

FIG. 28 depicts an exemplary learning association ganglite for concept association 2800 in accordance with one or more embodiments. The figure contains: external conditions 2821, 2822, and 2823; shape concept recognition ganglite area 2830 for concepts that are triggered by visual recognition, comprised of individual shape concept recognition ganglites 2831, 2832, and 2833; a ganglite 2840 that initiates and continues actions when the creature sees food; and the exemplary concept association ganglite 2810. 2810 comprises: logic and pre-conditioning ganglites 2811, 2812, 2813, 2814, 2815 and 2816; and learning neurites 2817, 2818; and 2819. The right logical combinations of external conditions may create the learning cues to the learning neurites. When present, these combinations may strengthen the synapses from the shape concept recognition ganglites to the learning association neurites so that, subsequently, the relevant shape recognition area may trigger the creature activities associated with seeing food.

Figure 29B:
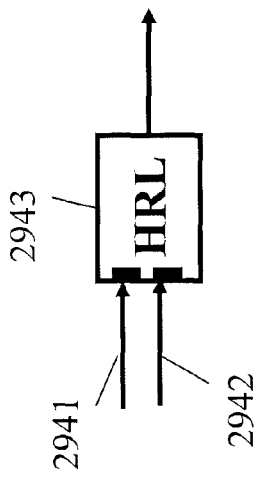
FIG. 29b depicts an exemplary higher level abstraction 2930 of the high rate learning association ganglite 2920 in accordance with one or more embodiments.
Figure 29D:
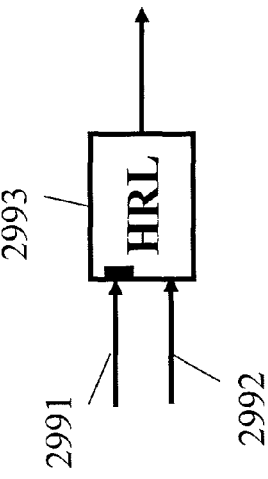
FIG. 29d depicts an exemplary higher level abstraction 2980 of the high rate learning association ganglite 2970 in accordance with one or more embodiments.
Figure 29A:
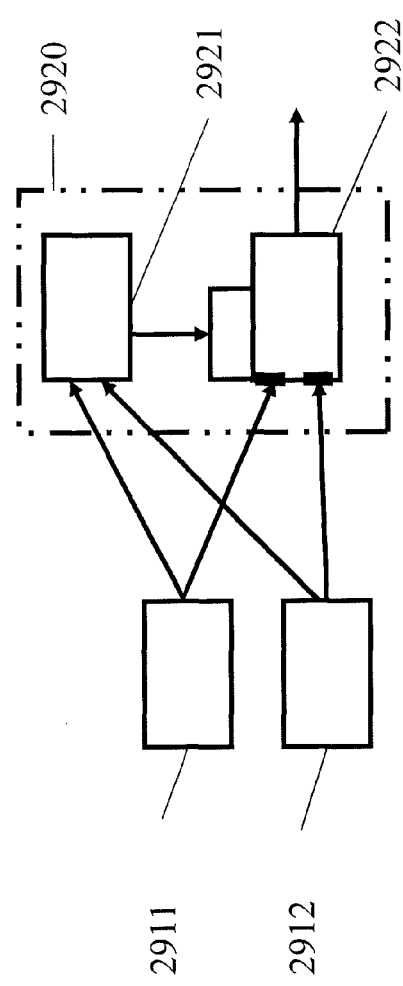
FIG. 29a depicts an exemplary high-rate learning association ganglite 2900 in accordance with one or more embodiments.

FIG. 29a depicts an exemplary high-rate learning association ganglite 2900 in accordance with one or more embodiments. The figure contains: inputs 2911 and 2912; and the exemplary high rate learning association ganglite 2920. 2920 comprises: "and-like" neurite 2921 (for example, see FIG. 6a); and learning neurite 2922, which has two synapses that may be strengthened when its learning module is stimulated. Inputs 2911 and 2912 each synapse upon both 2921 and 2922. If both inputs 2911 and 2912 fire rapidly enough to stimulate 2921 to fire, 2921 will stimulate the learning module of 2922, and 2922 will strengthen its synapses from both 2911 and 2912. Otherwise, 2921 will not fire, and these synapses will not be strengthened (no learning will take place). However, 2922 will still respond to 2911 and 2912 in accordance with whatever weights it has. This ganglite thus learns without a learning cue if both input ganglites fire at high enough rates. Many variations of such a high rate learning association ganglite are possible, including but not limited to ones with additional inputs, the use of other and-like ganglites for 2921, and the use of multiple learning ganglites.

FIG. 29b depicts an exemplary higher level abstraction 2930 of the high rate learning association ganglite 2920 in accordance with one or more embodiments. The figure contains: abstracted inputs 2941 and 2942 that represent all inputs from 2911 and 2912 of FIG. 29a; and ganglite 2943 that represents the entire ganglite 2920. This ganglite learns without a learning cue if the input ganglites fire at high enough rates.

Figure 29C:
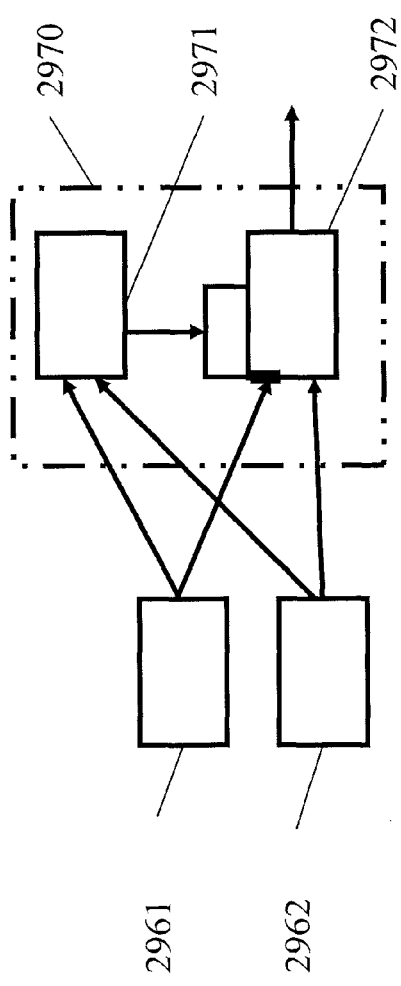
FIG. 29c depicts another exemplary high rate learning association ganglite 2950 in accordance with one or more embodiments.

FIG. 29c depicts another exemplary high rate learning association ganglite 2950 in accordance with one or more embodiments. The figure contains: inputs 2961 and 2962; and the exemplary high rate learning association ganglite 2970. 2970 comprises: "and-like" neurites 2971 and 2972 (for example, see FIG. 6a); and learning neurite 2972, which has one synapse (from 2961) that may be strengthened when its learning module is stimulated. Inputs 2961 and 2962 each synapse upon both 2971 and 2972. If both inputs 2961 and 2962 fire rapidly enough to stimulate 2971 to fire, 2971 will stimulate the learning module of 2972, and 2972 will permanently strengthen its synapses from 2961. Otherwise, 2971 will not fire, and no learning will take place. However, 2972 will still respond to 2961 and 2962 in accordance with the weights that it has. This ganglite thus learns without a learning cue if the input ganglites fire at high enough rates. Many variations of such a high rate learning association ganglite are possible, including but not limited to ones with additional inputs, the use of other and-like ganglites for 2971, and the use of multiple learning ganglites.

FIG. 29d depicts an exemplary higher level abstraction 2980 of the high rate learning association ganglite 2970 in accordance with one or more embodiments. The figure contains: abstracted inputs 2991 and 2992 that represent all inputs from 2961 and 2962 of FIG. 29a; and ganglite 2993 that represents the entire ganglite 2970. This ganglite learns without a learning cue if the input ganglites fire at high enough rates.

High rate learning association ganglites may also be developed that require learning cues. FIG. 30*a* depicts an exemplary high rate learning association ganglite that requires a learning cue and high rate inputs for learning 3000 in accordance with one or more embodiments. The figure contains: inputs 3011, and 3012; a learning cue 3013 that may be from a ganglite source 3014; and the exemplary high rate learning association ganglite 3020. 3020 comprises: "and-like" neurite 3021, (see FIG. 6*a*); "and-like" neurite 3022, which receives inputs from 3021 and 3013, and learning neurite 3023, which has two synapses from 3011 and 3012 that may be strengthened when its learning module is stimulated by an input from 3022. Inputs 3011 and 3012 each synapse upon both 3021 and 3023. Input 3013 synapses on 3022, and thus may provide the learning cue for the ganglite 3020. If both inputs 3011 and 3012 fire rapidly enough to stimulate 3021 to fire, 3021 may fire on 3022. If the learning cue input 3013 is also firing rapidly enough, 3022 may fire. 3022 may then stimulate the learning module of 3023, and 3023 may permanently strengthen its synapses from both 3011 and 3012. Otherwise, if 3011, 3012, and 3013 do not all fire rapidly enough, 3023 may not fire, and no synapse modification may take place. However, 3023 may still respond to 3011 and 3012 in accordance with whatever weights it has. Thus this ganglite 3020 learns with a learning cue if its input ganglites fire at high enough rates. Many variations of such a high rate learning association ganglite may be possible, including but not limited to ones with some inputs to the learning neurite 3023 that are not subject to synapse strengthening. Other potential variations include ones with additional inputs, the use of other and-like ganglites for 3021 and 3022, and the use of multiple learning cues and multiple learning ganglites.

Figure 30B:
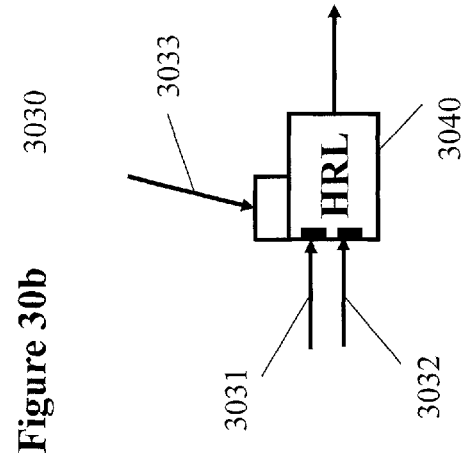
FIG. 30b depicts an exemplary higher level abstraction 3030 of the high rate learning association ganglite 3020 in accordance with one or more embodiments.

FIG. 30*b* depicts an exemplary higher level abstraction 3030 of the high rate learning association ganglite 3020 in accordance with one or more embodiments. The figure contains: abstracted inputs 3031 and 3032 that represent the inputs from 3011 and 3012 of FIG. 30*a*; learning cue input 3033 that represents the learning association input 3013, and high rate learning association ganglite 3040 that represents the entire ganglite 3020. This ganglite learns in the presence of a learning cue if the inputs fire at high enough rates.

Figure 30D:
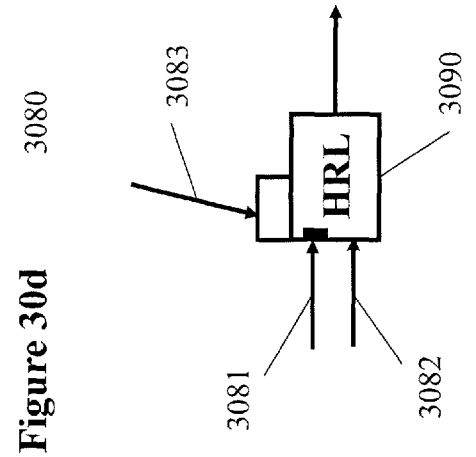
FIG. 30d depicts an exemplary higher level abstraction 3080 of the high rate learning association ganglite 3050 in accordance with one or more embodiments.
Figure 30A:
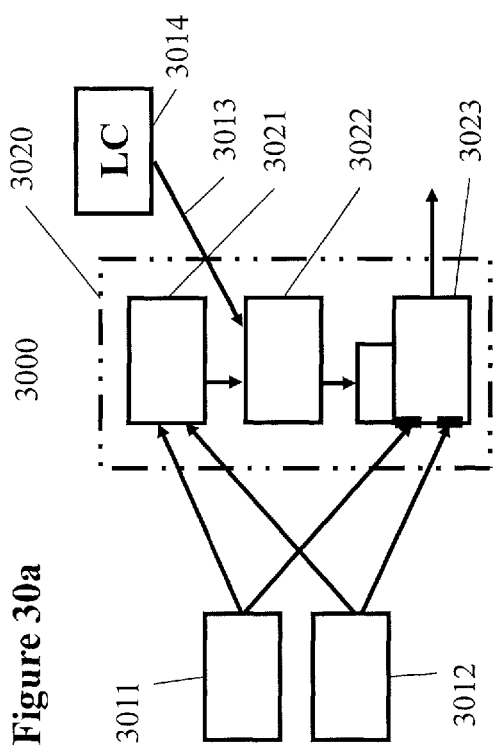
FIG. 30a depicts an exemplary high rate learning association ganglite that requires a learning cue and high rate inputs for learning 3000 in accordance with one or more embodiments.
Figure 30C:
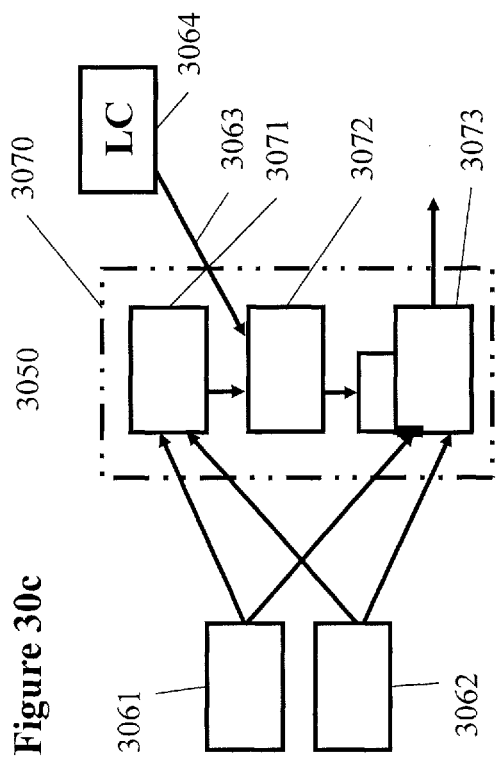
FIG. 30c depicts another exemplary high rate learning association ganglite 3050 that requires a learning cue and high rate inputs for learning in accordance with one or more embodiments.

FIG. 30*c* depicts another exemplary high rate learning association ganglite 3050 that requires a learning cue and high rate inputs for learning in accordance with one or more embodiments. The figure is identical to that of FIG. 30*a* except that one synapse (the synapse from 3062 to 3070) from an input to the learning neurite in the high rate learning association ganglite is not subject to strengthening. Thus this ganglite learns with a learning cue, but only for input 3061, if both input ganglites fire at high enough rates.

FIG. 30*d* depicts an exemplary higher level abstraction 3080 of the high rate learning association ganglite 3050 in accordance with one or more embodiments. The figure contains: abstracted inputs 3081 and 3082 that represent the inputs from 3011 and 3012 of FIG. 30*a*; learning cue input 3083 that represents the learning association input 3063, and high rate learning association ganglite 3090 that represents the entire ganglite 3070. This ganglite learns with a learning cue, but only for input 3081, if both input ganglites fire at high enough rates.

A ganglite may be required that fires outputs from different channels depending on the rate of firing of its input. FIG. 31*a* depicts a simple rate selective channel separation ganglite 3100 in accordance with one or more embodiments. The figure contains: an input source 3110; and the rate selective channel separation ganglite 3120. 3120 comprises two rate sensitive neurites (see FIG. 4*a*): a low rate rate-sensitive neurite 3121; and a high rate rate-sensitive neurite 3122 that suppresses the low-rate rate sensitive neurite. If 3110 fires below the threshold of 3121, neither 3121 nor 3122 will fire. If 3110 fires at or above the threshold of 3121, but below the threshold for 3122, only 3121 will fire. If 3110 fires at or above the threshold of 3122, 3122 will fire and suppress 3121, so that only 3122 fires. Many variations of this ganglite are possible, including the presence of more than two rate sensitive neurites so that there are more than two rate sensitive output channels, with each rate sensitive neurite suppressing all lower rate neurites, and the absence of internal suppression so that multiple output channels may fire at the same time.

Rate selective output methods may be incorporated into more complex ganglites. FIG. 31*b* depicts a general ganglite with rate selective channel separation 3150 in accordance with one or more embodiments. The figure contains: multiple inputs 3160; and the general ganglite with rate selective channel separation 3170. 3170 comprises: multiple input processing ganglites 3171; processing ganglite 3172 that combines and processes the results of 3171; and any number of rate sensitive output neurites 3173 and 3174 (with outputs 3183 and 3184 respectively) that may or may not have suppressive logic among them. Thus, depending on the inputs, processing, and logic, various combinations of outputs may be made to fire. Such ganglites may be used in pattern recognition, memory and recall, and in the transition from one concept to another.

Ganglite Fields

A ganglite field, or ganglite array, may comprise a set of ganglites for which position within the set carries meaning. Neurite processing between neighboring ganglites in the field, and within and between regions in the field is relatively easy to accomplish. The position of neurites or ganglites holding such results may also carry meaning. Ganglite fields may be one-dimensional, two-dimensional, or even of higher dimension. Ganglite fields do not need to be laid out with uniform spacing, and may have spacing that varies with desired sensitivity and resolution. Linear ganglite arrays may represent such things as sound amplitude or sound frequency. Two-dimensional ganglite arrays may represent a visual field or sense of pressure (or touch) on a two-dimensional object.

FIG. 32*a* depicts an exemplary linear ganglite field 3200 in accordance with one or more embodiments. The field 3210 contains two or more ganglites 3211, 3212, 3213, 3214, and 3215. The elements of the field may stimulate or inhibit one another.

FIG. 32*b* depicts an exemplary concatenation of ganglite fields to form a pathway segment 3250 in accordance with one or more embodiments. The figure contains ganglite fields 3220 and 3230. Ganglite field 3220 may be comprised of one or more ganglites 3221, 3222, 3223, 3224, and 3225. Ganglite field 3230 may be comprised of one or more ganglites 3231, 3232, 3233, 3234, and 3235. In the figure, the ganglites of ganglite field 3220 stimulate and inhibit the ganglites in ganglite field 3230 to further process a ganglite pattern. Concatenated fields may have the same structures. Neurite connections between concatenated ganglite fields may present many opportunities for highly parallel signal processing for pattern processing, pattern recognition, pattern association, and pattern learning. Complex pathways with multiple layers, feedback, and inputs from multiple previous layers may all be present.

Figure 33:
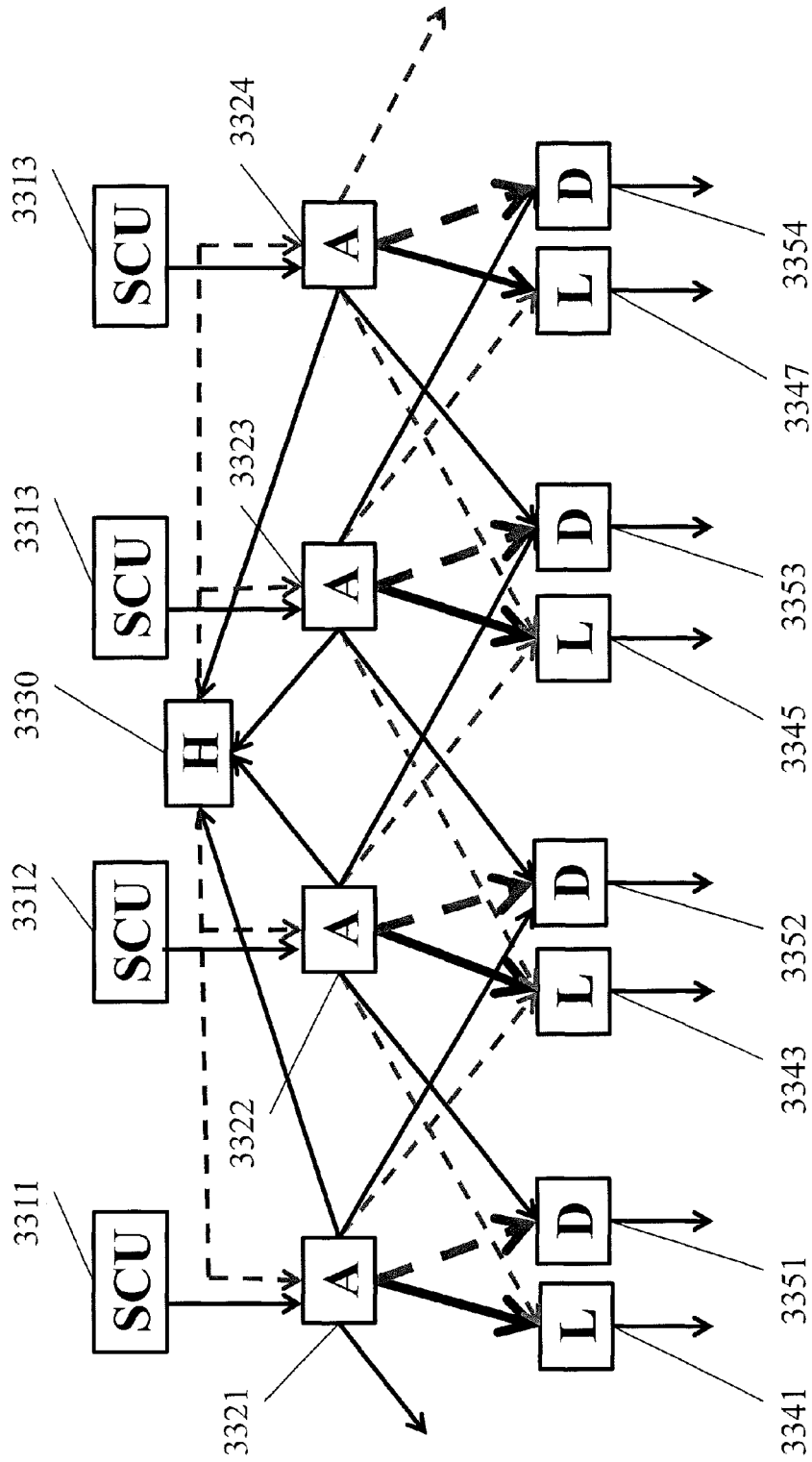
FIG. 33 depicts a region of an exemplary multi-layer concatenation of ganglite fields to maintain ganglite differentials and find contrast 3300 in accordance with one or more embodiments.

FIG. 33 depicts a region of an exemplary multi-layer concatenation of ganglite fields to maintain ganglite differentials and find contrast 3300 in accordance with one or more embodiments. The figure contains: a field of sensor conversion units 3311, 3312, 3313, and 3314, which may represent any number of sensor conversion units in one or two dimensions; a first field of ganglites 3321, 3322, 3323, and 3323, which represent a corresponding field of ganglites; a second field of ganglites 3341, 3342, 3341, and 3344 that represent a corresponding field of ganglites that may fire if their corresponding SCU fires more than the average of its surrounding SCUs; a third field of ganglites 3351, 3352, 3352, and 3354 that represents a corresponding field of ganglites that may fire if their corresponding SCU fires less than the average of its surrounding SCUs; and a horizontal ganglite 3330 that may receive excitory inputs from a region of the first field of ganglites and provides inhibitory pulses to the same region. The region may be of any size, and regions may abut or overlap so long as the horizontal ganglites 3330 are adjusted so that if all SCUs fire at the same rate, all ganglites of the first field of ganglites fire at the same rate. The net effect of the horizontal ganglites is to minimize the effect of overall external intensity on the ganglites of the first ganglite field (e.g., saturation of neurites in the first ganglite field). Horizontal cell feedback causes the first ganglite field to fire only on differences in SCU firing rates. Each of the ganglites in the second field of ganglites receives a strong excitory input from its corresponding first field ganglite, and weaker inhibitory inputs from surrounding first field ganglites. These synapse strengths are adjusted so that if all first field ganglites fire at the same rate, no second field ganglite fires. Each of the ganglites in the third field of ganglites receives a strong inhibitory input from its corresponding first field ganglite, and weaker excitory inputs from surrounding first field ganglites. These synapse strengths are adjusted so that if all first field ganglites fire at the same rate, no third field ganglite fires. The net result is that the sensory inputs, via their corresponding sensor conversion units, are separated into a field that fires only on inputs that are more intense (lighter) than their surroundings, and another field that fires only on inputs that are less intense (darker) than their surroundings. Such fields can be applied to any one or two (or higher) dimensional fields, including pressure, touch, light, and temperature.

Figure 34:
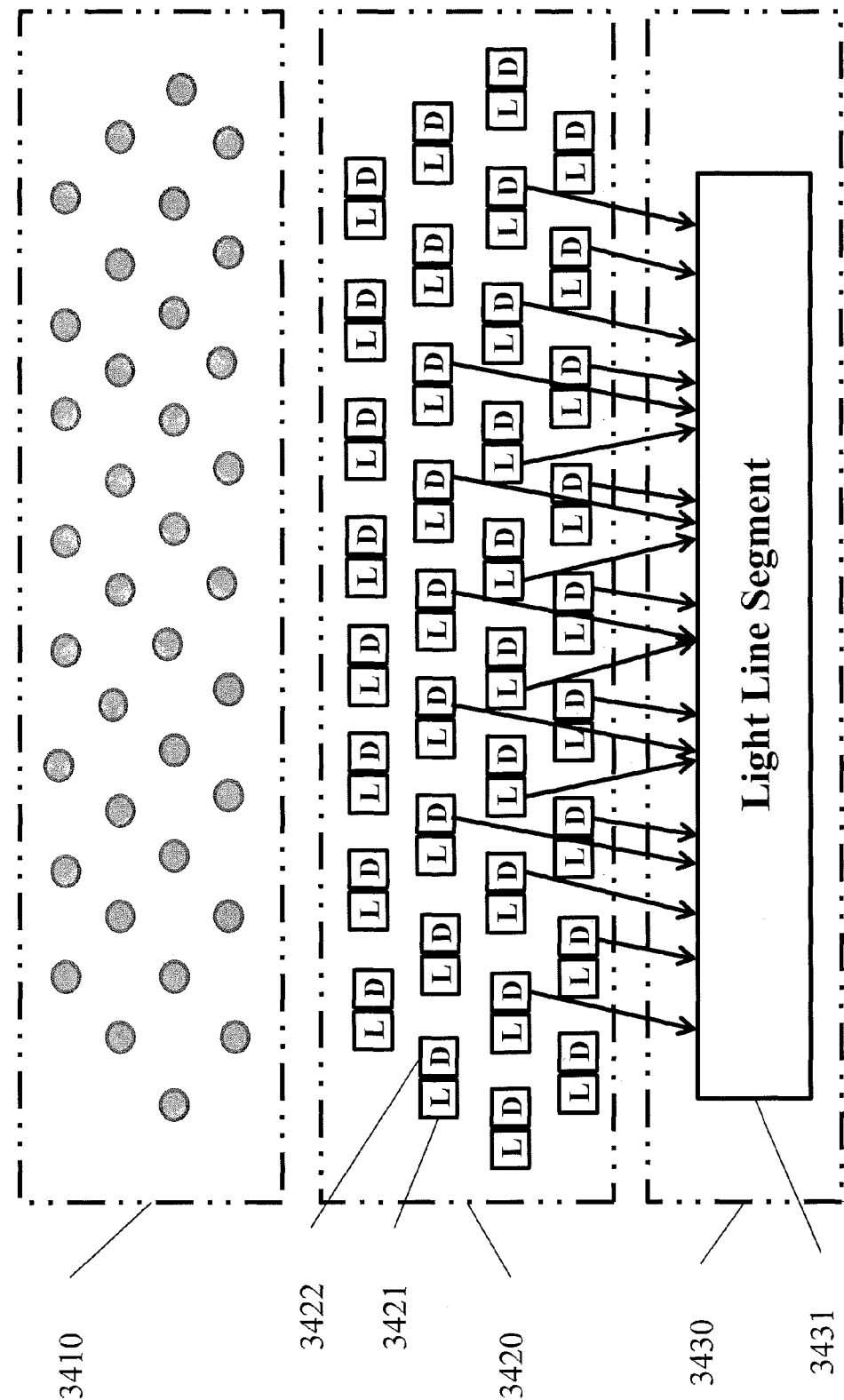
FIG. 34 illustrates an exemplary concatenation of two dimensional ganglite fields to produce primitive shapes 3400 in accordance with one or more embodiments.

FIG. 34 illustrates an exemplary concatenation of two dimensional ganglite fields to produce primitive shapes 3400 in accordance with one or more embodiments. The figure comprises: a sensor field 3410; a corresponding pair of ganglite fields 3420 that are related to 3410 in the same way that the second and third ganglite fields of FIG. 33 are related to the sensor field of FIG. 33; and a ganglite field of primitive shapes 3430. Ganglite 3421 of ganglite field 3420 represents a typical element of the second ganglite field of FIG. 33; ganglite 3422 represents a typical element of the third ganglite field of FIG. 33. Only one member (ganglite 3431) of ganglite field of primitive shapes 3430 is depicted. In the figure, a primitive shape ganglite is stimulated by "light" and "dark" excitory inputs from the fields of 3420. In the exemplary representative 3431, it is a "light" line segment of length 4 surrounded by a darker region. Primitive shapes can be of any size or shape. Input strengths may be adjusted so that if the input to 34 is uniform, the primitive shape receives no stimulation. The primitive shape may be a part of a field of identical or similar primitive shapes, so that each element of 3420 may provide outputs to a large number of primitive shapes in a ganglite field represented by 3430. Fields of both light and dark primitive shapes may be developed in this manner.

Many variations on this are possible, including taking excitory and inhibitory inputs directly from the first ganglite layer (3321, 3322, 3323, and 3324) of FIG. 33 to the primitive shape ganglite layer 3430. Hence, FIG. 33 is a special case of FIG. 34 in which individual "dark" and "light" neurites are created.

Figure 35A:
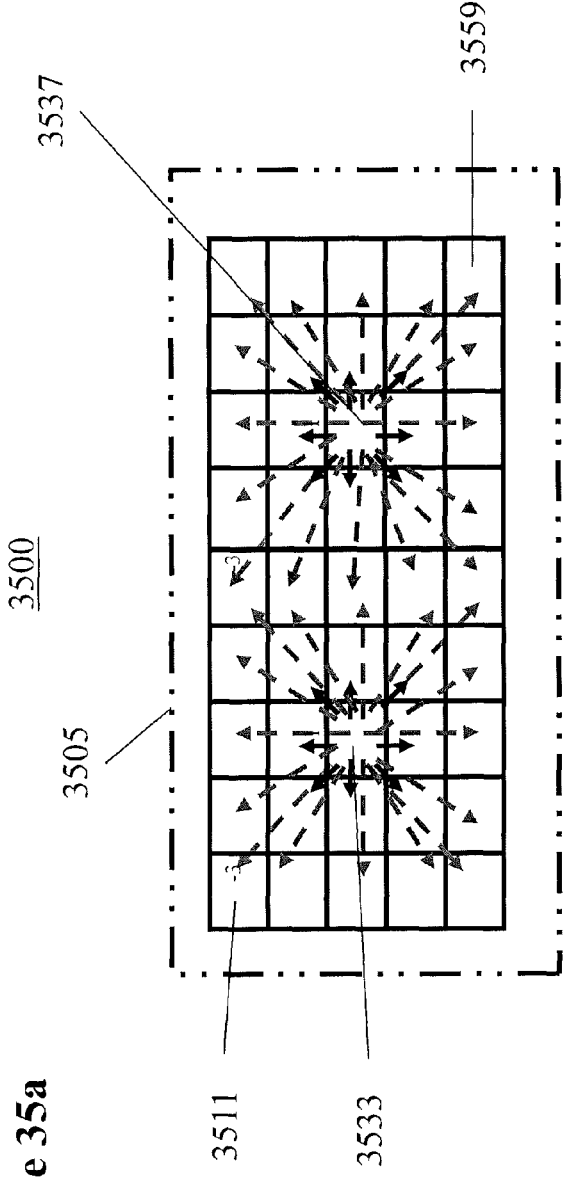
FIG. 35a depicts an exemplary two dimensional ganglite field 3500 in accordance with one or more embodiments.

FIG. 35a depicts an exemplary two dimensional ganglite field 3500 in accordance with one or more embodiments. The field 3505 contains the array of ganglites 3511 through 3559. The external inputs to the ganglite field and the external outputs of the ganglite field are not shown. Solid and dotted arrows in the figure may represent internal stimulation and internal suppression among the ganglites in the field, which may be used to perform many signal processing functions in parallel. For example, ganglite field members may be connected by nearest neighbor positive stimulation with learning synapses, and third-nearest neighbor negative stimulation to implement concept formation and separation.

Figure 35B:
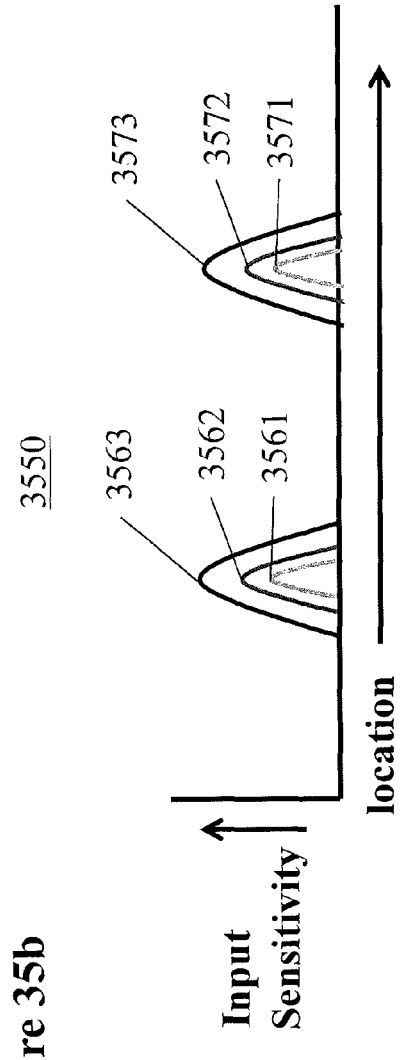
FIG. 35b depicts a hypothetical curve of input sensitivity for an internally processing learning ganglite field 3500 in accordance with one or more embodiments.

FIG. 35b depicts a hypothetical curve of input sensitivity for an internally processing learning ganglite field 3500 in accordance with one or more embodiments. The horizontal axis represents one component of position of a ganglite in the field, and the vertical axis representing ganglite sensitivity to stimulation. The curves 3561, 3562, and 3563 represents growing sensitivity over time, with 3561 representing the earliest time, and 3562 and 3563 representing successively later times, for stimulation of ganglite 3533. Similarly, the curves 3571, 3572, and 3573 represent growing sensitivity over time, with 3571 representing the earliest time, and 3572 and 3573 represent successively later times, for stimulation of ganglite 3537.

Fields can be combined in many ways.

Figure 36:
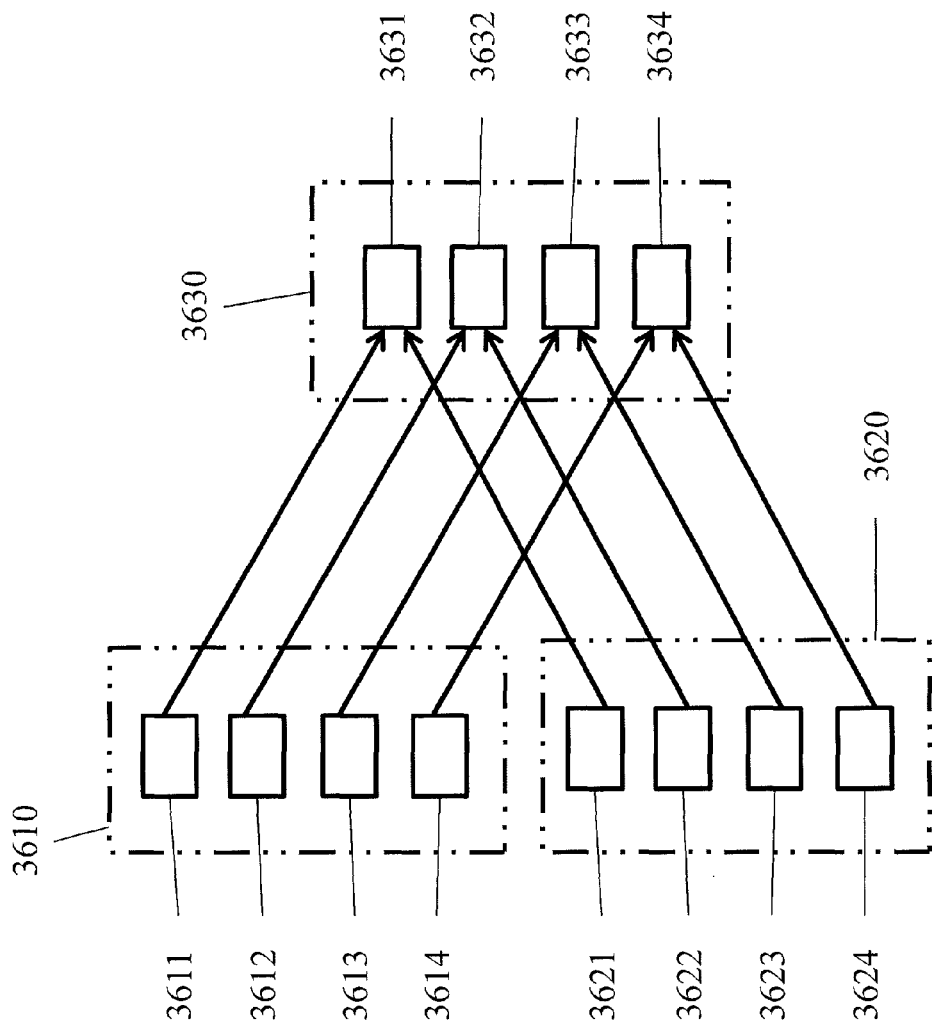
FIG. 36 represents the combination of two ganglite fields of similar shape to form a third field of the same shape 3600 in accordance with one or more embodiments.

FIG. 36 represents the combination of two ganglite fields of similar shape to form a third field of the same shape 3600 in accordance with one or more embodiments. The figure contains: ganglite field 3610 comprised of ganglites 3611, 3612, 3613, and 3614; ganglite field 3620, comprised of ganglites 3621, 3622, 3623, and 3624; and ganglite field 3630, comprised of ganglites 3631, 3632, 3633, and 3634. Each individual ganglite in ganglite field 3610 contributes to a corresponding ganglite in field 3630. Each individual ganglite in ganglite field 3620 contributes to a corresponding ganglite in field 3630. The fields may be of any dimensionality and size. The contributions may be to surrounding elements as well as the corresponding element, and may be both exciting and inhibiting. The downstream fields may feed back to the contributing fields to create associations. The combination of ganglite fields is important in many processes, including the synthesis and coordination of inputs, the use of one sensor to cue the attention of another, protective reflex junctions, and pattern matching.

Figure 37:
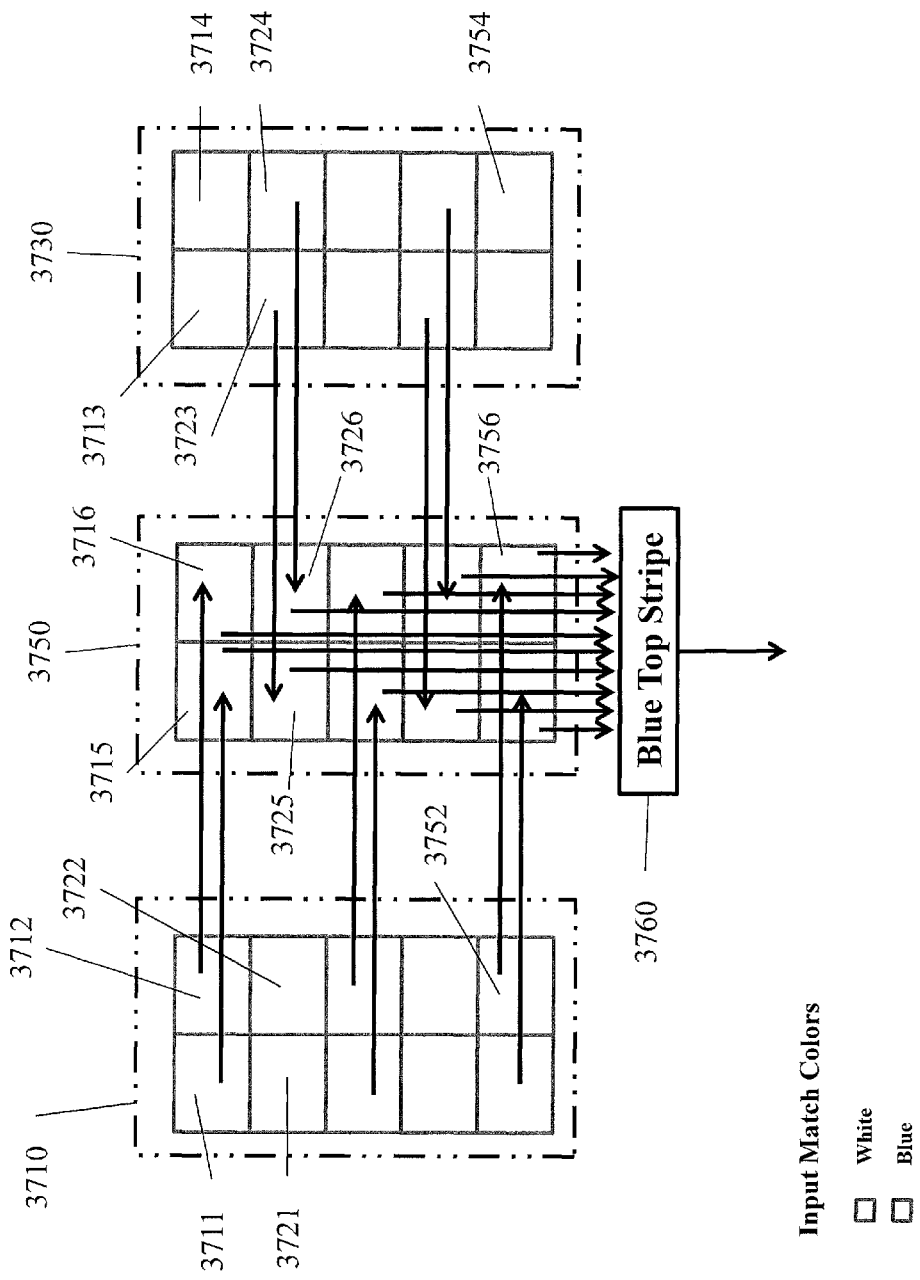
FIG. 37 depicts a block diagram of an exemplary combination of two ganglite fields 3700 in accordance with one or more embodiments.

FIG. 37 depicts a block diagram of an exemplary combination of two ganglite fields 3700 in accordance with one or more embodiments. The figure contains: ganglite field 3710, ganglite field 3730; ganglite field 3750; and blue top stripe pattern ganglite 3760. Ganglite field 3710 may be comprised of one or more ganglites 3711, 3712, 3721, 3722, 3731, 3732, 3741, 3742, 3751, and 3752. Ganglite field 3730 may be comprised of one or more ganglites 3713, 3714, 3723, 3724, 3733, 3734, 3743, 3744, 3753, and 3754. Ganglite field 3750 may be comprised of one or more ganglites 3715, 3716, 3725, 3726, 3735, 3736, 3745, 3746, 3755, and 3756. Ganglite field 3710 may represent a blue sensor field, and ganglite field 3730 may represent a white ganglite field. Ganglite field 3750 may represent a field that will contribute to the firing of a blue top stripe ganglite that may fire when a specific blue and white stripe pattern is seen. As shown by the arrows: ganglite 3711 may potentiate ganglite 3751; ganglite 3712 may potentiate ganglite 3752; ganglite 3723 may potentiate ganglite 3725;

ganglite 3724 may potentiate ganglite 26; and so on with ganglites in ganglite fields 3710 and 3730 potentiating the corresponding ganglites in ganglite field 3750 if and only if they contribute to the specific striped pattern. All ganglites in ganglite field 3750 may then contribute to the blue top stripe ganglite 3760. This example if primarily for purpose of illustrating like-field combination. Better pattern matching design might feed neurite outputs from the ganglite elements of 3710 and 3730 directly into the pattern recognition ganglite 3760, as will be covered elsewhere.

Figure 38:
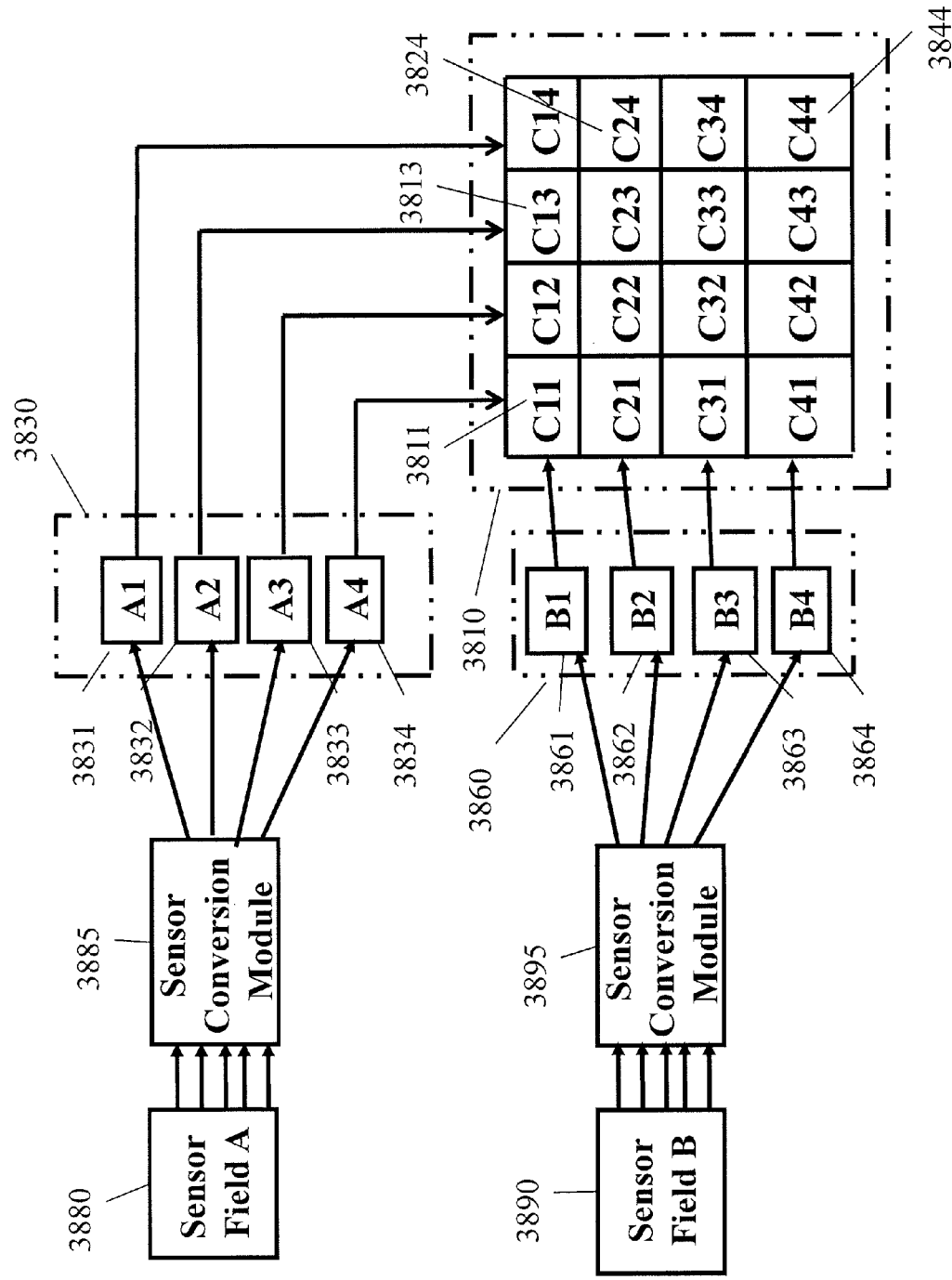
FIG. 38 depicts a block diagram of the combination of two linear ganglite fields into a two-dimensional ganglite field 3800 in accordance with one or more embodiments.

FIG. 38 depicts a block diagram of the combination of two linear ganglite fields into a two-dimensional ganglite field 3800 in accordance with one or more embodiments. The figure contains: sensor field 3880 with its sensor conversion module 3885 that may feed linear ganglite field 3830; sensor field 3890 with its sensor conversion module 3895 that may feed linear ganglite field 3860; and two-dimensional ganglite field 3810. Linear ganglite field 3830 may comprise ganglites 3831, 3832, 3833, and 3834. Linear ganglite field 3860 may comprise ganglites 3861, 3862, 3863, and 3864. Two-dimensional ganglite field 3810 may comprise corresponding ganglites 3811 through 3844. Each element of 3830 may contribute to all ganglites in its corresponding column in 3810. Each element of 3860 may contribute to all ganglites in its corresponding row in 3810. The linear fields may be of any size, and the two-dimensional field may be of any corresponding size. This combination of linear fields is important to create two-dimensional ganglite arrays to represent some physical attribute of the environment whenever linear sensor arrays may be scanned to create a two-dimensional picture. It is also important when the two-dimensional picture needs to be correlated with or combined with other two-dimensional ganglite array representations of the environment.

Figure 39:
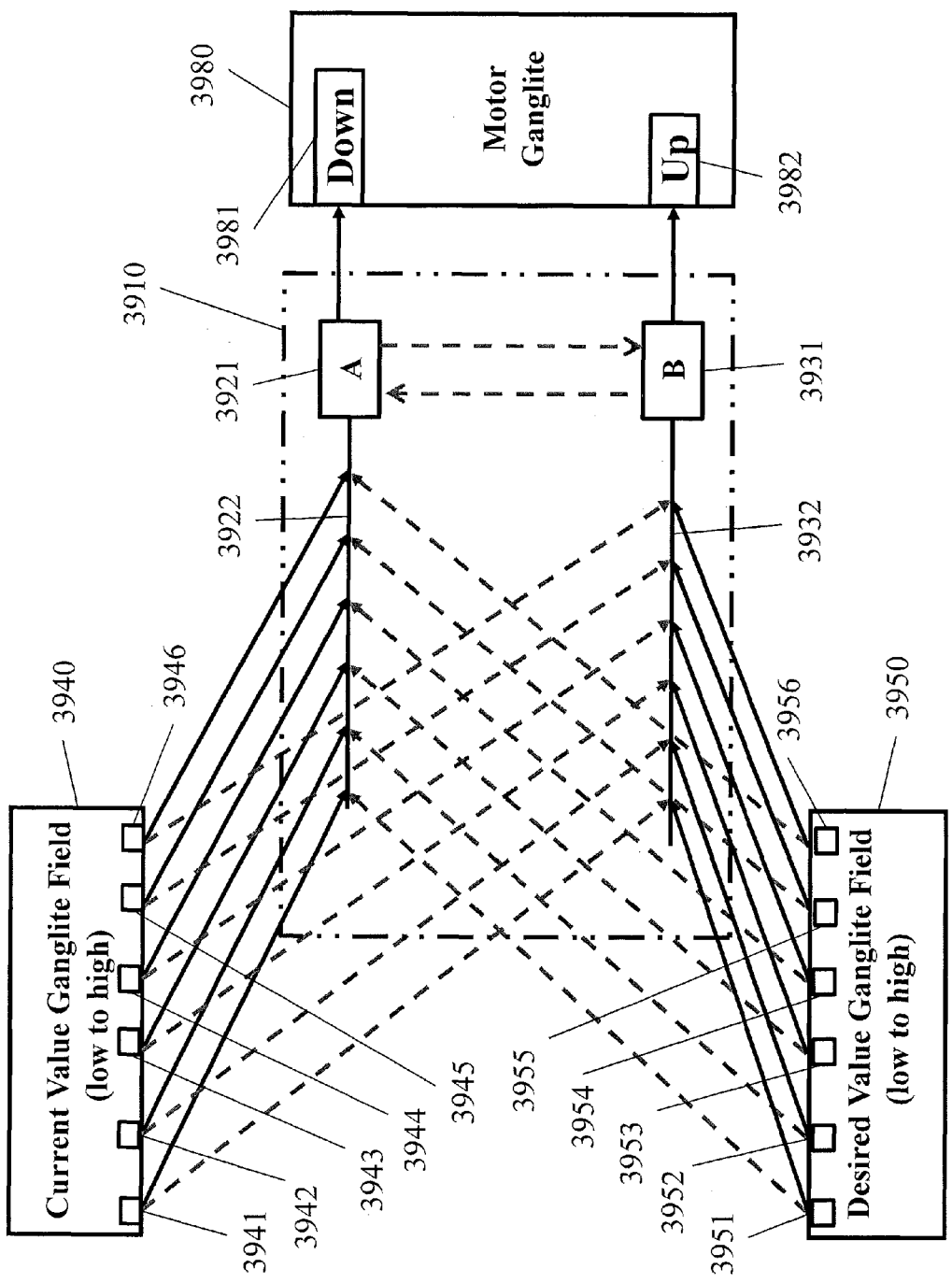
FIG. 39 depicts a block diagram of an exemplary comparison ganglite for two ganglite fields 3900 in accordance with one or more embodiments.

FIG. 39 depicts a block diagram of an exemplary comparison ganglite for two ganglite fields 3900 in accordance with one or more embodiments. The figure contains two ganglite fields 3940 and 3950 to be compared, an input comparison ganglite 3910, and a motor ganglite 3980 that may act on the comparison results. Ganglite field 3940, called the current value field, comprises two or more ganglites 3941, 3942, 3943, 3944, and 3945, which are arranged in order so that position in the ganglite field carries the meaning of up or down position in the environment. Ganglite field 3950, called the desired value field, comprises two or more ganglites 3951, 3952, 3953, 3954, and 3955, which are arranged in order so that position in the ganglite field carries the meaning of up or down position in the environment. Each of these ganglite fields may operate in single output mode, so that only a single ganglite may fire in each. The comparison ganglite 3910 comprises two ganglites: ganglite 3921, which comprises one or more location sensitive neurites that are potentiated by the ganglites of 3940 and depotentiated by the ganglites of 3950; and ganglite 3931, which comprises one or more location sensitive neurites that are potentiated by the ganglites of 3950 and depotentiated by the ganglites of 3940. Ganglite output sections of 3940 and 3950 terminate in the same order on the location sensitive neurites of ganglites 21 and 31. Ganglite 3921 may suppress ganglite 3931, and ganglite 3931 may suppress ganglite 3921. The motor ganglite comprises a downward movement initiator ganglite 3981 and an upward movement initiator ganglite 3982. Only one current value ganglite may fire, and only one desired value ganglite may fire. If the current value ganglite is higher than the desired value ganglite, neurites in 3921 may fire and neurites in 3931 may not, so that the downward movement ganglite 3981 may fire and may cause the creature to move down. If the desired value ganglite is higher than the current value ganglite, neurites in 3931 may fire, and neurites in 3921 may not, so that the upward movement ganglite 3982 may fire, and may cause the creature to move up. The rate at which neurites in 3921 or 3931 fire depends on the difference between the positions that are firing in ganglite fields 3940 and 3950. Comparison ganglites are important for many purposes, including system decision-making, coordination, change detection, and motion detection and estimation.

Figure 40:
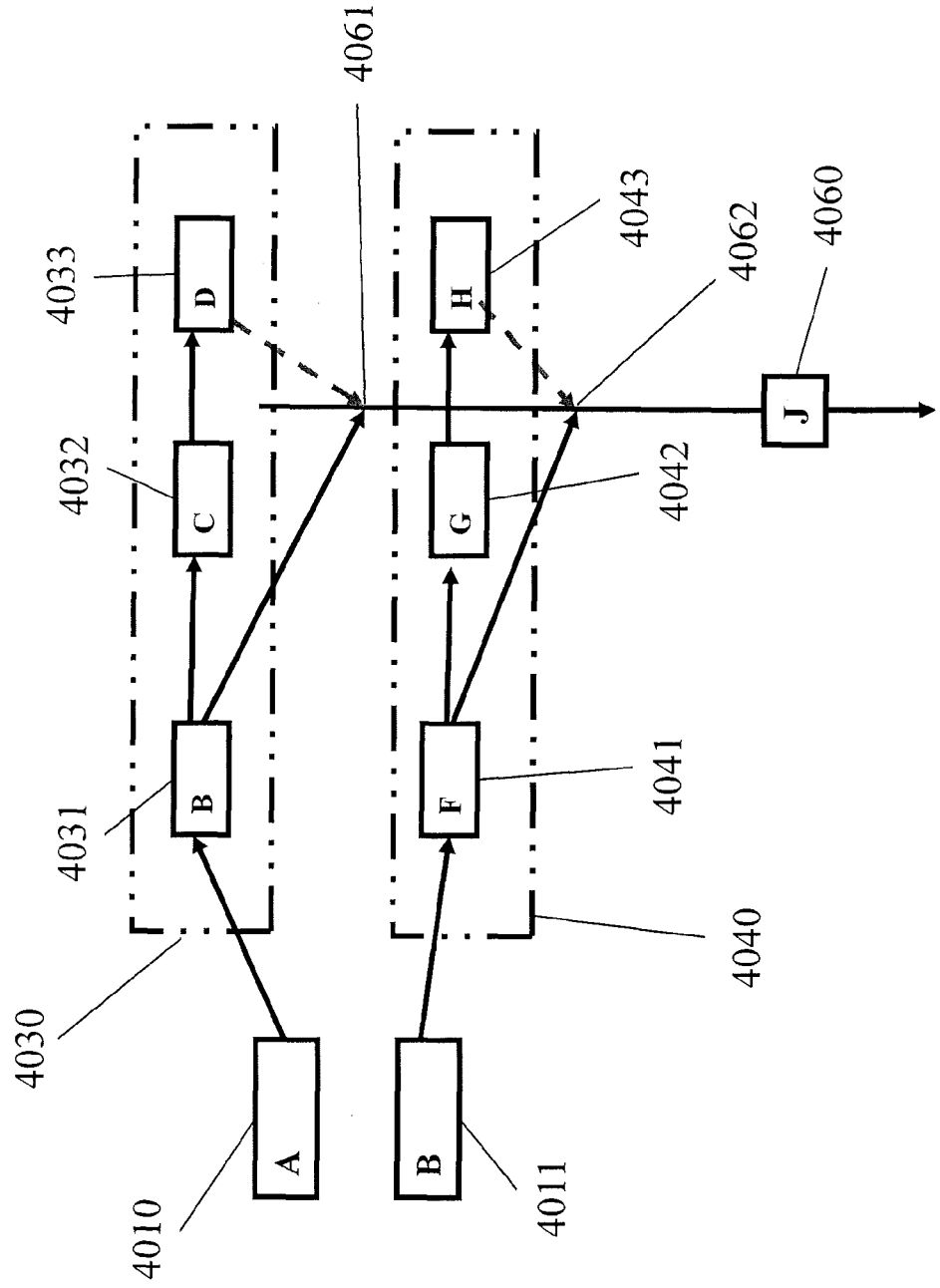
FIG. 40 depicts an exemplary neurite configuration for change detection over time 4000 in accordance with one or more embodiments.

FIG. 40 depicts an exemplary neurite configuration for change detection over time 4000 in accordance with one or more embodiments. The figure contains: two initiation neurites 4010 and 4011, one and only one of which fires at every instant; time sequence ganglites 4030 comprising ganglites 4031, 4032, and 4033; time sequence ganglites 4040 comprising ganglites 4041, 4042, and 4043; and location sensitive ganglite 4060, which may comprise one or more location sensitive neurites. Ganglites 4031 and 4041 represent the current value of the initiation neurites, and only one is stimulated in any instant. Ganglites 4033 and 4043 represent the recent past value of the initiation neurites, and only one is stimulated, via its time sequence, in any instant. Point 4061 on the location sensitive neurite 4060 is the input section point where 4031 potentiates and 4033 depotentiates 4060. Point 4062 on the location sensitive neurite 4060 is the input section point where 4041 potentiates and 4043 depotentiates 4060. If there is no time change in the input (4010 and 4011), the current value ganglite and the recent past value ganglite may be on the same chain, and both may potentiate and depotentiate neurite 4060 at the same point, so that the voltage of neurite 4060 may not change. If the current value changes in time so that it goes from 4011 to 4010, then neurite 4060 may not be potentiated because it may be potentiated at point 4061 and depotentiated at the stronger point 4061. If the current value changes in time so that it goes from 4010 to 4011, then neurite 4060 may become potentiated and fire because it may be potentiated at point 4062 and depotentiated at the weaker point 4061. A location sensitive neurite running the other way may become potentiated and fire when the current value changes in time so that it goes from 4011 to 4010. Such a ganglite may detect movement. For example, if the inputs 4010 and 4011 are positions in a sensory field, 4060 would detect directional movement from 4010 to 4011.

In a field of ganglites, every ganglite may contain a sequence that includes the present and the recent past. The collection of these sequences may be termed a persistence layer. In a two dimensional field of ganglites, location sensitive neurites may run in many directions so that change in multiple directions may be detected. Configurations with short sequences may be essential for short-term memory, and configurations with time change detection may be essential for many processes, including sensor processing, alerting, motion detection and estimation, target tracking, and motor control.

Neurite Pattern Recognition

A ganglite may represent a pattern, and the firing of a neurite or ganglite may represent and be interpreted as the firing of the pattern of neurites and ganglites that excite it. The firing of such a neurite may thus represent neurite pattern recognition. Neurite pattern recognition may be a basic process that underlies sensory input signal processing, downstream signal processing, complex internal neurite and ganglite processes, and the unlearned and learned recognition of objects, situations, ideas, and memories.

There are many challenges in neurite pattern recognition. For relatively static neurite patterns in which all relevant ganglites in the pattern fire in the same time interval (e.g., smell, taste, some visual patterns, and the combination of these inputs), because the incoming signals may be incomplete or corrupted by noise, an important challenge is to decide which of many patterns the incoming signals fit. This may involve, in addition to basic neurite pattern matching, partially potentiating input neurites that might provide missing pieces of the pattern, and suppressing alternative neurite patterns once a match has been found. Thus, in neurite pattern matching, more strongly firing ganglites that represent a pattern may suppress less strongly firing ganglites that represent other patterns, and may potentiate larger patterns of which they are a part. This process may be accomplished first on neurite sub-patterns, and then on successively larger neurite patterns, with potentiation and suppression occurring at all or most layers. Neurite pattern matching may be done across multiple modalities of input, so that, for example, specific color, shape, and visual pattern combinations may be matched against innate (pre-programmed) or previously learned specific color, shape, and visual pattern combinations.

Neurite pattern matching for inputs arriving over time (e.g., speech recognition) has added problems. The neurite system must retain information of past portions of the incoming signal while waiting for more. The system may need to retain multiple possibilities while waiting for pattern completion. For reasons of efficiency, the system may potentiate pattern completion in the face of incomplete or corrupt input signals. For reasons of efficiency, the system may also inhibit various pattern alternatives. The system may also have to clear its processing areas at some point to permit future processing. Of course, once neurite patterns arriving over time are successfully matched, sense must be made of them and context must be added. This may be is done using the techniques described for static neurite patterns.

Of course, the weakening of unused patterns may be an important part of developing good neurite recognition algorithms in neurite systems, since it may be more efficient to have many potential pattern connections present in the neurite system initially, and to prune away connections (and hence patterns) that rarely or never occur. This can be accomplished by implementing a slow, long-term decay of connection strength in the relevant neurites.

A ganglite structure is a large collection of ganglites with a common overall function that has internal interconnections that are generally are more numerous and complex than its external ones. The distinction between a ganglite structure and a ganglite or a collection of ganglites is not a hard and fast one, but rather a useful descriptive term and an aid to designing and understanding neurite systems. Ganglite structures may often be employed in pattern recognition.

Static Neurite Pattern Recognition

A static neurite pattern is one in which all elements are presented at the same time. Static neurite patterns may be formed in many ways. One pattern may be composed from many constituent components or sub-patterns. Components of a pattern may be combined in a variety of ways, including through logical neurites and ganglites (e.g., and-like, or-like, and not-like), rate-sensitive neurites and ganglites, and a variety of junctions (which may, for example, allow one pattern to dominate at low firing rate, and another to dominate at high firing rate). The elements of a pattern may be arranged in layers, or may formed with arbitrary complexity and feedback, with one element or sub-pattern stimulating, suppressing, or overriding another. The same sub-elements may form portions of different larger patterns, and patterns may compete or suppress one another so that only one or a few fire.

Figure 41:
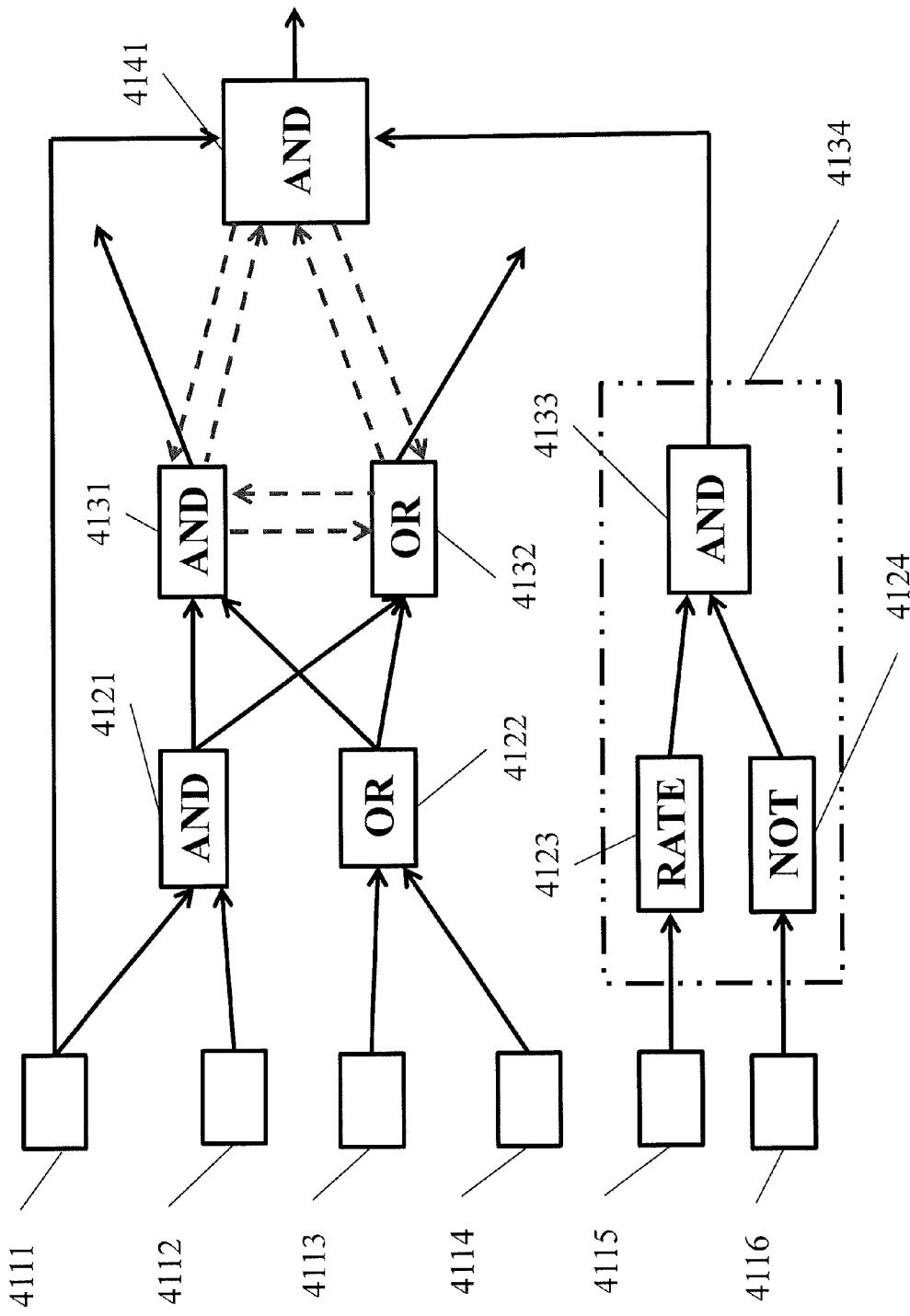
FIG. 41 depicts an exemplary block diagram of several representative multi-layer patterns in a ganglite pattern matching structure 4100 in accordance with one or more embodiments.

FIG. 41 depicts an exemplary block diagram of several representative multi-layer patterns in a ganglite pattern matching structure 4100 in accordance with one or more embodiments. It comprises: ganglites 4111, 4112, 4113, 4114, 4115, and 4116 that form an initial set of ganglites; 4121, 4122, 4123, 4124, 4131, 4132, 4133, and 4141 that are logical ganglites; and 4134 that is a composite ganglite composed of 4123, 4124, and 4133. The initial set might be any set of ganglites, including ones stimulated by sensory inputs and by other ganglites.

Any input ganglite and any other ganglite in the structure might be firing at any time, so that the entire pattern matching structure may be operating in parallel, and the labeled logic-like ganglites (and-like, or-like, and not-like) are consequently logic-like and not mathematically logical. Ganglite firing indicates the activation of the ganglite pattern that feeds it. Thus 4121 fires when 4111 and 4112 fire rapidly enough; 4122 fires when 4113 or 4114 have fired sufficiently; 4131 fires when 4121 and 4122 fire rapidly enough, unless suppressed by 4132 or 4141; 4132 fires when either 4121 or 4122 has fired sufficiently many times unless suppressed by 4131 or 4141; 4123 fires when 4115 fires rapidly enough; 4124 fires when 4116 does not fire; 4133 fires when 4123 and 4124 fire rapidly enough; and 4141 fires when 4134 and 4111 fire rapidly enough. The consequence of this is that three composite patterns, 4131, 4132, and 4141 are competing in direct single output mode (see FIG. 26a) in which only the best pattern match, based on input firing and pseudo-logic, will fire and will suppress the other two. 4131 represents the pattern 4111 and 4112 and 4113 or 4114; 4132 represents the pattern of the combination of 4111 and 4112, or 4113 or 4114, and 4141 represents the pattern of sufficiently rapid firing of 4111 and 4115 and the absence of firing of 4116. This figure is representative, and static patterns of arbitrary complexity may be composed.

Feedback stimulation of sub-elements of a pattern may enable those sub-elements to become more sensitive to inputs that are not firing rapidly enough. This is an important technique for recognizing patterns from incomplete information (perhaps a portion of the input pattern is obscured) or in the presence of noise at the inputs. Any of the ganglites 4121, 4122, 4123, 4124, 4131, 4132, 4133, 4141, and the composite ganglite 4134 may employ feedback stimulation of the ganglites that feed them in the manner of FIG. 42 or via other neurite feedback.

Neurite concepts, and especially pattern recognizers and memories (addressed later), must deal with incomplete, weak, and corrupted inputs. It is thus desirable to enable a ganglite to provide slight stimulation to the ganglites feeding it, so that a small degree of incompleteness might be overcome.

Figure 42:
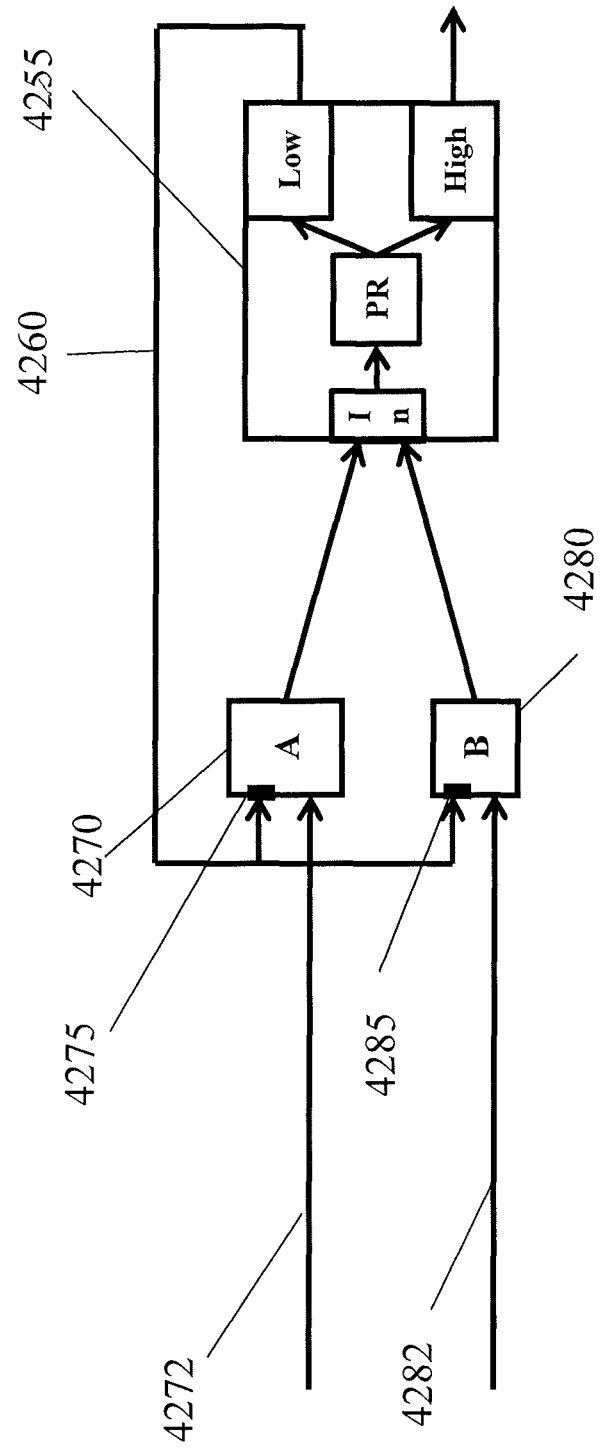
FIG. 42 depicts a rate-selective channel separation ganglite providing feedback to its input ganglites 4200 in accordance with one or more embodiments.

FIG. 42 depicts a rate-selective channel separation ganglite providing feedback to its input ganglites 4200 in accordance with one or more embodiments. The figure contains: the rate-selective channel separation ganglite 4255; two input ganglites 4270 and 4280; normal external neurite inputs to these ganglites 4272 and 4282 respectively; and the feedback pathway 4260 from the "low" output ganglite to input synapses 4275 and 4285 respectively on the input ganglites. There may be any number of input ganglites. The inputs from these ganglites may be excitory or inhibitory. The "low" output of the reflexive concept ganglite may provide feedback positively to the inputs of all of its input ganglites. Thus, if most of the inputs to the ganglite are firing sufficiently, the "low" output may fire, and may fire enough to potentiate the missing outputs if their normal external inputs are firing. If that is enough to cause the missing inputs to fire, the "High"

output may be activated, and may provide outputs to other processing areas normally stimulated by the rate-selective channel separation ganglite.

Figure 43:
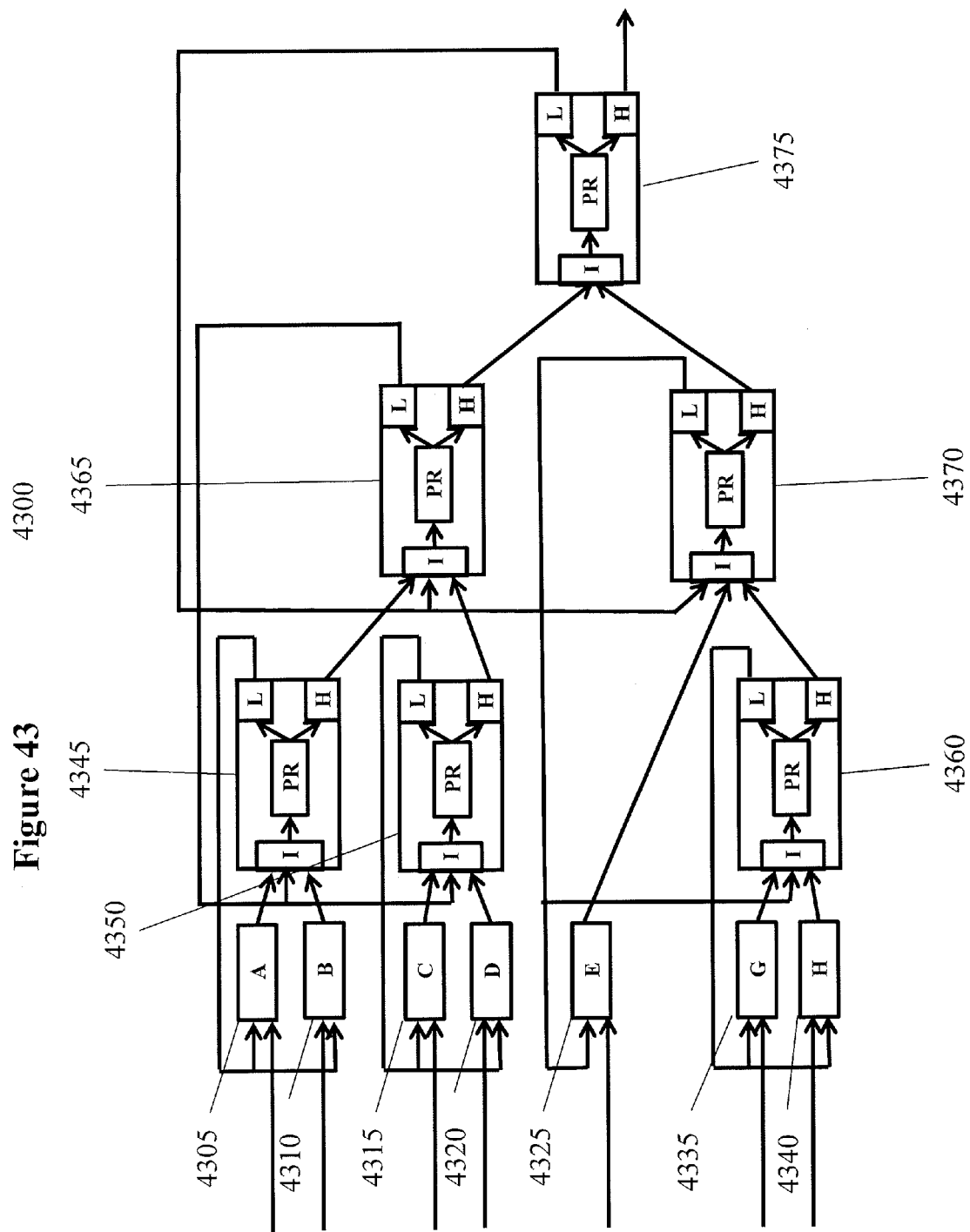
FIG. 43 depicts an arrangement of rate-selective channel separation ganglites 4300 in accordance with one or more embodiments.

Rate-selective channel separation ganglites may be combined in complex patterns. FIG. 43 depicts an arrangement of such ganglites 4300 in accordance with one or more embodiments. The figure contains rate-selective channel separation ganglites arranged in four tiers: The first tier contains rate-selective channel separation ganglites 4305, 4310, 4315, 4320 4325, 4335, and 4340, each with an external input. The second tier contains rate-selective channel separation ganglites 4345, 4350, and 4360, each of which feeds back to the first tier ganglites that feed it. The third tier contains rate-selective channel separation ganglites s 4365 and 4370, each of which feeds back to the first and second tier ganglites that feed it directly. The fourth tier contains rate-selective channel separation ganglite 4375 that feeds back to the ganglites that feed it directly. In the figure, as external inputs cause the first tier ganglites to fire they may cause the second tier to fire which may cause the third and fourth tiers to fire. As ganglites in these tiers fire, weaker inputs are slightly enhanced, and as these inputs fire, the pattern proceeds to fire additional structures to the right, until the rightmost structure fires. For example, if 4335 and 4340 fire rapidly enough, they may cause 4360 to fire at a high rate, which may cause enough feedback stimulation from 4370 to 4325 to add to its external stimulation and cause it to fire rapidly enough to cause 4370 to fire at a high rate so that it fires outputs to 4375. Similarly, based on external stimulation, 4305 may fire at a high enough rate to cause 4345 to fire at a low rate, so that its feedback to 4310 may augment the external input to 4310 enough to cause 4310 to fire rapidly enough to cause 4345 to fire at a high rate. In this manner, if many external inputs are firing at a sufficiently fast rate, and some are firing at a somewhat slower rate, the excitations may propagate from left to right, with enhanced sensitivity, until ganglite 4375 may fire at a high rate.

Figure 44:
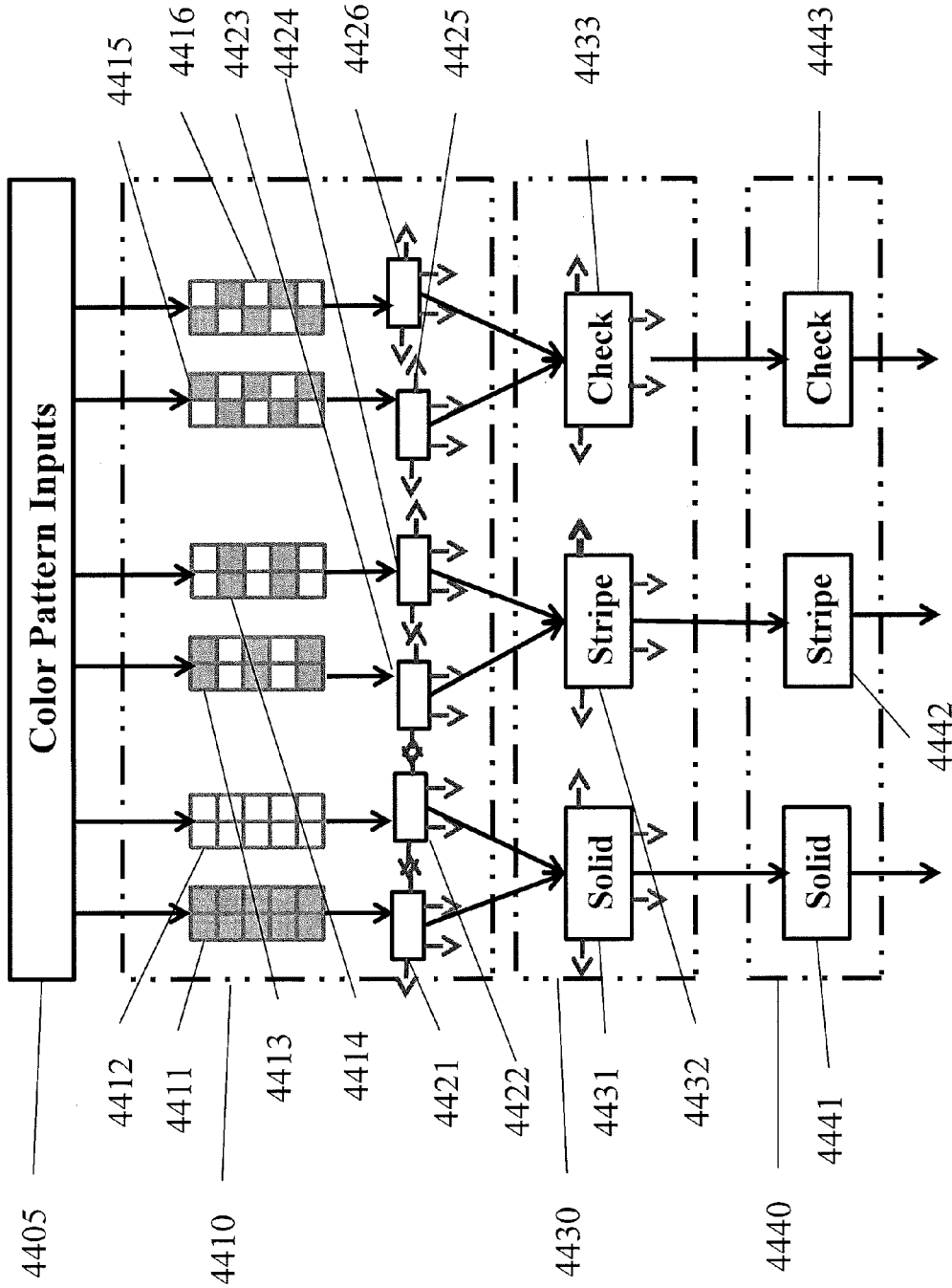
FIG. 44 depicts an exemplary ganglite structure for detecting and retaining one of many simple visual patterns 4400 in accordance with one or more embodiments.

FIG. 44 depicts an exemplary ganglite structure for detecting and retaining one of many simple visual patterns 4400 in accordance with one or more embodiments. The figure contains visual color inputs 4405, a collection of specific color pattern matching and recognition unit 4410, a collection of composite pattern recognition units 4430, and a persistence layer 4440. The color pattern input 4405 is identical to that depicted in 3710 and 3720. The pattern matching and recognition unit 4410 comprises individual specific pattern matching ganglites 4411, 4412, 4413, 4414, 4415, and 4416, which feed pattern recognition ganglites 4421, 4422, 4423, 4424, 4425, and 4426 respectively. 4421, 4422, 4423, 4424, 4425, and 4426 operate in single output mode. The action of these combinations of pattern recognition and pattern matching is described in FIG. 37, and the combination of 4413 and 4423 is the unit depicted in FIG. 37. Layer 4430, which comprises ganglites 4431, 4432, and 4433, combines specific patterns into composite concepts. Optionally, 4431, 4432, and 4433 may operate in single output mode. Layer 4440, which comprises 4441, 4442, and 4443, is a persistence layer for the composite concept ganglites of layer 4430, so that these concepts are available for further processing.

Figure 45:
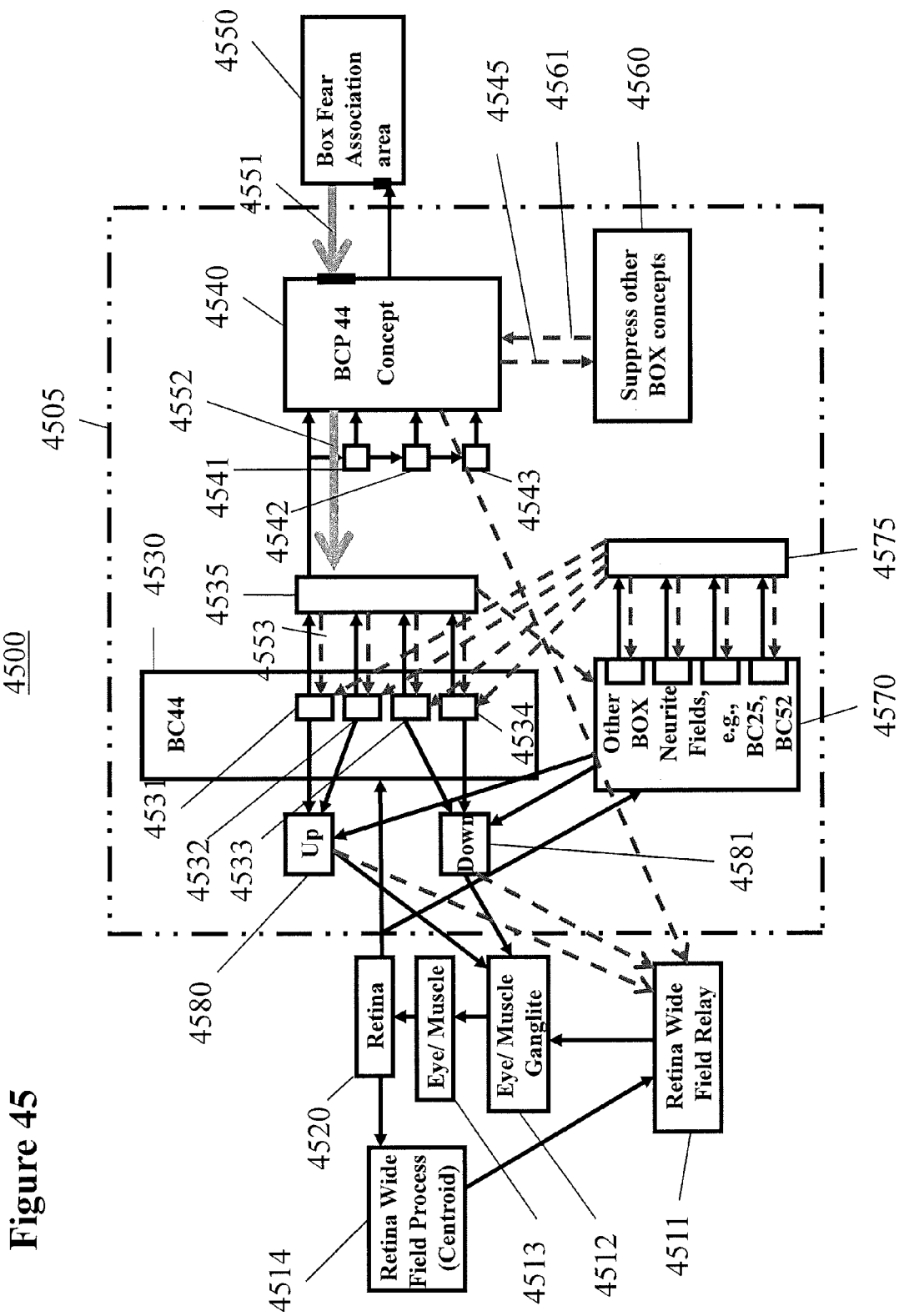
FIG. 45 depicts an exemplary ganglite structure of visual pattern recognition controlling eye movement and enhanced by associative memory 4500 in accordance with one or more embodiments.

FIG. 45 depicts an exemplary ganglite structure of visual pattern recognition controlling eye movement and enhanced by associative memory 4500 in accordance with one or more embodiments. The figure contains: external visual system components of wide field relay 4511, eye muscle ganglite 4512, eye muscle 4513, retina wide field processing 4514, and retina 4520; box fear association area 4550; and exemplary ganglite structure of visual pattern recognition 4505. The exemplary ganglite comprises: specific BC44 pattern recognition collection 4530 containing specific recognition ganglites 4531, 4532, 4533, and 4534 operating in indirect single output mode using master suppressor 4535; other parallel pattern recognition collections 4570 operating in single output mode with master suppressor 4575; persistence ganglite for BC44 concept 4541, 4542, and 4543, with persistent concept represented in ganglite 4540; parallel persistent structures for other patterns (not shown); ganglite to direct upward eye muscle movement 4580; and ganglite to direct downward eye muscle movement 4581. The retina may provide neurites that feed all of the individual pattern recognizers in all of the pattern recognition collections. The strongest may fire, and may indirectly suppress all others in its group and all others in other groups. The firing master suppressor initiates its persistence chain and persistent concept, which suppresses other persistent concepts and feeds back positively to the master suppressor to make it more sensitive. Specific individual pattern recognition ganglites will fire the up ganglite; others will fire the down ganglite. In the event that learning association has associated some pattern with fear, the connection weight from the relevant persistent concept to the fear association area will strengthen, and the connection from the fear association area to the relevant concept will also strengthen (reciprocal association), thus sensitizing the relevant suppressor to fire more easily on a triggering specific concept. A ganglite structure like this structure has perhaps a hundred ganglites and hundreds of internal connections, but only a few external ones, and its purpose (to recognize a few simple shapes and center the eye on those shapes) is easy to grasp.

Time Sequence Pattern Recognition

Figure 46:
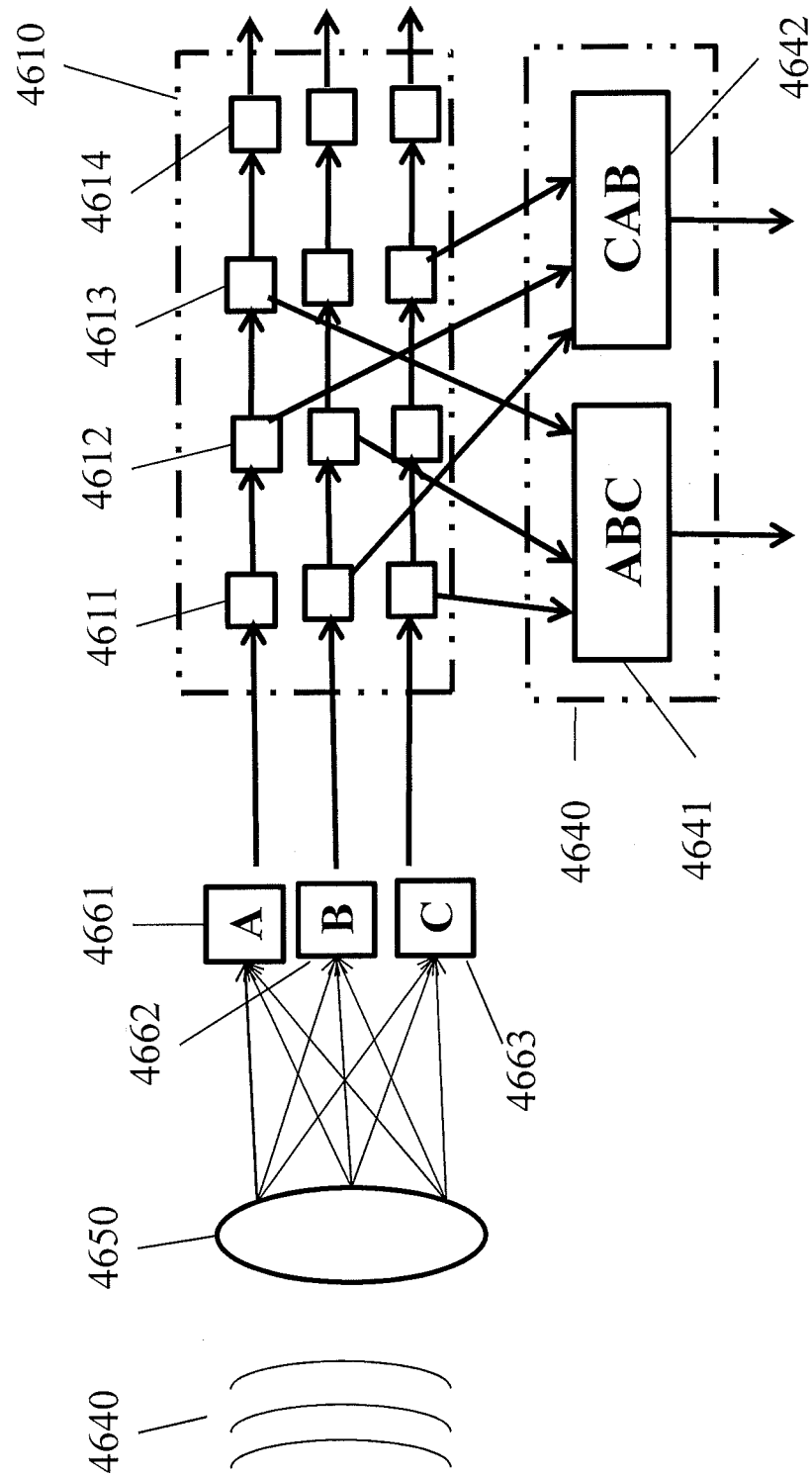
FIG. 46 depicts a block diagram of an exemplary simple time sequence pattern recognizer 4600 in accordance with one or more embodiments.

An entire pattern (such as a series of spoken words) may present itself as a sequence over time, so that some form of short-term memory may be necessary to store the pattern, and some collection of ganglites may be needed to assemble and recognize the sequence. FIG. 46 depicts a block diagram of an exemplary simple time sequence pattern recognizer 4600 in accordance with one or more embodiments. The figure contains: some physical phenomenon 4640, which may be pressure waves of sound; a sensor and sensor conversion unit 4650; processors that recognize individual phonemes 4651, 4652, and 4653; ganglite persistence chains initiated by the individual phoneme recognizers (e.g., 4611 to 4612 to 4613 to 4614 is initiated by 4661); and a collection of ganglite sequence recognizers 4640, comprising specific sequence recognizers 4641 and 4642. As pressure patterns may arrive and cause the processors 4661, 4662, and 4662 to fire, pulses may be propagated along the individual ganglite persistence chains Specific temporal sequences may fire the sequence recognizers. For example, the sequence 4663-4661-4662 (C-A-B) may fire the C-A-B sequence recognizer 4642.

Figure 47:
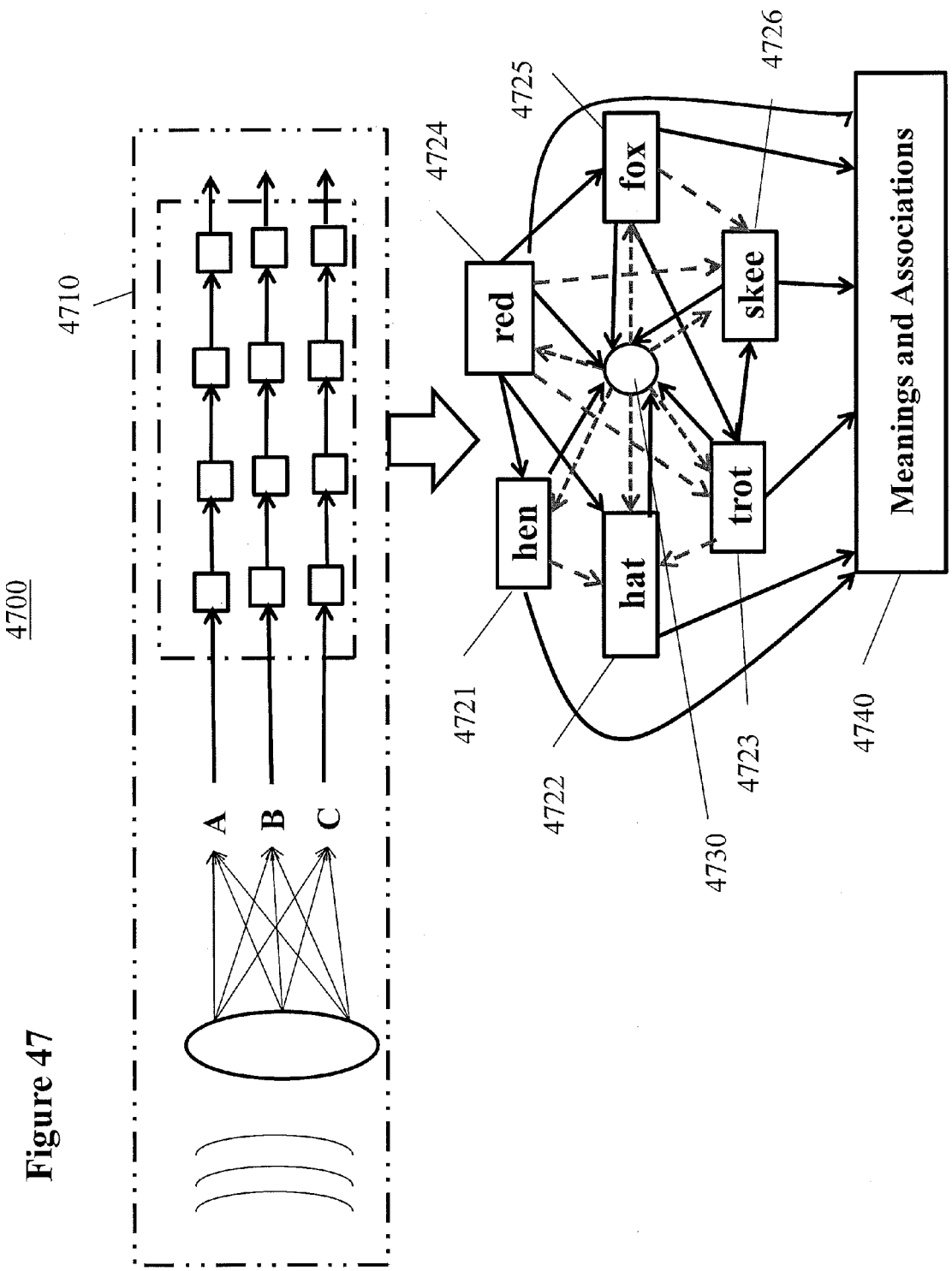
FIG. 47 depicts a block diagram of exemplary temporal sequence recognizers interacting to recognize larger units and meanings 4700, in accordance with one or more embodiments.

Specific recognized sequence ganglites may interact in complex ways. FIG. 47 depicts a block diagram of exemplary temporal sequence recognizers interacting to recognize larger units and meanings 4700, in accordance with one or more embodiments. The figure contains: specific sequence recognition ganglites 4721, 4722, 4723, 4724, 4725, and 4726; a master suppressor 4730, the collection of phoneme chains 4710 which potentiate the sequences recognition ganglites, and a collection of meaning and association ganglites 4740 that can be triggered. The phoneme chain may present sequences that are recognized by individual sequence recognition ganglites. When one is recognized, the sequence recognition ganglite may fire, causing all sequence recognizers (including itself) to reset their recognition potentials to zero. Sequences that are frequently followed by other sequences may, using a short time delay chain, potentiate other sequence recognizers, as 4724 does to 4721, 4722, and 4725 in the figure. Sequences recognizers may also, after a short time delay, depotentiate other sequence recognizers, as 4724 does to 4726 in the figure. Thus a neurite system may contain sequence recognizers, and sequence of sequence recognizers, with appropriate connections of the sequences and sequences of sequences to other recognizers that trigger appropriate associations and behaviors. When a "word" ganglite fires, it may inhibit rival words that might fire around the same time, so that only the strongest word fires at any time; it may cut the phoneme stream, so that other words with its trailing sequence are not potentiated; it may, with a small time delay, potentiate other "words" that are likely to follow it (as "red may be followed by "hat, "hen", and "fox"); it may inhibit words that are unlikely to follow it (as "red is unlikely to be followed by "skee" and "trot. Higher layers of pattern matching across sensory and other concept modalities may match patterns in the same manner. It is noted that the letters and letter groupings in the ganglites in FIGS. 46 and 47 are not to be taken literally as letters or as phonemes, but as labels for neurite firing and neurite sequence firing. They are labeled as they are for heuristic purposes only.

Neurite Memory: Pattern Learning and Recall

In this disclosure, neurite memory is the ability of a neurite system to use past information, created by past events, in neurite processing. The activation of a specific neurite memory is manifest in the activation of one or several specific associated ganglites that form the memory. In this patent, the word 'memory' may be used synonymously with a ganglite that represents it.

This section discusses short-term, simple long-term, and reciprocal long-term neurite memory. It describes how they are formed, how they interact, where and how they may be located and associated, how they are structured, and how they may be retrieved.

A short-term neurite memory may comprise a time sequence ganglite or ganglite chain (see FIGS. 14*a*, 14*b*, and 15*a*) or persistent ganglite state (see FIG. 16) that keeps a ganglite or group of ganglites active. The outputs of the time sequence ganglite or ganglite chain (e.g., 1422, 1424, 1426 and 1428) represent the short-term memory.

The challenge of forming new long-term memories is the challenge of responding to a pattern of ganglite firing by creating or strengthening synapses so that some ganglite develops the connections needed to respond to that pattern. Learning neurites are used to increase the connection strength between relevant ganglites that form the pattern and the ganglite (or ganglites) that will come to represent the pattern. Memories may form quickly or slowly, and memory formation may involve learning neurites with or without an input threshold frequency. Some memory formation may involve the use of high-rate learning association ganglites that generate their own learning cue (see FIG. 29).

Memory recall involves the activation of the ganglite or ganglites that represent the memory. A memory may be recalled by a specific activation or recall process, or via the activation of other memories that are associated with it and whose activation stimulates it.

In a reciprocal long-term neurite memory, the downstream ganglite that represents some more abstract (or composite) memory may stimulate the individual memory ganglites that trigger it, so that the abstraction (or composite) ganglite and the component ganglites that produced it are both firing and available to the neurite system. In a simple long-term memory, the firing of the memory ganglite may not stimulate the component memory ganglites, or pattern, that stimulated it.

The most basic simple long-term memory may be simple pattern recognition, achieved through the use of learning neurites to change input sensitivities in order to associate ganglite firing (see FIGS. 27*a* and 27*b*). Future firing of the same associated ganglites may then more easily produce the same downstream ganglite firing.

Depending on the amount of time needed for input sensitivities to change, the persistence of a short-term memory may aid the development of a long-term memory by providing continuing stimulation to the learning neurites to enable their input sensitivities to change. In this manner, short-term memory may potentiate long-term memory.

While the ganglites that are associated in simple long-term and reciprocal long-term memories may proceed from the specific to the abstract, they do not have to do so. Memory abstractions at all levels, and associated with multiple combinations of inputs, may feed one another and become associated in complex ways, with potential for complex feedback paths that may enable abstract memories to trigger specific ones, and that may enable one abstract memory to trigger another.

Long-term neurite memory may have distributed inputs from multiple locations and from both input and internal processing modalities, and may form redundantly in multiple locations and with complex interconnections. Long-term neurite memory may form in concept fields (discussed later) and may occur in the formation and coordination of movement modes (also discussed later).

Figure 48:
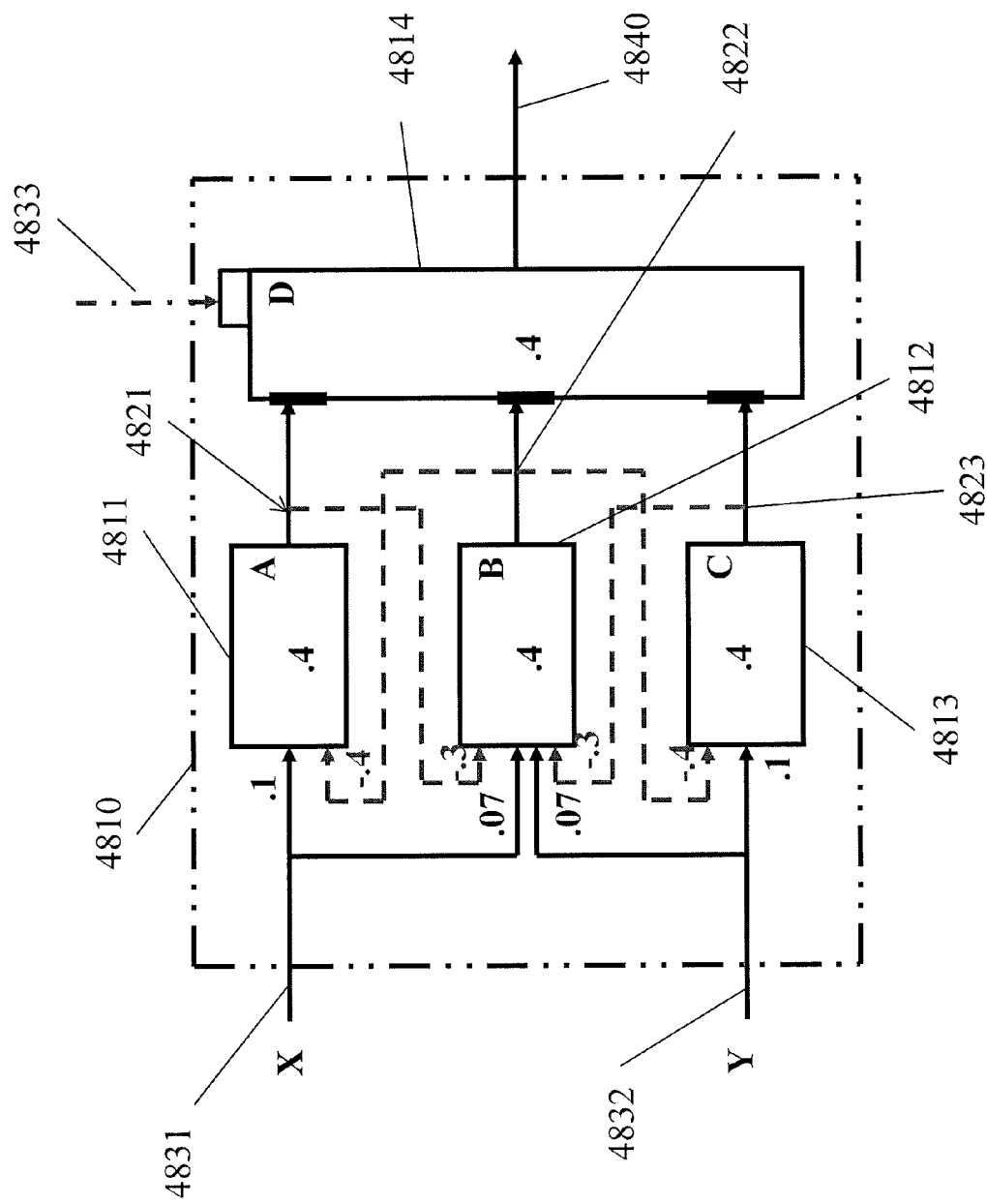
FIG. 48 depicts an exemplary basic pattern learning unit ganglite 4800 in accordance with one or more embodiments.

Many simple, long-term memory ganglites are possible. FIG. 48 depicts an exemplary basic pattern learning unit ganglite 4800 in accordance with one or more embodiments. The figure contains: neurite inputs 4831 and 4832; learning cue 4833; neurite 4814 output 4840; and the basic learning unit ganglite 4810. The basic learning unit ganglite comprises: three simple neurites 4811, 4812, 4813; and a learning neurite 4814. The output 4821 of neurite 4811 potentiates neurite 4814 and depotentiates neurite 4812. The output 4822 of neurite 4812 potentiates neurite 4814 and depotentiates neurites 4811 and 4813. The output 4823 of neurite 4813 potentiates neurite 4814 and depotentiates neurite 4812. The synapses from 4811 to 4814, 4812 to 4814, and 4813 to 4814 begin at low values and are subject to growth in the presence of a learning cue. With properly adjusted synapse strengths (input weights), in the presence of a learning cue and inputs from some combination of 4831 and 4832:

If only input 4831 fires, only the synapse from neurite 4811 to neurite 4814 will strengthen;

If only input 4832 fires, only the synapse from neurite 4813 to neurite 4814 will strengthen If both inputs 4831 and 4832 fire, neurite 4812 will be stimulated, and will suppress neurites 4811 and 4813, so that only the synapse from 4812 to 4814 will strengthen.

Subsequently, only the combination of inputs above that fired in the presence of the learning cue will cause 4814 to fire.

Values in the figure provide an example of properly adjusted synapse strengths, and refer to synapse strengths for neurites that fire with neurite potential=0.4, with all pulses of magnitude 1, all pulse durations=0.01, all sensitivities (FC)=1, and all dead times short (<0.05).

Figure 49:
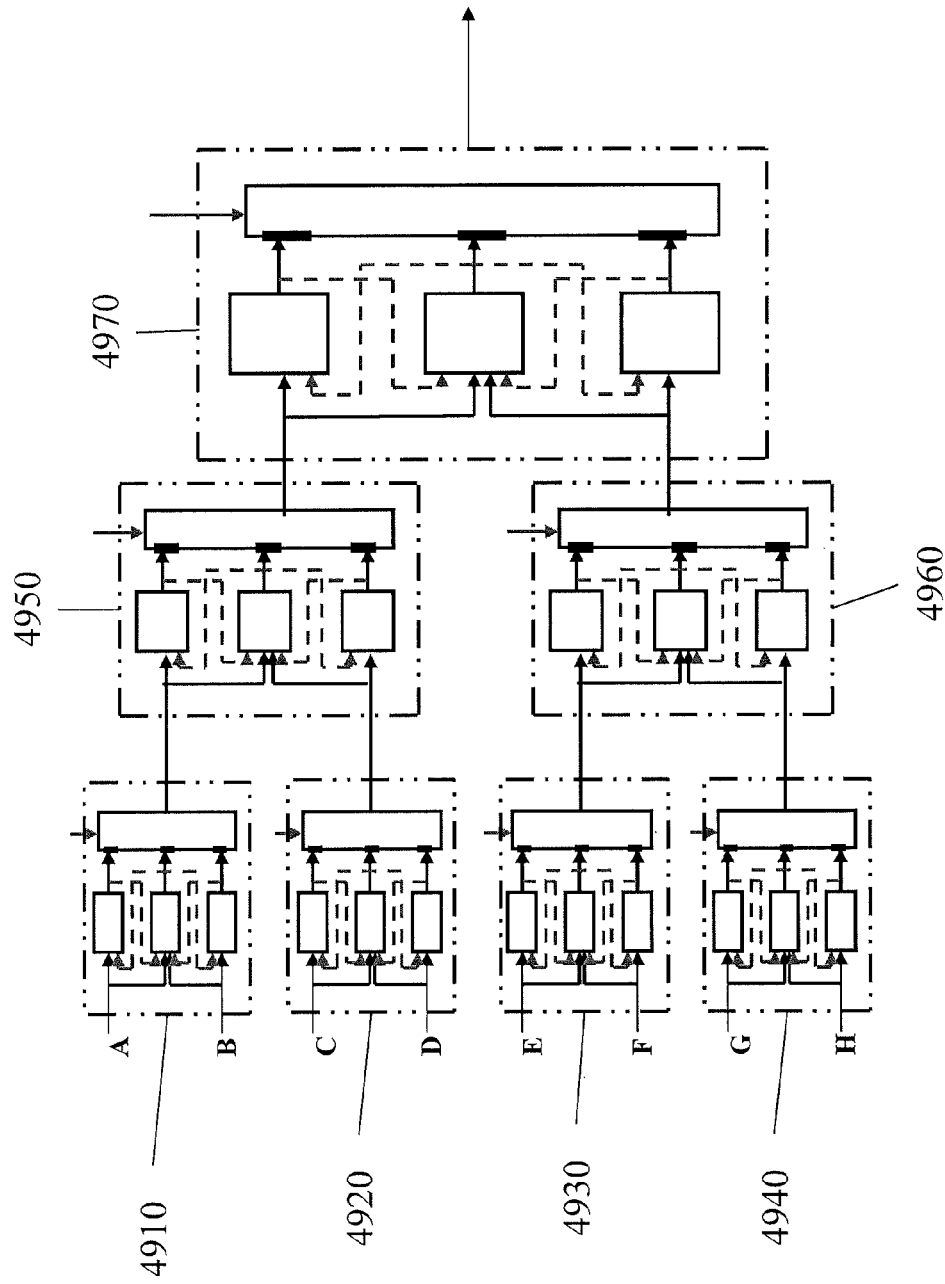
FIG. 49 depicts an exemplary configuration of basic learning unit ganglites in accordance with one or more embodiments.

FIG. 49 depicts an exemplary configuration of basic learning unit ganglites in accordance with one or more embodiments. The figure contains basic learning unit ganglites 4910, 4920, 4930, 4940, 4950, 4960, and 4970 arranged in three stages of such basic units. In the presence of a learning cue, the continuing firing of any combination of any number of the inputs to basic learning unit ganglites 4910, 4920, 4930, and 4940 will reinforce a path to the final output neurite of 4970. Subsequently, the firing of that combination of inputs, and only the firing of that combination of inputs, will cause the output neurite to fire.

Such neurite memory structures can be extremely efficient, and can retain and respond to one or several of a huge number of possible input states per neurite used (see FIG. 50, which provides a table of efficiencies). Of course there is some risk that if such a compound memory structure is used to make the response to several combinations of input ganglites permanent, then other inputs that are confabulations of these inputs may trigger the output neurite.

There may be reason to retain memory of an element of a ganglite field that has been stimulated. For short duration retention, persistence initiated by the stimulated ganglite (see FIGS. 14*a* and 14*b*)) is a powerful way to do this. For long-term retention and recall, a recallable event field memory structure may be used.

Figure 51:
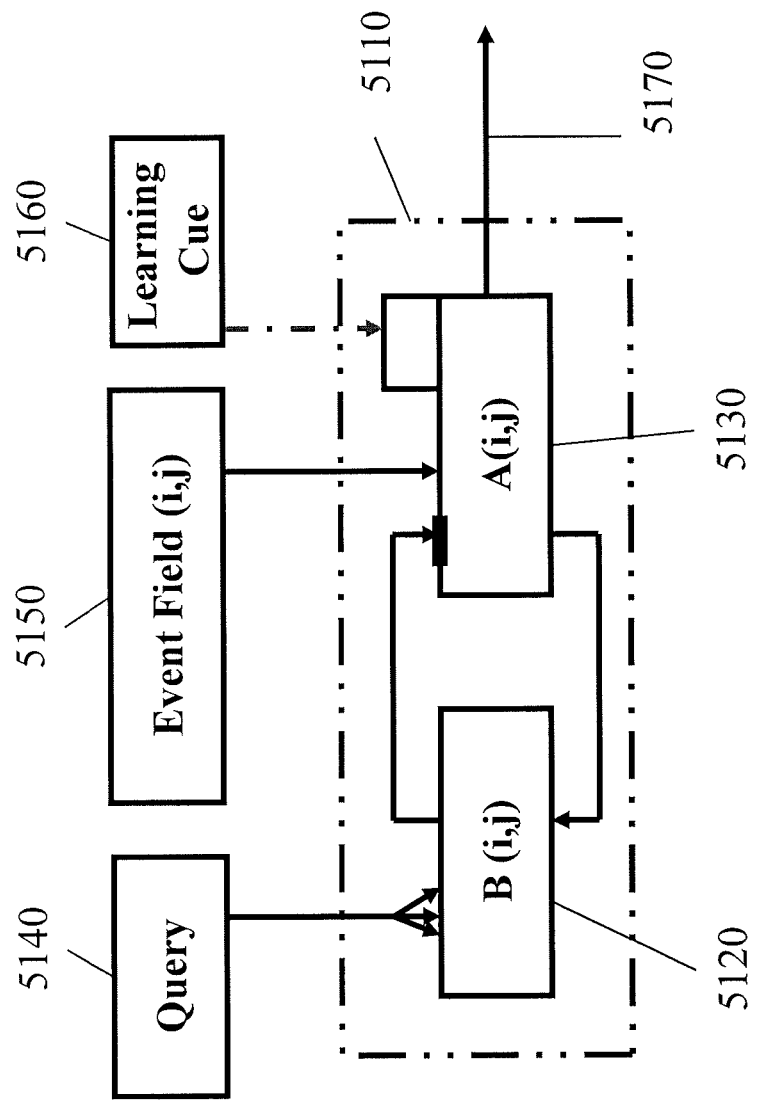
FIG. 51 depicts an exemplary recallable event field memory 5100 in accordance with one or more embodiments.

FIG. 51 depicts an exemplary recallable event field memory 5100 in accordance with one or more embodiments. The figure contains: a query ganglite 5140; an event field of ganglites 5150; a learning cue source 5160; a recallable event field memory 5110, and a recallable event field memory neurite output 5170. The recallable event field memory comprises ganglite fields 5120 and 5130.

The event field is the field for which memory of the firing element is to be retained. Fields 5120 and 5130 may have ganglites (which may be single neurites) that correspond one-to-one to the event field and to each other. Every ganglite of 5130 leads to and will fire the corresponding ganglite of 5120, and every ganglite of 5120 is connected to its corresponding ganglite in 5130 by a synapse that begins with a low value, but which exhibits strengthening in the presence of the learning cue provided by source 5160. Every element of the event field leads to its corresponding ganglite of 5130 by a synapse that will fire that ganglite, and that does not exhibit learning. The query ganglite stimulates all elements of 5120 to fire.

In the presence of a learning cue, with a ganglite of the event field firing, the corresponding ganglite of 5130 may fire. This may cause the corresponding ganglite of 5120 to fire. This may cause the synapse from the corresponding ganglite of 5120 to the corresponding ganglite of 5130 to strengthen.

Subsequently, the query may cause all ganglites of 5120 to fire. This may cause the strengthened synapse to cause its ganglite in 5130 to fire and provide its output along path 5170. Thus, in the presence of the query, the output of 5130 will be the corresponding ganglite of the event field that was to be remembered. Multiple memories may be stored if the learning cue was present upon occasions when different ganglites of the event field were firing. The ganglites of 5130 may be operated in single output mode so that, upon query, only the strongest stored memory will be produced in response to the query. The event field may correspond to any ganglite field, such as one for locations in space, or for sounds that are heard. The learning cue source may be any stimulus (such as the presence of food or danger) that is to be associated with a specific ganglite in the event field.

Figure 52:
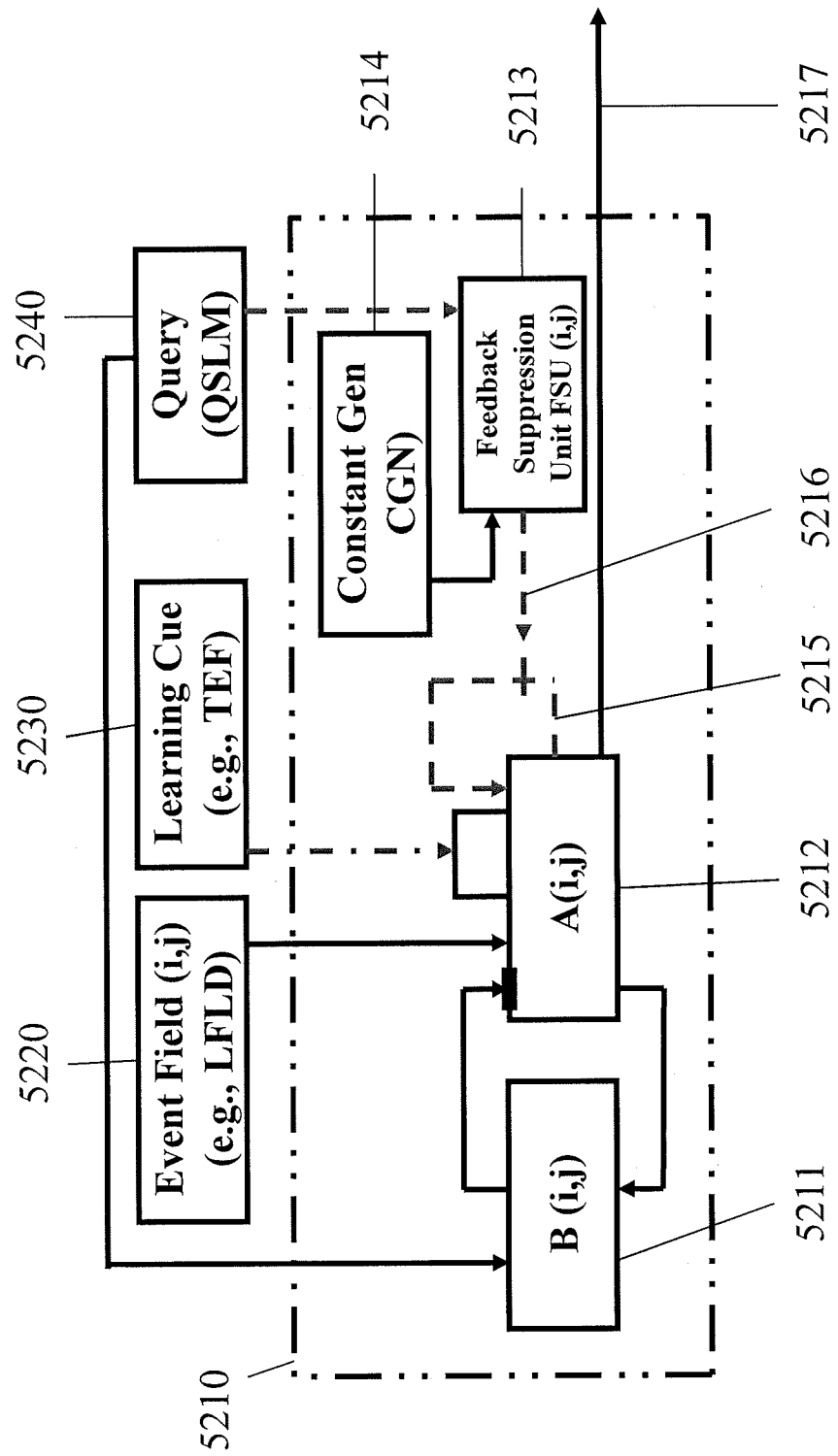
FIG. 52 depicts another exemplary recallable event field memory 5200 queried in single output mode in accordance with one or more embodiments.

FIG. 52 depicts another exemplary recallable event field memory 5200 queried in single output mode in accordance with one or more embodiments. The figure contains: a query ganglite 5240; an event field of ganglites 5220; a learning cue source 5230; a recallable event field memory 5210, and an event field memory neurite output 5217. The event field memory comprises constant generator 5214, feedback suppression unit 5213, and ganglite fields 5211 and 5212. Ganglite field 5212 may operate in direct or in indirect single output mode and may use transmission suppressible output neurites to enable quicker disruption of its suppression. The feedback suppression unit may comprise transmission inhibiting neurites that may suppress single output feedback among 5212 neurites. The constant generator may enable the feedback suppression unit. The query ganglite may suppress all the neurites of the feedback suppression unit. Thus, in the absence of a query, there may be no suppression, and the event field memory operates as the event field memory in FIG. 51. In the presence of a query, only the strongest memory may survive and produce an output.

Reciprocal Neurite Memory

Reciprocal neurite memory is defined as ganglite memory whose activation also stimulates the ganglites of the neurite or ganglite pattern that originally produced it.

Figure 53:
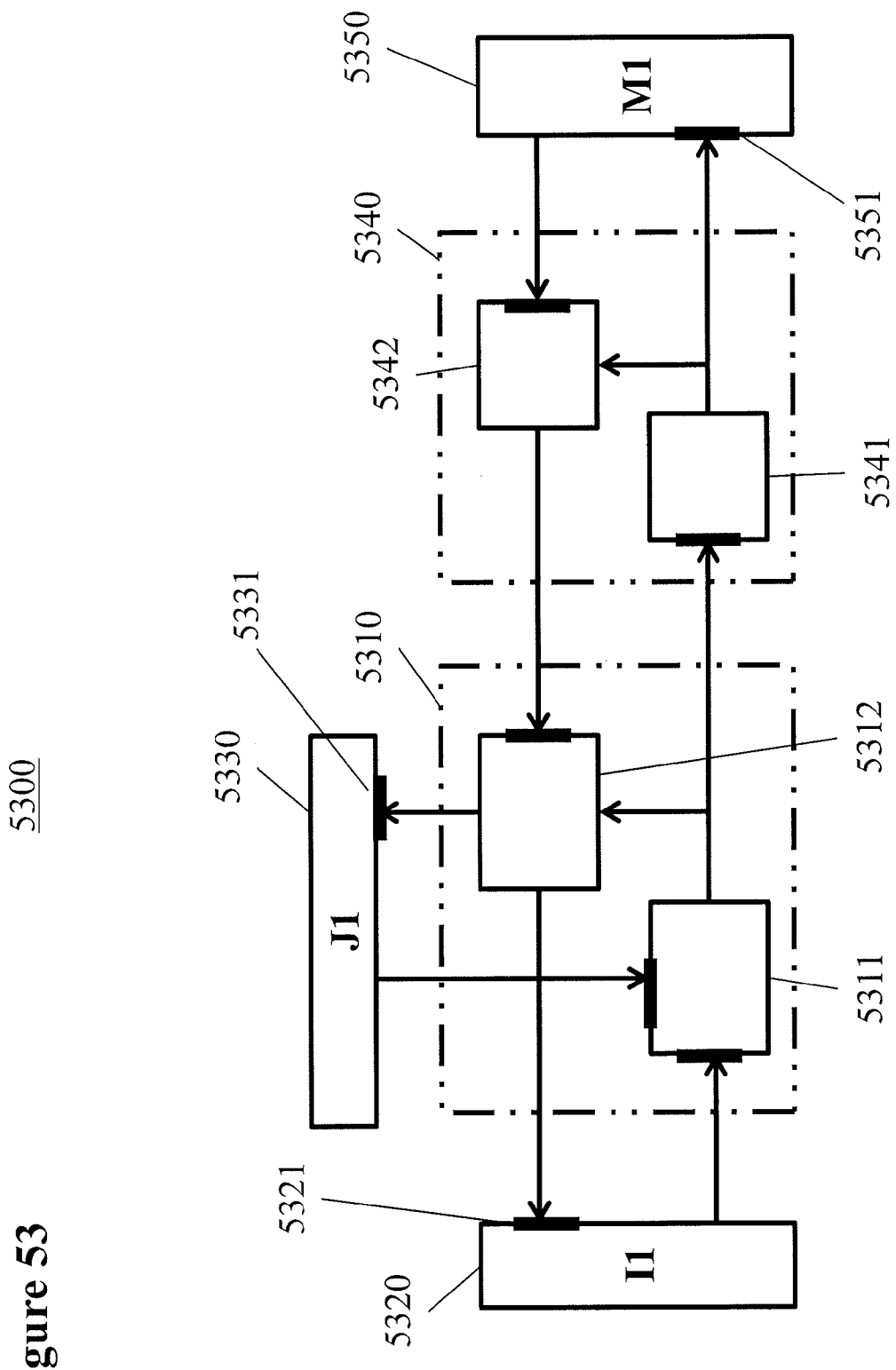
FIG. 53 depicts an exemplary detail of a reciprocal receiving ganglite and a reciprocal processing ganglite in context 5300 in accordance with one or more embodiments.

FIG. 53 depicts an exemplary detail of a reciprocal receiving ganglite and a reciprocal processing ganglite in context 5300 in accordance with one or more embodiments. It contains: reciprocal receiving ganglite 5310 comprising ganglites 5311 and 5312; reciprocal processing ganglite 5340, comprising ganglites 5341 and 5342; input ganglite 5320 with input synapse 5321 from constituent ganglite 5312 of the reciprocal receiving ganglite; input ganglite 5330 with input synapse 5331 from constituent ganglite 5312 of the reciprocal receiving ganglite; and external receiving ganglite 5350 with synapse 5351 from constituent ganglite 5341 of ganglite 5340. Ganglite 5341 may be a learning neurite.

Ganglite 5311 may be a neurite with a threshold frequency for learning, or may be a high-rate learning association ganglite (see FIG. 30*a*). 5312, and 5342 may be neurites with threshold frequencies for learning on one input, or may be high-rate learning association ganglites with learning on one input only (see FIG. 30*c*). Each of these ganglites strengthens synapses if both its inputs fire rapidly enough to stimulate its learning process, but may not learn if only a single input is firing. Learning neurite features of 5320, 5330, and 5350 are optional.

In the presence of a learning cue, with the input ganglites firing rapidly enough, the paths 5320 to 5311, 5330 to 5311, 5311 to 5341, 5342 to 5312, may all be reinforced. If 5321 and 5331 are learning synapses, the path from 5312 to 5320 and 5312 to 5330 may be reinforced. If 5350 is also firing, the path from 5350 to 5342 may be strengthened. This reciprocal receiving ganglite and reciprocal processing ganglite may form the basis of the reciprocal processing memory ganglite to be described. It is exemplary, and many specific implementations of the ganglites for a reciprocal memory structure can be developed based on the principles and more elementary ganglites disclosed herein.

Figure 54:
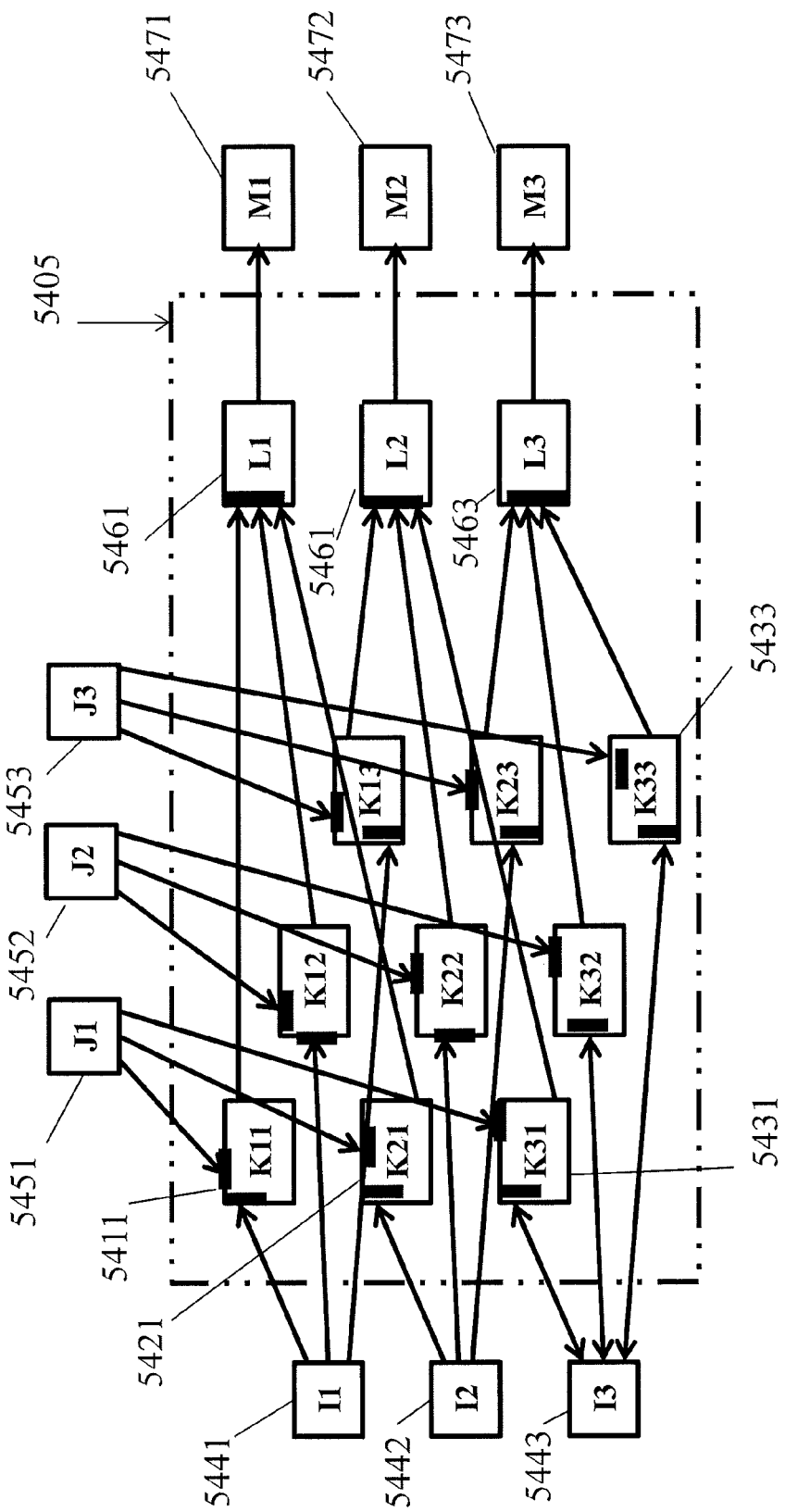
FIG. 54 depicts an exemplary reciprocal memory ganglite with only its forward pathways shown 5400 in accordance with one or many embodiments.

FIG. 54 depicts an exemplary reciprocal memory ganglite with only its forward pathways shown 5400 in accordance with one or many embodiments. The figure comprises: input set 1, comprised of ganglites 5441, 5442, and 5443; input set 2, comprised of ganglites 5451, 5452, and 5453; external receiving set comprised of ganglites 5471, 5472, and 5473; and the reciprocal memory ganglite, comprised of a set of reciprocal receiving ganglites 5411, 5412, 5413, 5421, 5422, 5423, 5431, 5432, and 5433, and an associated set of reciprocal processing ganglites 5461, 5462, and 5463. The unit may have greater or fewer input ganglites in input set 1 and input set 2, and greater or fewer ganglites in its external receiving set. The unit may have one reciprocal receiving ganglite for every input 1/input 2 ganglite pair. Each ganglite within the reciprocal memory ganglite may have learning neurites at all inputs (although the receiving to processing synapses may begin strong and not need learning. The external receiving ganglites may have learning neurites. Any ensemble of reciprocal receiving ganglite outputs may be combined in any of the reciprocal processing ganglites with any weights. The ones shown are for illustrative purposes only. Forward synapse strengthening from an input to a reciprocal receiving ganglite may occur when both inputs pulse at high enough rates, but not otherwise. If the external processing ganglite has a learning neurite, the reciprocal processing ganglites may optionally terminate on a learning neurite in the external receiving ganglite. Thus, in the presence of a learning cue, if a specific input 1 and input 2 pair are firing at a sufficiently rapid rate, the path from them through the reciprocal receiving ganglite to the reciprocal processing ganglite may be reinforced, and the path from the reciprocal processing ganglite to the external receiving ganglite may optionally be reinforced.

Figure 55:
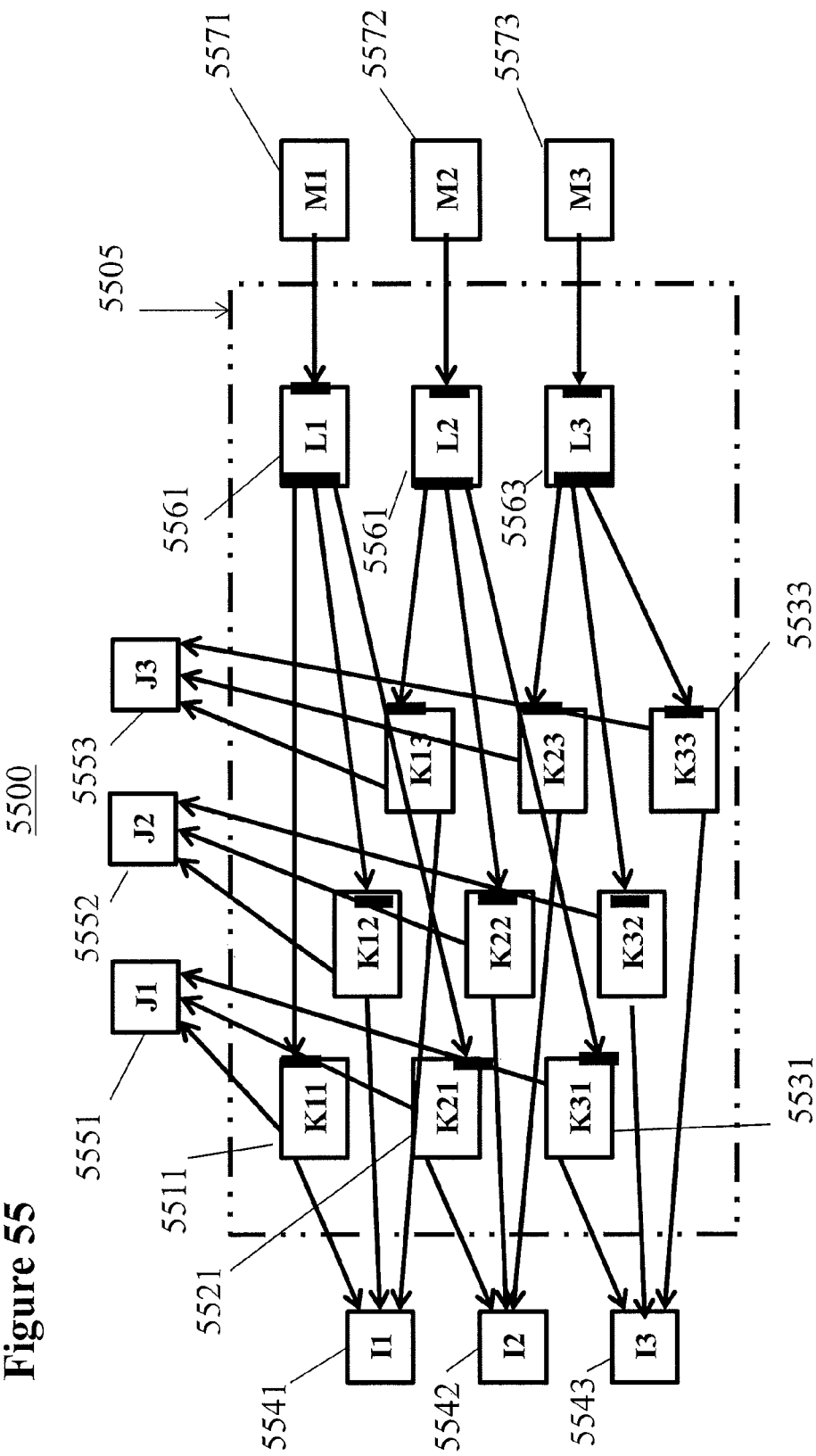
FIG. 55 depicts an exemplary reciprocal memory ganglite with only its return pathways 5500 in accordance with one or many embodiments.

FIG. 55 depicts an exemplary reciprocal memory ganglite with only its return pathways 5500 in accordance with one or many embodiments. All the ganglites of FIG. 55 are identical to the corresponding ganglites of FIG. 54. For example, the figure contains: input set 1, comprised of ganglites 5541, 5542, and 5543; input set 2, comprised of ganglites 5551, 5552, and 5553; external receiving set comprised of ganglites 5571, 5572, and 5573; and the reciprocal memory ganglite, comprised of a set of reciprocal receiving ganglites 5511, 5512, 5513, 5521, 5522, 5523, 5531, 5532, and 5533, and a set of reciprocal processing ganglites 5561, 5562, and 5563. In the presence of a learning cue, if a specific input 1/input 2 pair are firing at a sufficiently rapid rate, and if the corresponding external receiving ganglite is firing the path from the external receiving ganglite to the firing input 1/input 2 pair may be reinforced. No other path from that or any other external receiving ganglite to the reciprocal receiving ganglites or the input ganglites may be reinforced. Thus, in a reciprocal memory ganglite, if an input 1/input 2 pair is firing at a high enough rate, the path from them through the reciprocal receiving ganglite to the reciprocal processing ganglite to the external receiving ganglite may be reinforced, and the reverse path may be reinforced.

Figure 56A:
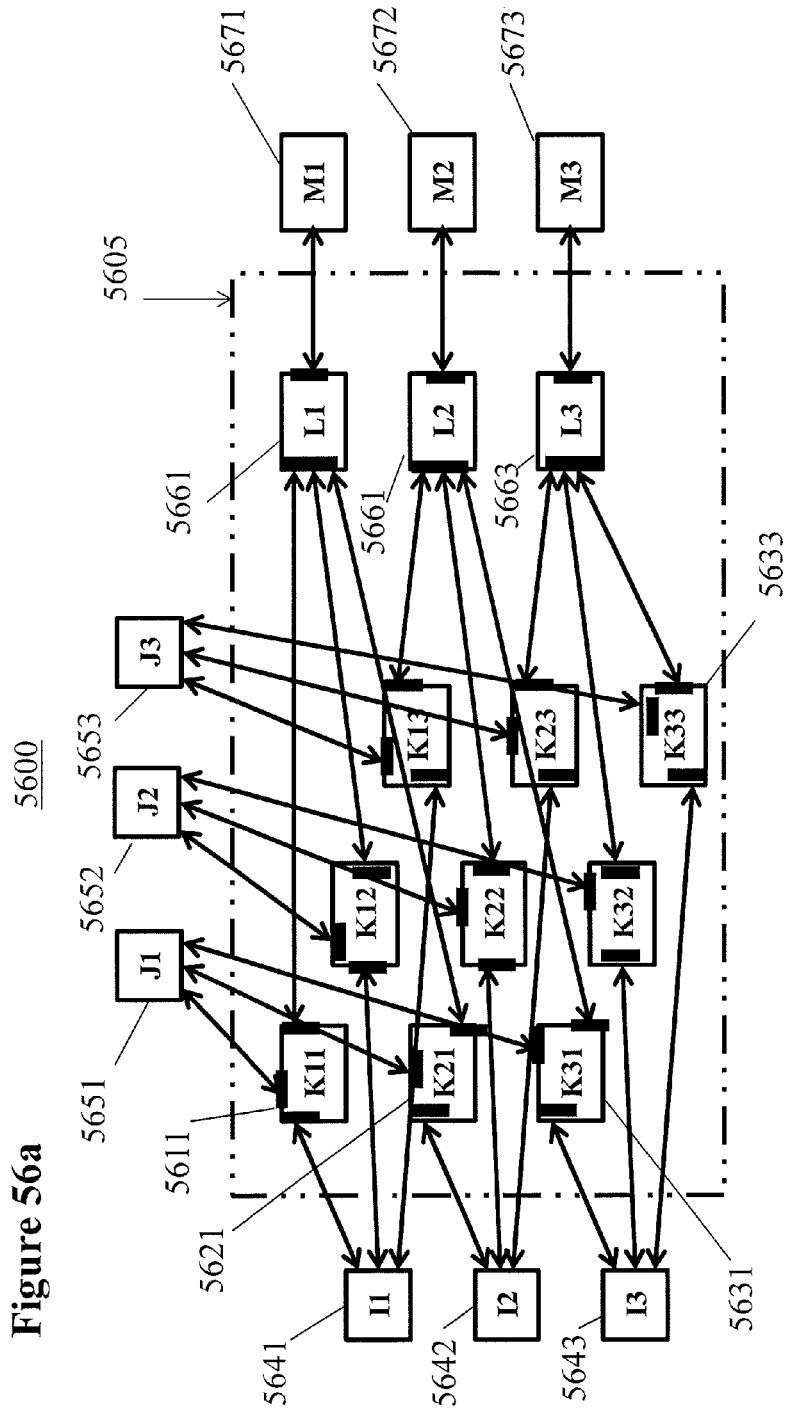
FIG. 56a depicts a block diagram of an exemplary reciprocal memory ganglite 5600 in accordance with one or more embodiments.

FIG. 56a depicts a block diagram of an exemplary reciprocal memory ganglite 5600 in accordance with one or more embodiments. All the ganglites of FIG. 56a are identical to the corresponding ganglites of FIG. 54. For example, the figure contains: input set 1, comprised of ganglites 5641, 5642, and 5643; input set 2, comprised of ganglites 5651, 5652, and 5653; external receiving set comprised of ganglites 5671, 5672, and 5673; and the reciprocal memory ganglite, comprised of a set of reciprocal receiving ganglites 5611, 5612, 5613, 5621, 5622, 5623, 5631, 5632, and 5633, and a set of reciprocal processing ganglites 5661, 5662, and 5663. All elements of the forward paths of FIG. 54, and all elements of the backward paths of FIG. 55 are included. Each two headed arrow indicates the presence of a forward path and a separate backward path between two ganglites. All learning features of FIG. 53 are included for the reciprocal receiving ganglites and reciprocal processing ganglites.

Figure 56B:
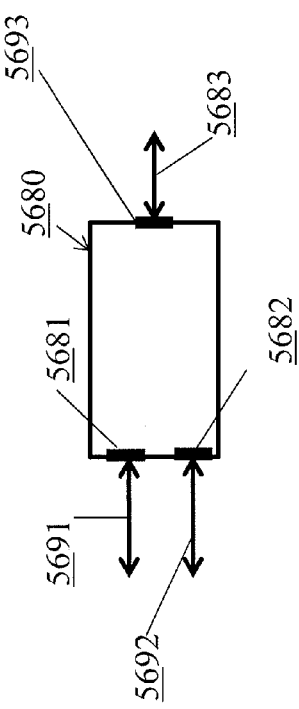
FIG. 56b depicts the symbol for an exemplary reciprocal memory ganglite 5675 in accordance with one or more embodiments.

FIG. 56b depicts the symbol for an exemplary reciprocal memory ganglite 5675 in accordance with one or more embodiments. The symbol abstracts and carries all features of FIG. 56a. The figure comprises reciprocal memory ganglite 5680, which contains the entirety of 5605. Learning synapses 5682 comprises all learning synapses from input set 1 of FIG. 56a to the receiving ganglites of FIG. 56a, and arrow 5691, which may be a one way or a two way arrow, describes those neurite pathways. Learning synapse 5682 comprises all learning synapses from input set 2 of FIG. 56a to the receiving ganglites of FIG. 56a, and arrow 5691, which may be a one way or a two way arrow, describes those neurite pathways.

Figure 57:
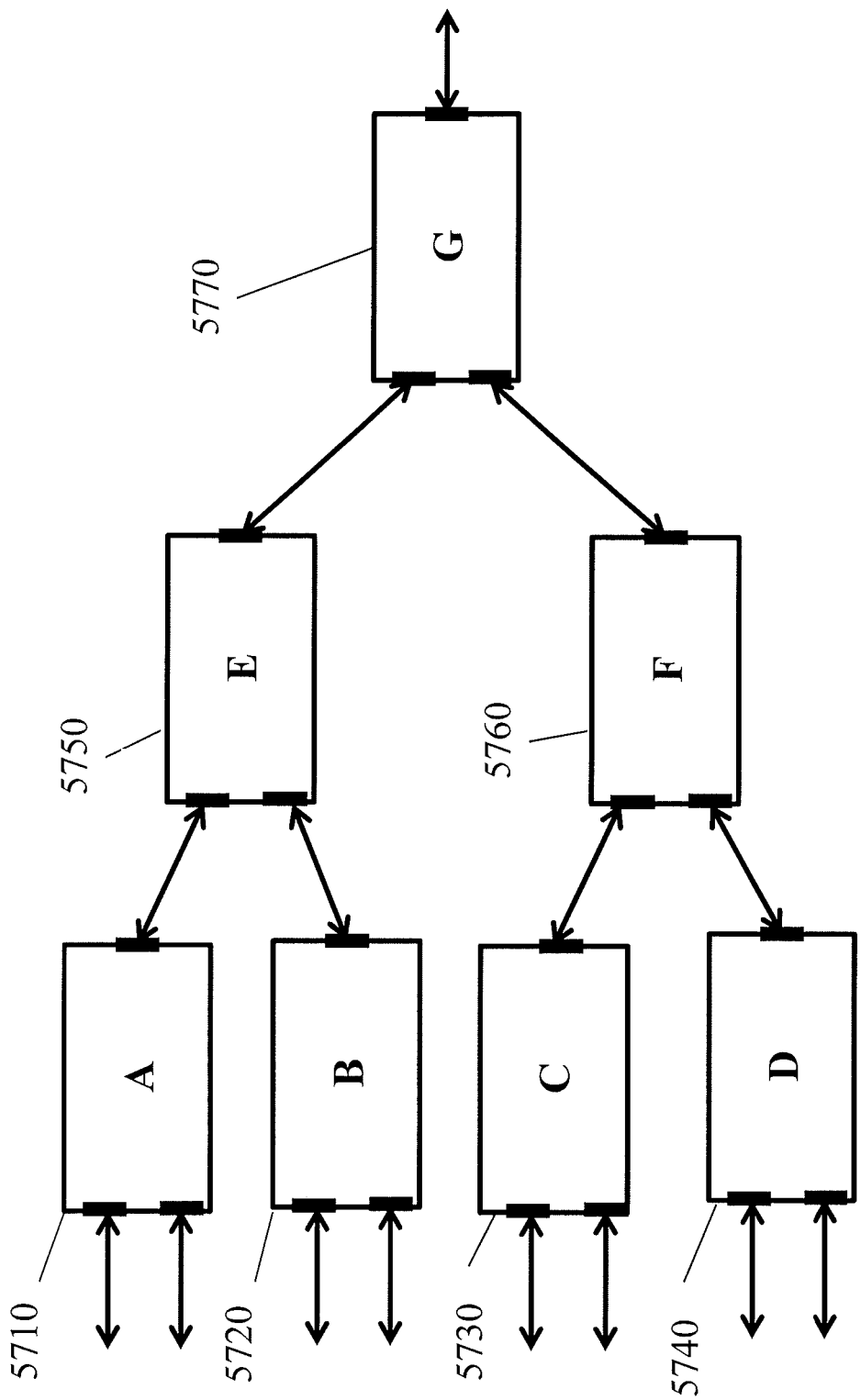
FIG. 57 depicts an exemplary combination of multiple reciprocal memory ganglites in accordance with one or more embodiments.

FIG. 57 depicts an exemplary combination of multiple reciprocal memory ganglites in accordance with one or more embodiments. The figure contains reciprocal memory ganglites 5710, 5720, 5730, 5740, 5750, 5760, and 5770. Reciprocal memory ganglites can be combined and linked in complex ways. Once this is done, and a specific input pattern (to 5710, 5720, 5730, and 5740) is reinforced through the presence of a learning cue, sensitivity to stimulation of the same original input set will be heightened. Thus this collection of inputs will form a memory, and awareness of and sensitivity to it will be heightened. In addition, the stimulation of the terminal ganglite or any ganglite in the path will stimulate all of the units that fed it, and, depending on the degree of reinforcement, that stimulation may propagate to many lower levels. Thus, if the units in FIG. 57 represent increasing levels of abstraction to the right, stimulation of a higher level of abstraction will stimulate the lower, more detailed levels from which it was created. If these reciprocal memory ganglites also feed some other structure (not depicted) that can synthesize and act based on both the abstraction and the details, that other structure may receive all of that information without the need to store it in separate memory. Multiple reciprocal memory ganglite layers and reciprocal memory units that cross layers and cross-connect in complex ways may allow memories to form and recombine in complex associations. In addition, if the system is imperfect or subject to noise, imperfectly reconstructed memories will emerge.

Neurite Concepts and Reciprocal Concept Field Structures

A neurite concept is a ganglite that represents an abstraction of multiple ganglites that may be pattern ganglites, memory ganglites or other concept ganglites, any of which may activate it. A learned concept involves association from these other ganglites using learning neurites. A concept ganglite may be activated and used in neurite processes with or without activation of any of the specific ganglites that it represents. Concepts may have internal learning (synapse modification in presence of learning cue).

Neurite memory may aid in simple concept development by associating and grouping processed inputs, and may aid in complex concept development by associating multiple ganglites in complex ways.

Concept field structures are structures of ganglites that contain concept ganglites in a field (position loosely carries meaning by permitting interactions between nearby related concepts). Neurite memory structures and neurite pattern recognition structures may be examples of structures of one or more concepts. Reciprocal concept field structures may be very flexible, and may involve input processing, concept formation and separation, and persistence.

Figure 58:
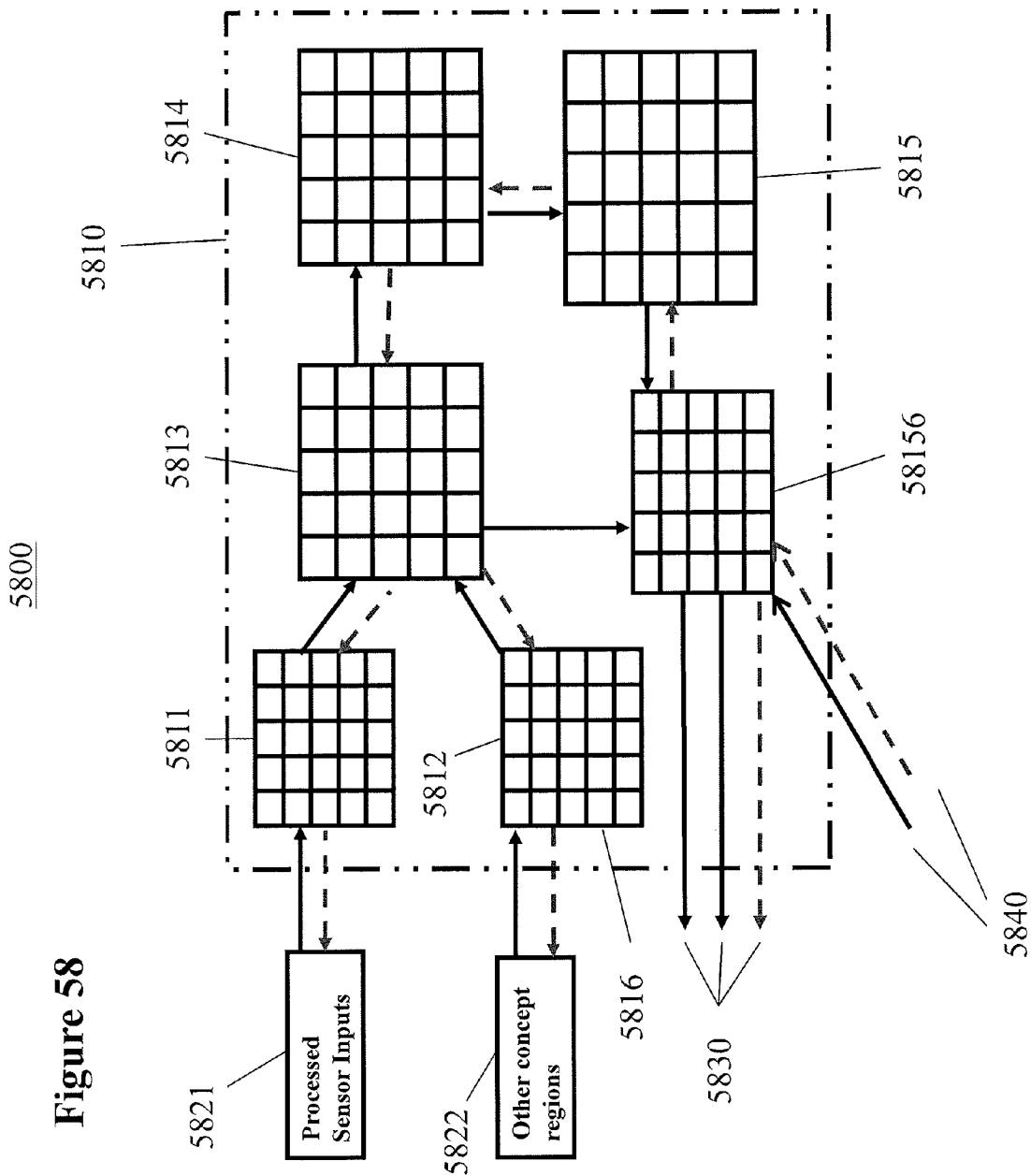
FIG. 58 depicts a block diagram of an exemplary multi-stage neurite reciprocal concept field structure 5800 in accordance with one or more embodiments.

FIG. 58 depicts a block diagram of an exemplary multi-stage neurite reciprocal concept field structure 5800 in accordance with one or more embodiments. The figure contains: processed inputs from sensors 5821; processed inputs from other neurite concepts and concept structures 5822; an exemplary multi-stage neurite concept structure 5810, its outputs to other neurite concepts and concept structures 5830, and its output-strength-modulating inputs from other areas 5840. The exemplary concept structure 5810 comprises: a sensor input processing area 5811; an input concept processing area 5812; a processing area 5813, a concept formulation and separation area 5814, a persistence area 5815, and an output area 5816. Each of these areas may be a concept field. There may be none or more inputs from sensors and none or more inputs from other concepts and concept structures. There may be a sensor input processing area for each sensor. There may be an input processing area 5812 for each input 5822. There may be one or more processing areas 5813. The sensor input processing area may processes sensory inputs and may feed back to the ganglites originating those inputs signals necessary to modulate input signal strength, perhaps to keep them within an acceptable range or to extend the range of the input sensory systems. 5811 may pass processed results to processing area 5813. Concept input processing area 5812 may process inputs from other concept areas and may feed back to the originating ganglites signals necessary to modulate input signal rates, perhaps to keep them within an acceptable range. 5812 may pass processed results to the processing area 5813. Processing area 5813 may perform multiple neurite operations on its inputs in parallel. It may pass those results to the concept formation and separation area and to the output area, and may provide feedback to areas 5811 and 5812. The concept formation and separation area may contain existing simple concepts or may form and strengthen new simple concepts using learning neurites. It may provide feedback to the processing area. The persistence area may maintain persistent representations of the concepts in the formation and separation area, and may allow these concepts to interact and activate one another over time. The output area sends pulses (5830) to other concepts and concept structures, motor ganglites, and output conversion units. It may receive inputs directly from the processing area. It may receive signal-strength-modifying inputs (5840) from other neurite regions. The persistence area may also permit free association and creativity by allowing each concept some opportunity to stimulate adjacent concepts, perhaps via weak synapse connections and significant noise in its neurites. There may be many ways to perform concept formation and separation. The area may contain a field of learning ganglites that may be stimulated by the processing area and may have near neighbor stimulation. As neurite processing may stimulate a ganglite in the concept formation and separation field, that ganglite may stimulate its near neighbors, so that synapse connections strengthen between the last processing area and the concept formation area, and the size of the associated region in the concept formation and separation area, which represents the concept, may grow. Negative synapses with greater range may be used to prevent a concept from growing too large and to separate concepts (see FIG. 35). Many approaches may be used to regulate the number and shapes (in the formation and separation field) of concepts that can be formed. One approach may be to provide a limited number of output neurites from the formation and separation area to the persistence area.

Movement and Speech

The organization and execution of movement, which includes speech, is a complex process that requires the sequencing, coordination, and timing of neurite output pulses. These may be converted by output conversion units into neurite creature actions via controlled equipment. Coordination, sequencing, and timing may be multi-stage processes. The techniques of this patent may be used for long time duration movements and for coordinated movements across multiple output conversion units.

Individual Output Units and Movement Modes

In this disclosure an individual output conversion unit (FIG. 9*a*) may be the smallest output unit controlled. An output conversion unit module (FIG. 9*c*) is a grouping of output conversion units. A time sequence ganglite (FIG. 14*a*) may connect to an output conversion unit module.

Figure 59B:
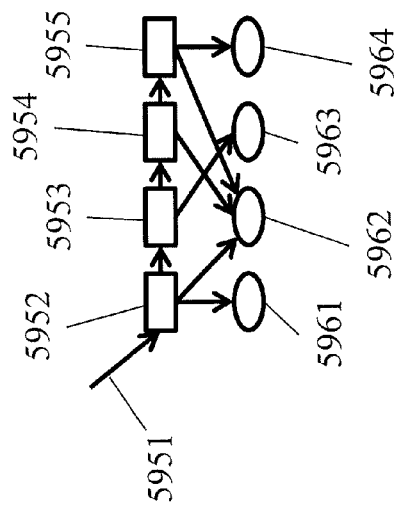
FIG. 59b depicts a variation of a movement mode 5950 in accordance with one or more embodiments.
Figure 59D:
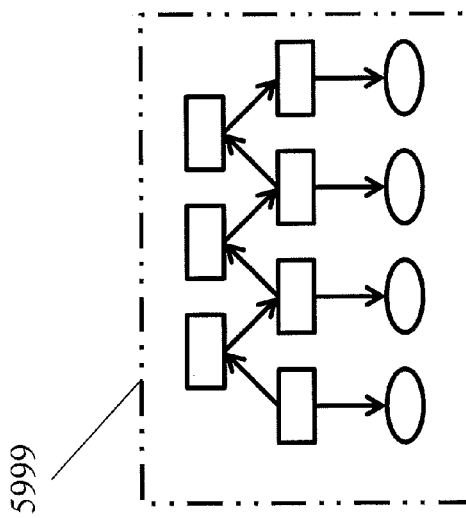
FIG. 59d depicts a standard symbol for a variable timing movement mode 5998 in accordance with one or more embodiments.
Figure 59A:
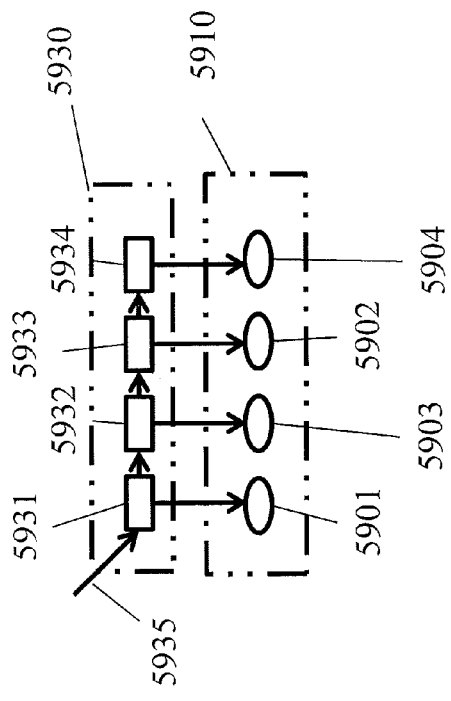
FIG. 59a depicts a movement mode 5900 in accordance with one or more embodiments.

FIG. 59*a* depicts a movement mode 5900 in accordance with one or more embodiments. A movement mode is a time sequence ganglite connected to an output conversion unit module. The FIG. 59*a* contains a time sequence ganglite 5930 with a neurite input 5935 and an output conversion unit module 5910. The time sequence ganglite comprises one or more ganglites 5931, 5931, 5933, and 5934. The output conversion unit module comprises one or more output conversion units 5901, 5902, 5903 and 5904. Input 5935 initiates the time sequence ganglite. The time sequence ganglite may have any number of ganglites in the sequence, some of which may stimulate various output conversion units. The output conversion unit module may have any number of output conversion units. A ganglite in the time sequence may fire zero or more output conversion units. The symbol for a movement mode should not be taken to imply that each time sequence ganglite fires on the output conversion module below it. Unless otherwise noted, any time sequence ganglite may fire on any set of output conversion units in the module.

FIG. 59*b* depicts a variation of a movement mode 5950 in accordance with one or more embodiments. The figure contains: a time sequence ganglite comprising one or more ganglites 5952, 5953, 5954, and 5955; an output conversion unit module comprising one or more output conversion units 5961, 5962, 5963, and 5964; and a neurite initiator 5951. Upon initiation, the timing sequence ganglites fire in the order of those of FIG. 59*a*, but the individual output conversion units may be stimulated in a different sequence, and some (e.g., 5962) may fire multiple times. FIG. 59*b* represents one variation of a movement mode included in the symbol 59*a*.

Figure 59C:
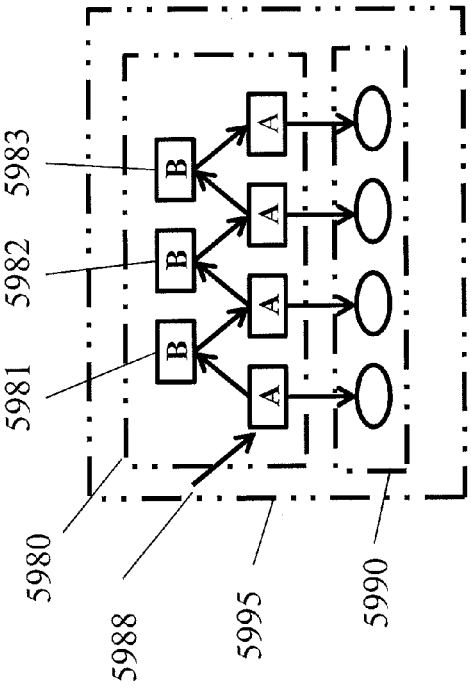
FIG. 59c depicts a variable timing movement mode 5975 in accordance with one or more embodiments.

FIG. 59*c* depicts a variable timing movement mode 5975 in accordance with one or more embodiments. The figure contains: a neurite initiator 5988; a variable timing movement mode 5995, which is comprised of a controlled timing sequence ganglite (see FIG. 19) 5980; and an output conversion unit module 5990. The controlled timing sequence ganglite contains one or more variable time delay ganglites 5981, 5982, and 5983. The inhibitory inputs to the variable time delay ganglites are not depicted. A variable timing movement mode may contain any controlled timing sequence ganglite, which may control any output conversion unit module, with any of its activity ganglites connected to any set or combination of zero or more output conversion units. In a variable timing movement mode, movement sequence and coordination may be controlled by the variable timing sequence ganglite, and timing may be controlled by inhibitory inputs to the variable time delay ganglites.

FIG. 59*d* depicts a standard symbol for a variable timing movement mode 5998 in accordance with one or more embodiments. The figure contains the symbol 5999, whose components are identified in 5975. The symbol does not imply a one to one correspondence between activity ganglites and output conversion units. Any activity ganglite may be connected to any number (zero or more) or set of output conversion units.

A controlled timing sequence ganglite is the special case of a variable timing movement mode in which each ganglite is connected to zero output conversion units.

Composite movement modes are possible, in which one movement mode or controlled timing sequence ganglite provides the sequence for movement modes for different output conversion unit modules.

Figure 60:
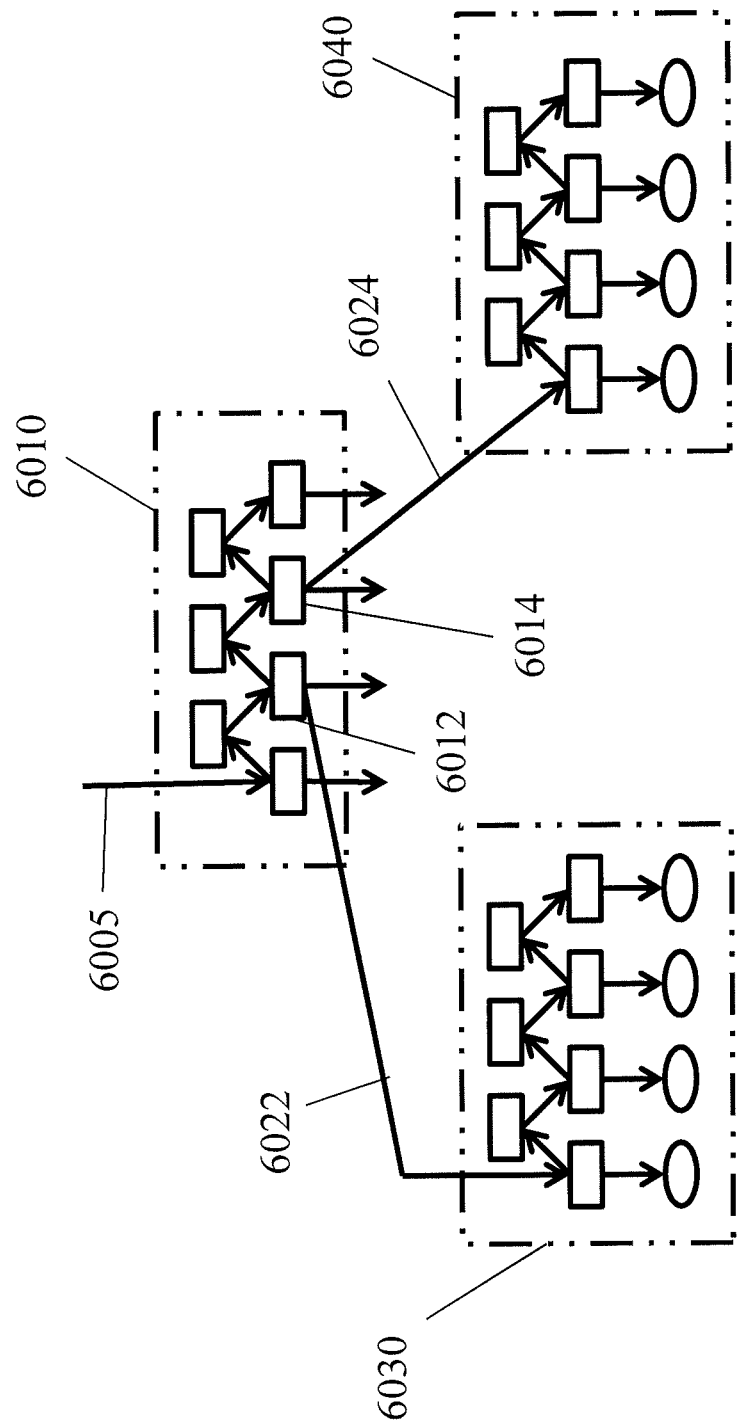
FIG. 60 displays a composite movement mode 6000 in accordance with one or more embodiments.

FIG. 60 displays a composite movement mode 6000 in accordance with one or more embodiments. The figure contains: a movement mode that comprises only controlled timing sequence ganglite 6010 with neurite input 6005 and ganglites 6012 and 6014 with output sections 6022 and 6024 respectively; variable timing movement mode 6030 with neurite initiator 6022, and variable timing movement mode 6040 with neurite initiator 6024. Variable timing neurite inputs to the various time delay ganglites in the figure are not shown. The controlled timing sequence ganglite initiates movement mode 6030 via ganglite 6012 before it initiates movement mode 6040 via ganglite 6014. 6030 and 6040 may control separate actuators, limbs or portions of the controlled equipment of a neurite creature. The sequence and timing of their initiation is controlled by 6010 and its variable timing neurite inputs; the internal timing of each set of actuators is controlled by its variable timing neurite inputs.

Figure 61:
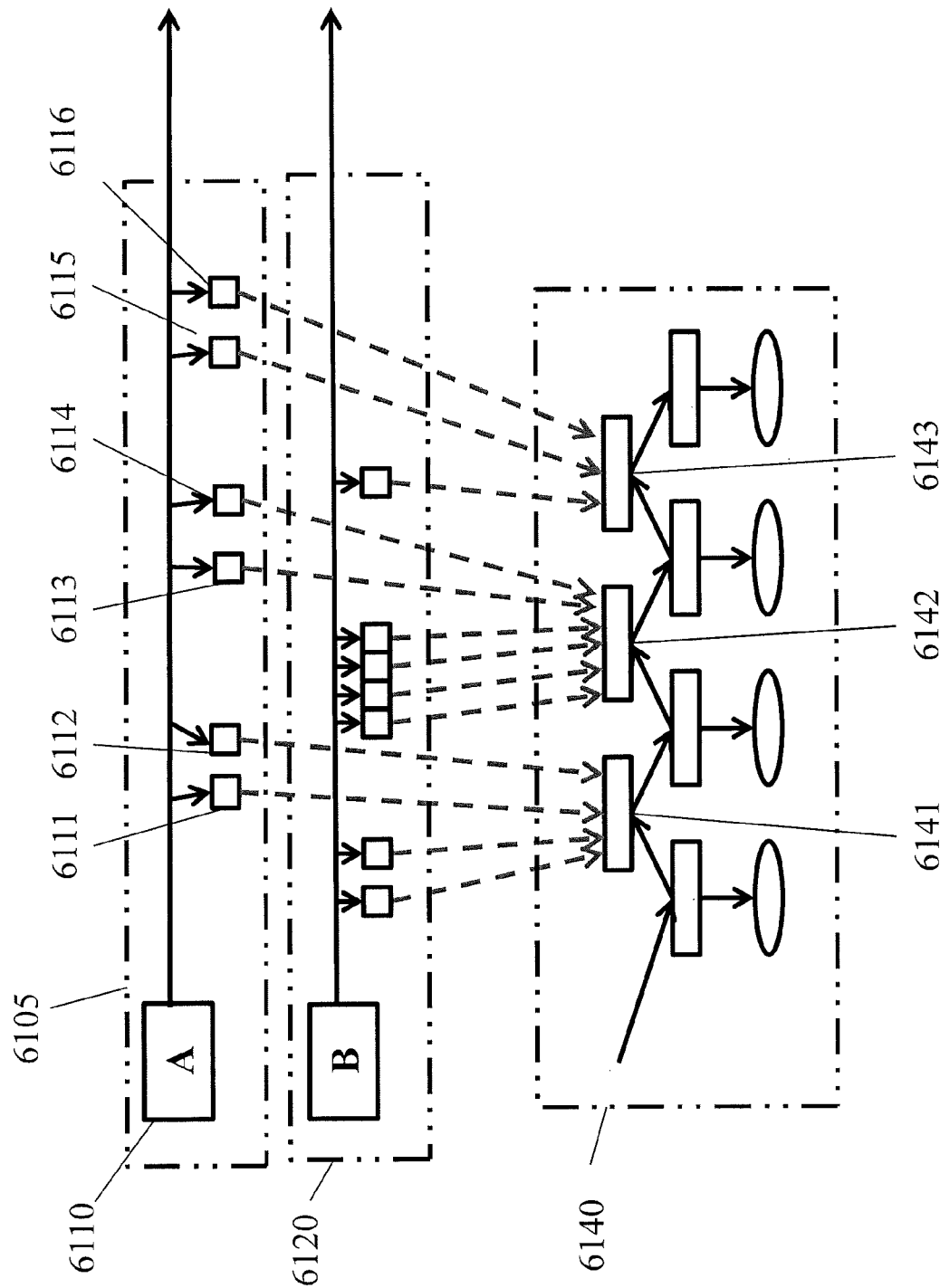
FIG. 61 displays two timing set ganglites feeding a variable timing movement mode 6100 in accordance with one or more embodiments.

FIG. 61 displays two timing set ganglites feeding a variable timing movement mode 6100 in accordance with one or more embodiments. The combination of a timing set and a variable timing movement mode is termed a composite movement mode. The figure contains: timing set ganglite 6105 (see FIG. 17) with stimulating ganglite 6110 and stimulated ganglites 6111, 6112, 6113, 6114, 6115, and 6116; timing set ganglite 6120; and variable movement mode 6140 with variable time delay ganglites 6141, 6142, and 6143. If 6110 fires, its stimulated ganglites may fire, and may load the variable time delay ganglites with negative potential, so that if the variable movement mode is initiated, its ganglites may fire with a certain rhythm. If timing set ganglite B fires, it may load the variable time delay ganglites with different negative potentials, so that if the variable movement mode is initiated, it may fire with a different rhythm. If both timing sets fire, it may load the variable movement mode with yet a third rhythm. If timing set stimulated ganglites are standardized, the greater the number of inhibitory stimulated ganglites impinging on a variable time delay ganglite, the longer the response time, and the slower that portion of the movement mode. Thus, in the figure, timing set 6110 may provide a uniform pace, and timing set 6120 may provide a medium, slow, fast pace for the movement mode. Of course, multiple timing sets may all be active, creating additional timing possibilities for the movement mode.

Figure 62:
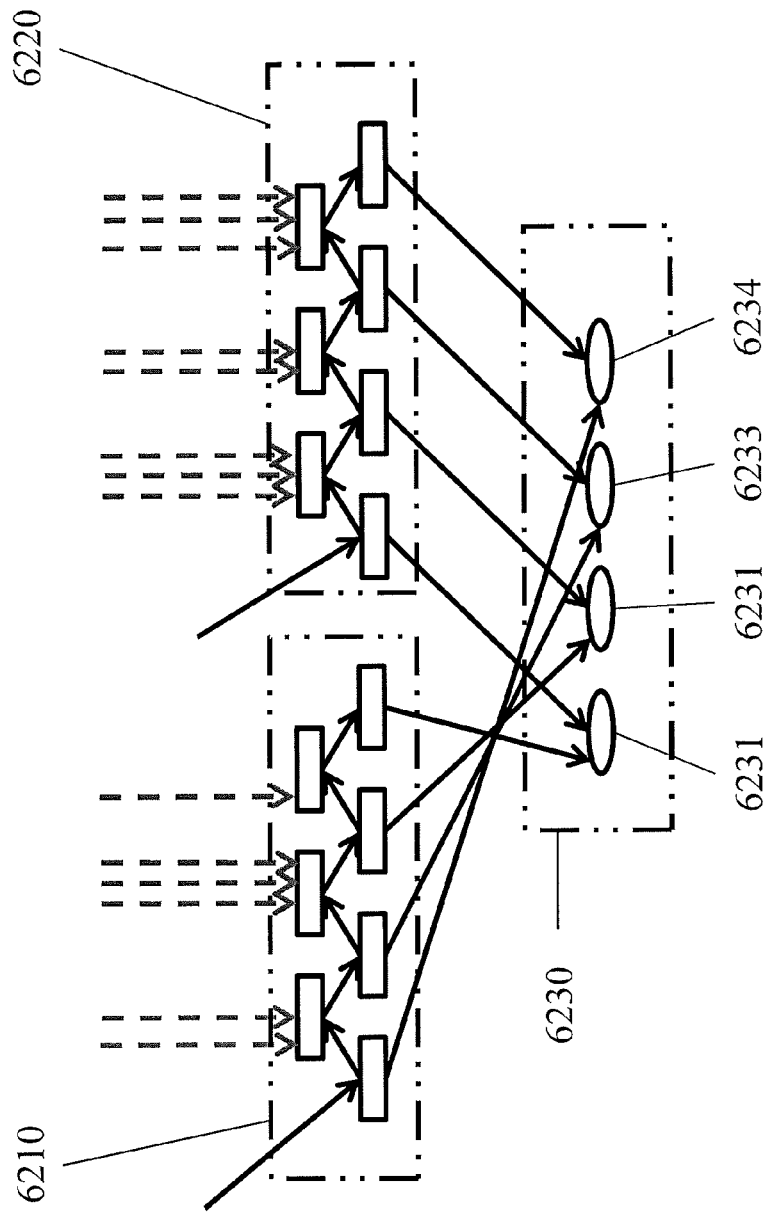
FIG. 62 depicts two controlled timing sequence ganglites activating the same output conversion unit module 6200 in accordance with one or more embodiments.

FIG. 62 depicts two controlled timing sequence ganglites activating the same output conversion unit module 6200 in accordance with one or more embodiments. The figure contains: controlled timing sequence ganglite 6210, controlled timing sequence 6220, and output conversion unit module 6230, with output conversion units 6231, 6232, 6233, and 6234. The same output unit may receive inputs from different movement modes so that the same output conversion unit module may be capable of different movements with different and variable timing.

Figure 63:
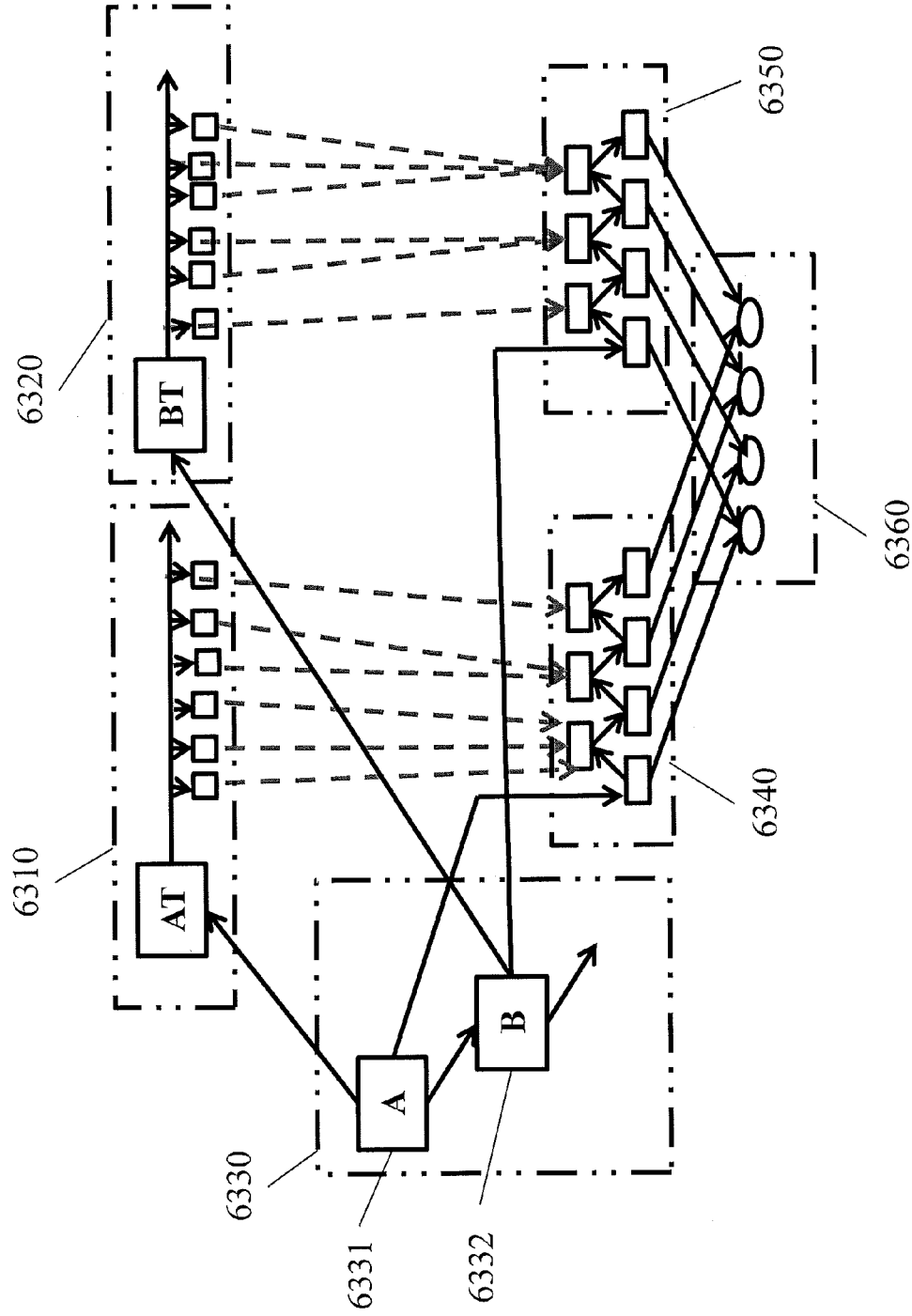
FIG. 63 depicts the sequence and timing of two movement modes for the same output unit 6300 in accordance with one or more embodiments.

Movement modes may often be of short duration, and longer movements may require that they be sequenced. FIG. 63 depicts the sequence and timing of two movement modes for the same output unit in accordance with one or more embodiments. The figure contains ganglite sequence 6330, timing set 6310; timing set 6320, controlled timing sequence ganglite 6340; controlled timing sequence ganglite 6350; and output conversion unit module 6360. Sequence 6330 contains ganglites 6331 and 6332. Each one may initiate a timing set and controlled timing sequence pair, so that the output conversion unit module may get a sequence of timed instructions. Timing between 6331 and 6332 in the figure may be accomplished by time delays between them, and this may be accomplished by making them part of their own composite movement mode.

Figure 64:
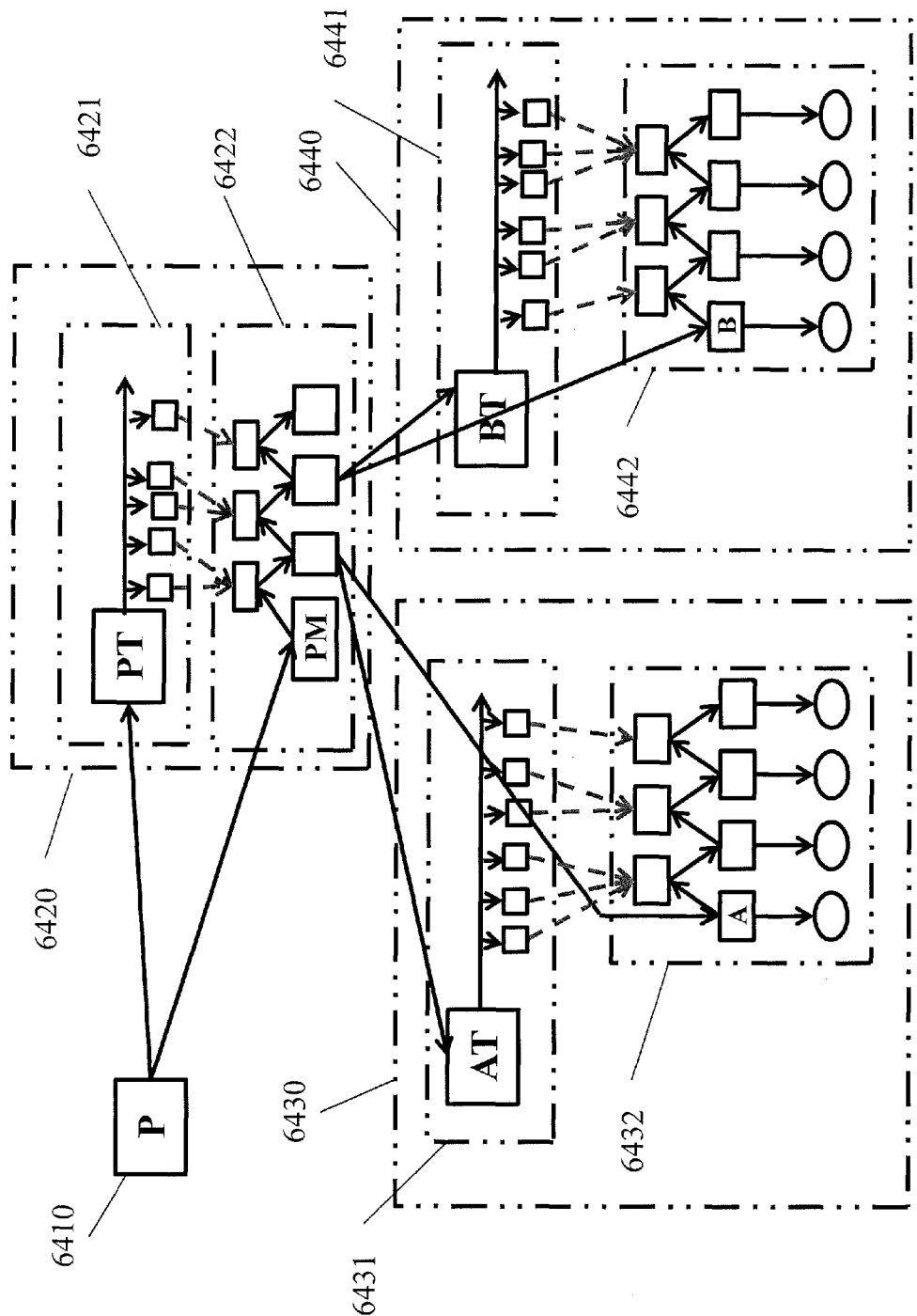
FIG. 64 depicts coordinated composite movement modes 6400 in accordance with one or more embodiments.

A more general approach to coordinated movement may be to utilize coordinated composite movement modes. FIG. 64 depicts coordinated composite movement modes 6400 in accordance with one or more embodiments. The figure contains: an initiator 6410; composite movement mode 6420 which comprises timing set ganglite 6421 and variable timing movement mode 6422; composite movement mode 6430 which comprises timing set ganglite 6431 and variable timing movement mode 6432; and composite movement mode 6440 which comprises timing set ganglite 6441 and variable timing movement mode 6442. Composite movement mode 6420 initiates and times the initiation of composite movement modes 6430 and 6440. Any number of movement modes may be linked in any sequence and with any timing in this manner. The movement modes may move different actuators, limbs, or portions of the controlled equipment of a neurite creature, or may consecutively move the same controlled equipment.

Figure 65:
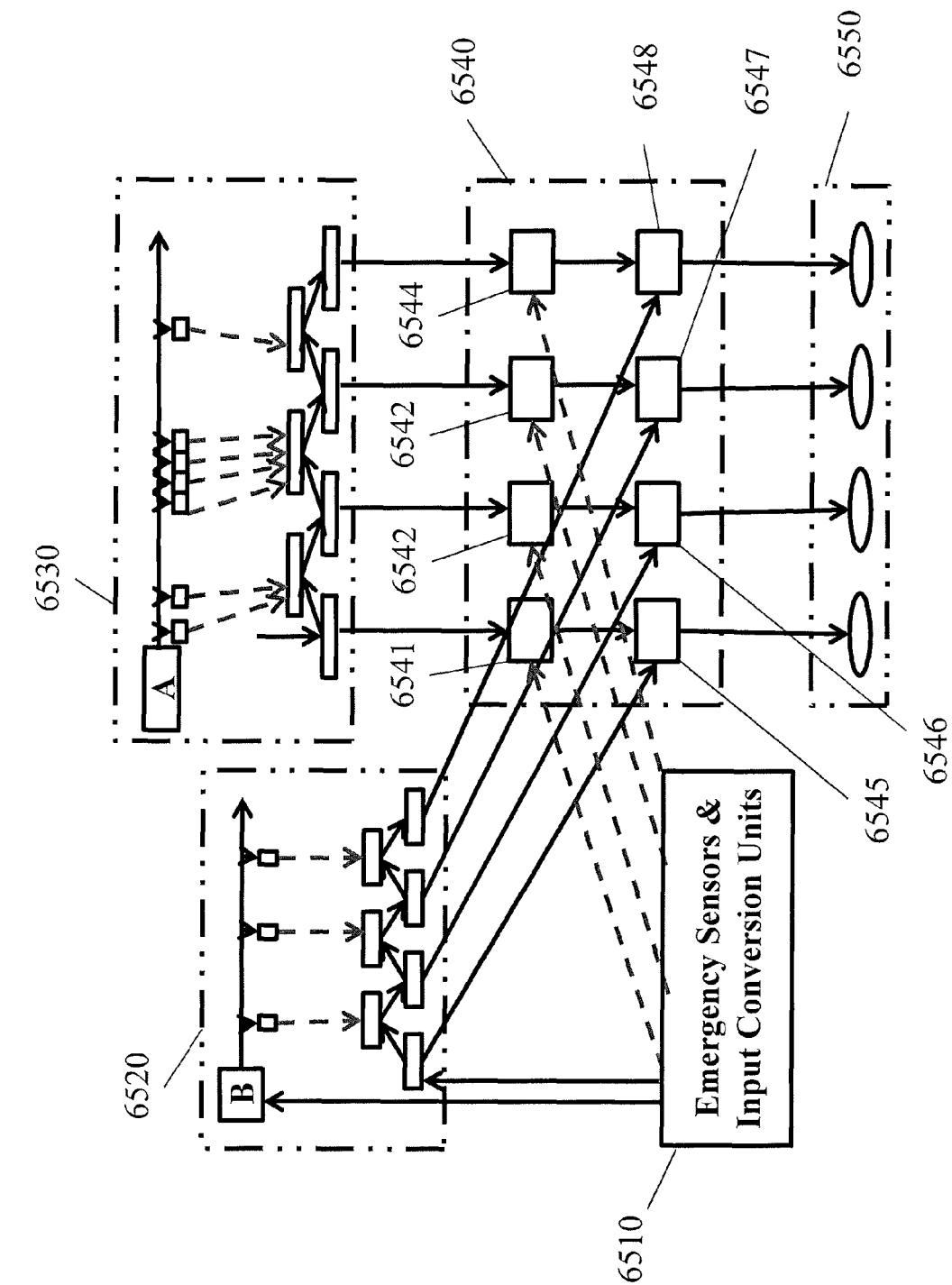
FIG. 65 depicts the emergency override of one composite movement mode by another through a junction 6500 in accordance with one or more embodiments.

FIG. 65 depicts the emergency override of one composite movement mode by another through a junction 6500 in accordance with one or more embodiments. The figure contains: an emergency sensor and sensor conversion unit 6510, which may be a balance sensor or local pain sensor; a composite movement mode associated with recovery from the emergency 6520; a composite movement mode in current operation 6530, a junction 6540, which comprises ganglites 6541, 6542, 6543, 6544 6545, 6546, 6547, and 6548; and an output control unit module 6550. The junction ganglite is of similar form to that of FIG. 13*b*. The movement mode 6530 may send its outputs through the junction, so that each ganglite output may pass through a pair of junction ganglites to the output conversion module. The emergency sensor may send depotentiating pulses to the first ganglite of each pair (6541, 6542, 6543, and 6544), so that the first ganglite may cease to fire. The emergency sensor may also send an initiation pulse to the composite movement mode associated with recovery. That composite movement mode may send its recovery pulse sequence and timing to the second ganglite of each ganglite pair (6545, 6546, 6547, and 6548) in the junction. Thus the emergency sensor substitutes its movement sequence for whatever sequence was previously controlling activity. One important challenge in autonomous systems is to enable local and emergency sensors to override movement modes quickly in the event that something unexpected is encountered. An unexpected event might include a loss of balance, a loss of footing, tactile inputs, or even an incoming projectile. Override may be accomplished by inserting override junctions immediately before the output conversion modules, so that all movement modes must go through these junctions.

Creation of Speech, Music, and Sequences of Sounds

Speech, music, and other sequences of sounds can be thought of as the sequencing and timing of phonemes, notes, and other actuator-induced products.

Composite movement modes may be applied to create sentences composed of timed and coordinated sequences of words, which can be thought of as timed and coordinated sequences of phonemes. Time sequence ganglites may also be used.

Figure 66:
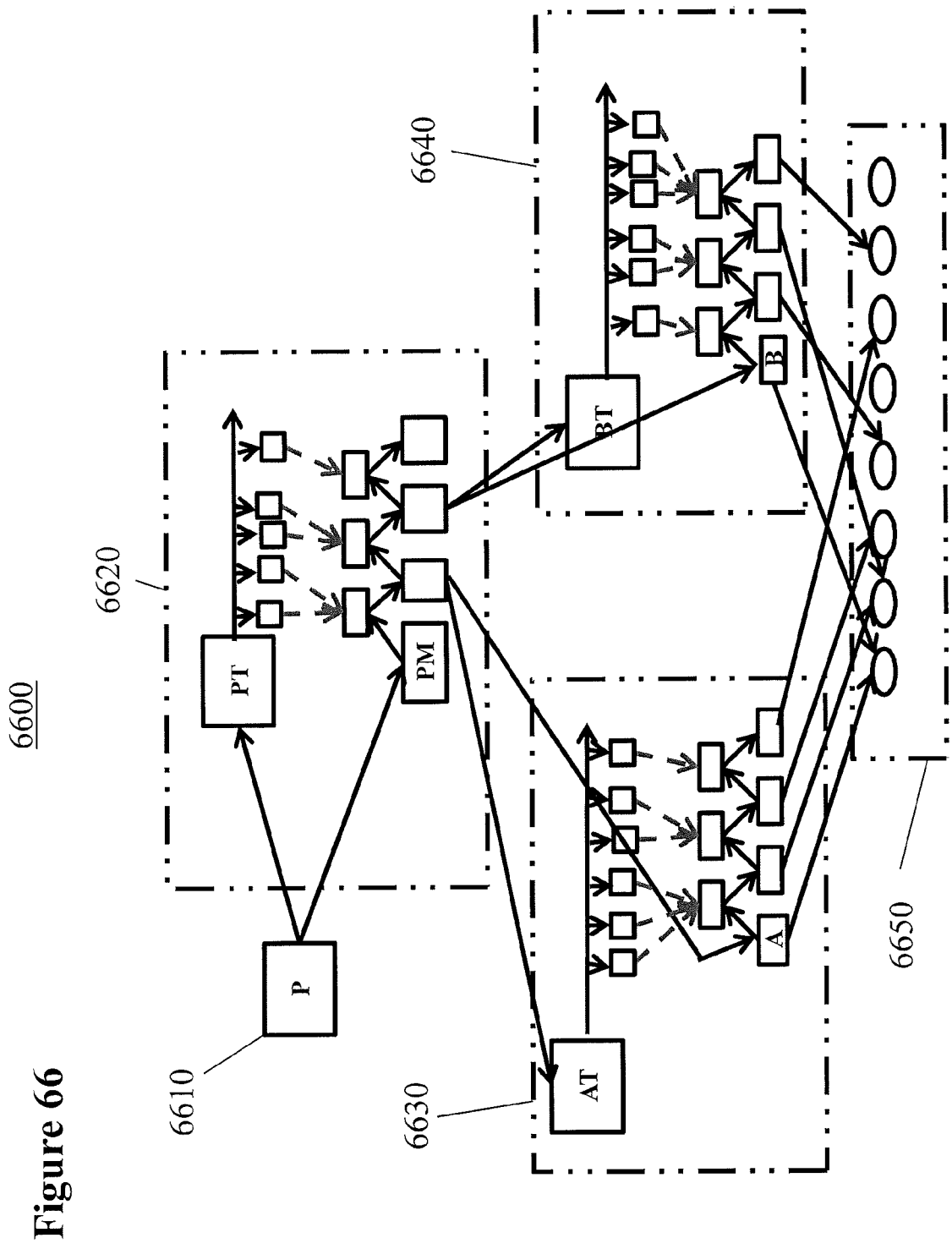
FIG. 66 displays composite movement modes that may be linked to form sequences of sounds 6600 in accordance with one or more embodiments.

FIG. 66 displays composite movement modes that may be linked to form sequences of sounds 6600 in accordance with one or more embodiments. The figure contains: an output conversion unit module 6650, composite movement modes 6630 and 6640 that can drive the output conversion module; a composite movement mode 6620 that times and sequences 6630 and 6640; and an initiator 6620. In the case of speech, the output conversion unit module may be thought of as containing various diaphragm and larynx muscles, the composite movement modes 6630 and 6640 may be thought of as movement and timing sequences for phonemes, and the composite movement mode 6620 may be thought of as the movement and timing sequence for a word or short phrase. A composite movement mode (not shown) that triggers 6620 and other composite movement modes at its level might be thought of as a mode that times and triggers longer phrases and sentences.

Figure 67:
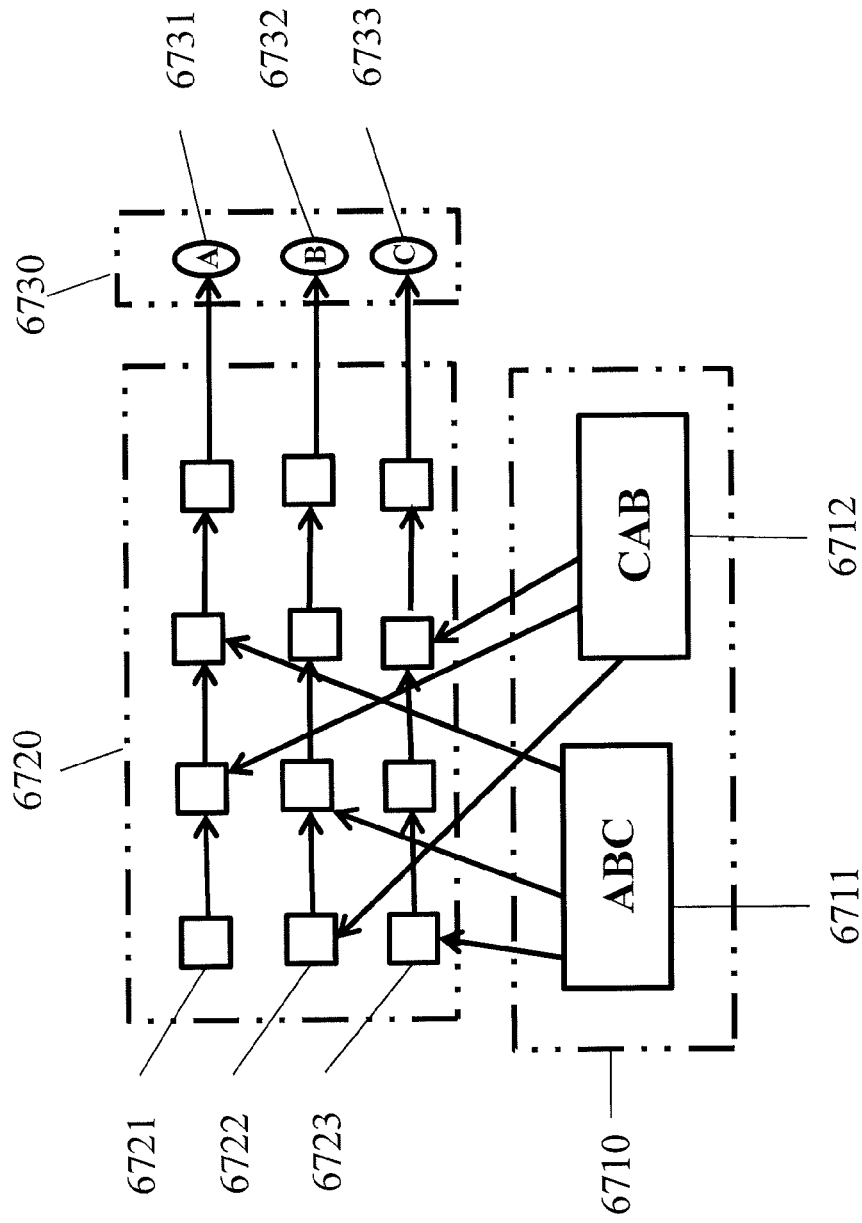
FIG. 67 displays sound sequence ganglites driving sound production 6700 in accordance with one or more embodiments.

An alternative approach to producing sequences of sounds involves the use of time sequence ganglites for which entry may be made at any point (see FIG. 14c). FIG. 67 displays sound sequence ganglites driving sound production 6700 in accordance with one or more embodiments. The figure contains a collection of time sequence ganglites 6720; output conversion unit module 6730; and sound sequence ganglite collection 6710. 6720 may contain one or more ganglite sequences 6721, 6722, and 6723, each with potential inputs at every ganglite in the sequence. The output conversion unit module may contain one or more output conversion units 6731, 6732, and 6733, which receive the outputs of sequences 6711, 6712 and 6713 respectively. 6710 may contain one or more ganglites 6711 and 6712. Ganglite 6711 may produce the sequence 6711-6712-6713 (ABC), and ganglite 6712 may produce the sequence 6713-6711-6712 (CAB). The sound sequences in the sound sequence collection may be thought of as "words." These "words" stimulate the collection of time sequence ganglites 6720 at different points in each time sequence to produce the right sounds in a specific order. The timing of the firing of the individual "word" ganglites is not shown in the figure. This approach may produce sequences of sound, music of a steady rhythm, and some speech. Timing may be incorporated by variable timing movement modes or other timing techniques of this patent.

Figure 68:
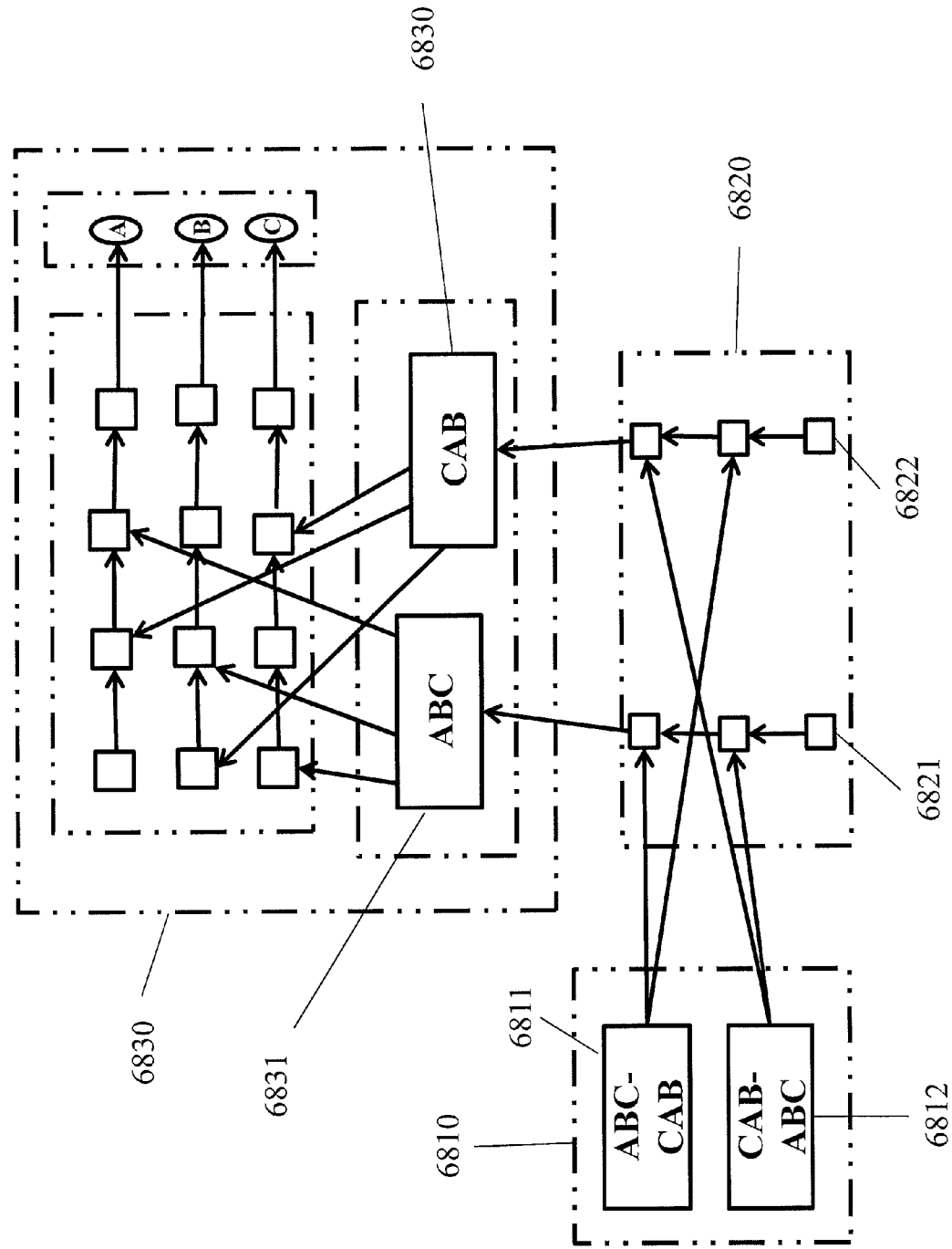
FIG. 68 depicts two layers of time sequence ganglites driving more complex words, phrases, and sounds 6800 in accordance with one or more embodiments.

FIG. 68 depicts two layers of time sequence ganglites driving more complex words, phrases, and sounds 6800 in accordance with one or more embodiments. The figure contains: a group of ganglites that drive the formation of phrases 6810; collection of time sequence ganglites 6820; and sound sequence ganglites driving sound production 6830. 6810 comprises one or more individual phrase sequences 6811 and 6812. 6820 contains one or more time sequence ganglite strings 6821 and 6822. 6830 contains one or more sound sequences 6831 and 6832 that drive sound production as shown in FIG. 67. Each phrase sequence (e.g., 6811) stimulates different time sequences (e.g. 6821 and 6822) simultaneously but at different ganglite points in the sequences, so that those ganglite strings stimulate the sound sequence ganglites (e.g. 6831 and 6832) at different times. Timing may be added by the techniques of this patent.

Ganglite Pathways

Pathways play a major role in autonomous neurite system behavior. They enable independent execution of behaviors, coordination of behaviors, and the complex interplay of behaviors based on external circumstance, controlled equipment state, neurite state, and neurite mood. This complex interplay may give the appearance of simple thinking. In addition, given sufficient neurite noise, this interplay may cause spontaneous behavior and give the appearance of free will. Pathways range from very simple to extremely complex. Complex pathways can enable complex and simultaneous behaviors of multiple parts of the controlled machine.

Any pathway segment (the connection between two ganglites) may be two-way, and may involve both excitation and inhibition both ways. That is, some neurites may be excited and others inhibited in either direction. In the following figures the dominant and most important pathways for excitation and inhibition may be shown for explanation of major behaviors. Others may be needed to refine, complete, or improve behaviors. Most of the ganglites, pathways, and junctions depicted may be designed in multiple ways and with multiple variations.

FIG. 69a depicts a simple pathway from sensor to controlled equipment 6900 in accordance with one or more embodiments. The figure contains a sensor 6911, sensor conversion unit 6912, sensor processing ganglite 6913, central processing ganglite 6915, output processing ganglite 6916, output conversion unit 6917, output actuator for controlled equipment 6918, and controlled equipment 6919.

In this and the following diagrams, the arrow from a sensor to a sensor conversion unit represents the flow of information. The arrows from output conversion units to actuators represents actuator instructions in whatever form the actuator needs, and the arrows from actuators to controlled equipment represents the control of the equipment by the actuator. All other arrows represent neurite and ganglite pathways.

The simplest neurite systems are composed of simple pathways that go from sensors through conversion and processing to conversion and output in this manner. In the most simple neurite systems, such paths may not need to interact, but as the neurite system may need to direct the attention and focus of sensor processing, as information from multiple sensors may need to be integrated, as the neurite system may need to control multiple components and equipments, as decisions may need to take into account conditions, mood, state, and memory, as controlled component and equipment (e.g., arm and leg) movements may need to be coordinated and operated in multiple modes (e.g., walk, trot, and run), these pathways may need to interact in complex ways and with complex feedback. FIG. 69a illustrates the important design feature that the control of controlled equipment may be based on processed sensor information.

FIG. 69b depicts a simple pathway from sensor to controlled equipment with multi-stage sensor processing 6930 in accordance with one or more embodiments. The figure is the same as that of FIG. 69a except that a second stage of sensor processing (6934) has been added, and feedback from the central processor (6935) to 6934, and feedback from the second stage (6934) to the first stage of sensor processing (6933) has been added. Such feedback may involve both excitory and inhibitory individual pathways. It may adjust the balance of dark and light (as might be done in a retinal system), or may strengthen or inhibit the total strength of the output, or may strengthen or inhibit some aspect of processing at a previous level. Although forward and backward paths in this example are shown as proceeding one step at a time, both forward and backward paths may also proceed two or more steps, and may cross pathways, as will be seen in later figures. FIG. 69b illustrates the important design features that feedback and multi-stage input processing may be needed to process sensor information.

FIG. 69c shows a simple creature with multiple pathways to provide more integrated control for controlled equipment 6950 in accordance with one or more embodiments. The figure contains: a sensor 6961, its sensor conversion unit 6962, ganglites 6963 and 6964 that provide two stages of sensor processing, a junction 6981, a central processor 6982, an output processing ganglite 6966 for the controlled equipment, output conversion unit 6967, actuator 6968 for the controlled equipment, and controlled equipment 6969. The figure also contains a control pathway for sensor movement (perhaps to control sensor field of view) that comprises an output processor 6977, an output conversion unit 6978, and an actuator for sensor movement 6979. The figure also contains sensors (perhaps pressure or touch sensors) 6971 for the controlled equipment, a sensor conversion unit 6972 for these sensors, a ganglite for a first stage of sensor processing 6973, and a ganglite for a second stage of sensor processing 6974. As before, arrows in the figure outside the sensor conversion units and output conversion units represent flows if information and control. Arrows within sensor conversion units and output conversion units represent neurite and ganglite pathways. FIG. 69c illustrates several additional and important neurite creature design features: controlled equipment may have additional sensors (6971) for refined and fine control; these sensors may be integrated (at 6981) with its other sensors (6961) for better overall control under a variety of circumstances; and sensors, whenever possible, may be treated and controlled as controlled equipment.

Figure 70:
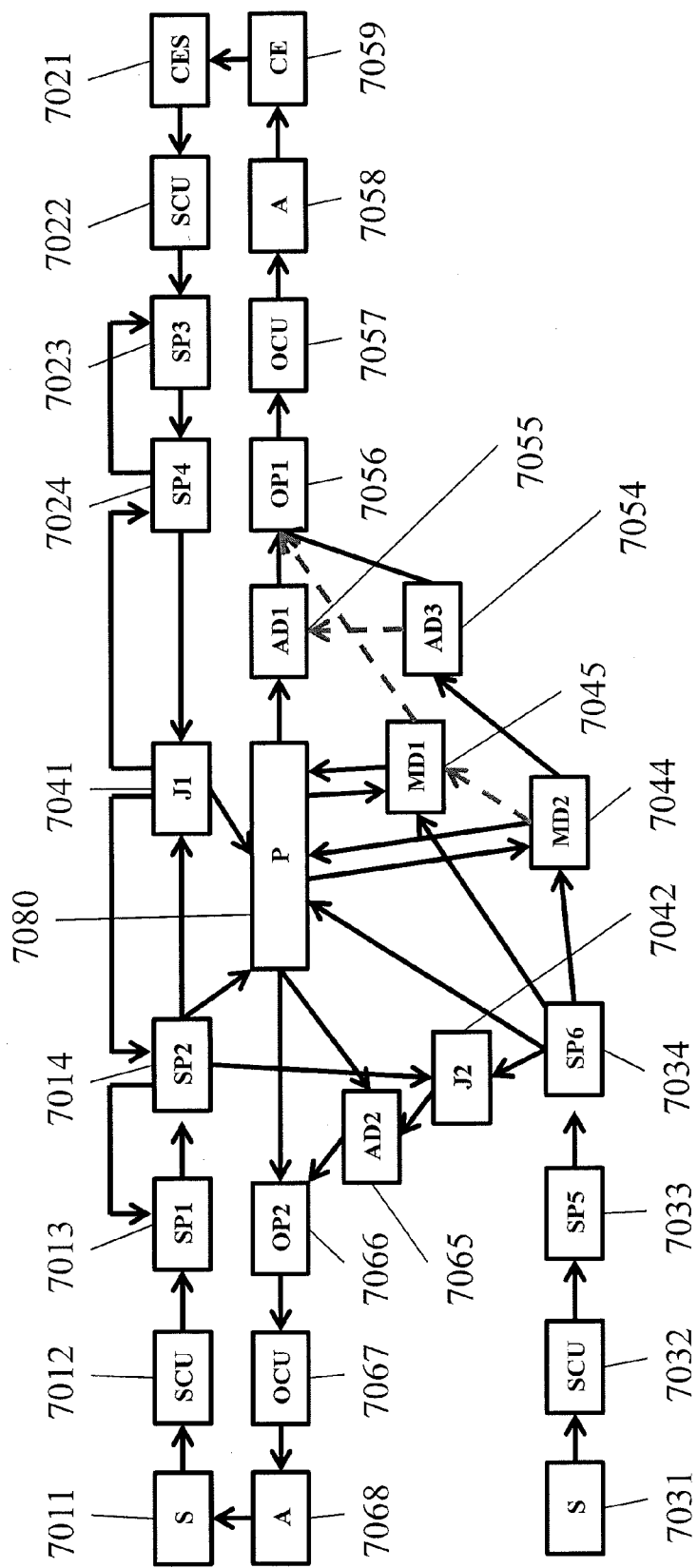
FIG. 70 shows a simple creature with additional sensors, moods, and pathways to provide richer behavior 7000 in accordance with one or more embodiments.

FIG. 70 shows a simple creature with additional sensors, moods, and pathways to provide richer behavior 7000 in accordance with one or more embodiments. To FIG. 69c the figure adds: sensor 7031, sensor conversion unit 7032, sensor processing units 7033 and 7034, ganglite junction 7042, sensor integration and control unit 7065, mood 7044, mood 7045, sensor movement integration ganglite 7065, controlled equipment movement mode 7054, and controlled movement mode 7055. To imagine the new behaviors of this simple creature, imagine that: controlled equipment comprises limbs that control locomotion; sensor 7011 is sight; sensor 7021 is an internal sensor for position of the locomotion limbs; sensor 7031 is sound; sensor processing ganglite 7033 is a first stage of sound processing; sensor processing ganglite 7034 is a second stage of sound processing; junction ganglite 7043 integrates sight and sound, perhaps to assist in the control of eye movement; ganglite 7065 integrates multiple inputs to control eye movement; mood 7045 is a low state of fear that freezes movement; 7044 is a high fear state that causes the creature to flee; ganglite 7055 provides normal movement mode; and ganglite 7054 provides a rapid running movement mode. Imagine that 7034 contains a rate-sensitive ganglite that sends low sensor amplitude signals to 7042 and the central processor 7080; sends medium sensor amplitude signals to the freeze mood ganglite 7045 and the central processor, and sends high sensor amplitude signals to the flee state ganglite 7044 and the central processor. Imagine that the low fear state freezes movement by suppressing 7056. Imagine that the high fear state 7044 suppresses the low fear mood 7045. Imagine that the rapid movement mode 7054 suppresses the normal movement mode 7055. Then this creature will behave normally, coordinating sound to help control eye movement until a loud sound causes it to freeze movement in a fear state or a very loud sound causes it to flee. The central processor may provide persistent loops and controls to return it to a normal state in time. This is still a very simple and unsophisticated creature. It only controls simple movement with a single actuator; it lacks internal sensors and drives associated with wellness or mission; and many important fine control pathways have been simplified or omitted.

Moods are important to give a creature one or several missions or drives, to enable it to make decisions as to when other circumstances interfere with or change missions, and it enables the creature to avoid becoming stuck in a state where immediate circumstances dictate its next action in a mechanical way. (As a very simple example, imagine a creature without a sense of satiety. It might never leave a food source to explore for other sources. A creature without a fear state might stop forever, or flee forever.)

Figure 71:
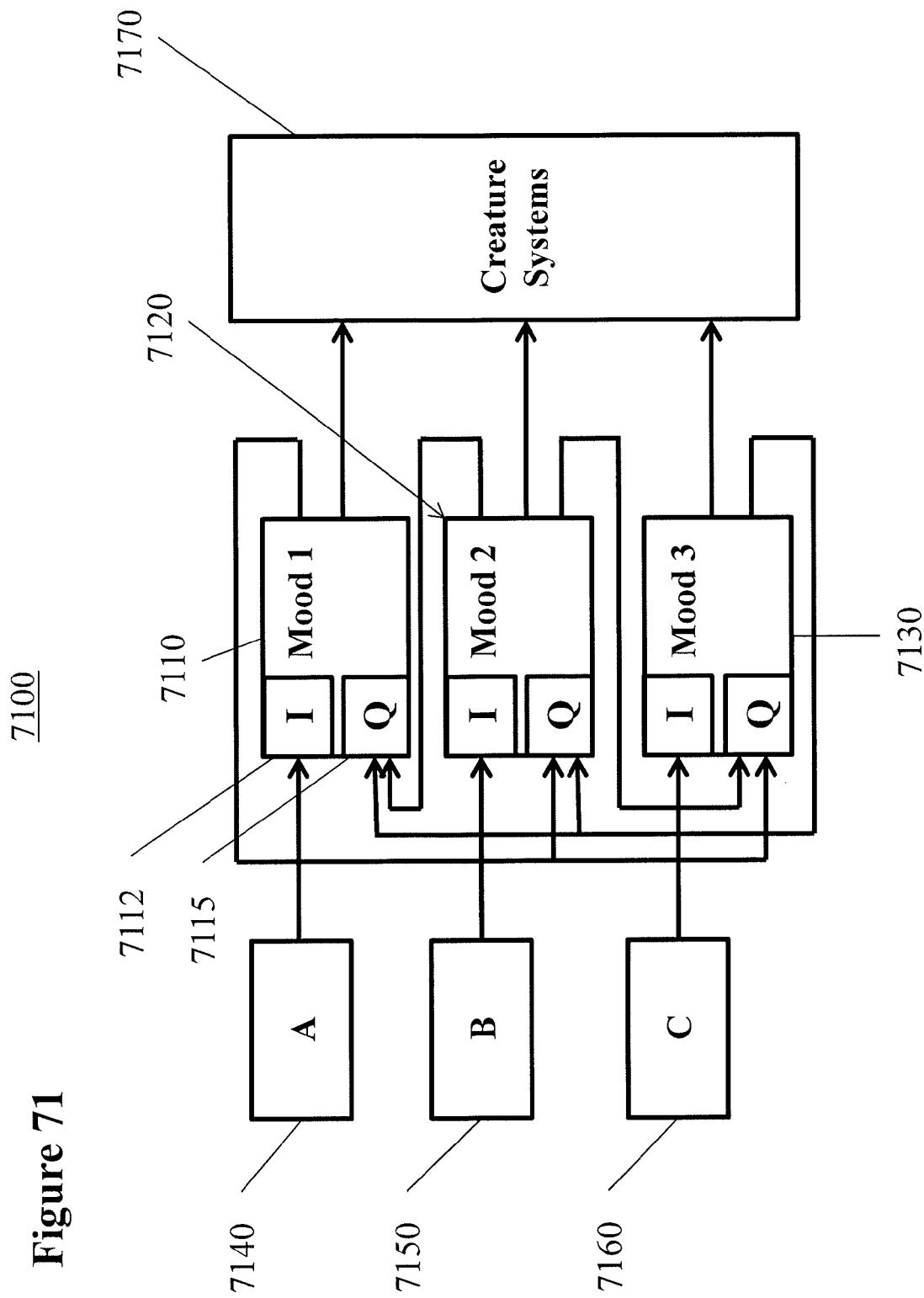
FIG. 71 shows three persistent and mutually suppressive mood ganglites 7100 in accordance with one or more embodiments.

FIG. 71 shows three persistent and mutually suppressive mood ganglites 7100 in accordance with one or more embodiments. The figure contains persistent state mood ganglites 7110, 7120, and 7130, external initiating ganglites 7140, 7150, and 7160 that may initiate them respectively, and other creature systems 7170. 7110 is a persistent state ganglite in the form of FIG. 15a, with internal initiating ganglite 7112 and internal terminating ganglite 7115, and an output to other creature systems. 7120 and 7130 are persistent mood ganglites in the same form, also containing internal initiating and terminating ganglites, and also providing neurite outputs to other creature systems. Each persistent state ganglite may be initiated externally by a ganglite, and each persistent state ganglite may quench the other persistent stage ganglites, so that, unless the external ganglites are firing, the entire system may exist in one persistent state, and the other creature systems will receive inputs from only one of the persistent states. Any number of such persistent state or mood ganglites may be added with any interactive logic, so that one or many may be active at any time. The external initiating ganglites may fire as a result of processed sensory inputs (e.g., low fuel, danger), as a result of sensory pattern recognition interacting with previously formed concepts, or as a result of any neurite creature processing. The persistent states may represent moods or drives, and may cause profound sensitization and desensitization of neurites across the neurite system.

Decision hierarchies are an important means by which neurites and ganglites may be used to control how a neurite system will behave under different external conditions, controlled equipment states, internal neurite states, and neurite moods. FIG. 72a depicts a simple sensory decision hierarchy 7200 in accordance with one or more embodiments. The figure contains: ganglite 7210, ganglite 7220; and ganglite 7230. 7210 and 7220 each provide positive stimulation to 7230. 7230 provides negative feedback to 7210 and 7220. 7210 also provides negative stimulation to 7220. This enables 7230 to extend the dynamic range of both 7210 and 7220. It also enables more complex dynamic behavior. For example, if 7210 and 7220 represent sensor inputs from different sensors, and 7220 predominates at all ranges, but 7210 provides more useful inputs at short ranges, then 7210 will take over control of 7230 when it begins to fire with even moderate rates. If 7210 is antenna touch, 7220 is sense of smell, and 7230 is an integrating ganglite, then smell may override the firing of random touch inputs at long range, and stronger touch inputs may override smell to control the creature at short range. The interactions of ganglites 7014, 7024, and 7041 of FIG. 70 may be of this form.

Decision hierarchies of arbitrary complexity are possible. FIG. 72b displays a decision hierarchy involving four ganglites 7250 in accordance with one or more embodiments. The figure contains ganglite 7270, which may be a muscle ganglion that drives creature movement; and a decision hierarchy 7260. The decision hierarchy comprises: 7261, which may indicate that the creature is "full" or sated; ganglite 7262, which may be the result of decision hierarchy 7200 that integrates inputs from senses of touch and smell; ganglite 7263 that may drive the muscle ganglion 7270 towards remembered food memory locations; and ganglite 7264, that may drive the muscle ganglion with random searches. This decision hierarchy produces somewhat realistic behavior in a very simple creature:

If 7261 (FUL) is active, 7262 (INT) and 7263 (DIR) may be suppressed, and 7264 (random search ganglite SEA) may drive the muscle ganglite 7270 to cause the system to search randomly. If 7261 is not active:

If 7262 (INT) is active, it may suppress 7263 and 7264, and may cause the muscle ganglite 7270 to take the system towards whatever is touched or smelled. If 7261 and 7262 are both not active (creature "full" and nothing is touched or smelled):

If 7263 (which receives inputs from memories of food) is active, it will drive 7270 to take the system towards remembered food locations. If 7263 is also not active, 7264 will cause the system to search randomly The above oversimplifies potential states of the neurite system, because all neurites may fire, and there may be intermediate cases where the neurite system dithers between search and memory, or search and detected smell.

Figure 73:
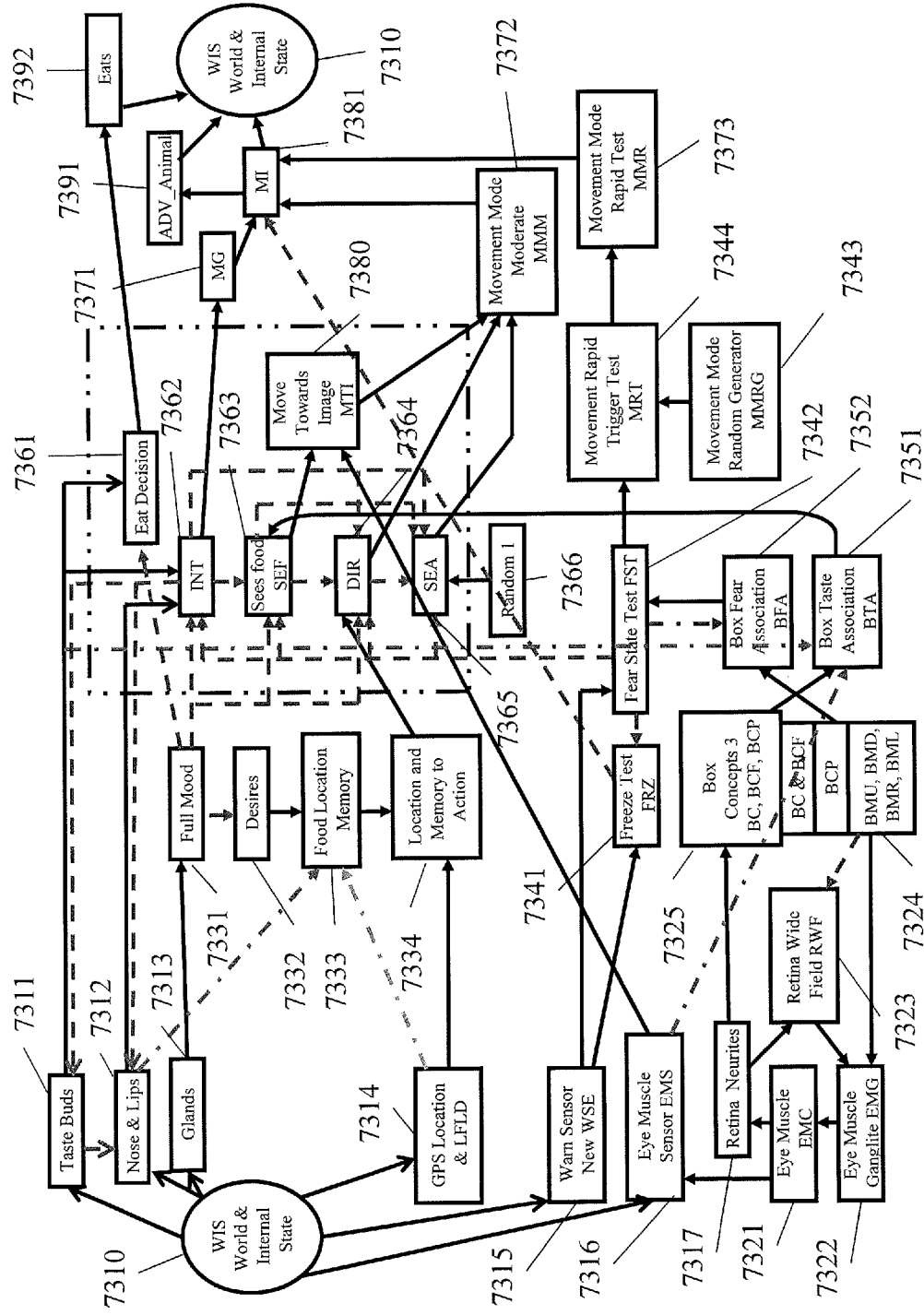
FIG. 73 depicts a simple neurite system with multiple sensory inputs, multiple internal states and moods triggered by internal and external sensors, and multiple controlled equipments, some of which control sensor movement 7300, in accordance with one or more embodiments.

FIG. 73 depicts a simple neurite system with multiple sensory inputs, multiple internal states and moods triggered by internal and external sensors, and multiple controlled equipments, some of which control sensor movement 7300, in accordance with one or more embodiments. The figure contains: the non-neurite environment 7310 that includes the external environment and controlled equipment state; external sensors 7311, 7312, 7313, 7314, and 7315; internal sensor 7316; eye muscle 7321 and eye muscle ganglite 7322; retina wide field processor 7323; box concept movement mode ganglites 7324 and box concept ganglite structure 7325; ganglites for fullness mood 7331, desires 7332, memory location field 7333, and location to action decisions 7334; a freeze state 7341 and fear state 7342; a random movement generator 7343, a movement mode trigger ganglite 7344; box concept association areas for food 7351 and fear 7352; eating decision ganglite 7361; decision hierarchy ganglites 7362, 7363, 7364, and 7365; random generator 7366; muscle ganglite 7371; moderate movement mode ganglite 7372; rapid movement mode ganglite 7373; move toward image decision ganglite 7380; muscle ganglite integrator 7381; output conversion unit to advance creature position in the world 7391, and output conversion unit for eating food 7392.

This asynchronous neurite system (Creature 9) has a simple warning sensor, and simple processes for vision, visual processing that can detect pre-existing concepts. It can, learn food locations, drive eye muscles to move the eye and drive the creature towards what it sees. Its warning sensor activates multiple fear states 7341 (freeze) and 7344 (flee) that trigger appropriate behaviors. Note the complexity of the decision hierarchy that emerges. Because most sensor and mood information feeds into it, it is best termed an attention and control structure. Note that not all decisions are integrated into a single, overall logical structure. For example, the decision to eat is independent of the remainder of the structure. The integration of sensor, mood, and activity ganglites is a design choice, and different choices will produce different results.

The decision hierarchy ganglites 7362, 7363, 7364, and 7365, which emerge in the process of creating survival behavior, may be thought of as a simple awareness and control module, because collectively they receive key sensory inputs and control key muscular outputs.

Some points to note are that not all behavior needs to be centrally controlled in the decision hierarchy (eating and eye muscle movement are not), not all sensory information and moods need to feed awareness (attention and control decision hierarchy), and emergency processes and coordination processes may bypass awareness for speed. Note that all ganglites and structures may be active at once, and that the relative strengths of neurite firing, (which is fed in part by noise in the individual neurites), rather than deterministic logic, may determine system behavior.

Figure 74:
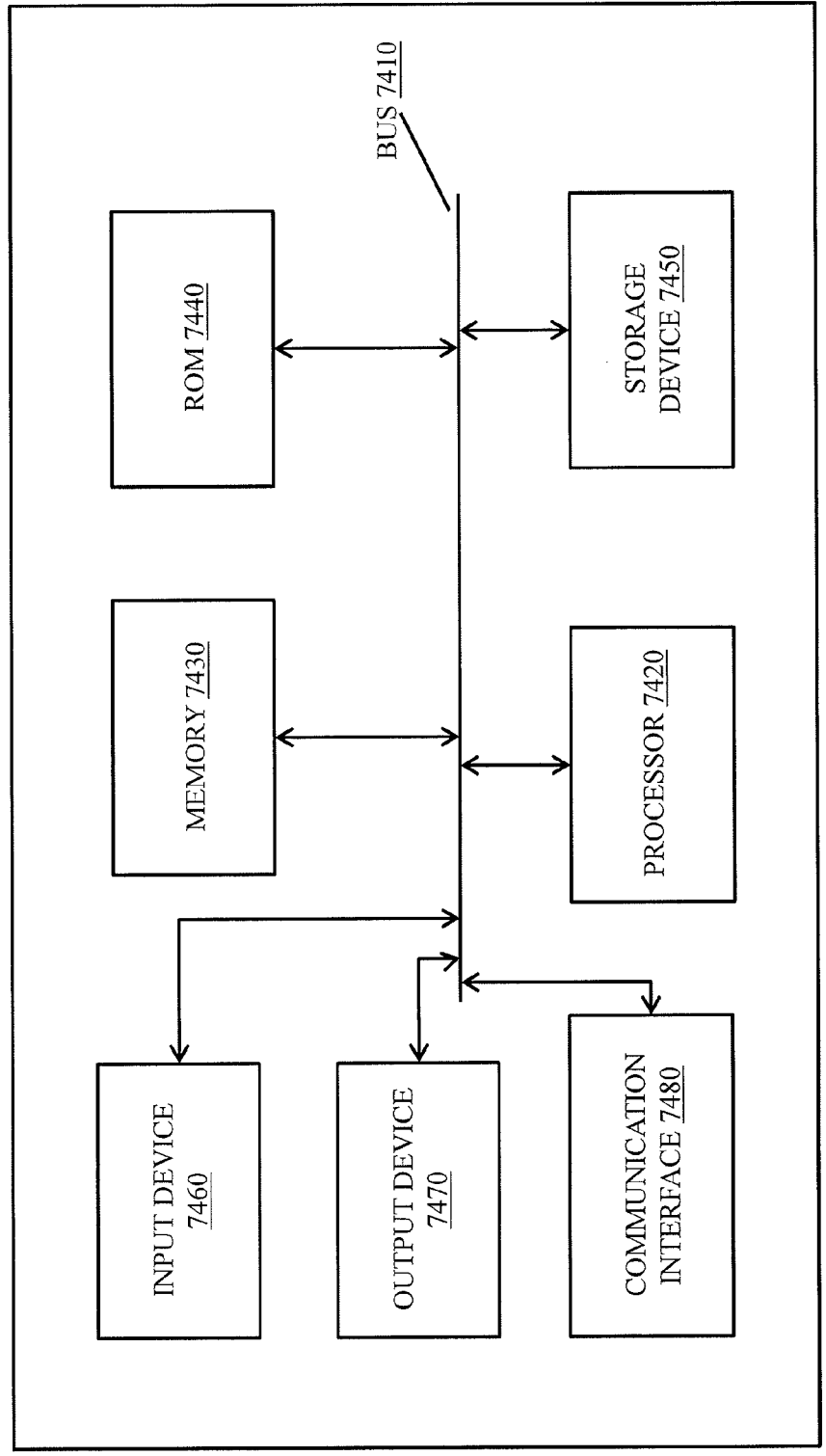
FIG. 74 depicts an exemplary architecture for implementing a computing device in accordance with one or more embodiments.

FIG. 74 depicts an exemplary architecture for implementing a computing device 7400 in accordance with one or more embodiments, which may be used to implement any computing device, or any other computer system or computing device component thereof. It will be appreciated that other devices that can be used with the computing device 7400, such as a client or a server, may be similarly configured. As illustrated in FIG. 74, computing device 7400 may include a bus 7410, a processor 7420, a memory 7430, a read only memory (ROM) 7440, a storage device 7450, an input device 7460, an output device 7470, and a communication interface 7480.

Bus 7410 may include one or more interconnects that permit communication among the components of computing device 7400. Processor 7420 may include any type of processor, microprocessor, or processing logic that may interpret and execute instructions (e.g., a field programmable gate array (FPGA)). Processor 7420 may include a single device (e.g., a single core) and/or a group of devices (e.g., multi-core). Memory 7430 may include a random access memory (RAM) or another type of dynamic storage device that may store information and instructions for execution by processor 7420. Memory 7430 may also be used to store temporary variables or other intermediate information during execution of instructions by processor 7420.

ROM 7440 may include a ROM device and/or another type of static storage device that may store static information and instructions for processor 7420. Storage device 7450 may include a magnetic disk and/or optical disk and its corresponding drive for storing information and/or instructions. Storage device 7450 may include a single storage device or multiple storage devices, such as multiple storage devices operating in parallel. Moreover, storage device 7450 may reside locally on the computing device 7400 and/or may be remote with respect to a server and connected thereto via network and/or another type of connection, such as a dedicated link or channel.

Input device 7460 may include any mechanism or combination of mechanisms that permit an operator to input information to computing device 7400, such as a keyboard, a mouse, a touch sensitive display device, a microphone, a pen-based pointing device, and/or a biometric input device, such as a voice recognition device and/or a finger print scanning device. Output device 7470 may include any mechanism or combination of mechanisms that outputs information to the operator, including a display, a printer, a speaker, etc.

Communication interface 7480 may include any transceiver-like mechanism that enables computing device 7400 to communicate with other devices and/or systems, such as a client, a server, a license manager, a vendor, etc. For example, communication interface 7480 may include one or more interfaces, such as a first interface coupled to a network and/or a second interface coupled to a license manager. Alternatively, communication interface 7480 may include other mechanisms (e.g., a wireless interface) for communicating via a network, such as a wireless network. In one implementation, communication interface 7480 may include logic to send code to a destination device, such as a target device that can include general purpose hardware (e.g., a personal computer form factor), dedicated hardware (e.g., a digital signal processing (DSP) device adapted to execute a compiled version of a model or a part of a model), etc.

Computing device 7400 may perform certain functions in response to processor 7420 executing software instructions contained in a computer-readable medium, such as memory 7430. In alternative embodiments, hardwired circuitry may be used in place of or in combination with software instructions to implement features consistent with principles of the disclosure. Thus, implementations consistent with principles of the disclosure are not limited to any specific combination of hardware circuitry and software.

Exemplary embodiments may be embodied in many different ways as a software component. For example, it may be a stand-alone software package, a combination of software packages, or it may be a software package incorporated as a "tool" in a larger software product. It may be downloadable from a network, for example, a website, as a stand-alone product or as an add-in package for installation in an existing software application. It may also be available as a client-server software application, or as a web-enabled software application. It may also be embodied as a software package installed on a hardware device.

Numerous specific details have been set forth to provide a thorough understanding of the embodiments. It will be understood, however, that the embodiments may be practiced without these specific details. In other instances, well-known operations, components and circuits have not been described in detail so as not to obscure the embodiments. It can be appreciated that the specific structural and functional details are representative and do not necessarily limit the scope of the embodiments.

It is worthy to note that any reference to "one embodiment" or "an embodiment" means that a particular feature, structure, or characteristic described in connection with the embodiment is included in at least one embodiment. The appearances of the phrase "in one embodiment" in the specification are not necessarily all referring to the same embodiment.

Although some embodiments may be illustrated and described as comprising exemplary functional components or modules performing various operations, it can be appreciated that such components or modules may be implemented by one or more hardware components, software components, and/or combination thereof. The functional components and/or modules may be implemented, for example, by logic (e.g., instructions, data, and/or code) to be executed by a logic device (e.g., processor). Such logic may be stored internally or externally to a logic device on one or more types of computer-readable storage media.

Some embodiments may comprise an article of manufacture. An article of manufacture may comprise a storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of storage media include hard drives, disk drives, solid state drives, and any other tangible storage media.

It also is to be appreciated that the described embodiments illustrate exemplary implementations, and that the functional components and/or modules may be implemented in various other ways which are consistent with the described embodiments. Furthermore, the operations performed by such components or modules may be combined and/or separated for a given implementation and may be performed by a greater number or fewer number of components or modules.

Some of the figures may include a flow diagram. Although such figures may include a particular logic flow, it can be appreciated that the logic flow merely provides an exemplary implementation of the general functionality. Further, the logic flow does not necessarily have to be executed in the order presented unless otherwise indicated. In addition, the logic flow may be implemented by a hardware element, a software element executed by a processor, or any combination thereof.

While various exemplary embodiments have been described above, it should be understood that they have been presented by way of example only, and not limitation. Thus, the breadth and scope of the present disclosure should not be limited by any of the above-described exemplary embodiments, but should instead be defined only in accordance with the following claims and their equivalents.

The invention claimed is:

1. A neurite comprising:
an input section configured to:
receive an input voltage, and
amplify the input voltage by a weight into a weighted voltage rate-of change;
a firing center comprising an existing instantaneous voltage and a trigger firing voltage, wherein the firing center is configured to, in a period of time:
receive the weighted voltage rate-of-change,
determine a new instantaneous voltage based on the existing instantaneous voltage, the weighted voltage rate-of-change, and the period of time,
transmit a pulse trigger to an output section when the new instantaneous voltage rises to or above the trigger firing voltage, and
reset the new instantaneous voltage to zero or some other predefined value; and
the output section configured to receive the pulse trigger and transmit an output voltage pulse having a finite duration to one or more branches.

2. The neurite of claim 1, wherein the input section is further configured to receive the input voltage from a source, and the source comprises at least one of another neurite, a sensor conversion unit, or a sensor.

3. The neurite of claim 2, wherein the neurite fires only if its input fires voltage pulses at a frequency above a critical threshold frequency.

4. The neurite of claim 2, wherein the neurite is implemented by at least one of hardware or software implemented by one or more computing devices.

5. The neurite of claim 1, wherein the firing center is further configured to not transmit a pulse trigger for at least as long as a dead time starting immediately after firing.

6. The neurite of claim 1, wherein the firing center is further configured to have internal voltage noise.

7. The neurite of claim 6, wherein the firing center is further configured to:
transmit the pulse trigger in response to internal noise causing the new instantaneous voltage to rise to or above the trigger firing voltage with or without input voltages.

8. The neurite of claim 1, wherein the firing center is further configured to have an internal voltage decay rate.

9. The neurite of claim 1, wherein the input section is further configured to:
receive a plurality of input voltages from a plurality of sources;
provide each input source with its own corresponding weight; and
determine the weighted voltage rate-of-change from the plurality of input voltages and corresponding weights.

10. The neurite of claim 9, wherein at least one of plurality of input voltages is received from at least one of another source comprising at least one of another neurite, a sensor conversion unit, or a sensor.

11. The neurite of claim 10 further comprising:
a learning module configured to:
receive stimulation from another source comprising a neurite or a non-neurite source;
remain stimulated for a second duration during which the learning module modifies the weight by which the input voltage is weighted.

12. The neurite of claim 11, wherein the weight remains modified after the second duration.

13. The neurite of claim 12, wherein the weight modification may be for individual sources that provide one or multiple positive input voltage pulses while the learning module is stimulated.

14. The neurite of claim 13, wherein no weight modification may take place for individual sources that do not provide one or multiple positive input voltage pulses while the learning module is stimulated.

15. The neurite of claim 13, wherein the weight modification may be for individual voltage sources that pulse at or above a critical threshold frequency while the learning module is stimulated.

16. The neurite of claim 12, wherein the neurite is implemented by at least one of hardware or software implemented by one or more computing devices.

17. The neurite of claim 9, wherein the neurite may fire if two or more inputs each fire voltage pulses at frequencies above their critical threshold frequencies.

18. The neurite of claim 9, wherein negatively weighted inputs may cause variable time delay in the firing caused by positively weighted inputs.

19. The neurite of claim 9, wherein the neurite is implemented by at least one of hardware or software implemented by one or more computing devices.

20. The neurite of claim 1, wherein the firing center further comprises at least one of:
a minimum voltage, wherein the new instantaneous voltage cannot fall below the minimum voltage; or
a maximum voltage, wherein the new instantaneous potential cannot rise above the maximum voltage.

21. The neurite of claim 20, wherein a negative minimum voltage may permit negatively weighted inputs to cause variable time delay in the firing caused by positively weighted inputs.

22. The neurite of claim 1 further comprising:
a learning module configured to:
receive stimulation from another source;
remain stimulated for a second duration during which the learning module modifies the weight by which the input voltage is weighted.

23. The neurite of claim 22, wherein the another source is at least one of a neurite or a non-neurite source.

24. The neurite of claim 22, wherein the weight remains modified after the second duration.

25. The neurite of claim 24, wherein the weight modification may be for individual sources that provide one or multiple positive input voltage pulses while the learning module is stimulated.

26. The neurite of claim 25, wherein no weight modification may take place for individual sources that do not provide one or multiple positive input voltage pulses while the learning module is stimulated.

27. The neurite of claim 25, wherein the weight modification may be for individual voltage sources that pulse at or above a critical threshold frequency while the learning module is stimulated.

28. The neurite of claim 24, wherein the neurite is implemented by at least one of hardware or software implemented by one or more computing devices.

29. The neurite of claim 1, wherein the weight varies monotonically along the input section.

30. The neurite of claim 1, wherein the input voltage may be blocked at a junction between an input and the neurite by a pulse from the output section of another neurite.

31. The neurite of claim 1, wherein the output voltage pulse transmission of the output section may be blocked by an output pulse of another neurite.

32. The neurite of claim 1, wherein the neurite is implemented by at least one of hardware or software implemented by one or more computing devices.

33. A ganglite comprising:
a plurality of neurites according to claim 1.

34. The ganglite of claim 33, wherein the ganglite is configured to operate as a relay or a junction.

35. The ganglite of claim 33, wherein the ganglite is configured to operate as a time sequence or as a time sequence concatenated with other time sequences.

36. The ganglite of claim 33, wherein the ganglite is configured to operate in a persistent state or in a semi-persistent state.

37. The ganglite of claim 33, wherein the ganglite is configured to operate as a continuous activity generator or a continuous sequence generator.

38. The ganglite of claim 33, wherein the ganglite is configured to operate as a variable time delay, a timing set, or a controlled timing sequence having variable time delays.

39. The ganglite of claim 33, wherein the ganglite is configured to perform pseudo-logic operations or composite pseudo-logic operations.

40. The ganglite of claim 33, wherein the ganglite is configured to operate as a random behavior generator.

41. The ganglite of claim 33, wherein the ganglite is configured to operate as a direct or an indirect single output ganglite.

42. The ganglite of claim 33 further comprising a learning association area or a learning association ganglite for concept association.

43. The ganglite of claim 33, wherein the ganglite is configured to operate as a learning association ganglite only for high-rate inputs above its threshold rate.

44. The ganglite of claim 43, wherein the ganglite is configured to operate as a learning association ganglite at least one of with one or more learning cues or without one or more learning cues.

45. The ganglite of claim 33, wherein the ganglite is configured to operate as a rate-selective channel separation ganglite.

46. The ganglite of claim 33, wherein the ganglite is configured to operate as a field in which position carries information.

47. The ganglite of claim 33, wherein the ganglite is configured to operate as a field that combines or processes other fields.

48. The ganglite of claim 33, wherein the ganglite is configured to operate as an input comparator.

49. The ganglite of claim 33, wherein the ganglite is configured to operate as a detector of change and motion.

50. A pattern matching structure that recognizes patterns from complete or incomplete patterns, the structure comprising:
a plurality of ganglites according to claim 33,
wherein the pattern matching structure operates simple feedback, rate-selective channel separation based feedback, or association area feedback.

51. A pattern matching structure comprising:
an ensemble of ganglites according to claim 33,
wherein the structure recovers weak, corrupted, and incomplete patterns through feedback to its inputs.

52. A pattern matching structure comprising:
a plurality of ganglites according to claim 33,
wherein the pattern matching structure is configured for time sequence pattern matching.

53. A long-term memory structure comprising:
a plurality of ganglites according to claim 33,
wherein ganglite firing patterns are configured to be stored and recognized.

54. A long-term memory structure comprising:
a plurality of ganglites according to claim 33,
wherein ganglite field firing patterns are configured to be stored, recognized, and retrieved multiply or in single output mode.

55. A reciprocal long-term memory structure comprising:
a plurality of ganglites according to claim 33,
wherein ganglite firing patterns are configured to be stored, recognized, and retrieved, and wherein composite patterns stimulate their constituent component patterns.

56. A reciprocal concept field structure comprising:
a plurality of ganglites according to claim 33,
wherein inputs from ganglites and sensors may be received and processed, stored; reciprocal memories may be formed, stored, recognized, and retrieved; memories and patterns may trigger the firing of other memories and patterns; and outputs may be sent to other ganglites and reciprocal concept field structures.

57. Movement modes comprising:
ensembles of ganglite according to claim 33 that form:
   variable timing movement modes,
   composite movement modes comprising variable timing movement modes and timing set ganglites,
   concatenations of composite movement modes, and
   composite movement modes that may be linked to form sequences of sounds.

58. A plurality of ganglites according to 33 comprising:
one or a plurality of pathways that may have beginnings, ends, or contain closed loops,
wherein multiple pathways may reinforce, suppress, interact with, or remain independent of one another.

59. A neurite system comprising:
one or more sensor conversion units, wherein each of the sensor conversion units are configured to:
   receive inputs from an external environment and controlled equipment,
   create pulses based on the received inputs, and
   provide the pulses to a neurite core;
the neurite core comprising a plurality of neurites, wherein the neurite core is configured to:
   receive the pulses from the one or more sensor conversion units,
   transmit the pulses to one or more other neurites in the neurite core,
   create second pulses based on pulses received from sensor conversion units and other neurites in the neurite core, and
   transmit the second pulses to one or more output conversion units; and
the one or more output conversion units configured to:
   receive the second pulses from neurites in the neurite core, and
   provide output signals to one or more output devices.

60. The neurite system of 59, wherein any neurite in the neurite core is capable of providing pulses to any neurite in the neurite core.

61. The neurite system of 59, wherein any neurite in the neurite core may fire asynchronously.

62. The neurite system of 59, wherein any number of neurites may be active in any number of ganglites or ganglite structures at any time.

63. The neurite system of 59, wherein input data and neurite system activities occur continuously for long periods of time rather than on specific and sporadic data sets.

64. A method of processing input voltages, the method comprising:
receiving, by an input section, an input voltage;
amplifying, by the input section, the input voltage by a weight into a weighted voltage rate of change;
receiving a weighted voltage rate-of-change by a firing center, the firing center comprising an existing instantaneous voltage and a trigger firing voltage;
determining, by the firing center in any period of time, a new instantaneous voltage based on the existing instantaneous voltage, the weighted voltage rate-of-change, and the period of time;
transmitting, by the firing center, a pulse trigger to an output section when the new instantaneous potential rises to or above the trigger firing voltage;
resetting, by the firing center, the new instantaneous voltage to zero or a preset value; and
receiving, by an output section, the pulse trigger, and
transmitting, by the output section, an output voltage pulse for a finite duration to one or more branches.

65. The method of claim 64, wherein the firing center is configured not to transmit a pulse trigger for at least a dead time starting immediately after the last pulse trigger.

66. The method of claim 64, wherein the input voltage is amplified into a negatively weighted voltage, the instantaneous voltage of the firing center to falls below zero, and the firing center subsequently operates with other inputs.

67. A method of local weight modification in elements that amplify input voltages by weights, through the use of a learning module associated with an element, the method comprising:
receiving, by the learning module associated with the element, a stimulation from another source;
remaining stimulated for a time duration during which the learning module causes or enables weights to be modified; and
modifying the weight assigned to input voltages by the element that amplifies the input voltages by weights.

68. A method of sequenced, coordinated, and timed action using a sequence of action-initiating elements interspersed with variable timing elements that are fed by time delay and enhancement source, the method comprising:
loading the variable timing elements with time delays or enhancements from a variable time delay and enhancement source;
initiating an action-initiating sequence element;
initiating a variable timing element by the action-initiating sequence element; and
initiating the next action-initiating sequence element by the variable timing element.

69. The method of claim 68, wherein if additional elements are present in the sequence, continuing the initiating steps by subsequent sequence elements to conclusion or interruption.

70. The method of claim 68, wherein the action-initiating sequence element initiates an action.

71. A method of associating a source with an association target, the method comprising:
receiving, by a learning neurite that fires an output to an association target, a learning cue;
receiving, by the learning neurite, an input from the source; and
increasing, by the learning neurite, the weight applied to the input received from the source;
wherein later output from the source causes the learning neurite to stimulate the association target.

72. A method of associating a new source with an association target so that the new source evokes the same response as the original association source, the method comprising:
receiving, by a learning module of a learning neurite that fires an output to the association target, a pulse from the original association source that also fires a pulse to the association target;
receiving by the learning neurite a voltage input from the new source; and increasing a weight applied to the voltage input from the new source;

wherein later output from the new source causes the learning neurite to stimulate the association target.

73. A method of reciprocal memory wherein activation of a composite memory stimulates the individual memory elements that originally produced the composite memory, the method comprising:

forming the composite memory, wherein forming the composite memory further comprises:

stimulating a first element by the individual memory elements, reinforcing the pathways from the individual memory elements to the first element, stimulating a second element by the first element, reinforcing a second pathway from the first element to the second element, stimulating a target composite memory by the second element, stimulating the second element by the target composite memory, reinforcing a third pathway from the target composite memory to the second element, stimulating the first element by the second element, reinforcing a fourth pathway from the second element to the first element, stimulating the individual memory elements by the first element, reinforcing the pathways from the first element to the individual memory elements; and activating the individual memory elements from the composite memory, wherein the activating further comprises:

activating the composite memory, activating the second element by the composite memory, activating the first element by the second element, and activating the individual memory elements by the first element.

74. A computer readable storage medium comprising instructions that if executed enables a computing system to:

receive an input voltage;

amplify the input voltage by a weight into a weighted voltage rate-of change;

determine a new instantaneous voltage based on the existing instantaneous voltage, the weighted voltage rate-of-change, and the period of time;

transmit to one or more branches an output voltage pulse having a finite duration.

* * * * *